United States Patent
Badie et al.

(10) Patent No.: US 12,472,233 B2
(45) Date of Patent: Nov. 18, 2025

(54) ADMINISTRATION OF ENGINEERED T CELLS FOR TREATMENT OF CANCERS IN THE CENTRAL NERVOUS SYSTEM

(71) Applicant: City of Hope, Duarte, CA (US)

(72) Inventors: Behnam Badie, Duarte, CA (US); Christine E. Brown, Duarte, CA (US); Stephen J. Forman, Duarte, CA (US); Saul J. Priceman, Duarte, CA (US)

(73) Assignee: City of Hope, Duarte, CA (US)

( * ) Notice: Subject to any disclaimer, the term of this patent is extended or adjusted under 35 U.S.C. 154(b) by 1085 days.

(21) Appl. No.: 17/025,723

(22) Filed: Sep. 18, 2020

(65) Prior Publication Data

US 2021/0244761 A1   Aug. 12, 2021

Related U.S. Application Data

(63) Continuation of application No. 15/425,773, filed on Feb. 6, 2017, now abandoned.

(60) Provisional application No. 62/309,348, filed on Mar. 16, 2016, provisional application No. 62/292,152, filed on Feb. 5, 2016.

(51) Int. Cl.
| | |
|---|---|
| *A61K 40/31* | (2025.01) |
| *A61K 9/00* | (2006.01) |
| *A61K 38/17* | (2006.01) |
| *A61K 38/20* | (2006.01) |
| *A61K 40/11* | (2025.01) |
| *A61K 40/42* | (2025.01) |
| *A61P 25/00* | (2006.01) |
| *A61P 35/00* | (2006.01) |
| *C07K 14/54* | (2006.01) |
| *C07K 14/705* | (2006.01) |
| *C07K 14/725* | (2006.01) |
| *C07K 14/73* | (2006.01) |
| *C12N 5/0783* | (2010.01) |

(52) U.S. Cl.
CPC ........ *A61K 38/1774* (2013.01); *A61K 9/0085* (2013.01); *A61K 38/177* (2013.01); *A61K 38/2086* (2013.01); *A61K 40/11* (2025.01); *A61K 40/31* (2025.01); *A61K 40/4205* (2025.01); *A61K 40/4217* (2025.01); *A61P 35/00* (2018.01); *C07K 14/5437* (2013.01); *C07K 14/7051* (2013.01); *C07K 14/70514* (2013.01); *C07K 14/70521* (2013.01); *C12N 5/0636* (2013.01); *A61K 2239/17* (2023.05); *A61K 2239/31* (2023.05); *A61K 2239/38* (2023.05); *A61K 2239/47* (2023.05); *A61K 2239/49* (2023.05); *C07K 2319/03* (2013.01); *C07K 2319/33* (2013.01); *C07K 2319/74* (2013.01)

(58) Field of Classification Search
None
See application file for complete search history.

(56) References Cited

U.S. PATENT DOCUMENTS

| | | |
|---|---|---|
| 7,514,537 B2 | 4/2009 | Jensen |
| 8,324,353 B2 | 12/2012 | Jensen |
| 8,822,647 B2 | 9/2014 | Jensen |
| 9,181,527 B2 | 11/2015 | Sentman |
| 11,197,919 B2 | 12/2021 | Priceman et al. |
| 11,278,594 B2 | 3/2022 | Jensen |
| 2006/0067920 A1 | 3/2006 | Jensen |
| 2009/0257994 A1 | 10/2009 | Jensen |
| 2012/0148552 A1 | 6/2012 | Jensen |
| 2013/0280224 A1 | 10/2013 | Monsonego |
| 2015/0191792 A1 | 7/2015 | Scher et al. |
| 2017/0224733 A1 | 8/2017 | Badie et al. |
| 2022/0072043 A1 | 3/2022 | Niss et al. |
| 2022/0177528 A1 | 6/2022 | Barish et al. |
| 2023/0372483 A1 | 11/2023 | Brown et al. |
| 2023/0374085 A1 | 11/2023 | Brown et al. |
| 2023/0405119 A1 | 12/2023 | Brown et al. |

FOREIGN PATENT DOCUMENTS

| | | |
|---|---|---|
| CN | 105121472 | 12/2015 |
| CN | 105131126 | 12/2015 |
| CN | 105246912 | 1/2016 |
| CN | 108174604 | 6/2018 |
| CN | 108779174 | 11/2018 |
| EP | 2331566 | 10/2015 |
| JP | 2012-501180 | 1/2012 |
| WO | WO 2008/121420 | 10/2008 |
| WO | WO 2014/100385 | 6/2014 |
| WO | WO 2015/105522 | 7/2015 |
| WO | WO 2015/164594 | 10/2015 |

OTHER PUBLICATIONS

Ahmed et al., HER2-specific T cells target primary Glioblastoma stem cells and induce regression of autologous experimental tumors (Clin Cancer Res, 2010, 16:474-485) (Year: 2010).*
Brown et al., "Bioactivity and Safety of IL13Rα2-Redirected Chimeric Antigen Receptor CD8+ T Cells in Patients with Recurrent Glioblastoma", Clinical Cancer Research, 21(18) Sep. 15, 2015, pp. 4062-4072.
Brown et al., "Regression of Glioblastoma after Chimeric Antigen Receptor T-Cell Therapy," N Engl J Med., Dec. 29, 2016, 375(26):2561-2569.
Burns et al., "A high molecular weight melanoma-associated antigen-specific chimeric antigen receptor redirects lymphocytes to target human melanomas," Cancer research, 2010, 70(8):3027-3033.

(Continued)

*Primary Examiner* — Arthur S Leonard

(74) *Attorney, Agent, or Firm* — Fish & Richardson P.C.

(57) ABSTRACT

An improved method of treating cancers with engineered T cells is described.

16 Claims, 55 Drawing Sheets

Specification includes a Sequence Listing.

(56) References Cited

OTHER PUBLICATIONS

Chen et al. "Fusion protein linkers: property, design and functionality," Advanced drug delivery reviews, 2013, 65(10):1357-1369.
Cordoba et al., "The large ectodomains of CD45 and CD148 regulate their segregation from and inhibition of ligated T-cell receptor," Blood, The Journal of the American Society of Hematology, 2013, 121(21):4295-4302.
Colman et al., "Effects of amino acid sequence changes on antigen interactions," Research in Immunology, 1994, 145(1):33-36.
De Graaf et al., "Central memory CD4-I- T cells dominate the normal cerebrospinal fluid." Cytometry B Clin Cytom Jan. 1, 2011, 80(1):43-50.
Dolezal et al., "ScFv multimers of the anti-neuraminidase antibody NC10: shortening of the linker in single-chain Fv fragment assembled in VL to VH orientation drives the formation of dimers, trimers, tetramers and higher molecular mass multimers," Protein engineering, 2000, 13(8):565-574.
European Extended Search Report in European Application No. 17748349.2, dated Aug. 26, 2019, 12 pages.
Glantz et al., "Understanding the Origins of Gliomas and Developing Novel Therapies: Cerebrospinal Fluid and Subventricular Zone Interplay," Seminars in Oncology, Aug. 2009, 36(Supplement 2):S17-S24.
Heitz et al., "Triple-negative and HER2-overexpressing breast cancers exhibit an elevated risk and an earlier occurrence of cerebral metastases," European journal of cancer, 2009, 45(16):2792-2798.
Kong et al. "Suppression of human glioma xenografts with second-generation IL13R-specific chimeric antigen receptor-modified T cells." Clin Cancer Res., Nov. 1, 2012, 18(21);5949-5960.
Priceman, "Regional Delivery of Chimeric Antigen Receptor—Engineered T Cells Effectively Targets HER2+ Breast Cancer Metastasis to the Brain," Clin Can Res., 2017, 24(1):95-105.
Maeda et al., "Engineering of functional chimeric protein G-Vargula Luciferase," Analytical biochemistry, 1997, 249(2):147-152.
Muller et al., "Spliceosomal peptide P140 for immunotherapy of systemic lupus erythematosus: results of an early phase II clinical trial," Arthritis & Rheumatism: Official Journal of the American College of Rheumatology, 2008, 58(12):3873-3883.
Safdari et al., "Antibody humanization methods—a review and update," Biotechnology and Genetic Engineering Reviews, 2013, 29(2):175-186.
Sakka et al., "Anatomy and physiology of cerebrospinal fluid." Eur Ann Otorhinolaryngol Head Neck Dis., Dec. 31, 2011, 128(6):309-16.
Schuessler et al., "Autologous T-cell therapy for cytomegalovirus as a consolidative treatment for recurrent glioblastoma," Cancer research, 2014, 74(13):3466-3476.
Tasian et al., "CD19-redirected chimeric antigen receptor-modified T cells: a promising immunotherapy for children and adults with B-cell acute lymphoblastic leukemia (ALL)." Ther Adv Hematol., Oct. 2015, 6(5):228-41.
Teplyakov et al., "Antibody modeling assessment II. Structures and models," Proteins: Structure, Function, and Bioinformatics, 2014, 82(8):1563-1582.
Tsuboi et al., "Effects of Local Injection of ex Vivo Expanded Autologous Tumor-specific T Lymphocytes in Cases with Recurrent Malignant Gliomas," Clinical Cancer Research, Aug. 15, 2003, 9(9):3294-3302.
Tsurushinna et al., Reduction of End-stage Malignant Glioma by Injection with Autologous Cytotoxic T Lymphocytes. Jpn. J. Cancer Res. 90, 536-545, May 1999 (Year: 1999).
Whilding, "ErbB-Targeted CAR T-cell immunotherapy of Cancer," Immunotherapy, Mar. 15, 2015, 7(3)-229-241.
Invitation to Pay Additional Fees in International Application No. PCT/US2017/016711, dated May 11, 2017, 3 pages.
International Search Report and Written Opinion in International Application No. PCT/US2017/016711, mailed Jul. 17, 2017, 25 pages.
International Preliminary Report on Patentability in International Application No. PCT/US2017/016711, mailed Aug. 7, 2018, 15 pages.
Mskcc.org, "Leptomeningeal Metastases," Memorial Sloan Kettering Cancer Center, last updated Jan. 11, 2022 [retrieved on Feb. 7, 2022], retrieved from URL <https://www.mskcc.org/pdf/cancer-care/patient-education/leptomeningeal-metastases>, 5 pages.
Sun et al., "Construction and evaluation of a novel humanized HER2-specific chimeric receptor," Breast Cancer Research, 2014, 16(3):R61.
Brown et al., "Stem-like tumor-initiating cells isolated from IL13Rα2 expressing gliomas are targeted and killed by IL13-zetakine-redirected T cells," Clinical Cancer Research, Apr. 2012, 18(8):2199-2209 (Author Manuscript).
ClinicalTrials.gov [online], "A Phase 2 Study of BGJ398 in Patients With Recurrent GBM," NCT01975701, last updated Dec. 4, 2019, retrieved on Apr. 30, 2025, retrieved from URL <https://clinicaltrials.gov/study/NCT01975701?term=NCT01975701&rank=1>, 39 pages.
ClinicalTrials.gov [online], "Genetically Modified T-cells in Treating Patients With Recurrent or Refractory Malignant Glioma," NCT02208362, last updated Feb. 19, 2025, retrieved on Apr. 30, 2025, retrieved from URL <https://clinicaltrials.gov/study/NCT02208362?term=NCT02208362&rank=1>, 75 pages.
Debinski et al., "Retargeting Interleukin 13 for Radioimmunodetection and Radioimmunotherapy of Human High-grade Gliomas," Clinical Cancer Research, Oct. 1999, 5(10):3143s-3147s.
Donovan et al., "Locoregional delivery of CAR T cells to the cerebrospinal fluid for treatment of metastatic medulloblastoma and ependymoma," Nature Medicine, May 2020, 26(5):720-731 (Author Manuscript).
Goff et al., "Pilot Trial of Adoptive Transfer of Chimeric Antigen Receptor-transduced T Cells Targeting EGFRvIII in Patients With Glioblastoma," Journal of Immunotherapy, May 2019, 42(4):126-135 (Author Manuscript).
Monje et al., "Intravenous and intracranial GD2-CAR T cells for H3K27M+ diffuse midline gliomas," Nature, Jan. 2025, 637(8046):708-715.
Monje et al., "Sequential intravenous and intracerebroventricular GD2-CAR T-cell therapy for H3K27M-mutated diffuse midline gliomas," medRxiv, Jun. 2024, 47 pages.
O'Rourke et al., "A single dose of peripherally infused EGFRVIII-directed Car T cells mediates antigen loss and induces adaptive resistance in patients with recurrent glioblastoma," Science Translational Medicine, Jul. 2017, 9(339):eaaa0984, 16 pages.
Sterner et al., "Car-T cell therapy: current limitations and potential strategies," 2021, Blood Cancer Journal, 11:69.
Theruvath et al., "Locoregionally administered B7-H3-targeted Car T cells for treatment of atypical teratoid/rhabdoid tumors," Nature Medicine, May 2020, 26(5):712-719 (Author Manuscript).
Vitanza et al., "Intracerebroventricular B7-H3-targeting Car T cells for diffuse intrinsic pontine glioma: a phase 1 trial," Nature Medicine, Mar. 2025, 31(3):861-868.
Wang et al., "The Cerebroventricular Environment Modifies CAR T Cells for Potent Activity against Both Central Nervous System and Systemic Lymphoma," Cancer Immunology Research, Jan. 2021, 9(1):75-88.

\* cited by examiner

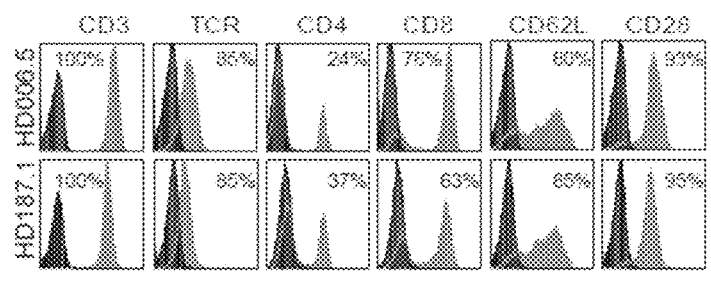
FIGURE 6A
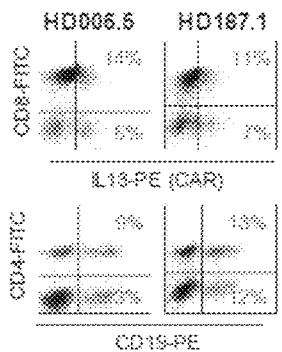
FIGURE 6B
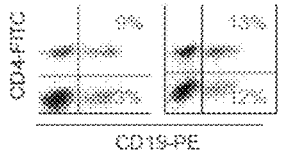

FIGURE 9A

MLLLVTSLLLCELPHPAFLLIPGPVPPSTALRYLIEELVNITQNQKAPLCNGSMVWSINLTAGM

GMCSFRa signal peptide (22 aa)   IL13 (112 aa)

YCAALESLINVSGCSAIEKTQRMLSGFCPHKVSAGQFSSLHVRDTKIEVAQFVKDLLLHLKKLF

REGRFNESKYGPPCPPCPAPEFEGGPSVFLFPPKPKDTLMISRTPEVTCVVVDVSQEDPEVQF

IgG4(L235E, N297Q in bold) (229 aa)

NWYVDGVEVHNAKTKPREEQFQSTYRVVSVLTVLHQDWLNGKEYKCKVSNKGLPSSIEKTIS

KAKGQPREPQVYTLPPSQEEMTKNQVSLTCLVKGFYPSDIAVEWESNGQPENNYKTTPPVL

DSDGSFFLYSRLTVDKSRWQEGNVFSCSVMHEALHNHYTQKSLSLSLGKMALIVLGGVAGLL

CD4tm (22 aa)

LFIGLGIFFKRGRKKLLYIFKQPFMRPVQTTQEEDGCSCRFPEEEEGGCELGGGRVKFSRSADA

41BB (42 aa)               Gly3  Zeta ( 112 aa)

PAYQQGQNQLYNELNLGRREEYDVLDKRRGRDPEMGGKPRRKNPQEGLYNELQKDKMAE

AYSEIGMKGERRRGKGHDGLYQGLSTATKDTYDALHMQALPPRLEGGGEGRGSLLTCGDV

T2A (24 aa)

EENPGPRMPPPRLLFFLLFLTPMEVRPEEPLVVKVEEGDNAVLQCLKGTSDGPTQQLTWSRE

SPLKPFLKLSLGLPGLGIHMRPLAIWLFIFNVSQQMGGFYLCQPGPPSEKAWQPGWTVNVE

GSGELFRWNVSDLGGLGCGLKNRSSEGPSSPSGKLMSPKLYVWAKDRPEIWEGEPPCVPPR

DSLNQSLSQDLTMAPGSTLWLSCGVPPDSVSRGPLSWTHVHPKGPKSLLSLELKDDRPARD

MWVMETGLLLPRATAQDAGKYYCHRGNLTMSFHLEITARPVLWHWLLRTGGWKVSAVTL

AYLIFCLCSLVGILHLQRALVLRRKR

FIGURE 10A

Yellow highlighting indicates the IL-13 optimized codon region including the GMCSF signal sequence (IL13op).
highlighting indicates the IgG4 optimized codon region (IgG4op[L235E, N297Q]).
highlighting indicates the two anticipated amino acid changes within the IgG4 hinge region(L235E and N297Q).
highlighting indicates the CD4 transmembrane optimized codon region.
highlighting indicates the 41BB cytoplasmic signaling region (41BB cyto).
highlighting indicates the 3 glycine linkers (g3).
Gray Highlighting indicates the CD3 zeta optimized codon region (zeta op).
highlighting indicates the T2A sequence (T2A).
highlighting Indicates the truncated CD19 sequence (CD19t).

```
                              1                                              50
IL13(EQ)41BBZeta        (1)   GTTAGACCAGATCTGAGCCTGGGAGCTCTCTGGCTAACTAGGGAACCCAC
CD19Rop_epHIV7          (1)   GTTAGACCAGATCTGAGCCTGGGAGCTCTCTGGCTAACTAGGGAACCCAC
      Consensus         (1)   GTTAGACCAGATCTGAGCCTGGGAGCTCTCTGGCTAACTAGGGAACCCAC
                              51                                            100
IL13(EQ)41BBZeta       (51)   TGCTTAAGCCTCAATAAAGCTTGCCTTGAGTGCTTCAAGTAGTGTGTGCC
CD19Rop_epHIV7         (51)   TGCTTAAGCCTCAATAAAGCTTGCCTTGAGTGCTTCAAGTAGTGTGTGCC
      Consensus        (51)   TGCTTAAGCCTCAATAAAGCTTGCCTTGAGTGCTTCAAGTAGTGTGTGCC
                              101                                           150
IL13(EQ)41BBZeta      (101)   CGTCTGTTGTGTGACTCTGGTAACTAGAGATCCCTCAGACCCTTTTAGTC
CD19Rop_epHIV7        (101)   CGTCTGTTGTGTGACTCTGGTAACTAGAGATCCCTCAGACCCTTTTAGTC
      Consensus       (101)   CGTCTGTTGTGTGACTCTGGTAACTAGAGATCCCTCAGACCCTTTTAGTC
                              151                                           200
IL13(EQ)41BBZeta      (151)   AGTGTGGAAAATCTCTAGCAGTGGCGCCCGAACAGGGACTTGAAAGCGAA
CD19Rop_epHIV7        (151)   AGTGTGGAAAATCTCTAGCAGTGGCGCCCGAACAGGGACTTGAAAGCGAA
      Consensus       (151)   AGTGTGGAAAATCTCTAGCAGTGGCGCCCGAACAGGGACTTGAAAGCGAA
                              201                                           250
IL13(EQ)41BBZeta      (201)   AGGGAAACCAGAGGAGCTCTCTCGACGCAGGACTCGGCTTGCTGAAGCGC
CD19Rop_epHIV7        (201)   AGGGAAACCAGAGGAGCTCTCTCGACGCAGGACTCGGCTTGCTGAAGCGC
      Consensus       (201)   AGGGAAACCAGAGGAGCTCTCTCGACGCAGGACTCGGCTTGCTGAAGCGC
                              251                                           300
IL13(EQ)41BBZeta      (251)   GCACGGCAAGAGGCGAGGGGCGGCGACTGGTGAGTACGCCAAAAATTTTG
CD19Rop_epHIV7        (251)   GCACGGCAAGAGGCGAGGGGCGGCGACTGGTGAGTACGCCAAAAATTTTG
      Consensus       (251)   GCACGGCAAGAGGCGAGGGGCGGCGACTGGTGAGTACGCCAAAAATTTTG
                              301                                           350
IL13(EQ)41BBZeta      (301)   ACTAGCGGAGGCTAGAAGGAGAGAGATGGGTGCGAGAGCGTCAGTATTAA
CD19Rop_epHIV7        (301)   ACTAGCGGAGGCTAGAAGGAGAGAGATGGGTGCGAGAGCGTCAGTATTAA
      Consensus       (301)   ACTAGCGGAGGCTAGAAGGAGAGAGATGGGTGCGAGAGCGTCAGTATTAA
                              351                                           400
IL13(EQ)41BBZeta      (351)   GCGGGGAGAATTAGATCGATGGGAAAAAATTCGGTTAAGGCCAGGGGGA
CD19Rop_epHIV7        (351)   GCGGGGAGAATTAGATCGATGGGAAAAAATTCGGTTAAGGCCAGGGGGA
      Consensus       (351)   GCGGGGAGAATTAGATCGATGGGAAAAAATTCGGTTAAGGCCAGGGGGA
                              401                                           450
IL13(EQ)41BBZeta      (401)   AAGAAAAAATATAAATTAAAACATATAGTATGGGCAAGCAGGGAGCTAGA
CD19Rop_epHIV7        (401)   AAGAAAAAATATAAATTAAAACATATAGTATGGGCAAGCAGGGAGCTAGA
      Consensus       (401)   AAGAAAAAATATAAATTAAAACATATAGTATGGGCAAGCAGGGAGCTAGA
                              451                                           500
```

FIGURE 10B

```
IL13(EQ)41BBZeta    (451) ACGATTCGCAGTTAATCCTGGCCTGTTAGAAACATCAGAAGGCTGTAGAC
   CD19Rop_epHIV7   (451) ACGATTCGCAGTTAATCCTGGCCTGTTAGAAACATCAGAAGGCTGTAGAC
        Consensus   (451) ACGATTCGCAGTTAATCCTGGCCTGTTAGAAACATCAGAAGGCTGTAGAC
                          501                                              550

IL13(EQ)41BBZeta    (501) AAATACTGGGACAGCTACAACCATCCCTTCAGACAGGATCAGAAGAACTT
   CD19Rop_epHIV7   (501) AAATACTGGGACAGCTACAACCATCCCTTCAGACAGGATCAGAAGAACTT
        Consensus   (501) AAATACTGGGACAGCTACAACCATCCCTTCAGACAGGATCAGAAGAACTT
                          551                                              600

IL13(EQ)41BBZeta    (551) AGATCATTATATAATACAGTAGCAACCCTCTATTGTGTGCATCAAAGGAT
   CD19Rop_epHIV7   (551) AGATCATTATATAATACAGTAGCAACCCTCTATTGTGTGCATCAAAGGAT
        Consensus   (551) AGATCATTATATAATACAGTAGCAACCCTCTATTGTGTGCATCAAAGGAT
                          601                                              650

IL13(EQ)41BBZeta    (601) AGAGATAAAAGACACCAAGGAAGCTTTAGACAAGATAGAGGAAGAGCAAA
   CD19Rop_epHIV7   (601) AGAGATAAAAGACACCAAGGAAGCTTTAGACAAGATAGAGGAAGAGCAAA
        Consensus   (601) AGAGATAAAAGACACCAAGGAAGCTTTAGACAAGATAGAGGAAGAGCAAA
                          651                                              700

IL13(EQ)41BBZeta    (651) ACAAAAGTAAGAAAAAAGCACAGCAAGCAGCAGCTGACACAGGACACAGC
   CD19Rop_epHIV7   (651) ACAAAAGTAAGAAAAAAGCACAGCAAGCAGCAGCTGACACAGGACACAGC
        Consensus   (651) ACAAAAGTAAGAAAAAAGCACAGCAAGCAGCAGCTGACACAGGACACAGC
                          701                                              750

IL13(EQ)41BBZeta    (701) AATCAGGTCAGCCAAAATTACCCTATAGTGCAGAACATCCAGGGGCAAAT
   CD19Rop_epHIV7   (701) AATCAGGTCAGCCAAAATTACCCTATAGTGCAGAACATCCAGGGGCAAAT
        Consensus   (701) AATCAGGTCAGCCAAAATTACCCTATAGTGCAGAACATCCAGGGGCAAAT
                          751                                              800

IL13(EQ)41BBZeta    (751) GGTACATCAGGCCATATCACCTAGAACTTTAAATGCATGGGTAAAAGTAG
   CD19Rop_epHIV7   (751) GGTACATCAGGCCATATCACCTAGAACTTTAAATGCATGGGTAAAAGTAG
        Consensus   (751) GGTACATCAGGCCATATCACCTAGAACTTTAAATGCATGGGTAAAAGTAG
                          801                                              850

IL13(EQ)41BBZeta    (801) TAGAAGAAAGGCTTTCAGCCCAGAAGTGATACCCATGTTTTCAGCATTA
   CD19Rop_epHIV7   (801) TAGAAGAAAGGCTTTCAGCCCAGAAGTGATACCCATGTTTTCAGCATTA
        Consensus   (801) TAGAAGAAAGGCTTTCAGCCCAGAAGTGATACCCATGTTTTCAGCATTA
                          851                                              900

IL13(EQ)41BBZeta    (851) TCAGAAGGAGCCACCCCACAAGATTTAAACACCATGCTAAACACAGTGGG
   CD19Rop_epHIV7   (851) TCAGAAGGAGCCACCCCACAAGATTTAAACACCATGCTAAACACAGTGGG
        Consensus   (851) TCAGAAGGAGCCACCCCACAAGATTTAAACACCATGCTAAACACAGTGGG
                          901                                              950

IL13(EQ)41BBZeta    (901) GGGACATCAAGCAGCCATGCAAATGTTAAAAGAGACCATCAATGAGGAAG
   CD19Rop_epHIV7   (901) GGGACATCAAGCAGCCATGCAAATGTTAAAAGAGACCATCAATGAGGAAG
        Consensus   (901) GGGACATCAAGCAGCCATGCAAATGTTAAAAGAGACCATCAATGAGGAAG
                          951                                             1000

IL13(EQ)41BBZeta    (951) CTGCAGGCAAAGAAGAGTGGTGCAGAGAGAAAAAAGAGCAGTGGGAAT
   CD19Rop_epHIV7   (951) CTGCAGGCAAAGAAGAGTGGTGCAGAGAGAAAAAAGAGCAGTGGGAAT
        Consensus   (951) CTGCAGGCAAAGAAGAGTGGTGCAGAGAGAAAAAAGAGCAGTGGGAAT
                          1001                                            1050

IL13(EQ)41BBZeta   (1001) AGGAGCTTTGTTCCTTGGGTTCTTGGGAGCAGCAGGAAGCACTATGGGCG
   CD19Rop_epHIV7  (1001) AGGAGCTTTGTTCCTTGGGTTCTTGGGAGCAGCAGGAAGCACTATGGGCG
        Consensus  (1001) AGGAGCTTTGTTCCTTGGGTTCTTGGGAGCAGCAGGAAGCACTATGGGCG
                          1051                                            1100

IL13(EQ)41BBZeta   (1051) CAGCGTCAATGACGCTGACGGTACAGGCCAGACAATTATTGTCTGGTATA
   CD19Rop_epHIV7  (1051) CAGCGTCAATGACGCTGACGGTACAGGCCAGACAATTATTGTCTGGTATA
        Consensus  (1051) CAGCGTCAATGACGCTGACGGTACAGGCCAGACAATTATTGTCTGGTATA
                          1101                                            1150

IL13(EQ)41BBZeta   (1101) GTGCAGCAGCAGAACAATTTGCTGAGGGCTATTGAGGCGCAACAGCATCT
   CD19Rop_epHIV7  (1101) GTGCAGCAGCAGAACAATTTGCTGAGGGCTATTGAGGCGCAACAGCATCT
        Consensus  (1101) GTGCAGCAGCAGAACAATTTGCTGAGGGCTATTGAGGCGCAACAGCATCT
```

FIGURE 10C

```
                              1151                                          1200
IL13(EQ)41BBZeta    (1151) GTTGCAACTCACAGTCTGGGGCATCAAGCAGCTCCAGGCAAGAATCCTGG
CD19Rop_epHIV7      (1151) GTTGCAACTCACAGTCTGGGGCATCAAGCAGCTCCAGGCAAGAATCCTGG
      Consensus     (1151) GTTGCAACTCACAGTCTGGGGCATCAAGCAGCTCCAGGCAAGAATCCTGG
                              1201                                          1250
IL13(EQ)41BBZeta    (1201) CTGTGAAAGATACCTAAAGGATCAACAGCTCCTGGGGATTTGGGGTTGC
CD19Rop_epHIV7      (1201) CTGTGAAAGATACCTAAAGGATCAACAGCTCCTGGGGATTTGGGGTTGC
      Consensus     (1201) CTGTGAAAGATACCTAAAGGATCAACAGCTCCTGGGGATTTGGGGTTGC
                              1251                                          1300
IL13(EQ)41BBZeta    (1251) TCTGGAAAACTCATTTGCACCACTGCTGTGCCTTGGATCTACAAATGGCA
CD19Rop_epHIV7      (1251) TCTGGAAAACTCATTTGCACCACTGCTGTGCCTTGGATCTACAAATGGCA
      Consensus     (1251) TCTGGAAAACTCATTTGCACCACTGCTGTGCCTTGGATCTACAAATGGCA
                              1301                                          1350
IL13(EQ)41BBZeta    (1301) GTATTCATCCACAATTTTAAAAGAAAAGGGGGGATTGGGGGGTACAGTGC
CD19Rop_epHIV7      (1301) GTATTCATCCACAATTTTAAAAGAAAAGGGGGGATTGGGGGGTACAGTGC
      Consensus     (1301) GTATTCATCCACAATTTTAAAAGAAAAGGGGGGATTGGGGGGTACAGTGC
                              1351                                          1400
IL13(EQ)41BBZeta    (1351) AGGGGAAAGAATAGTAGACATAATAGCAACAGACATACAAACTAAAGAAT
CD19Rop_epHIV7      (1351) AGGGGAAAGAATAGTAGACATAATAGCAACAGACATACAAACTAAAGAAT
      Consensus     (1351) AGGGGAAAGAATAGTAGACATAATAGCAACAGACATACAAACTAAAGAAT
                              1401                                          1450
IL13(EQ)41BBZeta    (1401) TACAAAAACAAATTACAAAAATTCAAAATTTTCGGGTTTATTACAGGGAC
CD19Rop_epHIV7      (1401) TACAAAAACAAATTACAAAAATTCAAAATTTTCGGGTTTATTACAGGGAC
      Consensus     (1401) TACAAAAACAAATTACAAAAATTCAAAATTTTCGGGTTTATTACAGGGAC
                              1451                                          1500
IL13(EQ)41BBZeta    (1451) AGCAGAGATCCAGTTTGGGGATCAATTGCATGAAGAATCTGCTTAGGGTT
CD19Rop_epHIV7      (1451) AGCAGAGATCCAGTTTGGGGATCAATTGCATGAAGAATCTGCTTAGGGTT
      Consensus     (1451) AGCAGAGATCCAGTTTGGGGATCAATTGCATGAAGAATCTGCTTAGGGTT
                              1501                                          1550
IL13(EQ)41BBZeta    (1501) AGGCGTTTTGCGCTGCTTCGCGAGGATCTGCGATCGCTCCGGTGCCCGTC
CD19Rop_epHIV7      (1501) AGGCGTTTTGCGCTGCTTCGCGAGGATCTGCGATCGCTCCGGTGCCCGTC
      Consensus     (1501) AGGCGTTTTGCGCTGCTTCGCGAGGATCTGCGATCGCTCCGGTGCCCGTC
                              1551                                          1600
IL13(EQ)41BBZeta    (1551) AGTGGGCAGAGCGCACATCGCCCACAGTCCCCGAGAAGTTGGGGGGAGGG
CD19Rop_epHIV7      (1551) AGTGGGCAGAGCGCACATCGCCCACAGTCCCCGAGAAGTTGGGGGGAGGG
      Consensus     (1551) AGTGGGCAGAGCGCACATCGCCCACAGTCCCCGAGAAGTTGGGGGGAGGG
                              1601                                          1650
IL13(EQ)41BBZeta    (1601) GTCGGCAATTGAACCGGTGCCTAGAGAAGGTGGCGCGGGGTAAACTGGGA
CD19Rop_epHIV7      (1601) GTCGGCAATTGAACCGGTGCCTAGAGAAGGTGGCGCGGGGTAAACTGGGA
      Consensus     (1601) GTCGGCAATTGAACCGGTGCCTAGAGAAGGTGGCGCGGGGTAAACTGGGA
                              1651                                          1700
IL13(EQ)41BBZeta    (1651) AAGTGATGTCGTGTACTGGCTCCGCCTTTTCCCGAGGGTGGGGGAGAAC
CD19Rop_epHIV7      (1651) AAGTGATGTCGTGTACTGGCTCCGCCTTTTCCCGAGGGTGGGGGAGAAC
      Consensus     (1651) AAGTGATGTCGTGTACTGGCTCCGCCTTTTCCCGAGGGTGGGGGAGAAC
                              1701                                          1750
IL13(EQ)41BBZeta    (1701) CGTATATAAGTGCAGTAGTCGCCGTGAACGTTCTTTTTCGCAACGGGTTT
CD19Rop_epHIV7      (1701) CGTATATAAGTGCAGTAGTCGCCGTGAACGTTCTTTTTCGCAACGGGTTT
      Consensus     (1701) CGTATATAAGTGCAGTAGTCGCCGTGAACGTTCTTTTTCGCAACGGGTTT
                              1751                                          1800
IL13(EQ)41BBZeta    (1751) GCCGCCAGAACACAGCTGAAGCTTCGAGGGGCTCGCATCTCTCCTTCACG
CD19Rop_epHIV7      (1751) GCCGCCAGAACACAGCTGAAGCTTCGAGGGGCTCGCATCTCTCCTTCACG
      Consensus     (1751) GCCGCCAGAACACAGCTGAAGCTTCGAGGGGCTCGCATCTCTCCTTCACG
                              1801                                          1850
IL13(EQ)41BBZeta    (1801) CGCCCGCCGCCCTACCTGAGGCCGCCATCCACGCCGGTTGAGTCGCGTTC
CD19Rop_epHIV7      (1801) CGCCCGCCGCCCTACCTGAGGCCGCCATCCACGCCGGTTGAGTCGCGTTC
```

FIGURE 10D

```
        Consensus  (1801) CGCCCGCCGCCCTACCTGAGGCCGCCATCCACGCCGGTTGAGTCGCGTTC
                          1851                                             1900
IL13(EQ)41BBZeta  (1851) TGCCGCCTCCCGCCTGTGGTGCCTCCTGAACTGCGTCCGCCGTCTAGGTA
     CD19Rop_epHIV7  (1851) TGCCGCCTCCCGCCTGTGGTGCCTCCTGAACTGCGTCCGCCGTCTAGGTA
        Consensus  (1851) TGCCGCCTCCCGCCTGTGGTGCCTCCTGAACTGCGTCCGCCGTCTAGGTA
                          1901                                             1950
IL13(EQ)41BBZeta  (1901) AGTTTAAAGCTCAGGTCGAGACCGGGCCTTTGTCCGGCGCTCCCTTGGAG
     CD19Rop_epHIV7  (1901) AGTTTAAAGCTCAGGTCGAGACCGGGCCTTTGTCCGGCGCTCCCTTGGAG
        Consensus  (1901) AGTTTAAAGCTCAGGTCGAGACCGGGCCTTTGTCCGGCGCTCCCTTGGAG
                          1951                                             2000
IL13(EQ)41BBZeta  (1951) CCTACCTAGACTCAGCCGGCTCTCCACGCTTTGCCTGACCCTGCTTGCTC
     CD19Rop_epHIV7  (1951) CCTACCTAGACTCAGCCGGCTCTCCACGCTTTGCCTGACCCTGCTTGCTC
        Consensus  (1951) CCTACCTAGACTCAGCCGGCTCTCCACGCTTTGCCTGACCCTGCTTGCTC
                          2001                                             2050
IL13(EQ)41BBZeta  (2001) AACTCTACGTCTTTGTTTCGTTTTCTGTTCTGCGCCGTTACAGATCCAAG
     CD19Rop_epHIV7  (2001) AACTCTACGTCTTTGTTTCGTTTTCTGTTCTGCGCCGTTACAGATCCAAG
        Consensus  (2001) AACTCTACGTCTTTGTTTCGTTTTCTGTTCTGCGCCGTTACAGATCCAAG
                          2051                                             2100
IL13(EQ)41BBZeta  (2051) CTGTGACCGGCGCCTACGGCTAGCGCCGCCACCATGCTGCTGCTGGTGAC
     CD19Rop_epHIV7  (2051) CTGTGACCGGCGCCTACGGCTAGCGCCGCCACCATGCTGCTGCTGGTGAC
        Consensus  (2051) CTGTGACCGGCGCCTACGGCTAGCGCCGCCACCATGCTGCTGCTGGTGAC
                          2101                                             2150
IL13(EQ)41BBZeta  (2101) CAGCCTGCTGCTGTGCGAGCTGCCCCACCCCGCCTTTCTGCTGATCCCTG
     CD19Rop_epHIV7  (2101) CAGCCTGCTGCTGTGCGAGCTGCCCCACCCCGCCTTTCTGCTGATCCCCG
        Consensus  (2101) CAGCCTGCTGCTGTGCGAGCTGCCCCACCCCGCCTTTCTGCTGATCCCC G
                          2151                                             2200
IL13(EQ)41BBZeta  (2151) GC--CCCG-TGCCCCTAGCACCGCC---CTGCGCTACCTGATCGAGGAA
     CD19Rop_epHIV7  (2151) ACATCCAGATGACCCAGACCACCTCCAGCCTGAGCGCCAGCCTGGGCGAC
        Consensus  (2151)  C  CC G  TG CCC  A CACC CC    CTG GC  C     T G  GA
                          2201                                             2250
IL13(EQ)41BBZeta  (2195) CTGGTGA--------------------------ACATCACCCAGAACCAGAA
     CD19Rop_epHIV7  (2201) CGGGTGACCATCAGCTGCCGGGCCAGCCAGGACATCAGCAAGTACCTGAA
        Consensus  (2201) C GGTGA                         ACATCA C AG ACC GAA
                          2251                                             2300
IL13(EQ)41BBZeta  (2221) --------------AGCCC--------CC---------CTGTGCAAC-----
     CD19Rop_epHIV7  (2251) CTGGTATCAGCAGAAGCCCGACGGCACCGTCAAGCTGCTGATCTACCACA
        Consensus  (2251)               AGCCC        CC         CTG C AC
                          2301                                             2350
IL13(EQ)41BBZeta  (2237) -------GGCAGCAT-----GGTGTG---------------------------
     CD19Rop_epHIV7  (2301) CCAGCCGGCTGCACAGCGGCGTGCCCAGCCGGTTTAGCGGCAGCGGCTCC
        Consensus  (2301)       GGC GCA     GG GTG
                          2351                                             2400
IL13(EQ)41BBZeta  (2251) -----------------GAGCATC---AACCTG-----------------
     CD19Rop_epHIV7  (2351) GGCACCGACTACAGCCTGACCATCTCCAACCTGGAACAGGAAGATATCGC
        Consensus  (2351)                  GA CATC   AACCTG
                          2401                                             2450
IL13(EQ)41BBZeta  (2264) -ACC--------GCCGGCATGT------ACTG------------TGCCGCC-
     CD19Rop_epHIV7  (2401) CACCTACTTTTGCCAGCAGGGCAACACACTGCCCTACACCTTTGGCGGCG
        Consensus  (2401)  ACC        GCC GCA G      ACTG            TG CG C
                          2451                                             2500
IL13(EQ)41BBZeta  (2288) --------CTGGAAA------GCCTGATCAACGTGAGCGGCT--------
     CD19Rop_epHIV7  (2451) GAACAAAGCTGGAAATCACCGGCAGCACCTCCGGCAGCGGCAAGCCTGGC
        Consensus  (2451)         CTGGAAA      GC  A C  CG  AGCGGC
                          2501                                             2550
IL13(EQ)41BBZeta  (2316) -----------GCAGCGCCATCG----------------AGAAAA--------
```

FIGURE 10E

```
CD19Rop_epHIV7   (2501) AGCGGCGAGGGCAGCACCAAGGGCGAGGTGAAGCTGCAGGAAAGCGGCCC
    Consensus    (2501)       GCAGC CCA  G                   AG AAA
                        2551                                              2600
IL13(EQ)41BBZeta (2334) ------------------CCCAGCG------------------------
CD19Rop_epHIV7   (2551) TGGCCTGGTGGCCCCCAGCCAGAGCCTGAGCGTGACCTGCACCGTGAGCG
    Consensus    (2551)                   CCCAGC
                        2601                                              2650
IL13(EQ)41BBZeta (2341) ----GATGCTGTCCGGCTTCTGC------------------CCCCACAAG
CD19Rop_epHIV7   (2601) GCGTGAGCCTGCCCGACTACGGCGTGAGCTGGATCCGGCAGCCCCCCAGG
    Consensus    (2601)     GA CTG CCG CT C GC                  CCCC CA G
                        2651                                              2700
IL13(EQ)41BBZeta (2369) ------------------------------GTGTCCGCCGGAC-----AGTT
CD19Rop_epHIV7   (2651) AAGGGCCTGGAATGGCTGGGCGTGATCTGGGGCAGCGAGACCACCTACTA
    Consensus    (2651)                               G  G  C   GC   GAC        A T
                        2701                                              2750
IL13(EQ)41BBZeta (2386) CAGCAGCCTGC--ACGTGCGGG------------------ACACCAAGA
CD19Rop_epHIV7   (2701) CAACAGCGCCCTGAAGAGCCGGCTGACCATCATCAAGGACAACAGCAAGA
    Consensus    (2701) CA CAGC   C  A G GC GG                   ACA CAAGA
                        2751                                              2800
IL13(EQ)41BBZeta (2415) TCGAGGTGGCCCAGTTCGTGAAGGACCTGCTG------------------C
CD19Rop_epHIV7   (2751) GCCAGGTGTTCCTGAAGATGAACAGCCTGCAGACCGACGACACCGCCATC
    Consensus    (2751)  C AGGTG  CC G   TGAA   CCTGC G                         C
                        2801                                              2850
IL13(EQ)41BBZeta (2448) TGCACCTG-----AAGAA----------------GCTGTTCCG----GGA----
CD19Rop_epHIV7   (2801) TACTACTGCGCCAAGCACTACTACTACGGCGGCAGCTACGCCATGGACTA
    Consensus    (2801) T C CTG    AAG A              GC G T CG    GGA
                        2851                                              2900
IL13(EQ)41BBZeta (2473) ---GGGCCGGTTCAAC------------------
CD19Rop_epHIV7   (2851) CTGGGGCCAGGGCACCAGCGTGACCGTGAGCAGCGAGAGCAAGTACGGCC
    Consensus    (2851)     GGGCC G  CA C                    GAGAGCAAGTACGGCC
                        2901                                              2950
IL13(EQ)41BBZeta (2502)
CD19Rop_epHIV7   (2901) CTCCCTGCCCCCTTGCCCTGCCCCCGAGTTCCTGGGCGGACCCAGCGTG
    Consensus    (2901) CTCCCTGCCCCCTTGCCCTGCCCC GAGTTC  GGGCGGACCCAGCGTG
                        2951                                              3000
IL13(EQ)41BBZeta (2552)
CD19Rop_epHIV7   (2951) TTCCTGTTCCCCCCAAGCCCAAGGACACCCTGATGATCAGCCGGACCCC
    Consensus    (2951) TTCCTGTTCCCCCCAAGCCCAAGGACACCCTGATGATCAGCCGGACCCC
                        3001                                              3050
IL13(EQ)41BBZeta (2602)
CD19Rop_epHIV7   (3001) CGAGGTGACCTGCGTGGTGGTGGACGTGAGCCAGGAAGATCCCGAGGTCC
    Consensus    (3001)  GAGGTGACCTGCGTGGTGGTGGACGTGAGCCAGGAAGATCC GAGGTCC
                        3051                                              3100
IL13(EQ)41BBZeta (2652)
CD19Rop_epHIV7   (3051) AGTTCAATTGGTACGTGGACGGCGTGGAGGTGCACAACGCCAAGACCAAG
    Consensus    (3051) AGTTCAATTGGTACGTGGACGGCGTGGAGGTGCACAACGCCAAGACCAAG
                        3101                                              3150
IL13(EQ)41BBZeta (2702)
CD19Rop_epHIV7   (3101) CCCAGGGAAGAGCAGTTCAACAGCACCTACCGGGTGGTGTCCGTGCTGAC
    Consensus    (3101) CCCAGGGAAGAGCAGTTC A AGCACCTACCGGGTGGTGTCCGTGCTGAC
                        3151                                              3200
IL13(EQ)41BBZeta (2752)
CD19Rop_epHIV7   (3151) CGTGCTGCACCAGGACTGGCTGAACGGCAAAGAATACAAGTGCAAGGTGT
    Consensus    (3151) CGTGCTGCACCAGGACTGGCTGAACGGCAAAGAATACAAGTGCAAGGTGT
                        3201                                              3250
```

FIGURE 10F

```
IL13(EQ)41BBZeta  (2802)
CD19Rop_epHIV7    (3201) CCAACAAGGGCCTGCCCAGCAGCATCGAGAAAACCATCAGCAAGGCCAAG
     Consensus    (3201) CCAACAAGGGCCTGCCCAGCAGCATCGAGAAAACCATCAGCAAGGCCAAG
                         3251                                             3300
IL13(EQ)41BBZeta  (2852)
CD19Rop_epHIV7    (3251) GGCCAGCCTCGGGAGCCCCAGGTGTACACCCTGCCCCCTTCCCAGGAAGA
     Consensus    (3251) GGCCAGCCTCGGGAGCCCCAGGTGTACACCCTGCCCCCTTCCCAGGAAGA
                         3301                                             3350
IL13(EQ)41BBZeta  (2902)
CD19Rop_epHIV7    (3301) GATGACCAAGAATCAGGTGTCCCTGACCTGCCTGGTGAAGGGCTTCTACC
     Consensus    (3301) GATGACCAAGAATCAGGTGTCCCTGACCTGCCTGGTGAAGGGCTTCTACC
                         3351                                             3400
IL13(EQ)41BBZeta  (2952)
CD19Rop_epHIV7    (3351) CCAGCGACATCGCCGTGGAGTGGGAGAGCAACGGCCAGCCCGAGAACAAC
     Consensus    (3351) CCAGCGACATCGCCGTGGAGTGGGAGAGCAACGGCCAGCCCGAGAACAAC
                         3401                                             3450
IL13(EQ)41BBZeta  (3002)
CD19Rop_epHIV7    (3401) TACAAGACCACCCCCCCTGTGCTGGACAGCGACGGCAGCTTCTTCCTGTA
     Consensus    (3401) TACAAGACCACCCCCCCTGTGCTGGACAGCGACGGCAGCTTCTTCCTGTA
                         3451                                             3500
IL13(EQ)41BBZeta  (3052)
CD19Rop_epHIV7    (3451) CAGCAGGCTGACCGTGGACAAGAGCCGGTGGCAGGAAGGCAACGTCTTTA
     Consensus    (3451) CAGCAGGCTGACCGTGGACAAGAGCCGGTGGCAGGAAGGCAACGTCTTTA
                         3501                                             3550
IL13(EQ)41BBZeta  (3102)
CD19Rop_epHIV7    (3501) GCTGCAGCGTGATGCACGAGGCCCTGCACAACCACTACACCCAGAAGAGC
     Consensus    (3501) GCTGCAGCGTGATGCACGAGGCCCTGCACAACCACTACACCCAGAAGAGC
                         3551                                             3600
IL13(EQ)41BBZeta  (3152) CTGTCCCTGAGCCTGGGCAAG
CD19Rop_epHIV7    (3551) CTGTCCCTGAGCCTGGGCAAGATGGCCCTGATCGTGCTGGGCGGCGTGGC
     Consensus    (3551) CTGTCCCTGAGCCTGGGCAAGATGGCCCTGATCGTGCTGGGCGGCGTGGC
                         3601                                             3650
IL13(EQ)41BBZeta  (3202)
CD19Rop_epHIV7    (3601) CGGGCTGCTGCTGTTCATCGGCCTGGGCATCTTTTTC-------------
     Consensus    (3601) CGGGCTGCTGCTGTTCATCGGCCTGGGCATCTTTTTC
                         3651                                             3700
IL13(EQ)41BBZeta  (3252)
CD19Rop_epHIV7    (3638) -----------------------------------C--------------
     Consensus    (3651)                                    C
                         3701                                             3750
IL13(EQ)41BBZeta  (3302)
CD19Rop_epHIV7    (3639) --------------------------------------------------
     Consensus    (3701)
                         3751                                             3800
IL13(EQ)41BBZeta  (3352)                              CGGGTGAAGTTCAGCCGGTCCGCCGACG
CD19Rop_epHIV7    (3639) -------------------------GGGTGAAGTTCAGCCGGTCCGCCGACG
     Consensus    (3751)                              GGGTGAAGTTCAGCCGGTCCGCCGACG
                         3801                                             3850
IL13(EQ)41BBZeta  (3402) CCCCTGCCTACCAGCAGGGCCAGAACCAGCTGTACAACGAGCTGAACCTG
CD19Rop_epHIV7    (3666) CCCCTGCCTACCAGCAGGGCCAGAACCAGCTGTACAACGAGCTGAACCTG
     Consensus    (3801) CCCCTGCCTACCAGCAGGGCCAGAACCAGCTGTACAACGAGCTGAACCTG
                         3851                                             3900
IL13(EQ)41BBZeta  (3452) GGCAGGCGGGAGGAATACGACGTGCTGGACAAGCGGAGAGGCCGGGACCC
CD19Rop_epHIV7    (3716) GGCAGGCGGGAGGAATACGACGTGCTGGACAAGCGGAGAGGCCGGGACCC
     Consensus    (3851) GGCAGGCGGGAGGAATACGACGTGCTGGACAAGCGGAGAGGCCGGGACCC
```

FIGURE 10G

```
                             3901                                              3950
IL13(EQ)41BBZeta    (3502)   TGAGATGGGCGGCAAGCCTCGGCGGAAGAACCCCCAGGAAGGCCTGTATA
CD19Rop_epHIV7      (3766)   TGAGATGGGCGGCAAGCCCAGGCGGAAGAACCCTCAGGAAGGCCTGTATA
        Consensus   (3901)   TGAGATGGGCGGCAAGCC  GGCGGAAGAACCC CAGGAAGGCCTGTATA
                             3951                                              4000
IL13(EQ)41BBZeta    (3552)   ACGAACTGCAGAAAGACAAGATGGCCGAGGCCTACAGCGAGATCGGCATG
CD19Rop_epHIV7      (3816)   ACGAACTGCAGAAAGACAAGATGGCCGAGGCCTACAGCGAGATCGGCATG
        Consensus   (3951)   ACGAACTGCAGAAAGACAAGATGGCCGAGGCCTACAGCGAGATCGGCATG
                             4001                                              4050
IL13(EQ)41BBZeta    (3602)   AAGGGCGAGCGGAGGCGGGGCAAGGGCCACGACGGCCTGTATCAGGGCCT
CD19Rop_epHIV7      (3866)   AAGGGCGAGCGGCGGAGGGGCAAGGGCCACGACGGCCTGTACCAGGGCCT
        Consensus   (4001)   AAGGGCGAGCGG GG GGGGCAAGGGCCACGACGGCCTGTA CAGGGCCT
                             4051                                              4100
IL13(EQ)41BBZeta    (3652)   GTCCACCGCCACCAAGGATACCTACGACGCCCTGCACATGCAGGCCCTGC
CD19Rop_epHIV7      (3916)   GAGCACCGCCACCAAGGATACCTACGACGCCCTGCACATGCAGGCCCTGC
        Consensus   (4051)   G  CACCGCCACCAAGGATACCTACGACGCCCTGCACATGCAGGCCCTGC
                             4101                                              4150
IL13(EQ)41BBZeta    (3702)   CCCCAAGG
CD19Rop_epHIV7      (3966)   CCCC---------------------------------------------
        Consensus   (4101)   CCCC
                             4151                                              4200
IL13(EQ)41BBZeta    (3752)   --------------------------------------------------
CD19Rop_epHIV7      (3970)   --------------------------------------------------
        Consensus   (4151)
                             4201                                              4250
IL13(EQ)41BBZeta    (3802)   --------------------------------------------------
CD19Rop_epHIV7      (3970)   --------------------------------------------------
        Consensus   (4201)
                             4251                                              4300
IL13(EQ)41BBZeta    (3852)   --------------------------------------------------
CD19Rop_epHIV7      (3970)   --------------------------------------------------
        Consensus   (4251)
                             4301                                              4350
IL13(EQ)41BBZeta    (3902)   --------------------------------------------------
CD19Rop_epHIV7      (3970)   --------------------------------------------------
        Consensus   (4301)
                             4351                                              4400
IL13(EQ)41BBZeta    (3952)   --------------------------------------------------
CD19Rop_epHIV7      (3970)   --------------------------------------------------
        Consensus   (4351)
                             4401                                              4450
IL13(EQ)41BBZeta    (4002)   --------------------------------------------------
CD19Rop_epHIV7      (3970)   --------------------------------------------------
        Consensus   (4401)
                             4451                                              4500
IL13(EQ)41BBZeta    (4052)   --------------------------------------------------
CD19Rop_epHIV7      (3970)   --------------------------------------------------
        Consensus   (4451)
                             4501                                              4550
IL13(EQ)41BBZeta    (4102)   --------------------------------------------------
CD19Rop_epHIV7      (3970)   --------------------------------------------------
        Consensus   (4501)
                             4551                                              4600
IL13(EQ)41BBZeta    (4152)   --------------------------------------------------
CD19Rop_epHIV7      (3970)   --------------------------------------------------
```

FIGURE 10H

```
        Consensus   (4551)
                           4601                                               4650
 IL13(EQ)41BBZeta  (4202)
    CD19Rop_epHIV7 (3970) --------------------------------------------------
        Consensus  (4601)
                           4651                                               4700
 IL13(EQ)41BBZeta  (4252)
    CD19Rop_epHIV7 (3970) --------------------------------------------------
        Consensus  (4651)
                           4701                                               4750
 IL13(EQ)41BBZeta  (4302)
    CD19Rop_epHIV7 (3970) -----------------------------C-------AGG------------
        Consensus  (4701)                              C       AGG
                           4751                                               4800
 IL13(EQ)41BBZeta  (4352)
    CD19Rop_epHIV7 (3974) -------------------------------T------------------
        Consensus  (4751)
                           4801                                               4850
 IL13(EQ)41BBZeta  (4402)
    CD19Rop_epHIV7 (3975) --------------------------------------------------
        Consensus  (4801)
                           4851                                               4900
 IL13(EQ)41BBZeta  (4452)
    CD19Rop_epHIV7 (3975) --------------------------------------------------
        Consensus  (4851)
                           4901                                               4950
 IL13(EQ)41BBZeta  (4502)
    CD19Rop_epHIV7 (3975) --------------------------------------------------
        Consensus  (4901)
                           4951                                               5000
 IL13(EQ)41BBZeta  (4552)
    CD19Rop_epHIV7 (3975) --------------------------------------------------
        Consensus  (4951)
                           5001                                               5050
 IL13(EQ)41BBZeta  (4602)
    CD19Rop_epHIV7 (3975) --------------------------------------------------
        Consensus  (5001)
                           5051                                               5100
 IL13(EQ)41BBZeta  (4652)
    CD19Rop_epHIV7 (3975) --------------------------------------------------
        Consensus  (5051)
                           5101                                               5150
 IL13(EQ)41BBZeta  (4702)
    CD19Rop_epHIV7 (3975) --------------------------------------------------
        Consensus  (5101)
                           5151                                               5200
 IL13(EQ)41BBZeta  (4752)    TCTAGACCCGGGCTGCAGGAATTCGATATCAAGCTTATCGATAATCAA
    CD19Rop_epHIV7 (3975) --------GACCCGGGCTGCAGGAATTCGATATCAAGCTTATCGATAATCAA
        Consensus  (5151)         GACCCGGGCTGCAGGAATTCGATATCAAGCTTATCGATAATCAA
                           5201                                               5250
 IL13(EQ)41BBZeta  (4802) CCTCTGGATTACAAAATTTGTGAAAGATTGACTGGTATTCTTAACTATGT
    CD19Rop_epHIV7 (4019) CCTCTGGATTACAAAATTTGTGAAAGATTGACTGGTATTCTTAACTATGT
        Consensus  (5201) CCTCTGGATTACAAAATTTGTGAAAGATTGACTGGTATTCTTAACTATGT
                           5251                                               5300
 IL13(EQ)41BBZeta  (4852) TGCTCCTTTTACGCTATGTGGATACGCTGCTTTAATGCCTTTGTATCATG
```

FIGURE 10I

```
CD19Rop_epHIV7   (4069)  TGCTCCTTTTACGCTATGTGGATACGCTGCTTTAATGCCTTTGTATCATG
    Consensus    (5251)  TGCTCCTTTTACGCTATGTGGATACGCTGCTTTAATGCCTTTGTATCATG
                         5301                                            5350
IL13(EQ)41BBZeta (4902) CTATTGCTTCCCGTATGGCTTTCATTTTCTCCTCCTTGTATAAATCCTGG
CD19Rop_epHIV7   (4119)  CTATTGCTTCCCGTATGGCTTTCATTTTCTCCTCCTTGTATAAATCCTGG
    Consensus    (5301)  CTATTGCTTCCCGTATGGCTTTCATTTTCTCCTCCTTGTATAAATCCTGG
                         5351                                            5400
IL13(EQ)41BBZeta (4952) TTGCTGTCTCTTTATGAGGAGTTGTGGCCCGTTGTCAGGCAACGTGGCGT
CD19Rop_epHIV7   (4169)  TTGCTGTCTCTTTATGAGGAGTTGTGGCCCGTTGTCAGGCAACGTGGCGT
    Consensus    (5351)  TTGCTGTCTCTTTATGAGGAGTTGTGGCCCGTTGTCAGGCAACGTGGCGT
                         5401                                            5450
IL13(EQ)41BBZeta (5002) GGTGTGCACTGTGTTTGCTGACGCAACCCCCACTGGTTGGGGCATTGCCA
CD19Rop_epHIV7   (4219)  GGTGTGCACTGTGTTTGCTGACGCAACCCCCACTGGTTGGGGCATTGCCA
    Consensus    (5401)  GGTGTGCACTGTGTTTGCTGACGCAACCCCCACTGGTTGGGGCATTGCCA
                         5451                                            5500
IL13(EQ)41BBZeta (5052) CCACCTGTCAGCTCCTTTCCGGGACTTTCGCTTTCCCCCTCCCTATTGCC
CD19Rop_epHIV7   (4269)  CCACCTGTCAGCTCCTTTCCGGGACTTTCGCTTTCCCCCTCCCTATTGCC
    Consensus    (5451)  CCACCTGTCAGCTCCTTTCCGGGACTTTCGCTTTCCCCCTCCCTATTGCC
                         5501                                            5550
IL13(EQ)41BBZeta (5102) ACGGCGGAACTCATCGCCGCCTGCCTTGCCCGCTGCTGGACAGGGGCTCG
CD19Rop_epHIV7   (4319)  ACGGCGGAACTCATCGCCGCCTGCCTTGCCCGCTGCTGGACAGGGGCTCG
    Consensus    (5501)  ACGGCGGAACTCATCGCCGCCTGCCTTGCCCGCTGCTGGACAGGGGCTCG
                         5551                                            5600
IL13(EQ)41BBZeta (5152) GCTGTTGGGCACTGACAATTCCGTGGTGTTGTCGGGGAAATCATCGTCCT
CD19Rop_epHIV7   (4369)  GCTGTTGGGCACTGACAATTCCGTGGTGTTGTCGGGGAAATCATCGTCCT
    Consensus    (5551)  GCTGTTGGGCACTGACAATTCCGTGGTGTTGTCGGGGAAATCATCGTCCT
                         5601                                            5650
IL13(EQ)41BBZeta (5202) TTCCTTGGCTGCTCGCCTGTGTTGCCACCTGGATTCTGCGCGGGACGTCC
CD19Rop_epHIV7   (4419)  TTCCTTGGCTGCTCGCCTGTGTTGCCACCTGGATTCTGCGCGGGACGTCC
    Consensus    (5601)  TTCCTTGGCTGCTCGCCTGTGTTGCCACCTGGATTCTGCGCGGGACGTCC
                         5651                                            5700
IL13(EQ)41BBZeta (5252) TTCTGCTACGTCCCTTCGGCCCTCAATCCAGCGGACCTTCCTTCCCGCGG
CD19Rop_epHIV7   (4469)  TTCTGCTACGTCCCTTCGGCCCTCAATCCAGCGGACCTTCCTTCCCGCGG
    Consensus    (5651)  TTCTGCTACGTCCCTTCGGCCCTCAATCCAGCGGACCTTCCTTCCCGCGG
                         5701                                            5750
IL13(EQ)41BBZeta (5302) CCTGCTGCCGGCTCTGCGGCCTCTTCCGCGTCTTCGCCTTCGCCCTCAGA
CD19Rop_epHIV7   (4519)  CCTGCTGCCGGCTCTGCGGCCTCTTCCGCGTCTTCGCCTTCGCCCTCAGA
    Consensus    (5701)  CCTGCTGCCGGCTCTGCGGCCTCTTCCGCGTCTTCGCCTTCGCCCTCAGA
                         5751                                            5800
IL13(EQ)41BBZeta (5352) CGAGTCGGATCTCCCTTTGGGCCGCCTCCCCGCATCGATACCGTCGACTA
CD19Rop_epHIV7   (4569)  CGAGTCGGATCTCCCTTTGGGCCGCCTCCCCGCATCGATACCGTCGACTA
    Consensus    (5751)  CGAGTCGGATCTCCCTTTGGGCCGCCTCCCCGCATCGATACCGTCGACTA
                         5801                                            5850
IL13(EQ)41BBZeta (5402) GCCGTACCTTTAAGACCAATGACTTACAAGGCAGCTGTAGATCTTAGCCA
CD19Rop_epHIV7   (4619)  GCCGTACCTTTAAGACCAATGACTTACAAGGCAGCTGTAGATCTTAGCCA
    Consensus    (5801)  GCCGTACCTTTAAGACCAATGACTTACAAGGCAGCTGTAGATCTTAGCCA
                         5851                                            5900
IL13(EQ)41BBZeta (5452) CTTTTTAAAAGAAAAGGGGGGACTGGAAGGGCTAATTCACTCCCAAAGAA
CD19Rop_epHIV7   (4669)  CTTTTTAAAAGAAAAGGGGGGACTGGAAGGGCTAATTCACTCCCAAAGAA
    Consensus    (5851)  CTTTTTAAAAGAAAAGGGGGGACTGGAAGGGCTAATTCACTCCCAAAGAA
                         5901                                            5950
IL13(EQ)41BBZeta (5502) GACAAGATCTGCTTTTTGCCTGTACTGGGTCTCTCTGGTTAGACCAGATC
CD19Rop_epHIV7   (4719)  GACAAGATCTGCTTTTTGCCTGTACTGGGTCTCTCTGGTTAGACCAGATC
    Consensus    (5901)  GACAAGATCTGCTTTTTGCCTGTACTGGGTCTCTCTGGTTAGACCAGATC
                         5951                                            6000
```

FIGURE 10J

```
IL13(EQ)41BBZeta  (5552)  TGAGCCTGGGAGCTCTCTGGCTAACTAGGGAACCCACTGCTTAAGCCTCA
   CD19Rop_epHIV7 (4769)  TGAGCCTGGGAGCTCTCTGGCTAACTAGGGAACCCACTGCTTAAGCCTCA
        Consensus (5951)  TGAGCCTGGGAGCTCTCTGGCTAACTAGGGAACCCACTGCTTAAGCCTCA
                          6001                                            6050
IL13(EQ)41BBZeta  (5602)  ATAAAGCTTGCCTTGAGTGCTTCAAGTAGTGTGTGCCCGTCTGTTGTGTG
   CD19Rop_epHIV7 (4819)  ATAAAGCTTGCCTTGAGTGCTTCAAGTAGTGTGTGCCCGTCTGTTGTGTG
        Consensus (6001)  ATAAAGCTTGCCTTGAGTGCTTCAAGTAGTGTGTGCCCGTCTGTTGTGTG
                          6051                                            6100
IL13(EQ)41BBZeta  (5652)  ACTCTGGTAACTAGAGATCCCTCAGACCCTTTTAGTCAGTGTGGAAAATC
   CD19Rop_epHIV7 (4869)  ACTCTGGTAACTAGAGATCCCTCAGACCCTTTTAGTCAGTGTGGAAAATC
        Consensus (6051)  ACTCTGGTAACTAGAGATCCCTCAGACCCTTTTAGTCAGTGTGGAAAATC
                          6101                                            6150
IL13(EQ)41BBZeta  (5702)  TCTAGCAGAATTCGATATCAAGCTTATCGATACCGTCGACCTCGAGGGGG
   CD19Rop_epHIV7 (4919)  TCTAGCAGAATTCGATATCAAGCTTATCGATACCGTCGACCTCGAGGGGG
        Consensus (6101)  TCTAGCAGAATTCGATATCAAGCTTATCGATACCGTCGACCTCGAGGGGG
                          6151                                            6200
IL13(EQ)41BBZeta  (5752)  GGCCCGGTACCCAATTCGCCCTATAGTGAGTCGTATTACAATTCACTGGC
   CD19Rop_epHIV7 (4969)  GGCCCGGTACCCAATTCGCCCTATAGTGAGTCGTATTACAATTCACTGGC
        Consensus (6151)  GGCCCGGTACCCAATTCGCCCTATAGTGAGTCGTATTACAATTCACTGGC
                          6201                                            6250
IL13(EQ)41BBZeta  (5802)  CGTCGTTTTACAACGTCGTGACTGGGAAAACCCTGGCGTTACCCAACTTA
   CD19Rop_epHIV7 (5019)  CGTCGTTTTACAACGTCGTGACTGGGAAAACCCTGGCGTTACCCAACTTA
        Consensus (6201)  CGTCGTTTTACAACGTCGTGACTGGGAAAACCCTGGCGTTACCCAACTTA
                          6251                                            6300
IL13(EQ)41BBZeta  (5852)  ATCGCCTTGCAGCACATCCCCCTTTCGCCAGCTGGCGTAATAGCGAAGAG
   CD19Rop_epHIV7 (5069)  ATCGCCTTGCAGCACATCCCCCTTTCGCCAGCTGGCGTAATAGCGAAGAG
        Consensus (6251)  ATCGCCTTGCAGCACATCCCCCTTTCGCCAGCTGGCGTAATAGCGAAGAG
                          6301                                            6350
IL13(EQ)41BBZeta  (5902)  GCCCGCACCGATCGCCCTTCCCAACAGTTGCGCAGCCTGAATGGCGAATG
   CD19Rop_epHIV7 (5119)  GCCCGCACCGATCGCCCTTCCCAACAGTTGCGCAGCCTGAATGGCGAATG
        Consensus (6301)  GCCCGCACCGATCGCCCTTCCCAACAGTTGCGCAGCCTGAATGGCGAATG
                          6351                                            6400
IL13(EQ)41BBZeta  (5952)  GAAATTGTAAGCGTTAATATTTTGTTAAAATTCGCGTTAAATTTTTGTTA
   CD19Rop_epHIV7 (5169)  GAAATTGTAAGCGTTAATATTTTGTTAAAATTCGCGTTAAATTTTTGTTA
        Consensus (6351)  GAAATTGTAAGCGTTAATATTTTGTTAAAATTCGCGTTAAATTTTTGTTA
                          6401                                            6450
IL13(EQ)41BBZeta  (6002)  AATCAGCTCATTTTTTAACCAATAGGCCGAAATCGGCAAAATCCCTTATA
   CD19Rop_epHIV7 (5219)  AATCAGCTCATTTTTTAACCAATAGGCCGAAATCGGCAAAATCCCTTATA
        Consensus (6401)  AATCAGCTCATTTTTTAACCAATAGGCCGAAATCGGCAAAATCCCTTATA
                          6451                                            6500
IL13(EQ)41BBZeta  (6052)  AATCAAAAGAATAGACCGAGATAGGGTTGAGTGTTGTTCCAGTTTGGAAC
   CD19Rop_epHIV7 (5269)  AATCAAAAGAATAGACCGAGATAGGGTTGAGTGTTGTTCCAGTTTGGAAC
        Consensus (6451)  AATCAAAAGAATAGACCGAGATAGGGTTGAGTGTTGTTCCAGTTTGGAAC
                          6501                                            6550
IL13(EQ)41BBZeta  (6102)  AAGAGTCCACTATTAAAGAACGTGGACTCCAACGTCAAAGGGCGAAAAAC
   CD19Rop_epHIV7 (5319)  AAGAGTCCACTATTAAAGAACGTGGACTCCAACGTCAAAGGGCGAAAAAC
        Consensus (6501)  AAGAGTCCACTATTAAAGAACGTGGACTCCAACGTCAAAGGGCGAAAAAC
                          6551                                            6600
IL13(EQ)41BBZeta  (6152)  CGTCTATCAGGGCGATGGCCCACTACGTGAACCATCACCCTAATCAAGTT
   CD19Rop_epHIV7 (5369)  CGTCTATCAGGGCGATGGCCCACTACGTGAACCATCACCCTAATCAAGTT
        Consensus (6551)  CGTCTATCAGGGCGATGGCCCACTACGTGAACCATCACCCTAATCAAGTT
                          6601                                            6650
IL13(EQ)41BBZeta  (6202)  TTTTGGGGTCGAGGTGCCGTAAAGCACTAAATCGGAACCCTAAAGGGAGC
   CD19Rop_epHIV7 (5419)  TTTTGGGGTCGAGGTGCCGTAAAGCACTAAATCGGAACCCTAAAGGGAGC
        Consensus (6601)  TTTTGGGGTCGAGGTGCCGTAAAGCACTAAATCGGAACCCTAAAGGGAGC
```

FIGURE 10K

```
                              6651                                          6700
IL13(EQ)41BBZeta    (6252)   CCCCGATTTAGAGCTTGACGGGGAAAGCCGGCGAACGTGGCGAGAAAGGA
CD19Rop_epHIV7      (5469)   CCCCGATTTAGAGCTTGACGGGGAAAGCCGGCGAACGTGGCGAGAAAGGA
       Consensus    (6651)   CCCCGATTTAGAGCTTGACGGGGAAAGCCGGCGAACGTGGCGAGAAAGGA
                              6701                                          6750
IL13(EQ)41BBZeta    (6302)   AGGGAAGAAAGCGAAAGGAGCGGGCGCTAGGGCGCTGGCAAGTGTAGCGG
CD19Rop_epHIV7      (5519)   AGGGAAGAAAGCGAAAGGAGCGGGCGCTAGGGCGCTGGCAAGTGTAGCGG
       Consensus    (6701)   AGGGAAGAAAGCGAAAGGAGCGGGCGCTAGGGCGCTGGCAAGTGTAGCGG
                              6751                                          6800
IL13(EQ)41BBZeta    (6352)   TCACGCTGCGCGTAACCACCACACCCGCCGCGCTTAATGCGCCGCTACAG
CD19Rop_epHIV7      (5569)   TCACGCTGCGCGTAACCACCACACCCGCCGCGCTTAATGCGCCGCTACAG
       Consensus    (6751)   TCACGCTGCGCGTAACCACCACACCCGCCGCGCTTAATGCGCCGCTACAG
                              6801                                          6850
IL13(EQ)41BBZeta    (6402)   GGCGCGTCAGGTGGCACTTTTCGGGGAAATGTGCGCGGAACCCCTATTTG
CD19Rop_epHIV7      (5619)   GGCGCGTCAGGTGGCACTTTTCGGGGAAATGTGCGCGGAACCCCTATTTG
       Consensus    (6801)   GGCGCGTCAGGTGGCACTTTTCGGGGAAATGTGCGCGGAACCCCTATTTG
                              6851                                          6900
IL13(EQ)41BBZeta    (6452)   TTTATTTTTCTAAATACATTCAAATATGTATCCGCTCATGAGACAATAAC
CD19Rop_epHIV7      (5669)   TTTATTTTTCTAAATACATTCAAATATGTATCCGCTCATGAGACAATAAC
       Consensus    (6851)   TTTATTTTTCTAAATACATTCAAATATGTATCCGCTCATGAGACAATAAC
                              6901                                          6950
IL13(EQ)41BBZeta    (6502)   CCTGATAAATGCTTCAATAATATTGAAAAAGGAAGAGTATGAGTATTCAA
CD19Rop_epHIV7      (5719)   CCTGATAAATGCTTCAATAATATTGAAAAAGGAAGAGTATGAGTATTCAA
       Consensus    (6901)   CCTGATAAATGCTTCAATAATATTGAAAAAGGAAGAGTATGAGTATTCAA
                              6951                                          7000
IL13(EQ)41BBZeta    (6552)   CATTTCCGTGTCGCCCTTATTCCCTTTTTTGCGGCATTTTGCCTTCCTGT
CD19Rop_epHIV7      (5769)   CATTTCCGTGTCGCCCTTATTCCCTTTTTTGCGGCATTTTGCCTTCCTGT
       Consensus    (6951)   CATTTCCGTGTCGCCCTTATTCCCTTTTTTGCGGCATTTTGCCTTCCTGT
                              7001                                          7050
IL13(EQ)41BBZeta    (6602)   TTTTGCTCACCCAGAAACGCTGGTGAAAGTAAAAGATGCTGAAGATCAGT
CD19Rop_epHIV7      (5819)   TTTTGCTCACCCAGAAACGCTGGTGAAAGTAAAAGATGCTGAAGATCAGT
       Consensus    (7001)   TTTTGCTCACCCAGAAACGCTGGTGAAAGTAAAAGATGCTGAAGATCAGT
                              7051                                          7100
IL13(EQ)41BBZeta    (6652)   TGGGTGCACGAGTGGGTTACATCGAACTGGATCTCAACAGCGGTAAGATC
CD19Rop_epHIV7      (5869)   TGGGTGCACGAGTGGGTTACATCGAACTGGATCTCAACAGCGGTAAGATC
       Consensus    (7051)   TGGGTGCACGAGTGGGTTACATCGAACTGGATCTCAACAGCGGTAAGATC
                              7101                                          7150
IL13(EQ)41BBZeta    (6702)   CTTGAGAGTTTTCGCCCCGAAGAACGTTTTCCAATGATGAGCACTTTTAA
CD19Rop_epHIV7      (5919)   CTTGAGAGTTTTCGCCCCGAAGAACGTTTTCCAATGATGAGCACTTTTAA
       Consensus    (7101)   CTTGAGAGTTTTCGCCCCGAAGAACGTTTTCCAATGATGAGCACTTTTAA
                              7151                                          7200
IL13(EQ)41BBZeta    (6752)   AGTTCTGCTATGTGGCGCGGTATTATCCCGTATTGACGCCGGGCAAGAGC
CD19Rop_epHIV7      (5969)   AGTTCTGCTATGTGGCGCGGTATTATCCCGTATTGACGCCGGGCAAGAGC
       Consensus    (7151)   AGTTCTGCTATGTGGCGCGGTATTATCCCGTATTGACGCCGGGCAAGAGC
                              7201                                          7250
IL13(EQ)41BBZeta    (6802)   AACTCGGTCGCCGCATACACTATTCTCAGAATGACTTGGTTGAGTACTCA
CD19Rop_epHIV7      (6019)   AACTCGGTCGCCGCATACACTATTCTCAGAATGACTTGGTTGAGTACTCA
       Consensus    (7201)   AACTCGGTCGCCGCATACACTATTCTCAGAATGACTTGGTTGAGTACTCA
                              7251                                          7300
IL13(EQ)41BBZeta    (6852)   CCAGTCACAGAAAAGCATCTTACGGATGGCATGACAGTAAGAGAATTATG
CD19Rop_epHIV7      (6069)   CCAGTCACAGAAAAGCATCTTACGGATGGCATGACAGTAAGAGAATTATG
       Consensus    (7251)   CCAGTCACAGAAAAGCATCTTACGGATGGCATGACAGTAAGAGAATTATG
                              7301                                          7350
IL13(EQ)41BBZeta    (6902)   CAGTGCTGCCATAACCATGAGTGATAACACTGCGGCCAACTTACTTCTGA
CD19Rop_epHIV7      (6119)   CAGTGCTGCCATAACCATGAGTGATAACACTGCGGCCAACTTACTTCTGA
```

FIGURE 10L

```
      Consensus  (7301)  CAGTGCTGCCATAACCATGAGTGATAACACTGCGGCCAACTTACTTCTGA
                         7351                                              7400
IL13(EQ)41BBZeta (6952)  CAACGATCGGAGGACCGAAGGAGCTAACCGCTTTTTTGCACAACATGGGG
   CD19Rop_epHIV7 (6169) CAACGATCGGAGGACCGAAGGAGCTAACCGCTTTTTTGCACAACATGGGG
      Consensus  (7351)  CAACGATCGGAGGACCGAAGGAGCTAACCGCTTTTTTGCACAACATGGGG
                         7401                                              7450
IL13(EQ)41BBZeta (7002)  GATCATGTAACTCGCCTTGATCGTTGGGAACCGGAGCTGAATGAAGCCAT
   CD19Rop_epHIV7 (6219) GATCATGTAACTCGCCTTGATCGTTGGGAACCGGAGCTGAATGAAGCCAT
      Consensus  (7401)  GATCATGTAACTCGCCTTGATCGTTGGGAACCGGAGCTGAATGAAGCCAT
                         7451                                              7500
IL13(EQ)41BBZeta (7052)  ACCAAACGACGAGCGTGACACCACGATGCCTGTAGCAATGGCAACAACGT
   CD19Rop_epHIV7 (6269) ACCAAACGACGAGCGTGACACCACGATGCCTGTAGCAATGGCAACAACGT
      Consensus  (7451)  ACCAAACGACGAGCGTGACACCACGATGCCTGTAGCAATGGCAACAACGT
                         7501                                              7550
IL13(EQ)41BBZeta (7102)  TGCGCAAACTATTAACTGGCGAACTACTTACTCTAGCTTCCCGGCAACAA
   CD19Rop_epHIV7 (6319) TGCGCAAACTATTAACTGGCGAACTACTTACTCTAGCTTCCCGGCAACAA
      Consensus  (7501)  TGCGCAAACTATTAACTGGCGAACTACTTACTCTAGCTTCCCGGCAACAA
                         7551                                              7600
IL13(EQ)41BBZeta (7152)  TTAATAGACTGGATGGAGGCGGATAAAGTTGCAGGACCACTTCTGCGCTC
   CD19Rop_epHIV7 (6369) TTAATAGACTGGATGGAGGCGGATAAAGTTGCAGGACCACTTCTGCGCTC
      Consensus  (7551)  TTAATAGACTGGATGGAGGCGGATAAAGTTGCAGGACCACTTCTGCGCTC
                         7601                                              7650
IL13(EQ)41BBZeta (7202)  GGCCCTTCCGGCTGGCTGGTTTATTGCTGATAAATCTGGAGCCGGTGAGC
   CD19Rop_epHIV7 (6419) GGCCCTTCCGGCTGGCTGGTTTATTGCTGATAAATCTGGAGCCGGTGAGC
      Consensus  (7601)  GGCCCTTCCGGCTGGCTGGTTTATTGCTGATAAATCTGGAGCCGGTGAGC
                         7651                                              7700
IL13(EQ)41BBZeta (7252)  GTGGGTCTCGCGGTATCATTGCAGCACTGGGGCCAGATGGTAAGCCCTCC
   CD19Rop_epHIV7 (6469) GTGGGTCTCGCGGTATCATTGCAGCACTGGGGCCAGATGGTAAGCCCTCC
      Consensus  (7651)  GTGGGTCTCGCGGTATCATTGCAGCACTGGGGCCAGATGGTAAGCCCTCC
                         7701                                              7750
IL13(EQ)41BBZeta (7302)  CGTATCGTAGTTATCTACACGACGGGGAGTCAGGCAACTATGGATGAACG
   CD19Rop_epHIV7 (6519) CGTATCGTAGTTATCTACACGACGGGGAGTCAGGCAACTATGGATGAACG
      Consensus  (7701)  CGTATCGTAGTTATCTACACGACGGGGAGTCAGGCAACTATGGATGAACG
                         7751                                              7800
IL13(EQ)41BBZeta (7352)  AAATAGACAGATCGCTGAGATAGGTGCCTCACTGATTAAGCATTGGTAAC
   CD19Rop_epHIV7 (6569) AAATAGACAGATCGCTGAGATAGGTGCCTCACTGATTAAGCATTGGTAAC
      Consensus  (7751)  AAATAGACAGATCGCTGAGATAGGTGCCTCACTGATTAAGCATTGGTAAC
                         7801                                              7850
IL13(EQ)41BBZeta (7402)  TGTCAGACCAAGTTTACTCATATATACTTTAGATTGATTTAAAACTTCAT
   CD19Rop_epHIV7 (6619) TGTCAGACCAAGTTTACTCATATATACTTTAGATTGATTTAAAACTTCAT
      Consensus  (7801)  TGTCAGACCAAGTTTACTCATATATACTTTAGATTGATTTAAAACTTCAT
                         7851                                              7900
IL13(EQ)41BBZeta (7452)  TTTTAATTTAAAAGGATCTAGGTGAAGATCCTTTTTGATAATCTCATGAC
   CD19Rop_epHIV7 (6669) TTTTAATTTAAAAGGATCTAGGTGAAGATCCTTTTTGATAATCTCATGAC
      Consensus  (7851)  TTTTAATTTAAAAGGATCTAGGTGAAGATCCTTTTTGATAATCTCATGAC
                         7901                                              7950
IL13(EQ)41BBZeta (7502)  CAAAATCCCTTAACGTGAGTTTTCGTTCCACTGAGCGTCAGACCCCGTAG
   CD19Rop_epHIV7 (6719) CAAAATCCCTTAACGTGAGTTTTCGTTCCACTGAGCGTCAGACCCCGTAG
      Consensus  (7901)  CAAAATCCCTTAACGTGAGTTTTCGTTCCACTGAGCGTCAGACCCCGTAG
                         7951                                              8000
IL13(EQ)41BBZeta (7552)  AAAAGATCAAAGGATCTTCTTGAGATCCTTTTTTTCTGCGCGTAATCTGC
   CD19Rop_epHIV7 (6769) AAAAGATCAAAGGATCTTCTTGAGATCCTTTTTTTCTGCGCGTAATCTGC
      Consensus  (7951)  AAAAGATCAAAGGATCTTCTTGAGATCCTTTTTTTCTGCGCGTAATCTGC
                         8001                                              8050
IL13(EQ)41BBZeta (7602)  TGCTTGCAAACAAAAAAACCACCGCTACCAGCGGTGGTTTGTTTGCCGGA
```

FIGURE 10M

```
CD19Rop_epHIV7     (6819)  TGCTTGCAAACAAAAAAACCACCGCTACCAGCGGTGGTTTGTTTGCCGGA
       Consensus   (8001)  TGCTTGCAAACAAAAAAACCACCGCTACCAGCGGTGGTTTGTTTGCCGGA
                           8051                                                  8100
IL13(EQ)41BBZeta   (7652)  TCAAGAGCTACCAACTCTTTTTCCGAAGGTAACTGGCTTCAGCAGAGCGC
CD19Rop_epHIV7     (6869)  TCAAGAGCTACCAACTCTTTTTCCGAAGGTAACTGGCTTCAGCAGAGCGC
       Consensus   (8051)  TCAAGAGCTACCAACTCTTTTTCCGAAGGTAACTGGCTTCAGCAGAGCGC
                           8101                                                  8150
IL13(EQ)41BBZeta   (7702)  AGATACCAAATACTGTTCTTCTAGTGTAGCCGTAGTTAGGCCACCACTTC
CD19Rop_epHIV7     (6919)  AGATACCAAATACTGTTCTTCTAGTGTAGCCGTAGTTAGGCCACCACTTC
       Consensus   (8101)  AGATACCAAATACTGTTCTTCTAGTGTAGCCGTAGTTAGGCCACCACTTC
                           8151                                                  8200
IL13(EQ)41BBZeta   (7752)  AAGAACTCTGTAGCACCGCCTACATACCTCGCTCTGCTAATCCTGTTACC
CD19Rop_epHIV7     (6969)  AAGAACTCTGTAGCACCGCCTACATACCTCGCTCTGCTAATCCTGTTACC
       Consensus   (8151)  AAGAACTCTGTAGCACCGCCTACATACCTCGCTCTGCTAATCCTGTTACC
                           8201                                                  8250
IL13(EQ)41BBZeta   (7802)  AGTGGCTGCTGCCAGTGGCGATAAGTCGTGTCTTACCGGGTTGGACTCAA
CD19Rop_epHIV7     (7019)  AGTGGCTGCTGCCAGTGGCGATAAGTCGTGTCTTACCGGGTTGGACTCAA
       Consensus   (8201)  AGTGGCTGCTGCCAGTGGCGATAAGTCGTGTCTTACCGGGTTGGACTCAA
                           8251                                                  8300
IL13(EQ)41BBZeta   (7852)  GACGATAGTTACCGGATAAGGCGCAGCGGTCGGGCTGAACGGGGGGTTCG
CD19Rop_epHIV7     (7069)  GACGATAGTTACCGGATAAGGCGCAGCGGTCGGGCTGAACGGGGGGTTCG
       Consensus   (8251)  GACGATAGTTACCGGATAAGGCGCAGCGGTCGGGCTGAACGGGGGGTTCG
                           8301                                                  8350
IL13(EQ)41BBZeta   (7902)  TGCACACAGCCCAGCTTGGAGCGAACGACCTACACCGAACTGAGATACCT
CD19Rop_epHIV7     (7119)  TGCACACAGCCCAGCTTGGAGCGAACGACCTACACCGAACTGAGATACCT
       Consensus   (8301)  TGCACACAGCCCAGCTTGGAGCGAACGACCTACACCGAACTGAGATACCT
                           8351                                                  8400
IL13(EQ)41BBZeta   (7952)  ACAGCGTGAGCTATGAGAAAGCGCCACGCTTCCCGAAGGGAGAAAGGCGG
CD19Rop_epHIV7     (7169)  ACAGCGTGAGCTATGAGAAAGCGCCACGCTTCCCGAAGGGAGAAAGGCGG
       Consensus   (8351)  ACAGCGTGAGCTATGAGAAAGCGCCACGCTTCCCGAAGGGAGAAAGGCGG
                           8401                                                  8450
IL13(EQ)41BBZeta   (8002)  ACAGGTATCCGGTAAGCGGCAGGGTCGGAACAGGAGAGCGCACGAGGGAG
CD19Rop_epHIV7     (7219)  ACAGGTATCCGGTAAGCGGCAGGGTCGGAACAGGAGAGCGCACGAGGGAG
       Consensus   (8401)  ACAGGTATCCGGTAAGCGGCAGGGTCGGAACAGGAGAGCGCACGAGGGAG
                           8451                                                  8500
IL13(EQ)41BBZeta   (8052)  CTTCCAGGGGGAAACGCCTGGTATCTTTATAGTCCTGTCGGGTTTCGCCA
CD19Rop_epHIV7     (7269)  CTTCCAGGGGGAAACGCCTGGTATCTTTATAGTCCTGTCGGGTTTCGCCA
       Consensus   (8451)  CTTCCAGGGGGAAACGCCTGGTATCTTTATAGTCCTGTCGGGTTTCGCCA
                           8501                                                  8550
IL13(EQ)41BBZeta   (8102)  CCTCTGACTTGAGCGTCGATTTTTGTGATGCTCGTCAGGGGGCGGAGCC
CD19Rop_epHIV7     (7319)  CCTCTGACTTGAGCGTCGATTTTTGTGATGCTCGTCAGGGGGCGGAGCC
       Consensus   (8501)  CCTCTGACTTGAGCGTCGATTTTTGTGATGCTCGTCAGGGGGCGGAGCC
                           8551                                                  8600
IL13(EQ)41BBZeta   (8152)  TATGGAAAAACGCCAGCAACGCGGCCTTTTTACGGTTCCTGGCCTTTTGC
CD19Rop_epHIV7     (7369)  TATGGAAAAACGCCAGCAACGCGGCCTTTTTACGGTTCCTGGCCTTTTGC
       Consensus   (8551)  TATGGAAAAACGCCAGCAACGCGGCCTTTTTACGGTTCCTGGCCTTTTGC
                           8601                                                  8650
IL13(EQ)41BBZeta   (8202)  TGGCCTTTTGCTCACATGTTCTTTCCTGCGTTATCCCCTGATTCTGTGGA
CD19Rop_epHIV7     (7419)  TGGCCTTTTGCTCACATGTTCTTTCCTGCGTTATCCCCTGATTCTGTGGA
       Consensus   (8601)  TGGCCTTTTGCTCACATGTTCTTTCCTGCGTTATCCCCTGATTCTGTGGA
                           8651                                                  8700
IL13(EQ)41BBZeta   (8252)  TAACCGTATTACCGCCTTTGAGTGAGCTGATACCGCTCGCCGCAGCCGAA
CD19Rop_epHIV7     (7469)  TAACCGTATTACCGCCTTTGAGTGAGCTGATACCGCTCGCCGCAGCCGAA
       Consensus   (8651)  TAACCGTATTACCGCCTTTGAGTGAGCTGATACCGCTCGCCGCAGCCGAA
                           8701                                                  8750
```

FIGURE 10N

| | | |
|---|---|---|
| IL13(EQ)41BBZeta | (8302) | CGACCGAGCGCAGCGAGTCAGTGAGCGAGGAAGCGGAAGAGCGCCCAATA |
| CD19Rop_epHIV7 | (7519) | CGACCGAGCGCAGCGAGTCAGTGAGCGAGGAAGCGGAAGAGCGCCCAATA |
| Consensus | (8701) | CGACCGAGCGCAGCGAGTCAGTGAGCGAGGAAGCGGAAGAGCGCCCAATA |
| | | 8751                                           8800 |
| IL13(EQ)41BBZeta | (8352) | CGCAAACCGCCTCTCCCCGCGCGTTGGCCGATTCATTAATGCAGCTGGCA |
| CD19Rop_epHIV7 | (7569) | CGCAAACCGCCTCTCCCCGCGCGTTGGCCGATTCATTAATGCAGCTGGCA |
| Consensus | (8751) | CGCAAACCGCCTCTCCCCGCGCGTTGGCCGATTCATTAATGCAGCTGGCA |
| | | 8801                                           8850 |
| IL13(EQ)41BBZeta | (8402) | CGACAGGTTTCCCGACTGGAAAGCGGGCAGTGAGCGCAACGCAATTAATG |
| CD19Rop_epHIV7 | (7619) | CGACAGGTTTCCCGACTGGAAAGCGGGCAGTGAGCGCAACGCAATTAATG |
| Consensus | (8801) | CGACAGGTTTCCCGACTGGAAAGCGGGCAGTGAGCGCAACGCAATTAATG |
| | | 8851                                           8900 |
| IL13(EQ)41BBZeta | (8452) | TGAGTTAGCTCACTCATTAGGCACCCCAGGCTTTACACTTTATGCTTCCG |
| CD19Rop_epHIV7 | (7669) | TGAGTTAGCTCACTCATTAGGCACCCCAGGCTTTACACTTTATGCTTCCG |
| Consensus | (8851) | TGAGTTAGCTCACTCATTAGGCACCCCAGGCTTTACACTTTATGCTTCCG |
| | | 8901                                           8950 |
| IL13(EQ)41BBZeta | (8502) | GCTCGTATGTTGTGTGGAATTGTGAGCGGATAACAATTTCACACAGGAAA |
| CD19Rop_epHIV7 | (7719) | GCTCGTATGTTGTGTGGAATTGTGAGCGGATAACAATTTCACACAGGAAA |
| Consensus | (8901) | GCTCGTATGTTGTGTGGAATTGTGAGCGGATAACAATTTCACACAGGAAA |
| | | 8951                                           9000 |
| IL13(EQ)41BBZeta | (8552) | CAGCTATGACCATGATTACGCCAAGCTCGAAATTAACCCTCACTAAAGGG |
| CD19Rop_epHIV7 | (7769) | CAGCTATGACCATGATTACGCCAAGCTCGAAATTAACCCTCACTAAAGGG |
| Consensus | (8951) | CAGCTATGACCATGATTACGCCAAGCTCGAAATTAACCCTCACTAAAGGG |
| | | 9001                                           9050 |
| IL13(EQ)41BBZeta | (8602) | AACAAAAGCTGGAGCTCCACCGCGGTGGCGGCCTCGAGGTCGAGATCCGG |
| CD19Rop_epHIV7 | (7819) | AACAAAAGCTGGAGCTCCACCGCGGTGGCGGCCTCGAGGTCGAGATCCGG |
| Consensus | (9001) | AACAAAAGCTGGAGCTCCACCGCGGTGGCGGCCTCGAGGTCGAGATCCGG |
| | | 9051                                           9100 |
| IL13(EQ)41BBZeta | (8652) | TCGACCAGCAACCATAGTCCCGCCCCTAACTCCGCCCATCCCGCCCCTAA |
| CD19Rop_epHIV7 | (7869) | TCGACCAGCAACCATAGTCCCGCCCCTAACTCCGCCCATCCCGCCCCTAA |
| Consensus | (9051) | TCGACCAGCAACCATAGTCCCGCCCCTAACTCCGCCCATCCCGCCCCTAA |
| | | 9101                                           9150 |
| IL13(EQ)41BBZeta | (8702) | CTCCGCCCAGTTCCGCCCATTCTCCGCCCCATGGCTGACTAATTTTTTTT |
| CD19Rop_epHIV7 | (7919) | CTCCGCCCAGTTCCGCCCATTCTCCGCCCCATGGCTGACTAATTTTTTTT |
| Consensus | (9101) | CTCCGCCCAGTTCCGCCCATTCTCCGCCCCATGGCTGACTAATTTTTTTT |
| | | 9151                                           9200 |
| IL13(EQ)41BBZeta | (8752) | ATTTATGCAGAGGCCGAGGCCGCCTCGGCCTCTGAGCTATTCCAGAAGTA |
| CD19Rop_epHIV7 | (7969) | ATTTATGCAGAGGCCGAGGCCGCCTCGGCCTCTGAGCTATTCCAGAAGTA |
| Consensus | (9151) | ATTTATGCAGAGGCCGAGGCCGCCTCGGCCTCTGAGCTATTCCAGAAGTA |
| | | 9201                                           9250 |
| IL13(EQ)41BBZeta | (8802) | GTGAGGAGGCTTTTTTGGAGGCCTAGGCTTTTGCAAAAAGCTTCGACGGT |
| CD19Rop_epHIV7 | (8019) | GTGAGGAGGCTTTTTTGGAGGCCTAGGCTTTTGCAAAAAGCTTCGACGGT |
| Consensus | (9201) | GTGAGGAGGCTTTTTTGGAGGCCTAGGCTTTTGCAAAAAGCTTCGACGGT |
| | | 9251                                           9300 |
| IL13(EQ)41BBZeta | (8852) | ATCGATTGGCTCATGTCCAACATTACCGCCATGTTGACATTGATTATTGA |
| CD19Rop_epHIV7 | (8069) | ATCGATTGGCTCATGTCCAACATTACCGCCATGTTGACATTGATTATTGA |
| Consensus | (9251) | ATCGATTGGCTCATGTCCAACATTACCGCCATGTTGACATTGATTATTGA |
| | | 9301                                           9350 |
| IL13(EQ)41BBZeta | (8902) | CTAGTTATTAATAGTAATCAATTACGGGGTCATTAGTTCATAGCCCATAT |
| CD19Rop_epHIV7 | (8119) | CTAGTTATTAATAGTAATCAATTACGGGGTCATTAGTTCATAGCCCATAT |
| Consensus | (9301) | CTAGTTATTAATAGTAATCAATTACGGGGTCATTAGTTCATAGCCCATAT |
| | | 9351                                           9400 |
| IL13(EQ)41BBZeta | (8952) | ATGGAGTTCCGCGTTACATAACTTACGGTAAATGGCCCGCCTGGCTGACC |
| CD19Rop_epHIV7 | (8169) | ATGGAGTTCCGCGTTACATAACTTACGGTAAATGGCCCGCCTGGCTGACC |
| Consensus | (9351) | ATGGAGTTCCGCGTTACATAACTTACGGTAAATGGCCCGCCTGGCTGACC |

FIGURE 10O

```
                                 9401                                         9450
IL13(EQ)41BBZeta      (9002) GCCCAACGACCCCCGCCCATTGACGTCAATAATGACGTATGTTCCCATAG
CD19Rop_epHIV7        (8219) GCCCAACGACCCCCGCCCATTGACGTCAATAATGACGTATGTTCCCATAG
Consensus             (9401) GCCCAACGACCCCCGCCCATTGACGTCAATAATGACGTATGTTCCCATAG
                                 9451                                         9500
IL13(EQ)41BBZeta      (9052) TAACGCCAATAGGGACTTTCCATTGACGTCAATGGGTGGAGTATTTACGG
CD19Rop_epHIV7        (8269) TAACGCCAATAGGGACTTTCCATTGACGTCAATGGGTGGAGTATTTACGG
Consensus             (9451) TAACGCCAATAGGGACTTTCCATTGACGTCAATGGGTGGAGTATTTACGG
                                 9501                                         9550
IL13(EQ)41BBZeta      (9102) TAAACTGCCCACTTGGCAGTACATCAAGTGTATCATATGCCAAGTACGCC
CD19Rop_epHIV7        (8319) TAAACTGCCCACTTGGCAGTACATCAAGTGTATCATATGCCAAGTACGCC
Consensus             (9501) TAAACTGCCCACTTGGCAGTACATCAAGTGTATCATATGCCAAGTACGCC
                                 9551                                         9600
IL13(EQ)41BBZeta      (9152) CCCTATTGACGTCAATGACGGTAAATGGCCCGCCTGGCATTATGCCCAGT
CD19Rop_epHIV7        (8369) CCCTATTGACGTCAATGACGGTAAATGGCCCGCCTGGCATTATGCCCAGT
Consensus             (9551) CCCTATTGACGTCAATGACGGTAAATGGCCCGCCTGGCATTATGCCCAGT
                                 9601                                         9650
IL13(EQ)41BBZeta      (9202) ACATGACCTTATGGGACTTTCCTACTTGGCAGTACATCTACGTATTAGTC
CD19Rop_epHIV7        (8419) ACATGACCTTATGGGACTTTCCTACTTGGCAGTACATCTACGTATTAGTC
Consensus             (9601) ACATGACCTTATGGGACTTTCCTACTTGGCAGTACATCTACGTATTAGTC
                                 9651                                         9700
IL13(EQ)41BBZeta      (9252) ATCGCTATTACCATGGTGATGCGGTTTTGGCAGTACATCAATGGGCGTGG
CD19Rop_epHIV7        (8469) ATCGCTATTACCATGGTGATGCGGTTTTGGCAGTACATCAATGGGCGTGG
Consensus             (9651) ATCGCTATTACCATGGTGATGCGGTTTTGGCAGTACATCAATGGGCGTGG
                                 9701                                         9750
IL13(EQ)41BBZeta      (9302) ATAGCGGTTTGACTCACGGGGATTTCCAAGTCTCCACCCCATTGACGTCA
CD19Rop_epHIV7        (8519) ATAGCGGTTTGACTCACGGGGATTTCCAAGTCTCCACCCCATTGACGTCA
Consensus             (9701) ATAGCGGTTTGACTCACGGGGATTTCCAAGTCTCCACCCCATTGACGTCA
                                 9751                                         9800
IL13(EQ)41BBZeta      (9352) ATGGGAGTTTGTTTTGGCACCAAAATCAACGGGACTTTCCAAAATGTCGT
CD19Rop_epHIV7        (8569) ATGGGAGTTTGTTTTGGCACCAAAATCAACGGGACTTTCCAAAATGTCGT
Consensus             (9751) ATGGGAGTTTGTTTTGGCACCAAAATCAACGGGACTTTCCAAAATGTCGT
                                 9801                                         9850
IL13(EQ)41BBZeta      (9402) AACAACTCCGCCCCATTGACGCAAATGGGCGGTAGGCGTGTACGGAATTC
CD19Rop_epHIV7        (8619) AACAACTCCGCCCCATTGACGCAAATGGGCGGTAGGCGTGTACGGAATTC
Consensus             (9801) AACAACTCCGCCCCATTGACGCAAATGGGCGGTAGGCGTGTACGGAATTC
                                 9851                                         9900
IL13(EQ)41BBZeta      (9452) GGAGTGGCGAGCCCTCAGATCCTGCATATAAGCAGCTGCTTTTTGCCTGT
CD19Rop_epHIV7        (8669) GGAGTGGCGAGCCCTCAGATCCTGCATATAAGCAGCTGCTTTTTGCCTGT
Consensus             (9851) GGAGTGGCGAGCCCTCAGATCCTGCATATAAGCAGCTGCTTTTTGCCTGT
                                 9901      9914
IL13(EQ)41BBZeta      (9502) ACTGGGTCTCTCTG
CD19Rop_epHIV7        (8719) ACTGGGTCTCTCTG
Consensus             (9901) ACTGGGTCTCTCTG
```

FIGURE 11

IL13(EmY)-CD8h3-CD8tm2-41BB-Zeta

MLLLVTSLLLCELPHPAFLLIPGPVPPSTALR⬚LIEELVNITQNQKAPLCNGSMVWSINLTAGM

GMCSFRa signal peptide　　　　IL13(EmY)

YCAALESLINVSGCSAIEKTQRMLSGFCPHKVSAGQFSSLHVRDTKIEVAQFVKDLLLHLKKLF

REGRFNAKPTTTPAPRPPTPAPTIASQPLSLRPEACRPAAGGAVHTRGLDFACDIYIWAPLAG

CD8hinge (48 aa)　　　　　　　　　　　　　　　　　　CD8tm(2)

TCGVLLLSLVITLYKRGRKKLLYIFKQPFMRPVQTTQEEDGCSCRFPEEEEGGCELGGGRVKFS 4-1BB cyto　　　　　　　　　　　　　　　　　　　　　CD3ζ

RSADAPAYQQGQNQLYNELNLGRREEYDVLDKRRGRDPEMGGKPRRKNPQEGLYNELQK

DKMAEAYSEIGMKGERRRGKGHDGLYQGLSTATKDTYDALHMQALPPR

GMCSFRa signal peptide
IL13(EmY)
CD8hinge
CD8 transmembrane (2)
4-1BB cyto
(Gly)3
Zeta

FIGURE 12

IL13(EmY)-CD8h3-CD28tm-CD28gg-41BB-Zeta

<u>MLLLVTSLLLCELPHPAFLLIPGPVPPSTALR</u><u>LIEELVNITQNQKAPLCNGSMVWSINLTAGM</u>

GMCSFRa signal peptide       IL13(EmY)

<u>YCAALESLINVSGCSAIEKTQRMLSGFCPHKVSAGQFSSLHVRDTKIEVAQFVKDLLLHLKKLF</u>

<u>REGRFN</u><u>AKPTTTPAPRPPTPAPTIASQPLSLRPEACRPAAGGAVHTRGLDFACDFWVLVVVG</u>

CD8 hinge (48 aa)                                         CD28tm

<u>GVLACYSLLVTVAFIIFWV</u><u>RSKRSRGGHSDYMNMTPRRPGPTRKHYQPYAPPRDFAAYRSG</u>

CD28gg

<u>GGKRGRKKLLYIFKQPFMRPVQTTQEEDGCSCRFPEEEEGGCELGGG</u><u>RVKFSRSADAPAYQ</u>

4-1BB cyto                                                  CD3ζ

<u>QGQNQLYNELNLGRREEYDVLDKRRGRDPEMGGKPRRKNPQEGLYNELQKDKMAEAYSEI</u>

<u>GMKGERRRGKGHDGLYQGLSTATKDTYDALHMQALPPR</u>

<u>GMCSFRa signal peptide</u>
<u>IL13(EmY)</u>
<u>CD8hinge</u>
CD28 transmembrane
<u>CD28gg</u>
<u>4-1BB cyto</u>
(Gly)3
<u>Zeta</u>

FIGURE 13

IL13(EmY)-IgG4(HL-CH3)-CD4tm-41BB-Zeta

<u>MLLLVTSLLLCELPHPAFLLIPGPVPPSTALR</u><u>LIEELVNITQNQKAPLCNGSMVWSINLTAGM</u>
GMCSFRa signal peptide       IL13(EmY)

<u>YCAALESLINVSGCSAIEKTQRMLSGFCPHKVSAGQFSSLHVRDTKIEVAQFVKDLLLHLKKLF</u>

<u>REGRFNESKYGPPCP</u><u>CPGGGSSGGGSGG</u><u>QPREPQVYTLPPSQEEMTKNQVSLTCLVKGFY</u>
   IgG4Hinge      Linker      IgG4-CH3

<u>PSDIAVEWESNGQPENNYKTTPPVLDSDGSFFLYSRLTVDKSRWQEGNVFSCSVMHEALHN</u>

<u>HYTQKSLSLSLGKM</u><u>ALIVLGGVAGLLLFIGLGIFF</u><u>KRGRKKLLYIFKQPFMRPVQTTQEEDGCS</u>
        CD4 tm                 4-1BB cyto <u>CRFPEEEEGGCEL</u><u>GGG</u><u>RVKFSRSADAPAYQQGQNQLYNELNLGRREEYDVLDKRRGRDPE</u>
                    CD3ζ

<u>MGGKPRRKNPQEGLYNELQKDKMAEAYSEIGMKGERRRGKGHDGLYQGLSTATKDTYDA</u>

<u>LHMQALPPR</u>

<u>GMCSFRa signal peptide</u>
<u>IL13(EmY)</u>
<u>IgG4Hinge</u>
Linker
<u>IgG4-Fc-CH3</u>
CD4 transmembrane
<u>4-1BB cyto</u>
(Gly)3
<u>Zeta</u>

FIGURE 14

IL13(EmY)-IgG4(L235E,N297Q)-CD8tm-41BB-Zeta

<u>MLLLVTSLLLCELPHPAFLLIP</u><u>GPVPPSTALR</u>ELEELVNITQNQKAPLCNGSMVWSINLTAGM
GMCSFRa signal peptide    IL13(EmY)

YCAALESLINVSGCSAIEKTQRMLSGFCPHKVSAGQFSSLHVRDTKIEVAQFVKDLLLHLKKLF

REGRFN<u>ESKYGPPCP</u>SCPAPEFEGGPSVFLFPPKPKDTLMISRTPEVTCVVVDVSQEDPEVQF
        IGgG4-Fc(SmP)

NWYVDGVEVHNAKTKPREEQFQSTYRVVSVLTVLHQDWLNGKEYKCKVSNKGLPSSIEKTIS

KAKGQPREPQVYTLPPSQEEMTKNQVSLTCLVKGFYPSDIAVEWESNGQPENNYKTTPPVL

DSDGSFFLYSRLTVDKSRWQEGNVFSCSVMHEALHNHYTQKSLSLSLGK<u>IYIWAPLAGTCGV</u>
                                                        CD8 tm

<u>LLLSLVIT</u><u>KRGRKKLLYIFKQPFMRPVQTTQEEDGCSCRFPEEEEGGCEL</u>GGG<u>RVKFSRSADAP</u>
         4-1BB cyto                                       CD3ζ

<u>AYQQGQNQLYNELNLGRREEYDVLDKRRGRDPEMGGKPRRKNPQEGLYNELQKDKMAEA</u>

<u>YSEIGMKGERRRGKGHDGLYQGLSTATKDTYDALHMQALPPR</u>

<u>GMCSFRa signal peptide</u>
<u>IL13(EmY)</u>
<u>IgG4-Fc(SmP)</u>
CD8 transmembrane
<u>4-1BB cyto</u>
(Gly)3
<u>Zeta</u>

FIGURE 15

IL13(EmY)-Linker-CD28tm-CD28gg-41BB-Zeta

MLLLVTSLLLCELPHPAFLLIPGPVPPSTALRLIEELVNITQNQKAPLCNGSMVWSINLTAGM
GMCSFRa signal peptide        IL13(EmY)

YCAALESLINVSGCSAIEKTQRMLSGFCPHKVSAGQFSSLHVRDTKIEVAQFVKDLLLHLKKLF

REGRFNGGGSSGGGSGMFWVLVVVGGVLACYSLLVTVAFIIFWVRSKRSRGGHSDYMNM
         Linker        CD28(M) tm                    CD28gg TPRRPGPTRKHYQPYAPPRDFAAYRSGGGKRGRKKLLYIFKQPFMRPVQTTQEEDGCSCRFP
                                      4-1BB cyto

EEEEGGCELGGGRVKFSRSADAPAYQQGQNQLYNELNLGRREEYDVLDKRRGRDPEMGGK
          CD3ζ

PRRKNPQEGLYNELQKDKMAEAYSEIGMKGERRRGKGHDGLYQGLSTATKDTYDALHMQ

ALPPR

GMCSFRa signal peptide
IL13(EmY)
Linker
CD28(M) transmembrane
CD28gg
4-1BB cyto
(Gly)3
Zeta

FIGURE 16

IL13(EmY)-HL-CD28m-CD28gg-41BB-Zeta

<u>MLLLVTSLLLCELPHPAFLLIP</u>GPVPPSTALRSLIEELVNITQNQKAPLCNGSMVWSINLTAGM
<u>GMCSFRa signal peptide</u>　　　IL13(EmY)

YCAALESLINVSGCSAIEKTQRMLSGFCPHKVSAGQFSSLHVRDTKIEVAQFVKDLLLHLKKLF

REGRFNE<u>SKYGPPCPSCPGGG</u><u>SSGGGSG</u><u>MFWVLVVVGGVLACYSLLVTVAFIIFWV</u>RSKRS
　　　　IgG4Hinge　　　Linker　　　　CD28(M) tm
CD28gg RGGHSDYMNMTPRRPGPTRKHYQPYAPPRDFAAYRS<u>GGG</u>KRGRKKLLYIFKQPFMRPVQT
　　　　　　　　　　　　　　　　　　　　　　　　4-1BB cyto TQEEDGCSCRFPEEEEGGCEL<u>GGG</u>RVKFSRSADAPAYQQGQNQLYNELNLGRREEYDVLDK
　　　　　　　　　　　　　　CD3ζ

RRGRDPEMGGKPRRKNPQEGLYNELQKDKMAEAYSEIGMKGERRRGKGHDGLYQGLSTA

TKDTYDALHMQALPPR

<u>GMCSFRa signal peptide</u>
<u>IL13(EmY)</u>
<u>IgG4Hinge</u>
Linker
<u>CD28(M) transmembrane</u>
CD28gg
4-1BB cyto
<u>(Gly)3</u>
Zeta

Figure 17

IL13(EmY)-IgG4(HL-CH3)-CD28tm-CD28gg-41BB-Zeta

<u>MLLLVTSLLLCELPHPAFLLIPGPVPPSTALR</u><u>LIEELVNITQNQKAPLCNGSMVWSINLTAGM</u>
GMCSFRa signal peptide          IL13(EmY)

<u>YCAALESLINVSGCSAIEKTQRMLSGFCPHKVSAGQFSSLHVRDTKIEVAQFVKDLLLHLKKLF</u>

<u>REGRFNESKYGPPCP</u><u>CPGGGSSGGGSGG</u><u>QPREPQVYTLPPSQEEMTKNQVSLTCLVKGFY</u>
    IgG4Hinge         Linker         IgG4 CH3

<u>PSDIAVEWESNGQPENNYKTTPPVLDSDGSFFLYSRLTVDKSRWQEGNVFSCSVMHEALHN</u>

<u>HYTQKSLSLSLGKMFWVLVVVGGVLACYSLLVTVAFIIFWV</u><u>RSKRSRGGHSDYMNMTPRRP</u>
        CD28(M) tm                 CD28gg

<u>GPTRKHYQPYAPPRDFAAYRSGGGKRGRKKLLYIFKQPFMRPVQTTQEEDGCSCRFPEEEEG</u>
                              4-1BB cyto <u>GCELGGGRVKFSRSADAPAYQQGQNQLYNELNLGRREEYDVLDKRRGRDPEMGGKPRRK</u>
    CD3ζ

<u>NPQEGLYNELQKDKMAEAYSEIGMKGERRRGKGHDGLYQGLSTATKDTYDALHMQALPP</u>

<u>R</u>

<u>GMCSFRa signal peptide</u>
<u>IL13(EmY)</u>
<u>IgG4Hinge</u>
<u>Linker</u>
<u>IgG4 CH3</u>
CD28 transmembrane
<u>CD28gg</u>
<u>4-1BB cyto</u>
(Gly)3
<u>Zeta</u>

FIGURE 18

IL13(EmY)-IgG4(L235E,N297Q)-CD28tm-CD28gg-41BB-Zeta

MLLLVTSLLLCELPHPAFLLIPGPVPPSTALRYLIEELVNITQNQKAPLCNGSMVWSINLTAGM
<u>GMCSFRa signal peptide</u>      <u>IL13(EmY)</u>

YCAALESLINVSGCSAIEKTQRMLSGFCPHKVSAGQFSSLHVRDTKIEVAQFVKDLLLHLKKLF

REGRFN<u>ESKYGPPCPPCPAPEFEGGPSVFLFPPKPDTLMISRTPEVTCVVVDVSQEDPEVQF</u>
      <u>IgG4-Fc(L235E,N297Q)</u>

<u>NWYVDGVEVHNAKTKPREEQFQSTYRVVSVLTVLHQDWLNGKEYKCKVSNKGLPSSIEKTIS</u>

<u>KAKGQPREPQVYTLPPSQEEMTKNQVSLTCLVKGFYPSDIAVEWESNGQPENNYKTTPPVL</u>

<u>DSDGSFFLYSRLTVDKSRWQEGNVFSCSVMHEALHNHYTQKSLSLSLGK</u>MFWVLVVVGGV
                                                       CD28(M) tm
LACYSLLVTVAFIIFWV<u>RSKRSRGGHSDYMNMTPRRPGPTRKHYQPYAPPRDFAAYRS</u>GGG
                  <u>CD28gg</u>

<u>KRGRKKLLYIFKQPFMRPVQTTQEEDGCSCRFPEEEEGGCEL</u>GGG<u>RVKFSRSADAPAYQQG</u>
<u>4-1BB cyto</u>                                    <u>CD3ζ</u>

<u>QNQLYNELNLGRREEYDVLDKRRGRDPEMGGKPRRKNPQEGLYNELQKDKMAEAYSEIG</u>

<u>MKGERRRGKGHDGLYQGLSTATKDTYDALHMQALPPR</u>

<u>GMCSFRa signal peptide</u>
<u>IL13(EmY)</u>
<u>IgG4-Fc(L235E,N297Q)</u>
CD28 (M) transmembrane
<u>CD28gg</u>
(Gly)3
<u>4-1BB cyto</u>
(Gly)3
<u>Zeta</u>

FIGURE 19

IL13(EmY)-CD8h3-CD8tm-41BB-Zeta

MLLLVTSLLLCELPHPAFLLIPGPVPPSTALR░LIEELVNITQNQKAPLCNGSMVWSINLTAGM

GMCSFRa signal peptide      IL13(EmY)

YCAALESLINVSGCSAIEKTQRMLSGFCPHKVSAGQFSSLHVRDTKIEVAQFVKDLLLHLKKLF

REGRFNAKPTTTPAPRPPTPAPTIASQPLSLRPEACRPAAGGAVHTRGLDFACDIYIWAPLAG

CD8hinge (48 aa)         CD8tm

TCGVLLLSLVITGGGKRGRKKLLYIFKQPFMRPVQTTQEEDGCSCRFPEEEEGGCELGGGRVK 4-1BB cyto         CD3ζ

FSRSADAPAYQQGQNQLYNELNLGRREEYDVLDKRRGRDPEMGGKPRRKNPQEGLYNELQ

KDKMAEAYSEIGMKGERRRGKGHDGLYQGLSTATKDTYDALHMQALPPR

GMCSFRa signal peptide
IL13(EmY)
CD8hinge
CD8 transmembrane
(Gly)3
4-1BB cyto
(Gly)3
Zeta Her2scFv-IgG4(L235E, N297Q)-CD28tm-CD28gg-Zeta-T2A-CD19t MLLLVTSLLLCELPHPAFLLIPDIQMTQSPSSLSASVGDRVTITCRASQDVNTAVAWYQQKPGKAPKLLIYSASFLYSGVPSRFSGSRSGTDFTLTISSLQPEDFATYYCQQHYT
TPPTFGQGTKVEIKGSTSGSGKPGSGEGSTKGEVQLVESGGGLVQPGGSLRLSCAASGFNIKDTYIHWVRQAPGKGLEWVARIYPTNGYTRYADSVKGRFTISADTSKNTA
YLQMNSLRAEDTAVYYCSRWGGDGFYAMDYWGQGTLVTVSSESKYGPPCPAPEFEGGPSVFLFPPKPKDTLMISRTPEVTCVVVDVSQEDPEVQFNWYVDGVEVH
NAKTKPREEQFQSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPV
LDSDGSFFLYSRLTVDKSRWQEGNVFSCSVMHEALHNHYTQKSLSLSLGKMFWVLVVVGGVLACYSLLVTVAFIIFWVRSKRSRLLHSDYMNMTPRRPGPTRKHYQPYA
PPRDFAAYRSGGGRVKFSRSADAPAYQQGQNQLYNELNLGRREEYDVLDKRRGRDPEMGGKPRRKNPQEGLYNELQKDKMAEAYSEIGMKGERRRGKGHDGLYQGLS
TATKDTYDALHMQALPPRLEGGGEGRGSLLTCGDVEENPGPRMPPPRLLFFLLFLLTPMEVRPEEPLVVKVEEGDNAVLQCLKGTSDGPTQQLTWSRESPLKPFLKLSLGLPG
LGIHMRPLAIWLFIFNVSQQMGGFYLCQPGPPSEKAWQPGWTVNVEGSGELFRWNVSDLGLGLGKLRNSSEGPSSPSGKLMSPKLYVWAKDRPEIWEGEPPCVPPRD
SLNQSLSQDLTMAPGSTLWLSCGVPPDSVSNGPLSWTHVHPKGPKSLLSLELKDDRPARDMVWMETGLLLPRATAQDAGKYYCHRGNLTMSFHLEITARPVLWHWLLRT
GGWKVSAVTLAYLIFCLCSLVGILHLQRALVLRRKR GMCSFRa signal peptide
Her2scFv
IgG4(SmP)
CD28 transmembrane
CD28cyto (LLinGG)
(Gly)3
Zeta
T2A
CD19t

Figure 20

Her2scFv-IgG4(L235E,N297Q)-CD8tm-41BB-Zeta-T2A-CD19t

MLLLVTSLLLCELPHPAFLLIPDIQMTQSPSSLSASVGDRVTITCRASQDVNTAVAWYQQKPGKAPKLLIYSASFLYSGVPSRFSGSRSGTDFTLTISSL
QPEDFATYYCQQHYTTPPTFGQGTKVEIKGSTSGSGGSGGGSGGGSSEVQLVESGGGLVQPGGSLRLSCAASGFNIKDTYIHWVRQAPGKGLE
WVARIYPTNGYTRYADSVKGRFTISADTSKNTAYLQMNSLRAEDTAVYYCSRWGGDGFYAMDYWGQGTLVTVSSESKYGPPCPxPAPEFEGG
PSVFLFPPKPKDTLMISRTPEVTCVVVDVSQEDPEVQFNWYVDGVEVHNAKTKPREEQFQSTYRVVSVLTVLHQDWLNGKEYKCKVSNKGLPSSI
EKTISKAKGQPREPQVYTLPPSQEEMTKNQVSLTCLVKGFYPSDIAVEWESNGQPENNYKTTPPVLDSDGSFFLYSRLTVDKSRWQEGNVFSCSV
MHEALHNHYTQKSLSLSLGKYIWAPLAGTCGVLLLSLVITLYCKRGRKKLLYIFKQPFMRPVQTTQEEDGCSCRFPEEEEGGCELGGGRVKFSRSADAP
AYQQGQNQLYNELNLGRREEYDVLDKRRGRDPEMGGKPRRKNPQEGLYNELQKDKMAEAYSEIGMKGERRRGKGHDGLYQGLSTATKDTYDA
LHMQALPPRLEGGGEGRGSLLTCGDVEENPGPRMDPPRLLFFLLFLTPMEVRPEEPLVVKVEEGDNAVLQCLKGTSDGPTQQLTWSRESPLKPFL
KLSLGLPGLGIHMRPLAIWLFIFNVSQQMGGFYLCQPGPPSEKAWQPGWTVNVEGSGELFRWNVSDLGLGLGCGLKNRSSEGPSSPSGKLMSPK
LYVWAKDRPEIWEGEPPCVPPRDSLNQSLNQSLSQDLTMAPGSTLWLSCGVPPDSVSRGPLSWTHVHPKGPKSLLSLELKDDRPARDMWVMETGLLL
PRATAQDDAGKYYCHRGNLTMSFHLEITARPVLWHWLLRTGGWKVSAVTLAYLIFCLCSLVGILHLQRALVLRRKR

GMCSFRa signal peptide
Her2scFv
IgG4(SmP)
CD8 transmembrane
4-1BB cyto
(Gly)3
Zeta
T2A
CD19t

Figure 21

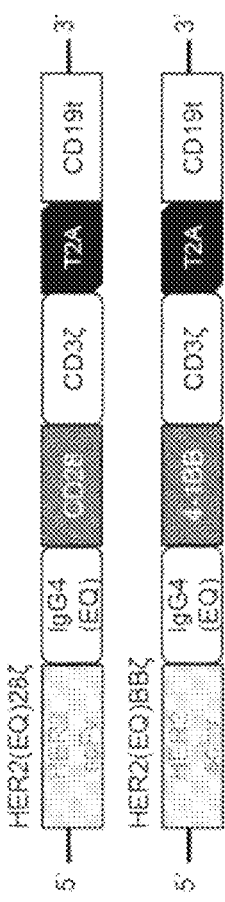
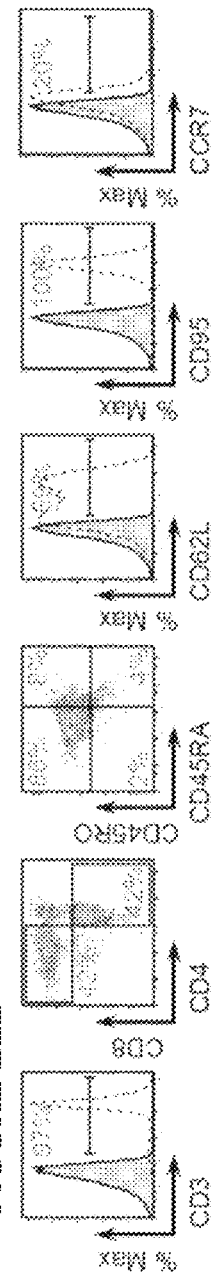
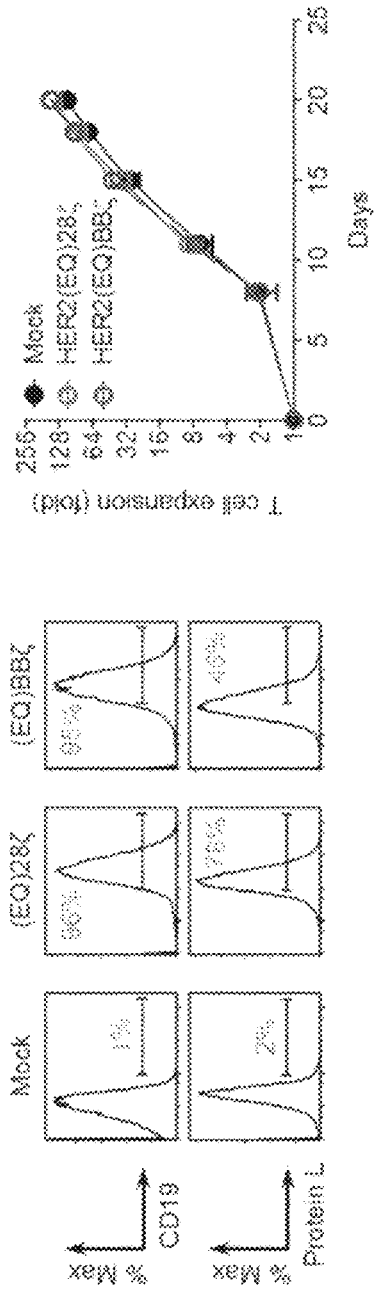
FIGURE 22A
FIGURE 22B
FIGURE 22C
FIGURE 22D

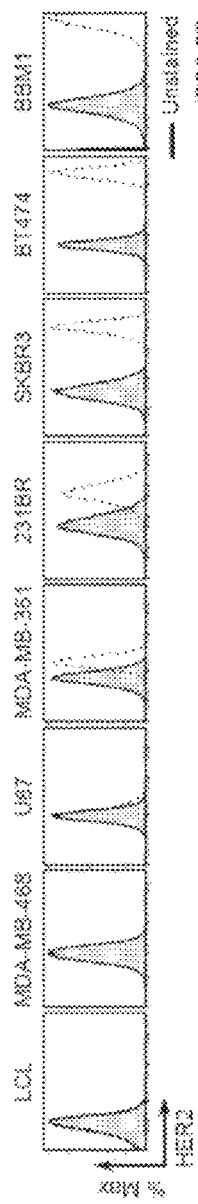
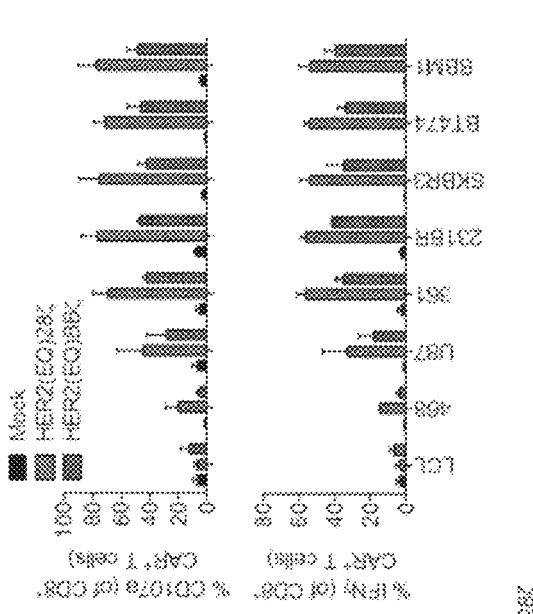
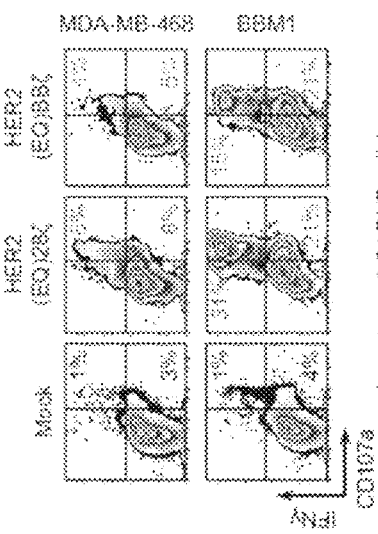
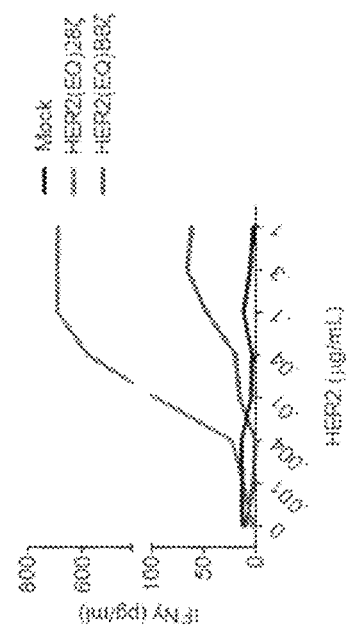
FIGURE 23A
FIGURE 23B
FIGURE 23C
FIGURE 23D

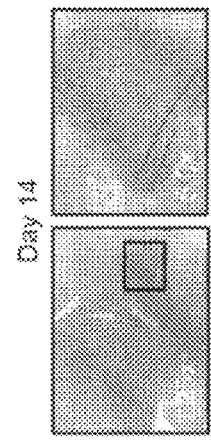
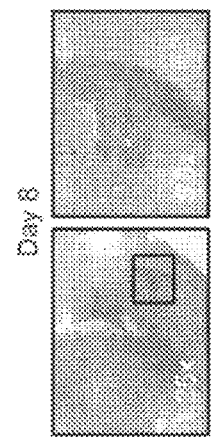
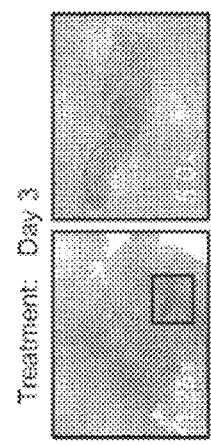
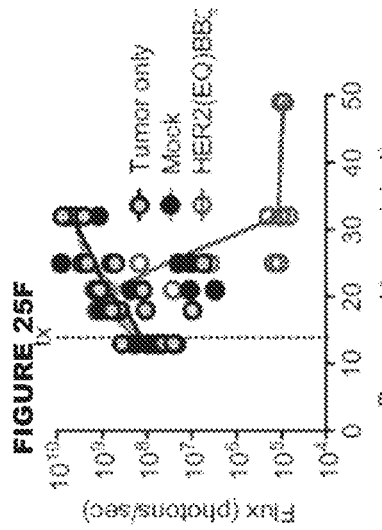
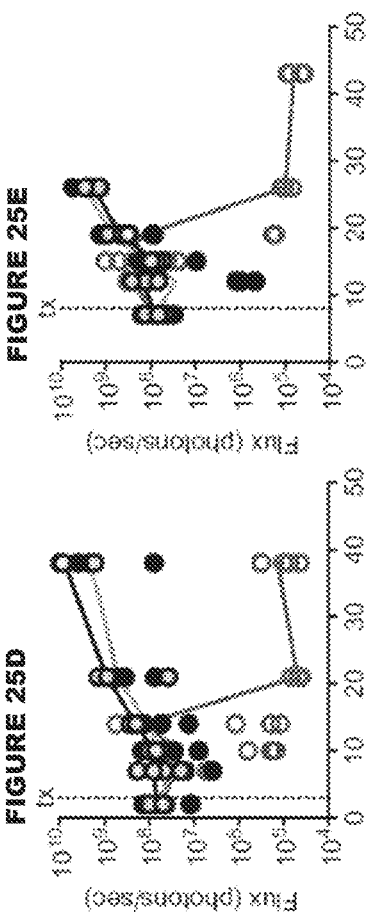
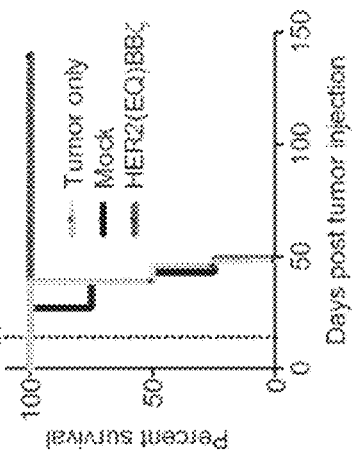
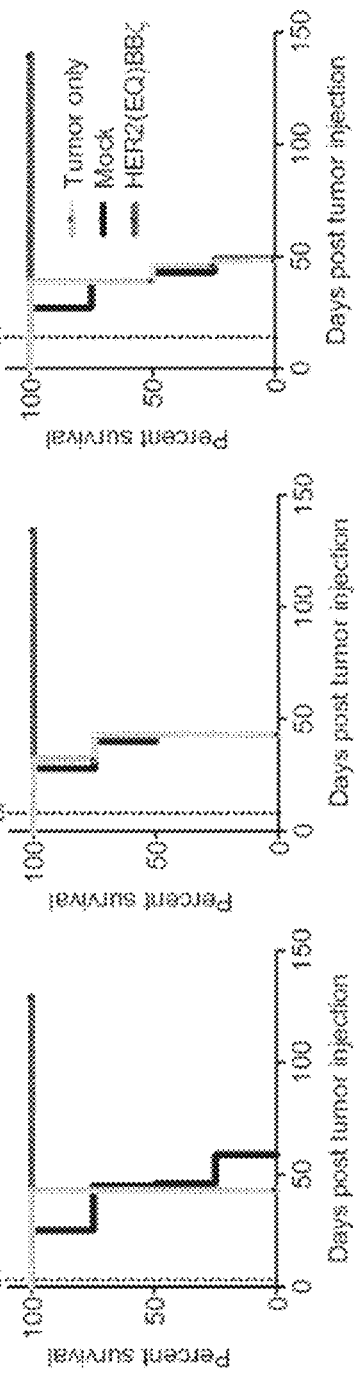

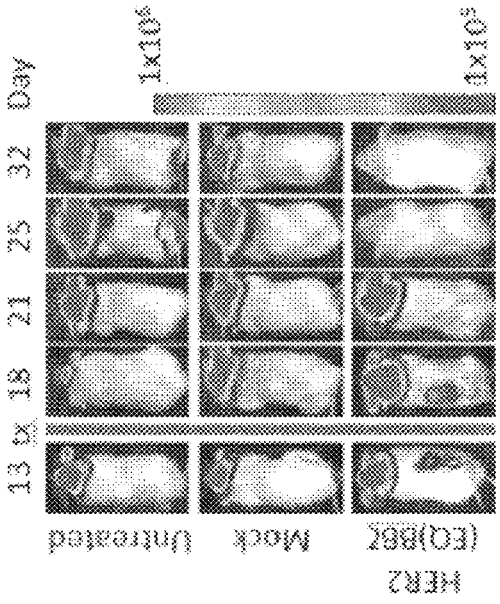
FIGURE 27A
FIGURE 27B
FIGURE 27C
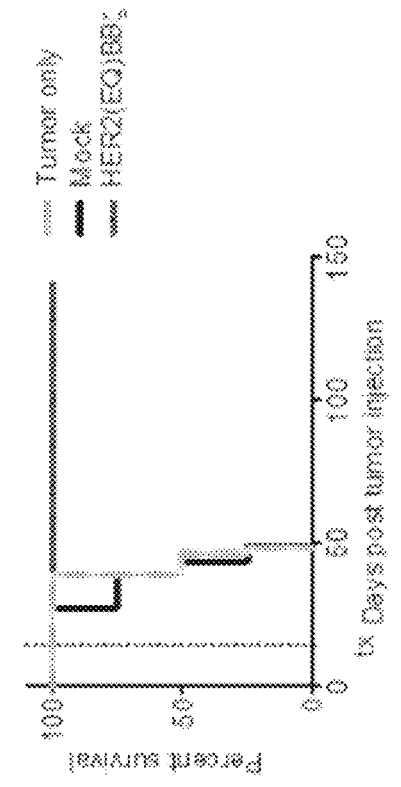
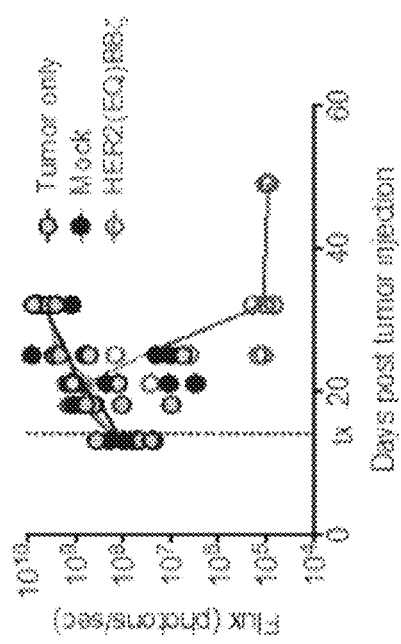
FIGURE 27D

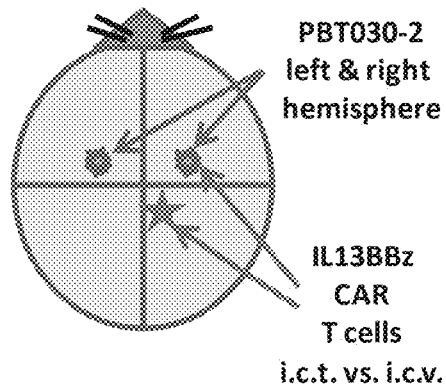
FIGURE 28
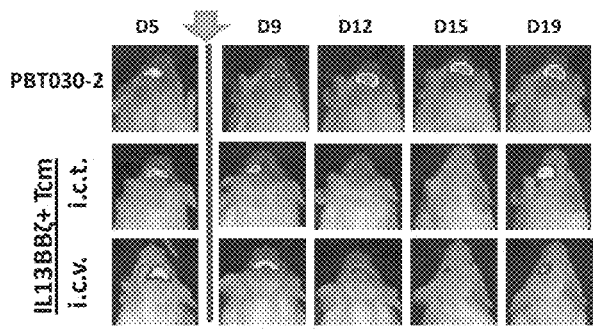
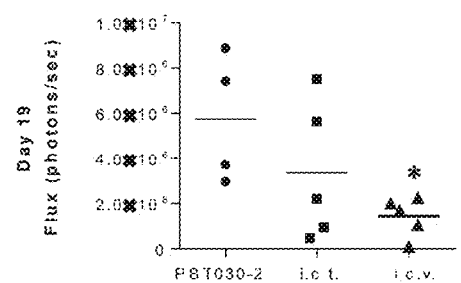
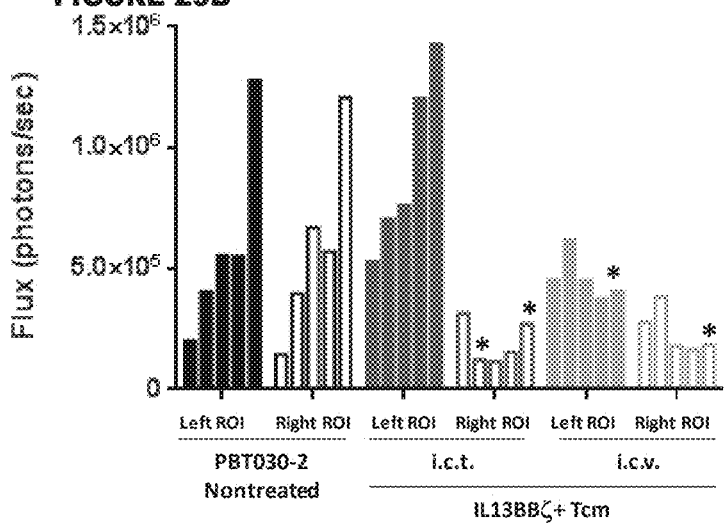

FIGURE 37A
Primary GBM, Right Temporal
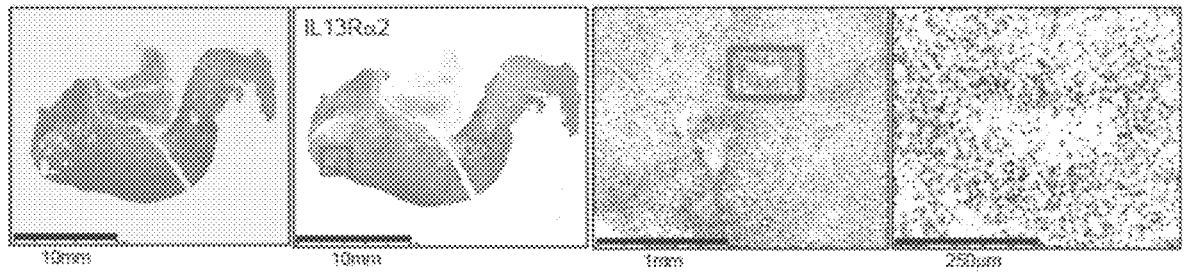
FIGURE 37B
Recurrent GBM (T1), Right Temporal-Occipital
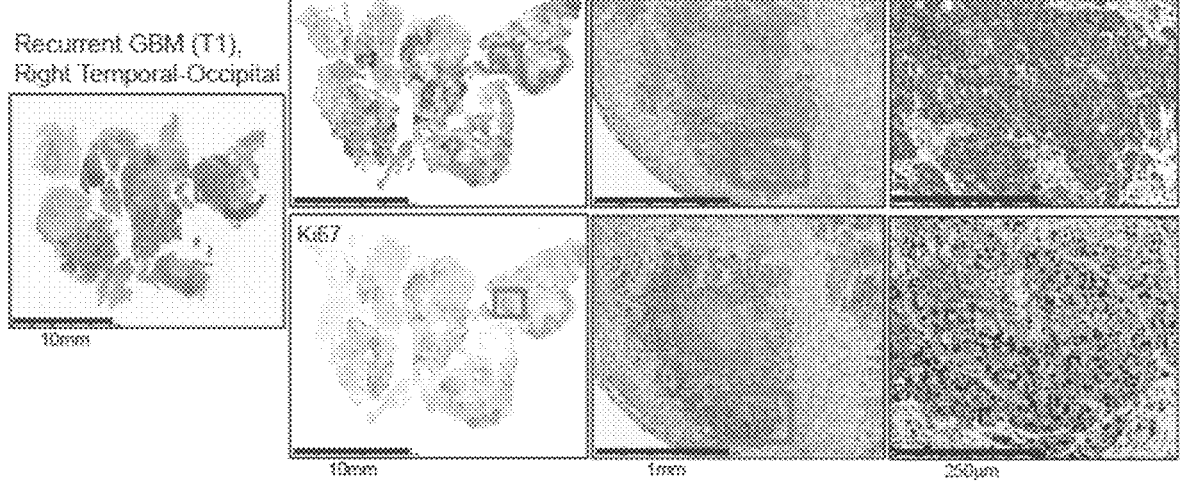
FIGURE 37C
Recurrent GBM (T1), Right Temporal-Occipital IL13Rα2
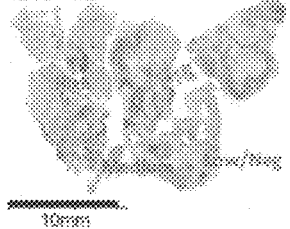
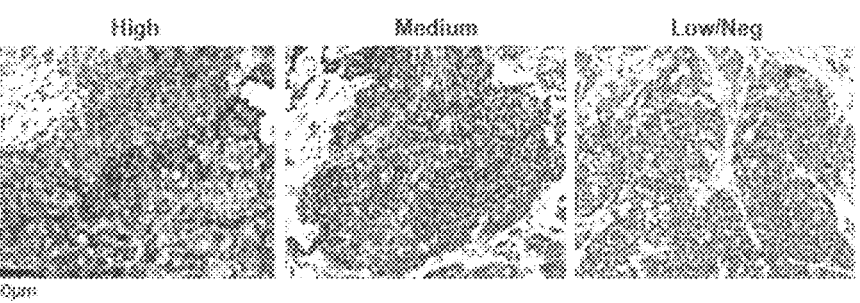

FIGURE 38A

| Tumor (T) | Anatomical Location | Surgically Resected? | Notes |
|---|---|---|---|
| T1 | Right posterior temporal-occipital lobe | Yes | |
| T2 | Right frontal lobe, superior | Yes | |
| T3 | Right frontal lobe, inferior | Yes | |
| T4 | Left temporal, pterion | No | |
| T5 | Left temporal, apex | No | |
| T6 | Right frontal lobe | No | New lesion arising during CART cycles 1-6, adjacent to resected cavity of T3 |
| T7 | Olfactory groove | No | New lesion arising during CART cycles 1-6 |
| T8 | Lumbar Spine | No | |

FIGURE 38B

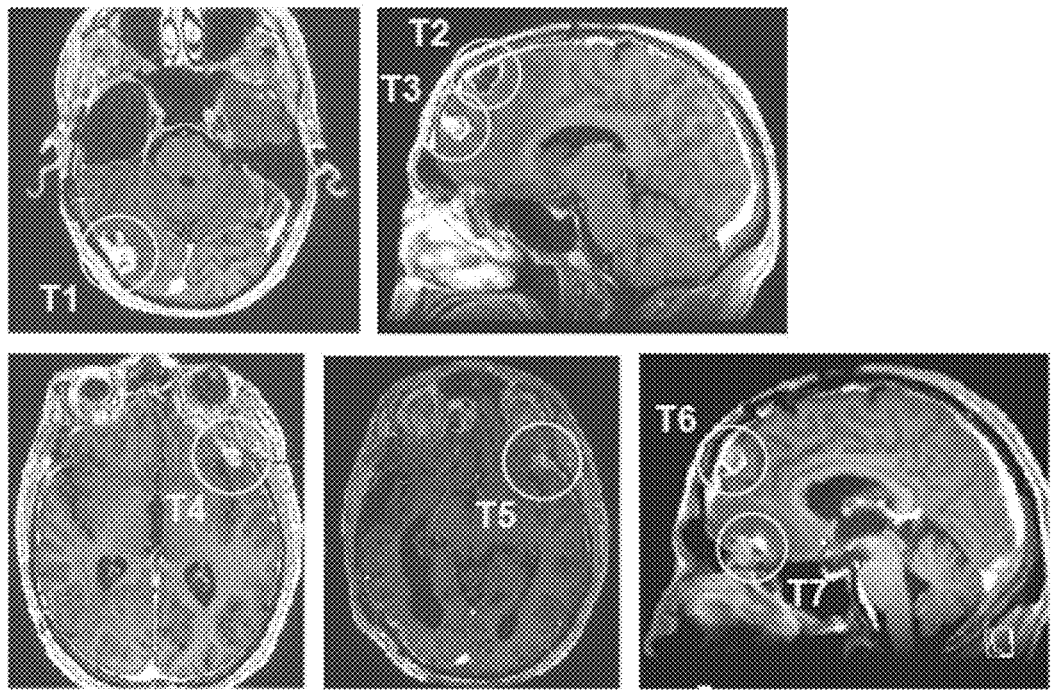

SEQUENCE LISTING

<160> NUMBER OF SEQ ID NOS: 59

<210> SEQ ID NO 1
<211> LENGTH: 889
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 1

Met Leu Leu Leu Val Thr Ser Leu Leu Cys Glu Leu Pro His Pro
1               5                   10                  15

Ala Phe Leu Leu Ile Pro Gly Pro Val Pro Ser Thr Ala Leu Arg
                20                  25                  30

Tyr Leu Ile Glu Glu Leu Val Asn Ile Thr Gln Asn Gln Lys Ala Pro
                35                  40                  45

Leu Cys Asn Gly Ser Met Val Trp Ser Ile Asn Leu Thr Ala Gly Met
50                  55                  60

Tyr Cys Ala Ala Leu Glu Ser Leu Ile Asn Val Ser Gly Cys Ser Ala
65                  70                  75                  80

Ile Glu Lys Thr Gln Arg Met Leu Ser Gly Phe Cys Pro His Lys Val
                85                  90                  95

Ser Ala Gly Gln Phe Ser Ser Leu His Val Arg Asp Thr Lys Ile Glu
                100                 105                 110

Val Ala Gln Phe Val Lys Asp Leu Leu Leu His Leu Lys Lys Leu Phe
            115                 120                 125

Arg Glu Gly Arg Phe Asn Glu Ser Lys Tyr Gly Pro Pro Cys Pro Pro
        130                 135                 140

Cys Pro Ala Pro Glu Phe Glu Gly Gly Pro Ser Val Phe Leu Phe Pro
145                 150                 155                 160

Pro Lys Pro Lys Asp Thr Leu Met Ile Ser Arg Thr Pro Glu Val Thr
                165                 170                 175

Cys Val Val Val Asp Val Ser Gln Glu Asp Pro Glu Val Gln Phe Asn
            180                 185                 190

Trp Tyr Val Asp Gly Val Glu Val His Asn Ala Lys Thr Lys Pro Arg
        195                 200                 205

Glu Glu Gln Phe Gln Ser Thr Tyr Arg Val Val Ser Val Leu Thr Val
    210                 215                 220

Leu His Gln Asp Trp Leu Asn Gly Lys Glu Tyr Lys Cys Lys Val Ser
225                 230                 235                 240

Asn Lys Gly Leu Pro Ser Ser Ile Glu Lys Thr Ile Ser Lys Ala Lys
                245                 250                 255

Gly Gln Pro Arg Glu Pro Gln Val Tyr Thr Leu Pro Pro Ser Gln Glu
            260                 265                 270

Glu Met Thr Lys Asn Gln Val Ser Leu Thr Cys Leu Val Lys Gly Phe
        275                 280                 285

Tyr Pro Ser Asp Ile Ala Val Glu Trp Glu Ser Asn Gly Gln Pro Glu
    290                 295                 300

Asn Asn Tyr Lys Thr Thr Pro Pro Val Leu Asp Ser Asp Gly Ser Phe
305                 310                 315                 320

Phe Leu Tyr Ser Arg Leu Thr Val Asp Lys Ser Arg Trp Gln Glu Gly
                325                 330                 335

Asn Val Phe Ser Cys Ser Val Met His Glu Ala Leu His Asn His Tyr
            340                 345                 350

```
Thr Gln Lys Ser Leu Ser Leu Ser Leu Gly Lys Met Ala Leu Ile Val
        355                 360                 365
Leu Gly Gly Val Ala Gly Leu Leu Leu Phe Ile Gly Leu Gly Ile Phe
    370                 375                 380
Phe Lys Arg Gly Arg Lys Lys Leu Leu Tyr Ile Phe Lys Gln Pro Phe
385                 390                 395                 400
Met Arg Pro Val Gln Thr Thr Gln Glu Glu Asp Gly Cys Ser Cys Arg
            405                 410                 415
Phe Pro Glu Glu Glu Glu Gly Gly Cys Glu Leu Gly Gly Gly Arg Val
                420                 425                 430
Lys Phe Ser Arg Ser Ala Asp Ala Pro Ala Tyr Gln Gln Gly Gln Asn
        435                 440                 445
Gln Leu Tyr Asn Glu Leu Asn Leu Gly Arg Arg Glu Glu Tyr Asp Val
    450                 455                 460
Leu Asp Lys Arg Arg Gly Arg Asp Pro Glu Met Gly Gly Lys Pro Arg
465                 470                 475                 480
Arg Lys Asn Pro Gln Glu Gly Leu Tyr Asn Glu Leu Gln Lys Asp Lys
                485                 490                 495
Met Ala Glu Ala Tyr Ser Glu Ile Gly Met Lys Gly Glu Arg Arg Arg
            500                 505                 510
Gly Lys Gly His Asp Gly Leu Tyr Gln Gly Leu Ser Thr Ala Thr Lys
        515                 520                 525
Asp Thr Tyr Asp Ala Leu His Met Gln Ala Leu Pro Pro Arg Leu Glu
    530                 535                 540
Gly Gly Gly Glu Gly Arg Gly Ser Leu Leu Thr Cys Gly Asp Val Glu
545                 550                 555                 560
Glu Asn Pro Gly Pro Arg Met Pro Pro Arg Leu Leu Phe Phe Leu
                565                 570                 575
Leu Phe Leu Thr Pro Met Glu Val Arg Pro Glu Glu Pro Leu Val Val
            580                 585                 590
Lys Val Glu Glu Gly Asp Asn Ala Val Leu Gln Cys Leu Lys Gly Thr
        595                 600                 605
Ser Asp Gly Pro Thr Gln Gln Leu Thr Trp Ser Arg Glu Ser Pro Leu
    610                 615                 620
Lys Pro Phe Leu Lys Leu Ser Leu Gly Leu Pro Gly Leu Gly Ile His
625                 630                 635                 640
Met Arg Pro Leu Ala Ile Trp Leu Phe Ile Phe Asn Val Ser Gln Gln
                645                 650                 655
Met Gly Gly Phe Tyr Leu Cys Gln Pro Gly Pro Pro Ser Glu Lys Ala
            660                 665                 670
Trp Gln Pro Gly Trp Thr Val Asn Val Glu Gly Ser Gly Glu Leu Phe
        675                 680                 685
Arg Trp Asn Val Ser Asp Leu Gly Gly Leu Gly Cys Gly Leu Lys Asn
    690                 695                 700
Arg Ser Ser Glu Gly Pro Ser Ser Pro Ser Gly Lys Leu Met Ser Pro
705                 710                 715                 720
Lys Leu Tyr Val Trp Ala Lys Asp Arg Pro Glu Ile Trp Glu Gly Glu
                725                 730                 735
Pro Pro Cys Val Pro Pro Arg Asp Ser Leu Asn Gln Ser Leu Ser Gln
            740                 745                 750
Asp Leu Thr Met Ala Pro Gly Ser Thr Leu Trp Leu Ser Cys Gly Val
        755                 760                 765
Pro Pro Asp Ser Val Ser Arg Gly Pro Leu Ser Trp Thr His Val His
```

```
                    770                 775                 780
Pro Lys Gly Pro Lys Ser Leu Leu Ser Leu Glu Leu Lys Asp Asp Arg
785                 790                 795                 800

Pro Ala Arg Asp Met Trp Val Met Glu Thr Gly Leu Leu Pro Arg
                805                 810                 815

Ala Thr Ala Gln Asp Ala Gly Lys Tyr Tyr Cys His Arg Gly Asn Leu
                820                 825                 830

Thr Met Ser Phe His Leu Glu Ile Thr Ala Arg Pro Val Leu Trp His
                835                 840                 845

Trp Leu Leu Arg Thr Gly Gly Trp Lys Val Ser Ala Val Thr Leu Ala
                850                 855                 860

Tyr Leu Ile Phe Cys Leu Cys Ser Leu Val Gly Ile Leu His Leu Gln
865                 870                 875                 880

Arg Ala Leu Val Leu Arg Arg Lys Arg
                885

<210> SEQ ID NO 2
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Met Leu Leu Leu Val Thr Ser Leu Leu Leu Cys Glu Leu Pro His Pro
1               5                   10                  15

Ala Phe Leu Leu Ile Pro
            20

<210> SEQ ID NO 3
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
                20                  25                  30

Val Trp Ser Ile Asn Leu Thr Ala Gly Met Tyr Cys Ala Ala Leu Glu
            35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu His Leu Lys Lys Leu Phe Arg Glu Gly Arg Phe Asn
            100                 105                 110

<210> SEQ ID NO 4
<211> LENGTH: 229
<212> TYPE: PRT
<213> ORGANISM: Artificial Sequence
<220> FEATURE:
<223> OTHER INFORMATION: Description of Artificial Sequence: Synthetic
``` polypeptide

<400> SEQUENCE: 4

Glu Ser Lys Tyr Gly Pro Pro Cys Pro Ser Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Gln Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 5
<211> LENGTH: 22
<212> TYPE: PRT
<213> ORGANISM: Homo sapiens

<400> SEQUENCE: 5

Met Ala Leu Ile Val Leu Gly Gly Val Ala Gly Leu Leu Leu Phe Ile
1               5                   10                  15

Gly Leu Gly Ile Phe Phe
            20

<210> SEQ ID NO 6
<211> LENGTH: 42
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

```
Pro Glu Glu Glu Gly Gly Cys Glu Leu
        35                  40

<210> SEQ ID NO 7
<211> LENGTH: 112
<212> TYPE: PRT
<213> ORGANISM: Homo sapiens

<400> SEQUENCE: 7

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 8
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Leu Glu Gly Gly Gly Glu Gly Arg Gly Ser Leu Leu Thr Cys Gly Asp
1               5                   10                  15

Val Glu Glu Asn Pro Gly Pro Arg
            20

<210> SEQ ID NO 9
<211> LENGTH: 323
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Met Pro Pro Pro Arg Leu Leu Phe Phe Leu Leu Phe Leu Thr Pro Met
1               5                   10                  15

Glu Val Arg Pro Glu Glu Pro Leu Val Val Lys Val Glu Glu Gly Asp
            20                  25                  30

Asn Ala Val Leu Gln Cys Leu Lys Gly Thr Ser Asp Gly Pro Thr Gln
        35                  40                  45

Gln Leu Thr Trp Ser Arg Glu Ser Pro Leu Lys Pro Phe Leu Lys Leu
    50                  55                  60

Ser Leu Gly Leu Pro Gly Leu Gly Ile His Met Arg Pro Leu Ala Ile
65                  70                  75                  80

Trp Leu Phe Ile Phe Asn Val Ser Gln Gln Met Gly Gly Phe Tyr Leu
                85                  90                  95
```

```
Cys Gln Pro Gly Pro Pro Ser Glu Lys Ala Trp Gln Pro Gly Trp Thr
                100                 105                 110
Val Asn Val Glu Gly Ser Gly Glu Leu Phe Arg Trp Asn Val Ser Asp
            115                 120                 125
Leu Gly Gly Leu Gly Cys Gly Leu Lys Asn Arg Ser Ser Glu Gly Pro
        130                 135                 140
Ser Ser Pro Ser Gly Lys Leu Met Ser Pro Lys Leu Tyr Val Trp Ala
145                 150                 155                 160
Lys Asp Arg Pro Glu Ile Trp Glu Gly Glu Pro Pro Cys Val Pro Pro
                165                 170                 175
Arg Asp Ser Leu Asn Gln Ser Leu Ser Gln Asp Leu Thr Met Ala Pro
            180                 185                 190
Gly Ser Thr Leu Trp Leu Ser Cys Gly Val Pro Pro Asp Ser Val Ser
        195                 200                 205
Arg Gly Pro Leu Ser Trp Thr His Val His Pro Lys Gly Pro Lys Ser
210                 215                 220
Leu Leu Ser Leu Glu Leu Lys Asp Asp Arg Pro Ala Arg Asp Met Trp
225                 230                 235                 240
Val Met Glu Thr Gly Leu Leu Leu Pro Arg Ala Thr Ala Gln Asp Ala
                245                 250                 255
Gly Lys Tyr Tyr Cys His Arg Gly Asn Leu Thr Met Ser Phe His Leu
            260                 265                 270
Glu Ile Thr Ala Arg Pro Val Leu Trp His Trp Leu Leu Arg Thr Gly
        275                 280                 285
Gly Trp Lys Val Ser Ala Val Thr Leu Ala Tyr Leu Ile Phe Cys Leu
290                 295                 300
Cys Ser Leu Val Gly Ile Leu His Leu Gln Arg Ala Leu Val Leu Arg
305                 310                 315                 320
Arg Lys Arg

<210> SEQ ID NO 10
<211> LENGTH: 889
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Met Leu Leu Leu Val Thr Ser Leu Leu Cys Glu Leu Pro His Pro
1               5                   10                  15
Ala Phe Leu Leu Ile Pro Gly Pro Val Pro Pro Ser Thr Ala Leu Arg
                20                  25                  30
Tyr Leu Ile Glu Glu Leu Val Asn Ile Thr Gln Asn Gln Lys Ala Pro
            35                  40                  45
Leu Cys Asn Gly Ser Met Val Trp Ser Ile Asn Leu Thr Ala Gly Met
        50                  55                  60
Tyr Cys Ala Ala Leu Glu Ser Leu Ile Asn Val Ser Gly Cys Ser Ala
65                  70                  75                  80
Ile Glu Lys Thr Gln Arg Met Leu Ser Gly Phe Cys Pro His Lys Val
                85                  90                  95
Ser Ala Gly Gln Phe Ser Ser Leu His Val Arg Asp Thr Lys Ile Glu
            100                 105                 110
Val Ala Gln Phe Val Lys Asp Leu Leu Leu His Leu Lys Lys Leu Phe
        115                 120                 125
```

```
Arg Glu Gly Arg Phe Asn Glu Ser Lys Tyr Gly Pro Pro Cys Pro Pro
    130                 135                 140

Cys Pro Ala Pro Glu Phe Glu Gly Gly Pro Ser Val Phe Leu Phe Pro
145                 150                 155                 160

Pro Lys Pro Lys Asp Thr Leu Met Ile Ser Arg Thr Pro Glu Val Thr
                165                 170                 175

Cys Val Val Val Asp Val Ser Gln Glu Asp Pro Glu Val Gln Phe Asn
                180                 185                 190

Trp Tyr Val Asp Gly Val Glu Val His Asn Ala Lys Thr Lys Pro Arg
            195                 200                 205

Glu Glu Gln Phe Gln Ser Thr Tyr Arg Val Val Ser Val Leu Thr Val
    210                 215                 220

Leu His Gln Asp Trp Leu Asn Gly Lys Glu Tyr Lys Cys Lys Val Ser
225                 230                 235                 240

Asn Lys Gly Leu Pro Ser Ser Ile Glu Lys Thr Ile Ser Lys Ala Lys
                245                 250                 255

Gly Gln Pro Arg Glu Pro Gln Val Tyr Thr Leu Pro Pro Ser Gln Glu
                260                 265                 270

Glu Met Thr Lys Asn Gln Val Ser Leu Thr Cys Leu Val Lys Gly Phe
    275                 280                 285

Tyr Pro Ser Asp Ile Ala Val Glu Trp Glu Ser Asn Gly Gln Pro Glu
290                 295                 300

Asn Asn Tyr Lys Thr Thr Pro Pro Val Leu Asp Ser Asp Gly Ser Phe
305                 310                 315                 320

Phe Leu Tyr Ser Arg Leu Thr Val Asp Lys Ser Arg Trp Gln Glu Gly
                325                 330                 335

Asn Val Phe Ser Cys Ser Val Met His Glu Ala Leu His Asn His Tyr
                340                 345                 350

Thr Gln Lys Ser Leu Ser Leu Ser Leu Gly Lys Met Ala Leu Ile Val
    355                 360                 365

Leu Gly Gly Val Ala Gly Leu Leu Leu Phe Ile Gly Leu Gly Ile Phe
370                 375                 380

Phe Lys Arg Gly Arg Lys Lys Leu Leu Tyr Ile Phe Lys Gln Pro Phe
385                 390                 395                 400

Met Arg Pro Val Gln Thr Thr Gln Glu Glu Asp Gly Cys Ser Cys Arg
                405                 410                 415

Phe Pro Glu Glu Glu Glu Gly Gly Cys Glu Leu Gly Gly Arg Val
                420                 425                 430

Lys Phe Ser Arg Ser Ala Asp Ala Pro Ala Tyr Gln Gln Gly Gln Asn
                435                 440                 445

Gln Leu Tyr Asn Glu Leu Asn Leu Gly Arg Arg Glu Glu Tyr Asp Val
    450                 455                 460

Leu Asp Lys Arg Arg Gly Arg Asp Pro Glu Met Gly Gly Lys Pro Arg
465                 470                 475                 480

Arg Lys Asn Pro Gln Glu Gly Leu Tyr Asn Glu Leu Gln Lys Asp Lys
                485                 490                 495

Met Ala Glu Ala Tyr Ser Glu Ile Gly Met Lys Gly Glu Arg Arg Arg
                500                 505                 510

Gly Lys Gly His Asp Gly Leu Tyr Gln Gly Leu Ser Thr Ala Thr Lys
                515                 520                 525

Asp Thr Tyr Asp Ala Leu His Met Gln Ala Leu Pro Pro Arg Leu Glu
    530                 535                 540

Gly Gly Gly Glu Gly Arg Gly Ser Leu Leu Thr Cys Gly Asp Val Glu
```

Glu Asn Pro Gly Pro Arg Met Pro Pro Arg Leu Leu Phe Phe Leu
545                 550                 555                 560

Leu Phe Leu Thr Pro Met Glu Val Arg Pro Glu Pro Leu Val Val
            565                 570                 575

Lys Val Glu Glu Gly Asp Asn Ala Val Leu Gln Cys Leu Lys Gly Thr
        580                 585                 590

Ser Asp Gly Pro Thr Gln Gln Leu Thr Trp Ser Arg Glu Ser Pro Leu
    595                 600                 605

Lys Pro Phe Leu Lys Leu Ser Leu Gly Leu Pro Gly Leu Gly Ile His
610                 615                 620

Met Arg Pro Leu Ala Ile Trp Leu Phe Ile Phe Asn Val Ser Gln Gln
625                 630                 635                 640

Met Gly Gly Phe Tyr Leu Cys Gln Pro Gly Pro Pro Ser Glu Lys Ala
            645                 650                 655

Trp Gln Pro Gly Trp Thr Val Asn Val Glu Gly Ser Gly Glu Leu Phe
        660                 665                 670

Arg Trp Asn Val Ser Asp Leu Gly Gly Leu Gly Cys Gly Leu Lys Asn
    675                 680                 685

Arg Ser Ser Glu Gly Pro Ser Ser Pro Ser Gly Lys Leu Met Ser Pro
705                 690                 695                 700

Lys Leu Tyr Val Trp Ala Lys Asp Arg Pro Glu Ile Trp Glu Gly Glu
        710                 715                 720

Pro Pro Cys Val Pro Pro Arg Asp Ser Leu Asn Gln Ser Leu Ser Gln
    725                 730                 735

Asp Leu Thr Met Ala Pro Gly Ser Thr Leu Trp Leu Ser Cys Gly Val
740                 745                 750

Pro Pro Asp Ser Val Ser Arg Gly Pro Leu Ser Trp Thr His Val His
            755                 760                 765

Pro Lys Gly Pro Lys Ser Leu Leu Ser Leu Glu Leu Lys Asp Asp Arg
770                 775                 780

Pro Ala Arg Asp Met Trp Val Met Glu Thr Gly Leu Leu Pro Arg
785                 790                 795                 800

Ala Thr Ala Gln Asp Ala Gly Lys Tyr Tyr Cys His Arg Gly Asn Leu
            805                 810                 815

Thr Met Ser Phe His Leu Glu Ile Thr Ala Arg Pro Val Leu Trp His
        820                 825                 830

Trp Leu Leu Arg Thr Gly Gly Trp Lys Val Ser Ala Val Thr Leu Ala
    835                 840                 845

Tyr Leu Ile Phe Cys Leu Cys Ser Leu Val Gly Ile Leu His Leu Gln
865                 850                 855                 860

Arg Ala Leu Val Leu Arg Arg Lys Arg
            885                 870                 875                 880

<210> SEQ ID NO 11
<211> LENGTH: 405
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 11

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
            100                 105                 110

Glu Ser Lys Tyr Gly Pro Pro Cys Pro Pro Cys Pro Ala Pro Glu Phe
        115                 120                 125

Glu Gly Gly Pro Ser Val Phe Leu Phe Pro Pro Lys Pro Lys Asp Thr
    130                 135                 140

Leu Met Ile Ser Arg Thr Pro Glu Val Thr Cys Val Val Val Asp Val
145                 150                 155                 160

Ser Gln Glu Asp Pro Glu Val Gln Phe Asn Trp Tyr Val Asp Gly Val
                165                 170                 175

Glu Val His Asn Ala Lys Thr Lys Pro Arg Glu Glu Gln Phe Gln Ser
            180                 185                 190

Thr Tyr Arg Val Val Ser Val Leu Thr Val Leu His Gln Asp Trp Leu
        195                 200                 205

Asn Gly Lys Glu Tyr Lys Cys Lys Val Ser Asn Lys Gly Leu Pro Ser
    210                 215                 220

Ser Ile Glu Lys Thr Ile Ser Lys Ala Lys Gly Gln Pro Arg Glu Pro
225                 230                 235                 240

Gln Val Tyr Thr Leu Pro Pro Ser Gln Glu Glu Met Thr Lys Asn Gln
                245                 250                 255

Val Ser Leu Thr Cys Leu Val Lys Gly Phe Tyr Pro Ser Asp Ile Ala
            260                 265                 270

Val Glu Trp Glu Ser Asn Gly Gln Pro Glu Asn Asn Tyr Lys Thr Thr
        275                 280                 285

Pro Pro Val Leu Asp Ser Asp Gly Ser Phe Phe Leu Tyr Ser Arg Leu
    290                 295                 300

Thr Val Asp Lys Ser Arg Trp Gln Glu Gly Asn Val Phe Ser Cys Ser
305                 310                 315                 320

Val Met His Glu Ala Leu His Asn His Tyr Thr Gln Lys Ser Leu Ser
                325                 330                 335

Leu Ser Leu Gly Lys Met Ala Leu Ile Val Leu Gly Gly Val Ala Gly
            340                 345                 350

Leu Leu Leu Phe Ile Gly Leu Gly Ile Phe Phe Lys Arg Gly Arg Lys
        355                 360                 365

Lys Leu Leu Tyr Ile Phe Lys Gln Pro Phe Met Arg Pro Val Gln Thr
    370                 375                 380

Thr Gln Glu Glu Asp Gly Cys Ser Cys Arg Phe Pro Glu Glu Glu Glu
385                 390                 395                 400

Gly Gly Cys Glu Leu
                405

<210> SEQ ID NO 12
<211> LENGTH: 9515
<212> TYPE: DNA

<213> ORGANISM: Artificial Sequence
<220> FEATURE:
<223> OTHER INFORMATION: Description of Artificial Sequence: Synthetic polynucleotide

<400> SEQUENCE: 12

```
gttagaccag atctgagcct gggagctctc tggctaacta gggaacccac tgcttaagcc      60
tcaataaagc ttgccttgag tgcttcaagt agtgtgtgcc cgtctgttgt gtgactctgg     120
taactagaga tccctcagac cctttagtc agtgtggaaa atctctagca gtggcgcccg     180
aacagggact tgaaagcgaa agggaaacca gaggagctct ctcgacgcag gactcggctt     240
gctgaagcgc gcacggcaag aggcgagggg cggcgactgg tgagtacgcc aaaaattttg     300
actagcggag gctagaagga gagagatggg tgcgagagcg tcagtattaa gcggggggaga     360
attagatcga tgggaaaaaa ttcggttaag gccaggggga aagaaaaaat ataaattaaa     420
acatatagta tgggcaagca gggagctaga acgattcgca gttaatcctg gcctgttaga     480
aacatcagaa ggctgtagac aaatactggg acagctacaa ccatcccttc agacaggatc     540
agaagaactt agatcattat ataatacagt agcaaccctc tattgtgtgc atcaaaggat     600
agagataaaa gacaccaagg aagctttaga caagatagag gaagagcaaa acaaaagtaa     660
gaaaaaagca cagcaagcag cagctgacac aggacacagc aatcaggtca gccaaaatta     720
ccctatagtg cagaacatcc aggggcaaat ggtacatcag gccatatcac ctagaacttt     780
aaatgcatgg gtaaaagtag tagaagagaa ggctttcagc ccagaagtga tacccatgtt     840
ttcagcatta tcagaaggag ccaccccaca agatttaaac accatgctaa acacagtggg     900
gggacatcaa gcagccatgc aaatgttaaa agagaccatc aatgaggaag ctgcaggcaa     960
agagaagagt ggtgcagaga gaaaaaagag cagtgggaat aggagctttg ttccttgggt    1020
tcttgggagc agcaggaagc actatgggcg cagcgtcaat gacgctgacg gtacaggcca    1080
gacaattatt gtctggtata gtgcagcagc agaacaattt gctgagggct attgaggcgc    1140
aacagcatct gttgcaactc acagtctggg gcatcaagca gctccaggca agaatcctgg    1200
ctgtggaaag atacctaaag gatcaacagc tcctggggat ttggggttgc tctggaaaac    1260
tcatttgcac cactgctgtg ccttggatct acaaatggca gtattcatcc acaatttaa    1320
aagaaagggg gggattgggg ggtacagtgc aggggaaaga atagtagaca taatagcaac    1380
agacatacaa actaaagaat tacaaaaaca aattacaaaa attcaaaatt tcgggttta    1440
ttacagggac agcagagatc cagtttgggg atcaattgca tgaagaatct gcttagggtt    1500
aggcgttttg cgctgcttcg cgaggatctg cgatcgctcc ggtgcccgtc agtgggcaga    1560
gcgcacatcg cccacagtcc ccgagaagtt gggggggaggg gtcggcaatt gaaccggtgc    1620
ctagagaagg tggcgcgggg taaactggga aagtgatgtc gtgtactggc tccgcctttt    1680
tcccgagggt gggggagaac cgtatataag tgcagtagtc gccgtgaacg ttcttttcg     1740
caacgggttt gccgccagaa cacagctgaa gcttcgaggg gctcgcatct ctccttcacg    1800
cgcccgccgc cctacctgag gccgccatcc acgccggttg agtcgcgttc tgccgcctcc    1860
cgcctgtggt gcctcctgaa ctgcgtccgc cgtctaggta agtttaaagc tcaggtcgag    1920
accgggcctt tgtccggcgc tcccttggag cctacctaga ctcagccggc tctccacgct    1980
ttgcctgacc ctgcttgctc aactctacgt ctttgtttcg ttttctgttc tgcgccgtta    2040
cagatccaag ctgtgaccgg cgcctacggg tagcgccgcc accatgctgc tgctggtgac    2100
cagcctgctg ctgtgcgagc tgccccaccc cgcctttctg ctgatccctg gccccgtgcc    2160
```

```
ccctagcacc gccctgcgct acctgatcga ggaactggtg aacatcaccc agaaccagaa    2220 agccccctg tgcaacggca gcatggtgtg gagcatcaac ctgaccgccg gcatgtactg     2280
tgccgccctg gaaagcctga tcaacgtgag cggctgcagc gccatcgaga aacccagcg    2340 gatgctgtcc ggcttctgcc cccacaaggt gtccgccgga cagttcagca gcctgcacgt    2400
gcgggacacc aagatcgagg tggcccagtt cgtgaaggac ctgctgctgc acctgaagaa    2460
gctgttccgg gagggccggt caacgagag caagtacggc cctccctgcc cccttgccc     2520 tgccccagag ttcgagggcg acccagcgt gttcctgttc cccccaagc caaggacac     2580 cctgatgatc agccggaccc ctgaggtgac ctgcgtggtg gtggacgtga gccaggaaga    2640
tcctgaggtc cagttcaatt ggtacgtgga cggcgtggag gtgcacaacg ccaagaccaa    2700
gcccagggaa gagcagttcc agagcaccta ccgggtggtg tccgtgctga ccgtgctgca    2760
ccaggactgg ctgaacggca agaatacaa gtgcaaggtg tccaacaagg gcctgcccag    2820
cagcatcgag aaaaccatca gcaaggccaa gggccagcct cgggagcccc aggtgtacac    2880 cctgcccct tcccaggaag agatgaccaa gaatcaggtg tccctgacct gctggtgaa     2940 gggcttctac cccagcgaca tcgccgtgga gtgggagagc aacggccagc ccgagaacaa    3000
ctacaagacc cccccctg tgctggacag cgacggcagc ttcttcctgt acagcaggct     3060
gaccgtggac aagagccggt ggcaggaagg caacgtcttt agctgcagcg tgatgcacga    3120
ggccctgcac aaccactaca cccagaagag cctgtccctg agcctgggca gatggccct     3180 gatcgtgctg ggcggcgtgg ccgggctgct gctgttcatc ggcctgggca tctttttcaa    3240
acggggcaga aagaaactcc tgtatatatt caaacaacca tttatgagac cagtacaaac    3300
tactcaagag gaagatggct gtagctgccg atttccagaa gaagaagaag gaggatgtga    3360
actgggcgga gggcgggtga agttcagccg gtccgccgac gcccctgcct accagcaggg    3420
ccagaaccag ctgtacaacg agctgaacct gggcaggcgg gaggaatacg acgtgctgga    3480
caagcggaga ggccgggacc ctgagatggg cggcaagcct cggcggaaga accccccagga    3540 aggcctgtat aacgaactgc agaaagacaa gatggccgag gcctacagcg agatcggcat    3600
gaagggcgag cggaggcggg gcaagggcca cgacggcctg tatcagggcc tgtccaccgc    3660
caccaaggat acctacgacg ccctgcacat gcaggccctg ccccaaggc tcgagggcgg    3720 cggagagggc agaggaagtc ttctaacatg cggtgacgtg gaggagaatc ccggccctag    3780
gatgccacct cctcgcctcc tcttcttcct cctcttcctc accccatgg aagtcaggcc    3840 cgaggaacct ctagtggtga aggtggaaga gggagataac gctgtgctgc agtgcctcaa    3900
ggggacctca gatggcccca ctcagcagct gacctggtct cgggagtccc cgcttaaacc    3960
cttcttaaaa ctcagcctgg ggctgccagg cctgggaatc cacatgaggc ccctggccat    4020 ctggctttc atcttcaacg tctctcaaca gatgggggc ttctacctgt gccagccggg     4080
gcccccctct gagaaggcct ggcagcctgg ctggacagtc aatgtggagg cagcggggga    4140
gctgttccgg tggaatgttt cggacctagg tggcctgggc tgtggcctga gaacaggtc     4200 ctcagagggc cccagctccc cttccgggaa gctcatgagc ccaagctgt atgtgtgggc     4260 caaagaccgc cctgagatct gggagggaga gcctccgtgt gtcccaccga gggacagcct    4320
gaaccagagc ctcagccagg acctcaccat ggcccctggc tccacactct ggctgtcctg    4380 tgggtaccc cctgactctg tgtccagggg cccctctcc tggacccatg tgcacccaa      4440 ggggcctaag tcattgctga gcctagagct gaaggacgat cgccctgcca gagatatgtg    4500
ggtaatggag acgggtctgt tgttgccccg ggccacagct caagacgctg gaaagtatta    4560
```

```
ttgtcaccgt ggcaacctga ccatgtcatt ccacctggag atcactgctc ggccagtact    4620
atggcactgg ctgctgagga ctggtggctg aaggtctca gctgtgactt tggcttatct    4680
gatcttctgc ctgtgttccc ttgtgggcat tcttcatctt caaagagccc tggtcctgag    4740
gaggaaaaga taatctagac ccgggctgca ggaattcgat atcaagctta tcgataatca    4800
acctctggat tacaaaattt gtgaaagatt gactggtatt cttaactatg ttgctccttt    4860
tacgctatgt ggatacgctg ctttaatgcc tttgtatcat gctattgctt cccgtatggc    4920
tttcattttc tcctccttgt ataaatcctg gttgctgtct ctttatgagg agttgtggcc    4980
cgttgtcagg caacgtggcg tggtgtgcac tgtgtttgct gacgcaaccc ccactggttg    5040
gggcattgcc accacctgtc agctcctttc gggactttc gctttccccc tcctattgc    5100 cacggcggaa ctcatcgccg cctgccttgc ccgctgctgg acaggggctc ggctgttggg    5160
cactgacaat tccgtggtgt tgtcggggaa atcatcgtcc tttccttggc tgctcgcctg    5220
tgttgccacc tggattctgc gcgggacgtc cttctgctac gtcccttcgg ccctcaatcc    5280
agcggacctt ccttcccgcg gcctgctgcc ggctctgcgg cctcttccgc gtcttcgcct    5340
tcgccctcag acgagtcgga tctccctttg ggccgcctcc ccgcatcgat accgtcgact    5400
agccgtacct ttaagaccaa tgacttacaa ggcagctgta gatcttagcc acttttaaa    5460 agaaaagggg ggactggaag ggctaattca ctcccaaaga agacaagatc tgcttttgc    5520 ctgtactggg tctctctggt tagaccagat ctgagcctgg gagctctctg gctaactagg    5580
gaacccactg cttaagcctc aataaagctt gccttgagtg cttcaagtag tgtgtgcccg    5640
tctgttgtgt gactctggta actagagatc cctcagaccc ttttagtcag tgtggaaaat    5700
ctctagcaga attcgatatc aagcttatcg ataccgtcga cctcgagggg gggcccggta    5760
cccaattcgc cctatagtga gtcgtattac aattcactgg ccgtcgtttt acaacgtcgt    5820
gactgggaaa accctggcgt tacccaactt aatcgccttg cagcacatcc cccttcgcc    5880 agctggcgta atagcgaaga ggcccgcacc gatcgccctt cccaacagtt gcgcagcctg    5940
aatggcgaat ggaaattgta agcgttaata ttttgttaaa attcgcgtta aattttttgt    6000
aaatcagctc attttttaac caataggccg aaatcggcaa aatcccttat aaatcaaaag    6060
aatagaccga gatagggttg agtgttgttc cagtttggaa caagagtcca ctattaaaga    6120
acgtggactc caacgtcaaa gggcgaaaaa ccgtctatca gggcgatggc ccactacgtg    6180
aaccatcacc ctaatcaagt tttttggggt cgaggtgccg taaagcacta atcggaacc    6240 ctaaagggag cccccgattt agagcttgac ggggaaagcc ggcgaacgtg gcgagaaagg    6300
aagggaagaa agcgaaagga gcgggcgcta gggcgctggc aagtgtagcg gtcacgctgc    6360
gcgtaaccac cacacccgcc gcgcttaatg cgccgctaca gggcgcgtca ggtggcactt    6420
ttcggggaaa tgtgcgcgga accctatt gtttattttt ctaaatacat tcaaatatgt    6480
atccgctcat gagacaataa ccctgataaa tgcttcaata atattgaaaa aggaagagta    6540
tgagtattca acatttccgt gtcgccctta ttccctttt tgcggcattt gccttcctg    6600 tttttgctca cccagaaacg ctggtgaaag taaaagatgc tgaagatcag ttgggtgcac    6660
gagtgggtta catcgaactg gatctcaaca gcggtaagat ccttgagagt tttcgccccg    6720
aagaacgttt tccaatgatg agcacttta aagttctgct atgtggcgcg gtattatccc    6780
gtattgacgc cgggcaagag caactcggtc gccgcataca ctattctcag aatgacttgg    6840
ttgagtactc accagtcaca gaaaagcatc ttacggatgg catgacagta agagaattat    6900
```

| | |
|---|---|
| gcagtgctgc cataaccatg agtgataaca ctgcggccaa cttacttctg acaacgatcg | 6960 |
| gaggaccgaa ggagctaacc gcttttttgc acaacatggg ggatcatgta actcgccttg | 7020 |
| atcgttggga accggagctg aatgaagcca taccaaacga cgagcgtgac accacgatgc | 7080 |
| ctgtagcaat ggcaacaacg ttgcgcaaac tattaactgg cgaactactt actctagctt | 7140 |
| cccggcaaca attaatagac tggatggagg cggataaagt tgcaggacca cttctgcgct | 7200 |
| cggcccttcc ggctggctgg tttattgctg ataaatctgg agccggtgag cgtgggtctc | 7260 |
| gcggtatcat tgcagcactg gggccagatg gtaagccctc ccgtatcgta gttatctaca | 7320 |
| cgacggggag tcaggcaact atggatgaac gaaatagaca gatcgctgag ataggtgcct | 7380 |
| cactgattaa gcattggtaa ctgtcagacc aagtttactc atatatactt tagattgatt | 7440 |
| taaaacttca ttttaatttt aaaaggatct aggtgaagat cctttttgat aatctcatga | 7500 |
| ccaaaatccc ttaacgtgag ttttcgttcc actgagcgtc agaccccgta gaaaagatca | 7560 |
| aaggatcttc ttgagatcct tttttctgc gcgtaatctg ctgcttgcaa acaaaaaaac | 7620 |
| caccgctacc agcggtggtt tgtttgccgg atcaagagct accaactctt tttccgaagg | 7680 |
| taactggctt cagcagagcg cagataccaa atactgttct tctagtgtag ccgtagttag | 7740 |
| gccaccactt caagaactct gtagcaccgc ctacatacct cgctctgcta atcctgttac | 7800 |
| cagtggctgc tgccagtggc gataagtcgt gtcttaccgg gttggactca agacgatagt | 7860 |
| taccggataa ggcgcagcgg tcgggctgaa cggggggttc gtgcacacag cccagcttgg | 7920 |
| agcgaacgac ctacaccgaa ctgagatacc tacagcgtga gctatgagaa agcgccacgc | 7980 |
| ttcccgaagg gagaaaggcg gacaggtatc cggtaagcgg cagggtcgga acaggagagc | 8040 |
| gcacgaggga gcttccaggg ggaaacgcct ggtatcttta tagtcctgtc gggtttcgcc | 8100 |
| acctctgact tgagcgtcga tttttgtgat gctcgtcagg ggggcggagc ctatggaaaa | 8160 |
| acgccagcaa cgcggccttt ttacggttcc tggccttttg ctggcctttt gctcacatgt | 8220 |
| tctttcctgc gttatcccct gattctgtgg ataaccgtat taccgccttt gagtgagctg | 8280 |
| ataccgctcg ccgcagccga acgaccgagc gcagcgagtc agtgagcgag gaagcggaag | 8340 |
| agcgcccaat acgcaaaccg cctctccccg cgcgttggcc gattcattaa tgcagctggc | 8400 |
| acgacaggtt cccgactgga aaagcgggca gtgagcgcaa cgcaattaat gtgagttagc | 8460 |
| tcactcatta ggcaccccag gctttacact ttatgcttcc ggctcgtatg ttgtgtggaa | 8520 |
| ttgtgagcgg ataacaattt cacacaggaa acagctatga ccatgattac gccaagctcg | 8580 |
| aaattaaccc tcactaaagg gaacaaaagc tggagctcca ccgcggtggc ggcctcgagg | 8640 |
| tcgagatccg gtcgaccagc aaccatagtc ccgcccctaa ctccgcccat cccgccccta | 8700 |
| actccgccca gttccgccca ttctccgccc catggctgac taatttttt tatttatgca | 8760 |
| gaggccgagg ccgcctcggc ctctgagcta ttccagaagt agtgaggagg cttttttgga | 8820 |
| ggcctaggct tttgcaaaaa gcttcgacgg tatcgattgg ctcatgtcca acattaccgc | 8880 |
| catgttgaca ttgattattg actagttatt aatagtaatc aattacgggg tcattagttc | 8940 |
| atagcccata tatggagttc cgcgttacat aacttacggt aaatggcccg cctggctgac | 9000 |
| cgcccaacga cccccgccca ttgacgtcaa taatgacgta tgttcccata gtaacgccaa | 9060 |
| tagggacttt ccattgacgt caatgggtgg agtatttacg gtaaactgcc cacttggcag | 9120 |
| tacatcaagt gtatcatatg ccaagtacgc cccctattga cgtcaatgac ggtaaatggc | 9180 |
| ccgcctggca ttatgcccag tacatgacct tatgggactt tcctacttgg cagtacatct | 9240 |
| acgtattagt catcgctatt accatggtga tgcggttttg gcagtacatc aatgggcgtg | 9300 |

| gatagcggtt tgactcacgg ggatttccaa gtctccaccc cattgacgtc aatgggagtt | 9360 |
| tgttttggca ccaaaatcaa cgggactttc caaaatgtcg taacaactcc gccccattga | 9420 |
| cgcaaatggg cggtaggcgt gtacggaatt cggagtggcg agccctcaga tcctgcatat | 9480 |
| aagcagctgc tttttgcctg tactgggtct ctctg | 9515 |

<210> SEQ ID NO 13
<211> LENGTH: 8732
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 13

| gttagaccag atctgagcct gggagctctc tggctaacta gggaacccac tgcttaagcc | 60 |
| tcaataaagc ttgccttgag tgcttcaagt agtgtgtgcc cgtctgttgt gtgactctgg | 120 |
| taactagaga tccctcagac ccttttagtc agtgtggaaa atctctagca gtggcgcccg | 180 |
| aacagggact tgaaagcgaa agggaaacca gaggagctct ctcgacgcag gactcggctt | 240 |
| gctgaagcgc gcacggcaag aggcgagggg cggcgactgg tgagtacgcc aaaaattttg | 300 |
| actagcggag gctagaagga gagagatggg tgcgagagcg tcagtattaa gcggggagaa | 360 |
| attagatcga tgggaaaaaa ttcggttaag gccagggggaa agaaaaaat ataaattaaa | 420 |
| acatatagta tgggcaagca gggagctaga acgattcgca gttaatcctg gcctgttaga | 480 |
| aacatcagaa ggctgtagac aaatactggg acagctacaa ccatcccttc agacaggatc | 540 |
| agaagaactt agatcattat ataatacagt agcaaccctc tattgtgtgc atcaaaggat | 600 |
| agagataaaa gacaccaagg aagctttaga caagatagag gaagagcaaa acaaaagtaa | 660 |
| gaaaaagca cagcaagcag cagctgacac aggacacagc aatcaggtca gccaaaatta | 720 |
| ccctatagtg cagaacatcc aggggcaaat ggtacatcag gccatatcac ctagaacttt | 780 |
| aaatgcatgg gtaaaagtag tagaagagaa ggctttcagc ccagaagtga tacccatgtt | 840 |
| ttcagcatta tcagaaggag ccaccccaca agatttaaac accatgctaa acacagtggg | 900 |
| gggacatcaa gcagccatgc aaatgttaaa agagaccatc aatgaggaag ctgcaggcaa | 960 |
| agagaagagt ggtgcagaga gaaaaaagag cagtgggaat aggagctttg ttccttgggt | 1020 |
| tcttgggagc agcaggaagc actatgggcg cagcgtcaat gacgctgacg gtacaggcca | 1080 |
| gacaattatt gtctggtata gtgcagcagc agaacaattt gctgagggct attgaggcgc | 1140 |
| aacagcatct gttgcaactc acagtctggg gcatcaagca gctccaggca agaatcctgg | 1200 |
| ctgtggaaag atacctaaag gatcaacagc tcctggggat ttggggttgc tctggaaaac | 1260 |
| tcatttgcac cactgctgtg ccttggatct acaaatggca gtattcatcc acaattttaa | 1320 |
| aagaaaaggg gggattgggg ggtacagtgc aggggaaaga atagtagaca taatagcaac | 1380 |
| agacatacaa actaaagaat acaaaaaca aattacaaaa attcaaaatt ttcgggttta | 1440 |
| ttacagggac agcagagatc cagtttgggg atcaattgca tgaagaatct gcttagggtt | 1500 |
| aggcgttttg cgctgcttcg cgaggatctg cgatcgctcc ggtgcccgtc agtgggcaga | 1560 |
| gcgcacatcg cccacagtcc ccgagaagtt ggggggaggg gtcggcaatt gaaccggtgc | 1620 |
| ctagagaagg tggcgcgggg taaactggga aagtgatgtc gtgtactggc tccgcctttt | 1680 |
| tcccgagggt gggggagaac cgtatataag tgcagtagtc gccgtgaacg ttctttttcg | 1740 |
| caacgggttt gccgccagaa cacagctgaa gcttcgaggg gctcgcatct ctccttcacg | 1800 |

-continued

```
cgcccgccgc cctacctgag gccgccatcc acgccggttg agtcgcgttc tgccgcctcc    1860
cgcctgtggt gcctcctgaa ctgcgtccgc cgtctaggta agtttaaagc tcaggtcgag    1920
accgggcctt tgtccggcgc tcccttggag cctacctaga ctcagccggc tctccacgct    1980
ttgcctgacc ctgcttgctc aactctacgt ctttgtttcg ttttctgttc tgcgccgtta    2040
cagatccaag ctgtgaccgg cgcctacggc tagcgccgcc accatgctgc tgctggtgac    2100
cagcctgctg ctgtgcgagc tgccccaccc cgcctttctg ctgatccccg acatccagat    2160
gacccagacc acctccagcc tgagcgccag cctgggcgac cgggtgacca tcagctgccg    2220
ggccagccag gacatcagca agtacctgaa ctggtatcag cagaagcccg acggcaccgt    2280
caagctgctg atctaccaca ccagccggct gcacagcggc gtgcccagcc ggtttagcgg    2340
cagcggctcc ggcaccgact acagcctgac catctccaac ctggaacagg aagatatcgc    2400
cacctacttt tgccagcagg gcaacacact gccctacacc tttggcggcg aacaaagct    2460
ggaaatcacc ggcagcacct ccggcagcgg caagcctggc agcggcgagg gcagcaccaa    2520
gggcgaggtg aagctgcagg aaagcggccc tggcctggtg gcccccagcc agagcctgag    2580
cgtgacctgc accgtgagcg gcgtgagcct gcccgactac ggcgtgagct ggatccggca    2640
gccccccagg aagggcctgg aatggctggg cgtgatctgg ggcagcgaga ccacctacta    2700
caacagcgcc ctgaagagcc ggctgaccat catcaaggac aacagcaaga gccaggtgtt    2760
cctgaagatg aacagcctgc agaccgacga caccgccatc tactactgcg ccaagcacta    2820
ctactacggc ggcagctacg ccatggacta ctggggccag ggcaccagcg tgaccgtgag    2880
cagcgagagc aagtacggcc ctccctgccc cccttgccct gcccccgagt tcctgggcgg    2940
acccagcgtg ttcctgttcc cccccaagcc caaggacacc ctgatgatca gccggacccc    3000
cgaggtgacc tgcgtggtgg tggacgtgag ccaggaagat cccgaggtcc agttcaattg    3060
gtacgtggac ggcgtggagg tgcacaacgc caagaccaag cccagggaag agcagttcaa    3120
cagcacctac cgggtggtgt ccgtgctgac cgtgctgcac caggactggc tgaacggcaa    3180
agaatacaag tgcaaggtgt ccaacaaggg cctgcccagc agcatcgaga aaaccatcag    3240
caaggccaag ggccagcctc gggagcccca ggtgtacacc ctgcccccct tccaggaaga    3300
gatgaccaag aatcaggtgt ccctgacctg cctggtgaag ggcttctacc ccagcgacat    3360
cgccgtggag tgggagagca acggccagcc cgagaacaac tacaagacca cccccctgt    3420
gctggacagc gacggcagct tcttcctgta cagcaggctg accgtggaca agagccggtg    3480
gcaggaaggc aacgtctttta gctgcagcgt gatgcacgag gccctgcaca accactacac    3540
ccagaagagc ctgtccctga gcctgggcaa gatggccctg atcgtgctgg gcggcgtggc    3600
cgggctgctg ctgttcatcg gcctgggcat ctttttccgg gtgaagttca gccggtccgc    3660
cgacgcccct gcctaccagc agggccagaa ccagctgtac aacgagctga acctgggcag    3720
gcgggaggaa tacgacgtgc tggacaagcg agaggccgg gacctgagga tgggcggcaa    3780
gcccaggcgg aagaaccctc aggaaggcct gtataacgaa ctgcagaaag acaagatggc    3840
cgaggcctac agcgagatcg gcatgaaggg cgagcggcgg aggggcaagg gccacgacgg    3900
cctgtaccag ggcctgagca ccgccaccaa ggatacctac gacgccctgc acatgcaggc    3960
cctgccccc aggtgacccg ggctgcagga attcgatatc aagcttatcg ataatcaacc    4020
tctggattac aaaatttgtg aaagattgac tggtattctt aactatgttg ctccttttac    4080
gctatgtgga tacgctgctt taatgccttt gtatcatgct attgcttccc gtatggcttt    4140
```

```
cattttctcc tccttgtata aatcctggtt gctgtctctt tatgaggagt tgtggcccgt    4200
tgtcaggcaa cgtggcgtgg tgtgcactgt gtttgctgac gcaaccccca ctggttgggg    4260
cattgccacc acctgtcagc tcctttccgg gactttcgct ttccccctcc ctattgccac    4320
ggcggaactc atcgccgcct gccttgcccg ctgctggaca ggggctcggc tgttgggcac    4380
tgacaattcc gtggtgttgt cggggaaatc atcgtccttt ccttggctgc tcgcctgtgt    4440
tgccacctgg attctgcgcg ggacgtcctt ctgctacgtc ccttcggccc tcaatccagc    4500
ggaccttcct tcccgcggcc tgctgccggc tctgcggcct cttccgcgtc ttcgccttcg    4560
ccctcagacg agtcggatct cccttttgggc cgcctcccg catcgatacc gtcgactagc    4620
cgtacccttta agaccaatga cttacaaggc agctgtagat cttagccact tttaaaaga    4680
aaagggggga ctggaagggc taattcactc ccaagaaga caagatctgc ttttgcctg    4740
tactgggtct ctctggttag accagatctg agcctgggag ctctctggct aactagggaa    4800
cccactgctt aagcctcaat aaagcttgcc ttgagtgctt caagtagtgt gtgcccgtct    4860
gttgtgtgac tctggtaact agagatccct cagacccttt tagtcagtgt ggaaaatctc    4920
tagcagaatt cgatatcaag cttatcgata ccgtcgacct cgagggggg cccggtaccc    4980
aattcgccct atagtgagtc gtattacaat tcactggccg tcgttttaca acgtcgtgac    5040
tgggaaaacc ctggcgttac ccaacttaat cgccttgcag cacatccccc tttcgccagc    5100
tggcgtaata gcgaagaggc ccgcaccgat cgcccttccc aacagttgcg cagcctgaat    5160
ggcgaatgga aattgtaagc gttaatattt tgttaaaatt cgcgttaaat tttgttaaa    5220
tcagctcatt ttttaaccaa taggccgaaa tcggcaaaat cccttataaa tcaaaagaat    5280
agaccgagat agggttgagt gttgttccag tttggaacaa gagtccacta ttaaagaacg    5340
tggactccaa cgtcaaaggg cgaaaaaccg tctatcaggg cgatggccca ctacgtgaac    5400
catcacccta atcaagttttt tggggtcga ggtgccgtaa agcactaaat cggaaccta    5460
aagggagccc ccgatttaga gcttgacggg gaaagccggc gaacgtggcg agaaaggaag    5520
ggaagaaagc gaaaggagcg ggcgctaggg cgctggcaag tgtagcggtc acgctgcgcg    5580
taaccaccac acccgccgcg cttaatgcgc cgctacaggg cgcgtcaggt ggcacttttc    5640
ggggaaatgt gcgcggaacc cctatttgtt tatttttcta aatacattca aatatgtatc    5700
cgctcatgag acaataaccc tgataaatgc ttcaataata ttgaaaaagg aagagtatga    5760
gtattcaaca tttccgtgtc gcccttattc ccttttttgc ggcattttgc cttcctgttt    5820
ttgctcaccc agaaacgctg gtgaaagtaa aagatgctga agatcagttg ggtgcacgag    5880
tgggttacat cgaactggat ctcaacagcg gtaagatcct tgagagtttt cgccccgaag    5940
aacgttttcc aatgatgagc acttttaaag ttctgctatg tggcgcggta ttatcccgta    6000
ttgacgccgg gcaagagcaa ctcggtcgcc gcatacacta ttctcagaat gacttggttg    6060
agtactcacc agtcacagaa aagcatctta cggatggcat gacagtaaga gaattatgca    6120
gtgctgccat aaccatgagt gataacactg cggccaactt acttctgaca acgatcggag    6180
gaccgaagga gctaaccgct tttttgcaca acatggggga tcatgtaact cgccttgatc    6240
gttgggaacc ggagctgaat gaagccatac caaacgacga gcgtgacacc acgatgcctg    6300
tagcaatggc aacaacgttg cgcaaactat taactggcga actacttact ctagcttccc    6360
ggcaacaatt aatagactgg atggaggcgg ataaagttgc aggaccactt ctgcgctcgg    6420
cccttccggc tggctggttt attgctgata aatctggagc cggtgagcgt gggtctcgcg    6480
gtatcattgc agcactgggg ccagatggta agccctcccg tatcgtagtt atctacacga    6540
```

```
cggggagtca ggcaactatg gatgaacgaa atagacagat cgctgagata ggtgcctcac    6600
tgattaagca ttggtaactg tcagaccaag tttactcata tatactttag attgatttaa    6660
aacttcattt ttaatttaaa aggatctagg tgaagatcct ttttgataat ctcatgacca    6720
aaatccctta acgtgagttt tcgttccact gagcgtcaga ccccgtagaa aagatcaaag    6780
gatcttcttg agatcctttt tttctgcgcg taatctgctg cttgcaaaca aaaaaaccac    6840
cgctaccagc ggtggtttgt ttgccggatc aagagctacc aactcttttt ccgaaggtaa    6900
ctggcttcag cagagcgcag ataccaaata ctgttcttct agtgtagccg tagttaggcc    6960
accacttcaa gaactctgta gcaccgccta catacctcgc tctgctaatc ctgttaccag    7020
tggctgctgc cagtggcgat aagtcgtgtc ttaccgggtt ggactcaaga cgatagttac    7080
cggataaggc gcagcggtcg ggctgaacgg ggggttcgtg cacacagccc agcttggagc    7140
gaacgaccta caccgaactg agatacctac agcgtgagct atgagaaagc gccacgcttc    7200
ccgaagggag aaaggcggac aggtatccgg taagcggcag ggtcggaaca ggagagcgca    7260
cgagggagct ccaggggga acgcctggt atctttatag tcctgtcggg tttcgccacc    7320
tctgacttga gcgtcgattt ttgtgatgct cgtcagggg gcggagccta tggaaaaacg    7380
ccagcaacgc ggccttttta cggttcctgg ccttttgctg gccttttgct cacatgttct    7440
ttcctgcgtt atcccctgat tctgtggata accgtattac cgcctttgag tgagctgata    7500
ccgctcgccg cagccgaacg accgagcgca gcgagtcagt gagcgaggaa gcggaagagc    7560
gcccaatacg caaaccgcct ctccccgcgc gttggccgat tcattaatgc agctggcacg    7620
acaggtttcc cgactggaaa gcgggcagtg agcgcaacgc aattaatgtg agttagctca    7680
ctcattaggc accccaggct ttacacttta tgcttccggc tcgtatgttg tgtggaattg    7740
tgagcggata acaatttcac acaggaaaca gctatgacca tgattacgcc aagctcgaaa    7800
ttaaccctca ctaaagggaa caaaagctgg agctccaccg cggtggcggc ctcgaggtcg    7860
agatccggtc gaccagcaac catagtcccg cccctaactc cgcccatccc gcccctaact    7920
ccgcccagtt ccgcccattc tccgcccat ggctgactaa ttttttttat ttatgcagag    7980
gccgaggccg cctcggcctc tgagctattc cagaagtagt gaggaggctt ttttggaggc    8040
ctaggctttt gcaaaaagct tcgacggtat cgattggctc atgtccaaca ttaccgccat    8100
gttgacattg attattgact agttattaat agtaatcaat tacggggtca ttagttcata    8160
gcccatatat ggagttccgc gttacataac ttacggtaaa tggcccgcct ggctgaccgc    8220
ccaacgaccc ccgcccattg acgtcaataa tgacgtatgt tcccatagta acgccaatag    8280
ggactttcca ttgacgtcaa tgggtggagt atttacggta aactgcccac ttggcagtac    8340
atcaagtgta tcatatgcca agtacgcccc ctattgacgt caatgacggt aaatggcccg    8400
cctggcatta tgcccagtac atgaccttat gggactttcc tacttggcag tacatctacg    8460
tattagtcat cgctattacc atggtgatgc ggttttggca gtacatcaat gggcgtggat    8520
agcggtttga ctcacgggga tttccaagtc tccaccccat tgacgtcaat gggagtttgt    8580
tttggcacca aaatcaacgg gactttccaa aatgtcgtaa caactccgcc ccattgacgc    8640
aaatgggcgg taggcgtgta cggaattcgg agtggcgagc cctcagatcc tgcatataag    8700
cagctgcttt ttgcctgtac tgggtctctc tg                                  8732
```

<210> SEQ ID NO 14
<211> LENGTH: 10
<212> TYPE: PRT

<213> ORGANISM: Artificial Sequence
<220> FEATURE:
<223> OTHER INFORMATION: Description of Artificial Sequence: Synthetic
      peptide

<400> SEQUENCE: 14

Gly Gly Gly Ser Ser Gly Gly Gly Ser Gly
1               5                   10

<210> SEQ ID NO 15
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Glu Ser Lys Tyr Gly Pro Pro Cys Pro Pro Cys Pro
1               5                   10

<210> SEQ ID NO 16
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Glu Ser Lys Tyr Gly Pro Pro Cys Pro Pro Cys Pro Gly Gly Gly Ser
1               5                   10                  15

Ser Gly Gly Gly Ser Gly
            20

<210> SEQ ID NO 17
<211> LENGTH: 39
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Ile Glu Val Met Tyr Pro Pro Pro Tyr Leu Asp Asn Glu Lys Ser Asn
1               5                   10                  15

Gly Thr Ile Ile His Val Lys Gly Lys His Leu Cys Pro Ser Pro Leu
            20                  25                  30

Phe Pro Gly Pro Ser Lys Pro
        35

<210> SEQ ID NO 18
<211> LENGTH: 48
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Ala Lys Pro Thr Thr Thr Pro Ala Pro Arg Pro Pro Thr Pro Ala Pro
1               5                   10                  15

Thr Ile Ala Ser Gln Pro Leu Ser Leu Arg Pro Glu Ala Cys Arg Pro
            20                  25                  30

Ala Ala Gly Gly Ala Val His Thr Arg Gly Leu Asp Phe Ala Cys Asp 35                  40                  45

<210> SEQ ID NO 19
<211> LENGTH: 45
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 19

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
            35                  40                  45

<210> SEQ ID NO 20
<211> LENGTH: 129
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 20

Glu Ser Lys Tyr Gly Pro Pro Cys Pro Pro Cys Pro Gly Gly Gly Ser
1               5                   10                  15

Ser Gly Gly Gly Ser Gly Gly Gln Pro Arg Glu Pro Gln Val Tyr Thr
            20                  25                  30

Leu Pro Pro Ser Gln Glu Glu Met Thr Lys Asn Gln Val Ser Leu Thr
            35                  40                  45

Cys Leu Val Lys Gly Phe Tyr Pro Ser Asp Ile Ala Val Glu Trp Glu
        50                  55                  60

Ser Asn Gly Gln Pro Glu Asn Asn Tyr Lys Thr Thr Pro Pro Val Leu
65                  70                  75                  80

Asp Ser Asp Gly Ser Phe Phe Leu Tyr Ser Arg Leu Thr Val Asp Lys
                85                  90                  95

Ser Arg Trp Gln Glu Gly Asn Val Phe Ser Cys Ser Val Met His Glu
            100                 105                 110

Ala Leu His Asn His Tyr Thr Gln Lys Ser Leu Ser Leu Ser Leu Gly
            115                 120                 125

Lys

<210> SEQ ID NO 21
<211> LENGTH: 21
<212> TYPE: PRT
<213> ORGANISM: Homo sapiens

<400> SEQUENCE: 21

Leu Cys Tyr Leu Leu Asp Gly Ile Leu Phe Ile Tyr Gly Val Ile Leu
1               5                   10                  15

Thr Ala Leu Phe Leu
            20

<210> SEQ ID NO 22
<211> LENGTH: 27
<212> TYPE: PRT
<213> ORGANISM: Homo sapiens -continued

```
<400> SEQUENCE: 22

Phe Trp Val Leu Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 23
<211> LENGTH: 21
<212> TYPE: PRT
<213> ORGANISM: Homo sapiens

<400> SEQUENCE: 23

Ile Tyr Ile Trp Ala Pro Leu Ala Gly Thr Cys Gly Val Leu Leu Leu
1               5                   10                  15

Ser Leu Val Ile Thr
            20

<210> SEQ ID NO 24
<211> LENGTH: 23
<212> TYPE: PRT
<213> ORGANISM: Homo sapiens

<400> SEQUENCE: 24

Ile Tyr Ile Trp Ala Pro Leu Ala Gly Thr Cys Gly Val Leu Leu Leu
1               5                   10                  15

Ser Leu Val Ile Thr Leu Tyr
            20

<210> SEQ ID NO 25
<211> LENGTH: 24
<212> TYPE: PRT
<213> ORGANISM: Homo sapiens

<400> SEQUENCE: 25

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 26
<211> LENGTH: 27
<212> TYPE: PRT
<213> ORGANISM: Homo sapiens

<400> SEQUENCE: 26

Ile Ile Ser Phe Phe Leu Ala Leu Thr Ser Thr Ala Leu Leu Phe Leu
1               5                   10                  15

Leu Phe Phe Leu Thr Leu Arg Phe Ser Val Val
            20                  25

<210> SEQ ID NO 27
<211> LENGTH: 41
<212> TYPE: PRT
<213> ORGANISM: Homo sapiens

<400> SEQUENCE: 27

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
```

```
                35                  40

<210> SEQ ID NO 28
<211> LENGTH: 41
<212> TYPE: PRT
<213> ORGANISM: Homo sapiens

<400> SEQUENCE: 28

Arg Ser Lys Arg Ser Arg Gly Gly His Ser Asp Tyr Met Asn Met Thr
1               5                   10                  15

Pro Arg Arg Pro Gly Pro Thr Arg Lys His Tyr Gln Pro Tyr Ala Pro
                20                  25                  30

Pro Arg Asp Phe Ala Ala Tyr Arg Ser
                35                  40

<210> SEQ ID NO 29
<211> LENGTH: 42
<212> TYPE: PRT
<213> ORGANISM: Homo sapiens

<400> SEQUENCE: 29

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
                20                  25                  30

Pro Glu Glu Glu Glu Gly Gly Cys Glu Leu
                35                  40

<210> SEQ ID NO 30
<211> LENGTH: 42
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

Ala Leu Tyr Leu Leu Arg Arg Asp Gln Arg Leu Pro Pro Asp Ala His
1               5                   10                  15

Lys Pro Pro Gly Gly Gly Ser Phe Arg Thr Pro Ile Gln Glu Glu Gln
                20                  25                  30

Ala Asp Ala His Ser Thr Leu Ala Lys Ile
                35                  40

<210> SEQ ID NO 31
<211> LENGTH: 362
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Met Leu Leu Leu Val Thr Ser Leu Leu Cys Glu Leu Pro His Pro
1               5                   10                  15

Ala Phe Leu Leu Ile Pro Gly Pro Val Pro Pro Ser Thr Ala Leu Arg
                20                  25                  30

Tyr Leu Ile Glu Glu Leu Val Asn Ile Thr Gln Asn Gln Lys Ala Pro
                35                  40                  45

Leu Cys Asn Gly Ser Met Val Trp Ser Ile Asn Leu Thr Ala Gly Met
        50                  55                  60
```

Tyr Cys Ala Ala Leu Glu Ser Leu Ile Asn Val Ser Gly Cys Ser Ala
65                  70                  75                  80

Ile Glu Lys Thr Gln Arg Met Leu Ser Gly Phe Cys Pro His Lys Val
                85                  90                  95

Ser Ala Gly Gln Phe Ser Ser Leu His Val Arg Asp Thr Lys Ile Glu
            100                 105                 110

Val Ala Gln Phe Val Lys Asp Leu Leu Leu His Leu Lys Lys Leu Phe
            115                 120                 125

Arg Glu Gly Arg Phe Asn Ala Lys Pro Thr Thr Pro Ala Pro Arg
130                 135                 140

Pro Pro Thr Pro Ala Pro Thr Ile Ala Ser Gln Pro Leu Ser Leu Arg
145                 150                 155                 160

Pro Glu Ala Cys Arg Pro Ala Ala Gly Gly Ala Val His Thr Arg Gly
                165                 170                 175

Leu Asp Phe Ala Cys Asp Ile Tyr Ile Trp Ala Pro Leu Ala Gly Thr
            180                 185                 190

Cys Gly Val Leu Leu Leu Ser Leu Val Ile Thr Leu Tyr Lys Arg Gly
        195                 200                 205

Arg Lys Lys Leu Leu Tyr Ile Phe Lys Gln Pro Phe Met Arg Pro Val
210                 215                 220

Gln Thr Thr Gln Glu Glu Asp Gly Cys Ser Cys Arg Phe Pro Glu Glu
225                 230                 235                 240

Glu Glu Gly Gly Cys Glu Leu Gly Gly Arg Val Lys Phe Ser Arg
                245                 250                 255

Ser Ala Asp Ala Pro Ala Tyr Gln Gln Gly Gln Asn Gln Leu Tyr Asn
            260                 265                 270

Glu Leu Asn Leu Gly Arg Arg Glu Glu Tyr Asp Val Leu Asp Lys Arg
        275                 280                 285

Arg Gly Arg Asp Pro Glu Met Gly Gly Lys Pro Arg Arg Lys Asn Pro
            290                 295                 300

Gln Glu Gly Leu Tyr Asn Glu Leu Gln Lys Asp Lys Met Ala Glu Ala
305                 310                 315                 320

Tyr Ser Glu Ile Gly Met Lys Gly Glu Arg Arg Arg Gly Lys Gly His
                325                 330                 335

Asp Gly Leu Tyr Gln Gly Leu Ser Thr Ala Thr Lys Asp Thr Tyr Asp
            340                 345                 350

Ala Leu His Met Gln Ala Leu Pro Pro Arg
            355                 360

<210> SEQ ID NO 32
<211> LENGTH: 410
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Met Leu Leu Leu Val Thr Ser Leu Leu Cys Glu Leu Pro His Pro
1               5                   10                  15

Ala Phe Leu Leu Ile Pro Gly Pro Val Pro Ser Thr Ala Leu Arg
                20                  25                  30

Tyr Leu Ile Glu Glu Leu Val Asn Ile Thr Gln Asn Gln Lys Ala Pro
            35                  40                  45

Leu Cys Asn Gly Ser Met Val Trp Ser Ile Asn Leu Thr Ala Gly Met
50                  55                  60

Tyr Cys Ala Ala Leu Glu Ser Leu Ile Asn Val Ser Gly Cys Ser Ala
 65                  70                  75                  80

Ile Glu Lys Thr Gln Arg Met Leu Ser Gly Phe Cys Pro His Lys Val
                 85                  90                  95

Ser Ala Gly Gln Phe Ser Ser Leu His Val Arg Asp Thr Lys Ile Glu
            100                 105                 110

Val Ala Gln Phe Val Lys Asp Leu Leu Leu His Leu Lys Lys Leu Phe
        115                 120                 125

Arg Glu Gly Arg Phe Asn Ala Lys Pro Thr Thr Pro Ala Pro Arg
130                 135                 140

Pro Pro Thr Pro Ala Pro Thr Ile Ala Ser Gln Pro Leu Ser Leu Arg
145                 150                 155                 160

Pro Glu Ala Cys Arg Pro Ala Ala Gly Gly Ala Val His Thr Arg Gly
                165                 170                 175

Leu Asp Phe Ala Cys Asp Phe Trp Val Leu Val Val Gly Gly Val
            180                 185                 190

Leu Ala Cys Tyr Ser Leu Leu Val Thr Val Ala Phe Ile Ile Phe Trp
        195                 200                 205

Val Arg Ser Lys Arg Ser Arg Gly Gly His Ser Asp Tyr Met Asn Met
210                 215                 220

Thr Pro Arg Arg Pro Gly Pro Thr Arg Lys His Tyr Gln Pro Tyr Ala
225                 230                 235                 240

Pro Pro Arg Asp Phe Ala Ala Tyr Arg Ser Gly Gly Lys Arg Gly
                245                 250                 255

Arg Lys Lys Leu Leu Tyr Ile Phe Lys Gln Pro Phe Met Arg Pro Val
                260                 265                 270

Gln Thr Thr Gln Glu Glu Asp Gly Cys Ser Cys Arg Phe Pro Glu Glu
                275                 280                 285

Glu Glu Gly Gly Cys Glu Leu Gly Gly Gly Arg Val Lys Phe Ser Arg
        290                 295                 300

Ser Ala Asp Ala Pro Ala Tyr Gln Gln Gly Gln Asn Gln Leu Tyr Asn
305                 310                 315                 320

Glu Leu Asn Leu Gly Arg Arg Glu Glu Tyr Asp Val Leu Asp Lys Arg
                325                 330                 335

Arg Gly Arg Asp Pro Glu Met Gly Gly Lys Pro Arg Arg Lys Asn Pro
            340                 345                 350

Gln Glu Gly Leu Tyr Asn Glu Leu Gln Lys Asp Lys Met Ala Glu Ala
        355                 360                 365

Tyr Ser Glu Ile Gly Met Lys Gly Glu Arg Arg Arg Gly Lys Gly His
370                 375                 380

Asp Gly Leu Tyr Gln Gly Leu Ser Thr Ala Thr Lys Asp Thr Tyr Asp
385                 390                 395                 400

Ala Leu His Met Gln Ala Leu Pro Pro Arg
            405                 410

<210> SEQ ID NO 33
<211> LENGTH: 442
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Met Leu Leu Leu Val Thr Ser Leu Leu Leu Cys Glu Leu Pro His Pro

-continued

```
1               5               10              15
Ala Phe Leu Leu Ile Pro Gly Pro Val Pro Ser Thr Ala Leu Arg
                20              25              30
Tyr Leu Ile Glu Glu Leu Val Asn Ile Thr Gln Asn Gln Lys Ala Pro
                35              40              45
Leu Cys Asn Gly Ser Met Val Trp Ser Ile Asn Leu Thr Ala Gly Met
 50              55              60
Tyr Cys Ala Ala Leu Glu Ser Leu Ile Asn Val Ser Gly Cys Ser Ala
 65              70              75              80
Ile Glu Lys Thr Gln Arg Met Leu Ser Gly Phe Cys Pro His Lys Val
                85              90              95
Ser Ala Gly Gln Phe Ser Ser Leu His Val Arg Asp Thr Lys Ile Glu
                100             105             110
Val Ala Gln Phe Val Lys Asp Leu Leu Leu His Leu Lys Lys Leu Phe
                115             120             125
Arg Glu Gly Arg Phe Asn Glu Ser Lys Tyr Gly Pro Pro Cys Pro Pro
                130             135             140
Cys Pro Gly Gly Gly Ser Ser Gly Gly Ser Gly Gly Gln Pro Arg
145             150             155             160
Glu Pro Gln Val Tyr Thr Leu Pro Pro Ser Gln Glu Glu Met Thr Lys
                165             170             175
Asn Gln Val Ser Leu Thr Cys Leu Val Lys Gly Phe Tyr Pro Ser Asp
                180             185             190
Ile Ala Val Glu Trp Glu Ser Asn Gly Gln Pro Glu Asn Asn Tyr Lys
                195             200             205
Thr Thr Pro Pro Val Leu Asp Ser Asp Gly Ser Phe Phe Leu Tyr Ser
                210             215             220
Arg Leu Thr Val Asp Lys Ser Arg Trp Gln Glu Gly Asn Val Phe Ser
225             230             235             240
Cys Ser Val Met His Glu Ala Leu His Asn His Tyr Thr Gln Lys Ser
                245             250             255
Leu Ser Leu Ser Leu Gly Lys Met Ala Leu Ile Val Leu Gly Gly Val
                260             265             270
Ala Gly Leu Leu Leu Phe Ile Gly Leu Gly Ile Phe Phe Lys Arg Gly
                275             280             285
Arg Lys Lys Leu Leu Tyr Ile Phe Lys Gln Pro Phe Met Arg Pro Val
                290             295             300
Gln Thr Thr Gln Glu Glu Asp Gly Cys Ser Cys Arg Phe Pro Glu Glu
305             310             315             320
Glu Glu Gly Gly Cys Glu Leu Gly Gly Gly Arg Val Lys Phe Ser Arg
                325             330             335
Ser Ala Asp Ala Pro Ala Tyr Gln Gln Gly Gln Asn Gln Leu Tyr Asn
                340             345             350
Glu Leu Asn Leu Gly Arg Arg Glu Glu Tyr Asp Val Leu Asp Lys Arg
                355             360             365
Arg Gly Arg Asp Pro Glu Met Gly Gly Lys Pro Arg Arg Lys Asn Pro
                370             375             380
Gln Glu Gly Leu Tyr Asn Glu Leu Gln Lys Asp Lys Met Ala Glu Ala
385             390             395             400
Tyr Ser Glu Ile Gly Met Lys Gly Glu Arg Arg Arg Gly Lys Gly His
                405             410             415
Asp Gly Leu Tyr Gln Gly Leu Ser Thr Ala Thr Lys Asp Thr Tyr Asp
                420             425             430
```

Ala Leu His Met Gln Ala Leu Pro Pro Arg
        435                 440

<210> SEQ ID NO 34
<211> LENGTH: 541
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

Met Leu Leu Leu Val Thr Ser Leu Leu Leu Cys Glu Leu Pro His Pro
1               5                   10                  15

Ala Phe Leu Leu Ile Pro Gly Pro Val Pro Ser Thr Ala Leu Arg
            20                  25                  30

Tyr Leu Ile Glu Glu Leu Val Asn Ile Thr Gln Asn Gln Lys Ala Pro
            35                  40                  45

Leu Cys Asn Gly Ser Met Val Trp Ser Ile Asn Leu Thr Ala Gly Met
50                  55                      60

Tyr Cys Ala Ala Leu Glu Ser Leu Ile Asn Val Ser Gly Cys Ser Ala
65                  70                  75                  80

Ile Glu Lys Thr Gln Arg Met Leu Ser Gly Phe Cys Pro His Lys Val
                85                  90                  95

Ser Ala Gly Gln Phe Ser Ser Leu His Val Arg Asp Thr Lys Ile Glu
            100                 105                 110

Val Ala Gln Phe Val Lys Asp Leu Leu Leu His Leu Lys Lys Leu Phe
        115                 120                 125

Arg Glu Gly Arg Phe Asn Glu Ser Lys Tyr Gly Pro Pro Cys Pro Pro
130                 135                 140

Cys Pro Ala Pro Glu Phe Glu Gly Gly Pro Ser Val Phe Leu Phe Pro
145                 150                 155                 160

Pro Lys Pro Lys Asp Thr Leu Met Ile Ser Arg Thr Pro Glu Val Thr
                165                 170                 175

Cys Val Val Val Asp Val Ser Gln Glu Asp Pro Glu Val Gln Phe Asn
            180                 185                 190

Trp Tyr Val Asp Gly Val Glu Val His Asn Ala Lys Thr Lys Pro Arg
        195                 200                 205

Glu Glu Gln Phe Gln Ser Thr Tyr Arg Val Val Ser Val Leu Thr Val
    210                 215                 220

Leu His Gln Asp Trp Leu Asn Gly Lys Glu Tyr Lys Cys Lys Val Ser
225                 230                 235                 240

Asn Lys Gly Leu Pro Ser Ser Ile Glu Lys Thr Ile Ser Lys Ala Lys
                245                 250                 255

Gly Gln Pro Arg Glu Pro Gln Val Tyr Thr Leu Pro Pro Ser Gln Glu
            260                 265                 270

Glu Met Thr Lys Asn Gln Val Ser Leu Thr Cys Leu Val Lys Gly Phe
        275                 280                 285

Tyr Pro Ser Asp Ile Ala Val Glu Trp Glu Ser Asn Gly Gln Pro Glu
    290                 295                 300

Asn Asn Tyr Lys Thr Thr Pro Pro Val Leu Asp Ser Asp Gly Ser Phe
305                 310                 315                 320

Phe Leu Tyr Ser Arg Leu Thr Val Asp Lys Ser Arg Trp Gln Glu Gly
                325                 330                 335

Asn Val Phe Ser Cys Ser Val Met His Glu Ala Leu His Asn His Tyr

```
              340                 345                 350
Thr Gln Lys Ser Leu Ser Leu Ser Leu Gly Lys Ile Tyr Ile Trp Ala
            355                 360                 365

Pro Leu Ala Gly Thr Cys Gly Val Leu Leu Ser Leu Val Ile Thr
        370                 375                 380

Lys Arg Gly Arg Lys Lys Leu Leu Tyr Ile Phe Lys Gln Pro Phe Met
385                 390                 395                 400

Arg Pro Val Gln Thr Thr Gln Glu Glu Asp Gly Cys Ser Cys Arg Phe
                405                 410                 415

Pro Glu Glu Glu Glu Gly Gly Cys Glu Leu Gly Gly Gly Arg Val Lys
                420                 425                 430

Phe Ser Arg Ser Ala Asp Ala Pro Ala Tyr Gln Gln Gly Gln Asn Gln
                435                 440                 445

Leu Tyr Asn Glu Leu Asn Leu Gly Arg Arg Glu Glu Tyr Asp Val Leu
    450                 455                 460

Asp Lys Arg Arg Gly Arg Asp Pro Glu Met Gly Gly Lys Pro Arg Arg
465                 470                 475                 480

Lys Asn Pro Gln Glu Gly Leu Tyr Asn Glu Leu Gln Lys Asp Lys Met
                485                 490                 495

Ala Glu Ala Tyr Ser Glu Ile Gly Met Lys Gly Glu Arg Arg Arg Gly
                500                 505                 510

Lys Gly His Asp Gly Leu Tyr Gln Gly Leu Ser Thr Ala Thr Lys Asp
                515                 520                 525

Thr Tyr Asp Ala Leu His Met Gln Ala Leu Pro Pro Arg
    530                 535                 540

<210> SEQ ID NO 35
<211> LENGTH: 373
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

Met Leu Leu Leu Val Thr Ser Leu Leu Cys Glu Leu Pro His Pro
1               5                   10                  15

Ala Phe Leu Leu Ile Pro Gly Pro Val Pro Ser Thr Ala Leu Arg
            20                  25                  30

Tyr Leu Ile Glu Glu Leu Val Asn Ile Thr Gln Asn Gln Lys Ala Pro
        35                  40                  45

Leu Cys Asn Gly Ser Met Val Trp Ser Ile Asn Leu Thr Ala Gly Met
    50                  55                  60

Tyr Cys Ala Ala Leu Glu Ser Leu Ile Asn Val Ser Gly Cys Ser Ala
65                  70                  75                  80

Ile Glu Lys Thr Gln Arg Met Leu Ser Gly Phe Cys Pro His Lys Val
                85                  90                  95

Ser Ala Gly Gln Phe Ser Ser Leu His Val Arg Asp Thr Lys Ile Glu
            100                 105                 110

Val Ala Gln Phe Val Lys Asp Leu Leu Leu His Leu Lys Lys Leu Phe
        115                 120                 125

Arg Glu Gly Arg Phe Asn Gly Gly Gly Ser Gly Gly Gly Ser Gly
    130                 135                 140

Met Phe Trp Val Leu Val Val Val Gly Gly Val Leu Ala Cys Tyr Ser
145                 150                 155                 160
```

```
Leu Leu Val Thr Val Ala Phe Ile Ile Phe Trp Val Arg Ser Lys Arg
            165                 170                 175

Ser Arg Gly Gly His Ser Asp Tyr Met Asn Met Thr Pro Arg Arg Pro
        180                 185                 190

Gly Pro Thr Arg Lys His Tyr Gln Pro Tyr Ala Pro Pro Arg Asp Phe
    195                 200                 205

Ala Ala Tyr Arg Ser Gly Gly Lys Arg Gly Arg Lys Lys Leu Leu
210                 215                 220

Tyr Ile Phe Lys Gln Pro Phe Met Arg Pro Val Gln Thr Thr Gln Glu
225                 230                 235                 240

Glu Asp Gly Cys Ser Cys Arg Phe Pro Glu Glu Glu Glu Gly Gly Cys
                245                 250                 255

Glu Leu Gly Gly Gly Arg Val Lys Phe Ser Arg Ser Ala Asp Ala Pro
            260                 265                 270

Ala Tyr Gln Gln Gly Gln Asn Gln Leu Tyr Asn Glu Leu Asn Leu Gly
        275                 280                 285

Arg Arg Glu Glu Tyr Asp Val Leu Asp Lys Arg Arg Gly Arg Asp Pro
    290                 295                 300

Glu Met Gly Gly Lys Pro Arg Arg Lys Asn Pro Gln Glu Gly Leu Tyr
305                 310                 315                 320

Asn Glu Leu Gln Lys Asp Lys Met Ala Glu Ala Tyr Ser Glu Ile Gly
                325                 330                 335

Met Lys Gly Glu Arg Arg Arg Gly Lys Gly His Asp Gly Leu Tyr Gln
            340                 345                 350

Gly Leu Ser Thr Ala Thr Lys Asp Thr Tyr Asp Ala Leu His Met Gln
        355                 360                 365

Ala Leu Pro Pro Arg
    370

<210> SEQ ID NO 36
<211> LENGTH: 385
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 36

Met Leu Leu Leu Val Thr Ser Leu Leu Cys Glu Leu Pro His Pro
1               5                   10                  15

Ala Phe Leu Leu Ile Pro Gly Pro Val Pro Ser Thr Ala Leu Arg
                20                  25                  30

Tyr Leu Ile Glu Glu Leu Val Asn Ile Thr Gln Asn Gln Lys Ala Pro
            35                  40                  45

Leu Cys Asn Gly Ser Met Val Trp Ser Ile Asn Leu Thr Ala Gly Met
    50                  55                  60

Tyr Cys Ala Ala Leu Glu Ser Leu Ile Asn Val Ser Gly Cys Ser Ala
65                  70                  75                  80

Ile Glu Lys Thr Gln Arg Met Leu Ser Gly Phe Cys Pro His Lys Val
                85                  90                  95

Ser Ala Gly Gln Phe Ser Ser Leu His Val Arg Asp Thr Lys Ile Glu
            100                 105                 110

Val Ala Gln Phe Val Lys Asp Leu Leu Leu His Leu Lys Lys Leu Phe
        115                 120                 125

Arg Glu Gly Arg Phe Asn Glu Ser Lys Tyr Gly Pro Pro Cys Pro Pro
    130                 135                 140
```

Cys Pro Gly Gly Gly Ser Ser Gly Gly Gly Ser Gly Met Phe Trp Val
145                 150                 155                 160

Leu Val Val Val Gly Val Leu Ala Cys Tyr Ser Leu Leu Val Thr
                165                 170                 175

Val Ala Phe Ile Ile Phe Trp Val Arg Ser Lys Arg Ser Arg Gly Gly
            180                 185                 190

His Ser Asp Tyr Met Asn Met Thr Pro Arg Arg Pro Gly Pro Thr Arg
            195                 200                 205

Lys His Tyr Gln Pro Tyr Ala Pro Pro Arg Asp Phe Ala Ala Tyr Arg
        210                 215                 220

Ser Gly Gly Gly Lys Arg Gly Arg Lys Lys Leu Leu Tyr Ile Phe Lys
225                 230                 235                 240

Gln Pro Phe Met Arg Pro Val Gln Thr Thr Gln Glu Glu Asp Gly Cys
                245                 250                 255

Ser Cys Arg Phe Pro Glu Glu Glu Glu Gly Gly Cys Glu Leu Gly Gly
                260                 265                 270

Gly Arg Val Lys Phe Ser Arg Ser Ala Asp Ala Pro Ala Tyr Gln Gln
            275                 280                 285

Gly Gln Asn Gln Leu Tyr Asn Glu Leu Asn Leu Gly Arg Arg Glu Glu
        290                 295                 300

Tyr Asp Val Leu Asp Lys Arg Arg Gly Arg Asp Pro Glu Met Gly Gly
305                 310                 315                 320

Lys Pro Arg Arg Lys Asn Pro Gln Glu Gly Leu Tyr Asn Glu Leu Gln
                325                 330                 335

Lys Asp Lys Met Ala Glu Ala Tyr Ser Glu Ile Gly Met Lys Gly Glu
                340                 345                 350

Arg Arg Arg Gly Lys Gly His Asp Gly Leu Tyr Gln Gly Leu Ser Thr
            355                 360                 365

Ala Thr Lys Asp Thr Tyr Asp Ala Leu His Met Gln Ala Leu Pro Pro
        370                 375                 380

Arg
385

<210> SEQ ID NO 37
<211> LENGTH: 492
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

Met Leu Leu Leu Val Thr Ser Leu Leu Leu Cys Glu Leu Pro His Pro
1               5                   10                  15

Ala Phe Leu Leu Ile Pro Gly Pro Val Pro Pro Ser Thr Ala Leu Arg
            20                  25                  30

Tyr Leu Ile Glu Glu Leu Val Asn Ile Thr Gln Asn Gln Lys Ala Pro
        35                  40                  45

Leu Cys Asn Gly Ser Met Val Trp Ser Ile Asn Leu Thr Ala Gly Met
    50                  55                  60

Tyr Cys Ala Ala Leu Glu Ser Leu Ile Asn Val Ser Gly Cys Ser Ala
65                  70                  75                  80

Ile Glu Lys Thr Gln Arg Met Leu Ser Gly Phe Cys Pro His Lys Val
                85                  90                  95

Ser Ala Gly Gln Phe Ser Ser Leu His Val Arg Asp Thr Lys Ile Glu

```
                    100                 105                 110
Val Ala Gln Phe Val Lys Asp Leu Leu His Leu Lys Lys Leu Phe
            115                 120                 125

Arg Glu Gly Arg Phe Asn Glu Ser Lys Tyr Gly Pro Pro Cys Pro Pro
130                 135                 140

Cys Pro Gly Gly Gly Ser Ser Gly Gly Ser Gly Gly Gln Pro Arg
145                 150                 155                 160

Glu Pro Gln Val Tyr Thr Leu Pro Pro Ser Gln Glu Glu Met Thr Lys
                165                 170                 175

Asn Gln Val Ser Leu Thr Cys Leu Val Lys Gly Phe Tyr Pro Ser Asp
            180                 185                 190

Ile Ala Val Glu Trp Glu Ser Asn Gly Gln Pro Glu Asn Asn Tyr Lys
            195                 200                 205

Thr Thr Pro Pro Val Leu Asp Ser Asp Gly Ser Phe Phe Leu Tyr Ser
            210                 215                 220

Arg Leu Thr Val Asp Lys Ser Arg Trp Gln Glu Gly Asn Val Phe Ser
225                 230                 235                 240

Cys Ser Val Met His Glu Ala Leu His Asn His Tyr Thr Gln Lys Ser
                245                 250                 255

Leu Ser Leu Ser Leu Gly Lys Met Phe Trp Val Leu Val Val Val Gly
            260                 265                 270

Gly Val Leu Ala Cys Tyr Ser Leu Leu Val Thr Val Ala Phe Ile Ile
            275                 280                 285

Phe Trp Val Arg Ser Lys Arg Ser Arg Gly Gly His Ser Asp Tyr Met
            290                 295                 300

Asn Met Thr Pro Arg Arg Pro Gly Pro Thr Arg Lys His Tyr Gln Pro
305                 310                 315                 320

Tyr Ala Pro Pro Arg Asp Phe Ala Ala Tyr Arg Ser Gly Gly Gly Lys
                325                 330                 335

Arg Gly Arg Lys Lys Leu Leu Tyr Ile Phe Lys Gln Pro Phe Met Arg
            340                 345                 350

Pro Val Gln Thr Thr Gln Glu Glu Asp Gly Cys Ser Cys Arg Phe Pro
            355                 360                 365

Glu Glu Glu Glu Gly Gly Cys Glu Leu Gly Gly Arg Val Lys Phe
            370                 375                 380

Ser Arg Ser Ala Asp Ala Pro Ala Tyr Gln Gln Gly Gln Asn Gln Leu
385                 390                 395                 400

Tyr Asn Glu Leu Asn Leu Gly Arg Arg Glu Glu Tyr Asp Val Leu Asp
                405                 410                 415

Lys Arg Arg Gly Arg Asp Pro Glu Met Gly Gly Lys Pro Arg Arg Lys
            420                 425                 430

Asn Pro Gln Glu Gly Leu Tyr Asn Glu Leu Gln Lys Asp Lys Met Ala
            435                 440                 445

Glu Ala Tyr Ser Glu Ile Gly Met Lys Gly Glu Arg Arg Arg Gly Lys
            450                 455                 460

Gly His Asp Gly Leu Tyr Gln Gly Leu Ser Thr Ala Thr Lys Asp Thr
465                 470                 475                 480

Tyr Asp Ala Leu His Met Gln Ala Leu Pro Pro Arg
                485                 490

<210> SEQ ID NO 38
<211> LENGTH: 592
<212> TYPE: PRT
<213> ORGANISM: Artificial Sequence
```

<220> FEATURE:
<223> OTHER INFORMATION: Description of Artificial Sequence: Synthetic
      polypeptide

<400> SEQUENCE: 38

```
Met Leu Leu Leu Val Thr Ser Leu Leu Cys Glu Leu Pro His Pro
1               5                   10                  15

Ala Phe Leu Leu Ile Pro Gly Pro Val Pro Ser Thr Ala Leu Arg
                20                  25                  30

Tyr Leu Ile Glu Glu Leu Val Asn Ile Thr Gln Asn Gln Lys Ala Pro
            35                  40                  45

Leu Cys Asn Gly Ser Met Val Trp Ser Ile Asn Leu Thr Ala Gly Met
50                  55                  60

Tyr Cys Ala Ala Leu Glu Ser Leu Ile Asn Val Ser Gly Cys Ser Ala
65                  70                  75                  80

Ile Glu Lys Thr Gln Arg Met Leu Ser Gly Phe Cys Pro His Lys Val
                85                  90                  95

Ser Ala Gly Gln Phe Ser Ser Leu His Val Arg Asp Thr Lys Ile Glu
                100                 105                 110

Val Ala Gln Phe Val Lys Asp Leu Leu Leu His Leu Lys Lys Leu Phe
            115                 120                 125

Arg Glu Gly Arg Phe Asn Glu Ser Lys Tyr Gly Pro Pro Cys Pro Pro
            130                 135                 140

Cys Pro Ala Pro Glu Phe Glu Gly Gly Pro Ser Val Phe Leu Phe Pro
145                 150                 155                 160

Pro Lys Pro Lys Asp Thr Leu Met Ile Ser Arg Thr Pro Glu Val Thr
                165                 170                 175

Cys Val Val Val Asp Val Ser Gln Glu Asp Pro Glu Val Gln Phe Asn
                180                 185                 190

Trp Tyr Val Asp Gly Val Glu Val His Asn Ala Lys Thr Lys Pro Arg
            195                 200                 205

Glu Glu Gln Phe Gln Ser Thr Tyr Arg Val Val Ser Val Leu Thr Val
            210                 215                 220

Leu His Gln Asp Trp Leu Asn Gly Lys Glu Tyr Lys Cys Lys Val Ser
225                 230                 235                 240

Asn Lys Gly Leu Pro Ser Ser Ile Glu Lys Thr Ile Ser Lys Ala Lys
                245                 250                 255

Gly Gln Pro Arg Glu Pro Gln Val Tyr Thr Leu Pro Pro Ser Gln Glu
                260                 265                 270

Glu Met Thr Lys Asn Gln Val Ser Leu Thr Cys Leu Val Lys Gly Phe
            275                 280                 285

Tyr Pro Ser Asp Ile Ala Val Glu Trp Glu Ser Asn Gly Gln Pro Glu
            290                 295                 300

Asn Asn Tyr Lys Thr Thr Pro Pro Val Leu Asp Ser Asp Gly Ser Phe
305                 310                 315                 320

Phe Leu Tyr Ser Arg Leu Thr Val Asp Lys Ser Arg Trp Gln Glu Gly
                325                 330                 335

Asn Val Phe Ser Cys Ser Val Met His Glu Ala Leu His Asn His Tyr
            340                 345                 350

Thr Gln Lys Ser Leu Ser Leu Ser Leu Gly Lys Met Phe Trp Val Leu
            355                 360                 365

Val Val Val Gly Gly Val Leu Ala Cys Tyr Ser Leu Leu Val Thr Val
370                 375                 380

Ala Phe Ile Ile Phe Trp Val Arg Ser Lys Arg Ser Arg Gly Gly His
```

```
385                 390                 395                 400
Ser Asp Tyr Met Asn Met Thr Pro Arg Arg Pro Gly Pro Thr Arg Lys
                405                 410                 415

His Tyr Gln Pro Tyr Ala Pro Pro Arg Asp Phe Ala Ala Tyr Arg Ser
                420                 425                 430

Gly Gly Gly Lys Arg Gly Arg Lys Leu Leu Tyr Ile Phe Lys Gln
                435                 440                 445

Pro Phe Met Arg Pro Val Gln Thr Thr Gln Glu Glu Asp Gly Cys Ser
450                 455                 460

Cys Arg Phe Pro Glu Glu Glu Gly Gly Cys Glu Leu Gly Gly
465                 470                 475                 480

Arg Val Lys Phe Ser Arg Ser Ala Asp Ala Pro Ala Tyr Gln Gln Gly
                485                 490                 495

Gln Asn Gln Leu Tyr Asn Glu Leu Asn Leu Gly Arg Arg Glu Glu Tyr
                500                 505                 510

Asp Val Leu Asp Lys Arg Arg Gly Arg Asp Pro Glu Met Gly Gly Lys
                515                 520                 525

Pro Arg Arg Lys Asn Pro Gln Glu Gly Leu Tyr Asn Glu Leu Gln Lys
                530                 535                 540

Asp Lys Met Ala Glu Ala Tyr Ser Glu Ile Gly Met Lys Gly Glu Arg
545                 550                 555                 560

Arg Arg Gly Lys Gly His Asp Gly Leu Tyr Gln Gly Leu Ser Thr Ala
                565                 570                 575

Thr Lys Asp Thr Tyr Asp Ala Leu His Met Gln Ala Leu Pro Pro Arg
                580                 585                 590

<210> SEQ ID NO 39
<211> LENGTH: 340
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

Gly Pro Val Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
                20                  25                  30

Val Trp Ser Ile Asn Leu Thr Ala Gly Met Tyr Cys Ala Ala Leu Glu
            35                  40                  45

Ser Leu Ile Asn Val Ser Gly Cys Ser Ala Ile Glu Lys Thr Gln Arg
        50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu His Leu Lys Lys Leu Phe Arg Glu Gly Arg Phe Asn
                100                 105                 110

Ala Lys Pro Thr Thr Thr Pro Ala Pro Arg Pro Pro Thr Pro Ala Pro
            115                 120                 125

Thr Ile Ala Ser Gln Pro Leu Ser Leu Arg Pro Glu Ala Cys Arg Pro
        130                 135                 140

Ala Ala Gly Gly Ala Val His Thr Arg Gly Leu Asp Phe Ala Cys Asp
145                 150                 155                 160
```

```
Ile Tyr Ile Trp Ala Pro Leu Ala Gly Thr Cys Gly Val Leu Leu Leu
                165                 170                 175

Ser Leu Val Ile Thr Leu Tyr Lys Arg Gly Arg Lys Lys Leu Leu Tyr
            180                 185                 190

Ile Phe Lys Gln Pro Phe Met Arg Pro Val Gln Thr Thr Gln Glu Glu
        195                 200                 205

Asp Gly Cys Ser Cys Arg Phe Pro Glu Glu Glu Gly Gly Cys Glu
    210                 215                 220

Leu Gly Gly Gly Arg Val Lys Phe Ser Arg Ser Ala Asp Ala Pro Ala
225                 230                 235                 240

Tyr Gln Gln Gly Gln Asn Gln Leu Tyr Asn Glu Leu Asn Leu Gly Arg
                245                 250                 255

Arg Glu Glu Tyr Asp Val Leu Asp Lys Arg Arg Gly Arg Asp Pro Glu
                260                 265                 270

Met Gly Gly Lys Pro Arg Arg Lys Asn Pro Gln Glu Gly Leu Tyr Asn
            275                 280                 285

Glu Leu Gln Lys Asp Lys Met Ala Glu Ala Tyr Ser Glu Ile Gly Met
        290                 295                 300

Lys Gly Glu Arg Arg Arg Gly Lys Gly His Asp Gly Leu Tyr Gln Gly
305                 310                 315                 320

Leu Ser Thr Ala Thr Lys Asp Thr Tyr Asp Ala Leu His Met Gln Ala
                325                 330                 335

Leu Pro Pro Arg
            340

<210> SEQ ID NO 40
<211> LENGTH: 388
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 40

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu His Leu Lys Lys Leu Phe Arg Glu Gly Arg Phe Asn
                100                 105                 110

Ala Lys Pro Thr Thr Thr Pro Ala Pro Arg Pro Pro Thr Pro Ala Pro
            115                 120                 125

Thr Ile Ala Ser Gln Pro Leu Ser Leu Arg Pro Glu Ala Cys Arg Pro
        130                 135                 140

Ala Ala Gly Gly Ala Val His Thr Arg Gly Leu Asp Phe Ala Cys Asp
145                 150                 155                 160

Phe Trp Val Leu Val Val Val Gly Gly Val Leu Ala Cys Tyr Ser Leu
                165                 170                 175
```

```
Leu Val Thr Val Ala Phe Ile Ile Phe Trp Val Arg Ser Lys Arg Ser
            180                 185                 190

Arg Gly Gly His Ser Asp Tyr Met Asn Met Thr Pro Arg Pro Gly
        195                 200                 205

Pro Thr Arg Lys His Tyr Gln Pro Tyr Ala Pro Pro Arg Asp Phe Ala
    210                 215                 220

Ala Tyr Arg Ser Gly Gly Lys Arg Gly Lys Lys Leu Leu Tyr
225                 230                 235                 240

Ile Phe Lys Gln Pro Phe Met Arg Pro Val Gln Thr Thr Gln Glu Glu
                245                 250                 255

Asp Gly Cys Ser Cys Arg Phe Pro Glu Glu Glu Gly Cys Glu
        260                 265                 270

Leu Gly Gly Gly Arg Val Lys Phe Ser Arg Ser Ala Asp Ala Pro Ala
            275                 280                 285

Tyr Gln Gln Gly Gln Asn Gln Leu Tyr Asn Glu Leu Asn Leu Gly Arg
    290                 295                 300

Arg Glu Glu Tyr Asp Val Leu Asp Lys Arg Gly Arg Asp Pro Glu
305                 310                 315                 320

Met Gly Gly Lys Pro Arg Arg Lys Asn Pro Gln Glu Gly Leu Tyr Asn
                325                 330                 335

Glu Leu Gln Lys Asp Lys Met Ala Glu Ala Tyr Ser Glu Ile Gly Met
            340                 345                 350

Lys Gly Glu Arg Arg Arg Gly Lys Gly His Asp Gly Leu Tyr Gln Gly
        355                 360                 365

Leu Ser Thr Ala Thr Lys Asp Thr Tyr Asp Ala Leu His Met Gln Ala
    370                 375                 380

Leu Pro Pro Arg
385

<210> SEQ ID NO 41
<211> LENGTH: 420
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu His Leu Lys Lys Leu Phe Arg Glu Gly Arg Phe Asn
            100                 105                 110

Glu Ser Lys Tyr Gly Pro Pro Cys Pro Pro Cys Pro Gly Gly Ser
        115                 120                 125

Ser Gly Gly Gly Ser Gly Gly Gln Pro Arg Glu Pro Gln Val Tyr Thr
```

```
                130               135               140
Leu Pro Pro Ser Gln Glu Glu Met Thr Lys Asn Gln Val Ser Leu Thr
145                 150                 155                 160

Cys Leu Val Lys Gly Phe Tyr Pro Ser Asp Ile Ala Val Glu Trp Glu
                165                 170                 175

Ser Asn Gly Gln Pro Glu Asn Asn Tyr Lys Thr Thr Pro Pro Val Leu
                180                 185                 190

Asp Ser Asp Gly Ser Phe Phe Leu Tyr Ser Arg Leu Thr Val Asp Lys
                195                 200                 205

Ser Arg Trp Gln Glu Gly Asn Val Phe Ser Cys Ser Val Met His Glu
                210                 215                 220

Ala Leu His Asn His Tyr Thr Gln Lys Ser Leu Ser Leu Ser Leu Gly
225                 230                 235                 240

Lys Met Ala Leu Ile Val Leu Gly Gly Val Ala Gly Leu Leu Leu Phe
                245                 250                 255

Ile Gly Leu Gly Ile Phe Phe Lys Arg Gly Arg Lys Lys Leu Leu Tyr
                260                 265                 270

Ile Phe Lys Gln Pro Phe Met Arg Pro Val Gln Thr Thr Gln Glu Glu
                275                 280                 285

Asp Gly Cys Ser Cys Arg Phe Pro Glu Glu Glu Glu Gly Gly Cys Glu
                290                 295                 300

Leu Gly Gly Gly Arg Val Lys Phe Ser Arg Ser Ala Asp Ala Pro Ala
305                 310                 315                 320

Tyr Gln Gln Gly Gln Asn Gln Leu Tyr Asn Glu Leu Asn Leu Gly Arg
                325                 330                 335

Arg Glu Glu Tyr Asp Val Leu Asp Lys Arg Arg Gly Arg Asp Pro Glu
                340                 345                 350

Met Gly Gly Lys Pro Arg Arg Lys Asn Pro Gln Glu Gly Leu Tyr Asn
                355                 360                 365

Glu Leu Gln Lys Asp Lys Met Ala Glu Ala Tyr Ser Glu Ile Gly Met
370                 375                 380

Lys Gly Glu Arg Arg Arg Gly Lys Gly His Asp Gly Leu Tyr Gln Gly
385                 390                 395                 400

Leu Ser Thr Ala Thr Lys Asp Thr Tyr Asp Ala Leu His Met Gln Ala
                405                 410                 415

Leu Pro Pro Arg
                420

<210> SEQ ID NO 42
<211> LENGTH: 519
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 42

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
                20                  25                  30

Val Trp Ser Ile Asn Leu Thr Ala Gly Met Tyr Cys Ala Ala Leu Glu
                35                  40                  45

Ser Leu Ile Asn Val Ser Gly Cys Ser Ala Ile Glu Lys Thr Gln Arg
50                  55                  60
```

```
Met Leu Ser Gly Phe Cys Pro His Lys Val Ser Ala Gly Gln Phe Ser
 65                  70                  75                  80

Ser Leu His Val Arg Asp Thr Lys Ile Glu Val Ala Gln Phe Val Lys
                 85                  90                  95

Asp Leu Leu His Leu Lys Lys Leu Phe Arg Glu Gly Arg Phe Asn
            100                 105                 110

Glu Ser Lys Tyr Gly Pro Pro Cys Pro Pro Cys Pro Ala Pro Glu Phe
        115                 120                 125

Glu Gly Gly Pro Ser Val Phe Leu Phe Pro Pro Lys Pro Lys Asp Thr
        130                 135                 140

Leu Met Ile Ser Arg Thr Pro Glu Val Thr Cys Val Val Val Asp Val
145                 150                 155                 160

Ser Gln Glu Asp Pro Glu Val Gln Phe Asn Trp Tyr Val Asp Gly Val
                165                 170                 175

Glu Val His Asn Ala Lys Thr Lys Pro Arg Glu Gln Phe Gln Ser
            180                 185                 190

Thr Tyr Arg Val Val Ser Val Leu Thr Val Leu His Gln Asp Trp Leu
        195                 200                 205

Asn Gly Lys Glu Tyr Lys Cys Lys Val Ser Asn Lys Gly Leu Pro Ser
    210                 215                 220

Ser Ile Glu Lys Thr Ile Ser Lys Ala Lys Gly Gln Pro Arg Glu Pro
225                 230                 235                 240

Gln Val Tyr Thr Leu Pro Pro Ser Gln Glu Met Thr Lys Asn Gln
                245                 250                 255

Val Ser Leu Thr Cys Leu Val Lys Gly Phe Tyr Pro Ser Asp Ile Ala
            260                 265                 270

Val Glu Trp Glu Ser Asn Gly Gln Pro Glu Asn Asn Tyr Lys Thr Thr
        275                 280                 285

Pro Pro Val Leu Asp Ser Asp Gly Ser Phe Phe Leu Tyr Ser Arg Leu
        290                 295                 300

Thr Val Asp Lys Ser Arg Trp Gln Glu Gly Asn Val Phe Ser Cys Ser
305                 310                 315                 320

Val Met His Glu Ala Leu His Asn His Tyr Thr Gln Lys Ser Leu Ser
                325                 330                 335

Leu Ser Leu Gly Lys Ile Tyr Ile Trp Ala Pro Leu Ala Gly Thr Cys
            340                 345                 350

Gly Val Leu Leu Leu Ser Leu Val Ile Thr Lys Arg Gly Arg Lys Lys
        355                 360                 365

Leu Leu Tyr Ile Phe Lys Gln Pro Phe Met Arg Pro Val Gln Thr Thr
        370                 375                 380

Gln Glu Glu Asp Gly Cys Ser Cys Arg Phe Pro Glu Glu Glu Glu Gly
385                 390                 395                 400

Gly Cys Glu Leu Gly Gly Arg Val Lys Phe Ser Arg Ser Ala Asp
            405                 410                 415

Ala Pro Ala Tyr Gln Gln Gly Gln Asn Gln Leu Tyr Asn Glu Leu Asn
            420                 425                 430

Leu Gly Arg Arg Glu Glu Tyr Asp Val Leu Asp Lys Arg Arg Gly Arg
        435                 440                 445

Asp Pro Glu Met Gly Gly Lys Pro Arg Arg Lys Asn Pro Gln Glu Gly
        450                 455                 460

Leu Tyr Asn Glu Leu Gln Lys Asp Lys Met Ala Glu Ala Tyr Ser Glu
465                 470                 475                 480

Ile Gly Met Lys Gly Glu Arg Arg Arg Gly Lys Gly His Asp Gly Leu
```

```
                    485                 490                 495
Tyr Gln Gly Leu Ser Thr Ala Thr Lys Asp Thr Tyr Asp Ala Leu His
                500                 505                 510

Met Gln Ala Leu Pro Pro Arg
        515

<210> SEQ ID NO 43
<211> LENGTH: 351
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43

Gly Pro Val Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
                20                  25                  30

Val Trp Ser Ile Asn Leu Thr Ala Gly Met Tyr Cys Ala Ala Leu Glu
            35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
                100                 105                 110

Gly Gly Gly Ser Ser Gly Gly Gly Ser Gly Met Phe Trp Val Leu Val
            115                 120                 125

Val Val Gly Gly Val Leu Ala Cys Tyr Ser Leu Leu Val Thr Val Ala
        130                 135                 140

Phe Ile Ile Phe Trp Val Arg Ser Lys Arg Ser Arg Gly Gly His Ser
145                 150                 155                 160

Asp Tyr Met Asn Met Thr Pro Arg Arg Pro Gly Pro Thr Arg Lys His
                165                 170                 175

Tyr Gln Pro Tyr Ala Pro Pro Arg Asp Phe Ala Ala Tyr Arg Ser Gly
                180                 185                 190

Gly Gly Lys Arg Gly Arg Lys Lys Leu Leu Tyr Ile Phe Lys Gln Pro
            195                 200                 205

Phe Met Arg Pro Val Gln Thr Thr Gln Glu Glu Asp Gly Cys Ser Cys
210                 215                 220

Arg Phe Pro Glu Glu Glu Glu Gly Gly Cys Glu Leu Gly Gly Gly Arg
225                 230                 235                 240

Val Lys Phe Ser Arg Ser Ala Asp Ala Pro Ala Tyr Gln Gln Gly Gln
                245                 250                 255

Asn Gln Leu Tyr Asn Glu Leu Asn Leu Gly Arg Arg Glu Glu Tyr Asp
                260                 265                 270

Val Leu Asp Lys Arg Arg Gly Arg Asp Pro Glu Met Gly Gly Lys Pro
            275                 280                 285

Arg Arg Lys Asn Pro Gln Glu Gly Leu Tyr Asn Glu Leu Gln Lys Asp
        290                 295                 300

Lys Met Ala Glu Ala Tyr Ser Glu Ile Gly Met Lys Gly Glu Arg Arg
305                 310                 315                 320
```

Arg Gly Lys Gly His Asp Gly Leu Tyr Gln Gly Leu Ser Thr Ala Thr
            325                 330                 335

Lys Asp Thr Tyr Asp Ala Leu His Met Gln Ala Leu Pro Pro Arg
        340                 345                 350

<210> SEQ ID NO 44
<211> LENGTH: 363
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
            100                 105                 110

Glu Ser Lys Tyr Gly Pro Pro Cys Pro Pro Cys Pro Gly Gly Gly Ser
        115                 120                 125

Ser Gly Gly Gly Ser Gly Met Phe Trp Val Leu Val Val Val Gly Gly
    130                 135                 140

Val Leu Ala Cys Tyr Ser Leu Leu Val Thr Val Ala Phe Ile Ile Phe
145                 150                 155                 160

Trp Val Arg Ser Lys Arg Ser Arg Gly Gly His Ser Asp Tyr Met Asn
                165                 170                 175

Met Thr Pro Arg Arg Pro Gly Pro Thr Arg Lys His Tyr Gln Pro Tyr
            180                 185                 190

Ala Pro Pro Arg Asp Phe Ala Ala Tyr Arg Ser Gly Gly Gly Lys Arg
        195                 200                 205

Gly Arg Lys Lys Leu Leu Tyr Ile Phe Lys Gln Pro Phe Met Arg Pro
    210                 215                 220

Val Gln Thr Thr Gln Glu Glu Asp Gly Cys Ser Cys Arg Phe Pro Glu
225                 230                 235                 240

Glu Glu Glu Gly Gly Cys Glu Leu Gly Gly Arg Val Lys Phe Ser
                245                 250                 255

Arg Ser Ala Asp Ala Pro Ala Tyr Gln Gln Gly Gln Asn Gln Leu Tyr
            260                 265                 270

Asn Glu Leu Asn Leu Gly Arg Arg Glu Glu Tyr Asp Val Leu Asp Lys
        275                 280                 285

Arg Arg Gly Arg Asp Pro Glu Met Gly Gly Lys Pro Arg Arg Lys Asn
    290                 295                 300

Pro Gln Glu Gly Leu Tyr Asn Glu Leu Gln Lys Asp Lys Met Ala Glu
305                 310                 315                 320

Ala Tyr Ser Glu Ile Gly Met Lys Gly Glu Arg Arg Arg Gly Lys Gly
                325                 330                 335

His Asp Gly Leu Tyr Gln Gly Leu Ser Thr Ala Thr Lys Asp Thr Tyr
            340                 345                 350

Asp Ala Leu His Met Gln Ala Leu Pro Pro Arg
            355                 360

<210> SEQ ID NO 45
<211> LENGTH: 470
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 45

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
            100                 105                 110

Glu Ser Lys Tyr Gly Pro Pro Cys Pro Pro Cys Pro Gly Gly Gly Ser
        115                 120                 125

Ser Gly Gly Gly Ser Gly Gly Gln Pro Arg Glu Pro Gln Val Tyr Thr
    130                 135                 140

Leu Pro Pro Ser Gln Glu Glu Met Thr Lys Asn Gln Val Ser Leu Thr
145                 150                 155                 160

Cys Leu Val Lys Gly Phe Tyr Pro Ser Asp Ile Ala Val Glu Trp Glu
                165                 170                 175

Ser Asn Gly Gln Pro Glu Asn Asn Tyr Lys Thr Thr Pro Pro Val Leu
            180                 185                 190

Asp Ser Asp Gly Ser Phe Phe Leu Tyr Ser Arg Leu Thr Val Asp Lys
        195                 200                 205

Ser Arg Trp Gln Glu Gly Asn Val Phe Ser Cys Ser Val Met His Glu
    210                 215                 220

Ala Leu His Asn His Tyr Thr Gln Lys Ser Leu Ser Leu Ser Leu Gly
225                 230                 235                 240

Lys Met Phe Trp Val Leu Val Val Val Gly Val Leu Ala Cys Tyr
                245                 250                 255

Ser Leu Leu Val Thr Val Ala Phe Ile Ile Phe Trp Val Arg Ser Lys
            260                 265                 270

Arg Ser Arg Gly Gly His Ser Asp Tyr Met Asn Met Thr Pro Arg Arg
        275                 280                 285

Pro Gly Pro Thr Arg Lys His Tyr Gln Pro Tyr Ala Pro Pro Arg Asp
    290                 295                 300

Phe Ala Ala Tyr Arg Ser Gly Gly Gly Lys Arg Gly Arg Lys Lys Leu
305                 310                 315                 320

Leu Tyr Ile Phe Lys Gln Pro Phe Met Arg Pro Val Gln Thr Thr Gln

```
                        325                 330                 335
Glu Glu Asp Gly Cys Ser Cys Arg Phe Pro Glu Glu Glu Gly Gly
                340                 345                 350

Cys Glu Leu Gly Gly Gly Arg Val Lys Phe Ser Arg Ser Ala Asp Ala
            355                 360                 365

Pro Ala Tyr Gln Gln Gly Gln Asn Gln Leu Tyr Asn Glu Leu Asn Leu
        370                 375                 380

Gly Arg Arg Glu Glu Tyr Asp Val Leu Asp Lys Arg Gly Arg Asp
385                 390                 395                 400

Pro Glu Met Gly Gly Lys Pro Arg Arg Lys Asn Pro Gln Glu Gly Leu
                405                 410                 415

Tyr Asn Glu Leu Gln Lys Asp Lys Met Ala Glu Ala Tyr Ser Glu Ile
                420                 425                 430

Gly Met Lys Gly Glu Arg Arg Arg Gly Lys Gly His Asp Gly Leu Tyr
            435                 440                 445

Gln Gly Leu Ser Thr Ala Thr Lys Asp Thr Tyr Asp Ala Leu His Met
        450                 455                 460

Gln Ala Leu Pro Pro Arg
465                 470

<210> SEQ ID NO 46
<211> LENGTH: 570
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 46

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
                20                  25                  30

Val Trp Ser Ile Asn Leu Thr Ala Gly Met Tyr Cys Ala Ala Leu Glu
            35                  40                  45

Ser Leu Ile Asn Val Ser Gly Cys Ser Ala Ile Glu Lys Thr Gln Arg
        50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
            100                 105                 110

Glu Ser Lys Tyr Gly Pro Pro Cys Pro Pro Cys Pro Ala Pro Glu Phe
        115                 120                 125

Glu Gly Gly Pro Ser Val Phe Leu Phe Pro Pro Lys Pro Lys Asp Thr
    130                 135                 140

Leu Met Ile Ser Arg Thr Pro Glu Val Thr Cys Val Val Val Asp Val
145                 150                 155                 160

Ser Gln Glu Asp Pro Glu Val Gln Phe Asn Trp Tyr Val Asp Gly Val
                165                 170                 175

Glu Val His Asn Ala Lys Thr Lys Pro Arg Glu Glu Gln Phe Gln Ser
            180                 185                 190

Thr Tyr Arg Val Val Ser Val Leu Thr Val Leu His Gln Asp Trp Leu
        195                 200                 205
```

```
Asn Gly Lys Glu Tyr Lys Cys Lys Val Ser Asn Lys Gly Leu Pro Ser
    210                 215                 220

Ser Ile Glu Lys Thr Ile Ser Lys Ala Lys Gly Gln Pro Arg Glu Pro
225                 230                 235                 240

Gln Val Tyr Thr Leu Pro Pro Ser Gln Glu Met Thr Lys Asn Gln
                245                 250                 255

Val Ser Leu Thr Cys Leu Val Lys Gly Phe Tyr Pro Ser Asp Ile Ala
                260                 265                 270

Val Glu Trp Glu Ser Asn Gly Gln Pro Glu Asn Asn Tyr Lys Thr Thr
            275                 280                 285

Pro Pro Val Leu Asp Ser Asp Gly Ser Phe Phe Leu Tyr Ser Arg Leu
        290                 295                 300

Thr Val Asp Lys Ser Arg Trp Gln Glu Gly Asn Val Phe Ser Cys Ser
305                 310                 315                 320

Val Met His Glu Ala Leu His Asn His Tyr Thr Gln Lys Ser Leu Ser
                325                 330                 335

Leu Ser Leu Gly Lys Met Phe Trp Val Leu Val Val Val Gly Gly Val
                340                 345                 350

Leu Ala Cys Tyr Ser Leu Leu Val Thr Val Ala Phe Ile Ile Phe Trp
            355                 360                 365

Val Arg Ser Lys Arg Ser Arg Gly Gly His Ser Asp Tyr Met Asn Met
    370                 375                 380

Thr Pro Arg Arg Pro Gly Pro Thr Arg Lys His Tyr Gln Pro Tyr Ala
385                 390                 395                 400

Pro Pro Arg Asp Phe Ala Ala Tyr Arg Ser Gly Gly Gly Lys Arg Gly
                405                 410                 415

Arg Lys Lys Leu Leu Tyr Ile Phe Lys Gln Pro Phe Met Arg Pro Val
            420                 425                 430

Gln Thr Thr Gln Glu Glu Asp Gly Cys Ser Cys Arg Phe Pro Glu Glu
        435                 440                 445

Glu Glu Gly Gly Cys Glu Leu Gly Gly Gly Arg Val Lys Phe Ser Arg
    450                 455                 460

Ser Ala Asp Ala Pro Ala Tyr Gln Gln Gly Gln Asn Gln Leu Tyr Asn
465                 470                 475                 480

Glu Leu Asn Leu Gly Arg Arg Glu Glu Tyr Asp Val Leu Asp Lys Arg
                485                 490                 495

Arg Gly Arg Asp Pro Glu Met Gly Gly Lys Pro Arg Arg Lys Asn Pro
            500                 505                 510

Gln Glu Gly Leu Tyr Asn Glu Leu Gln Lys Asp Lys Met Ala Glu Ala
        515                 520                 525

Tyr Ser Glu Ile Gly Met Lys Gly Glu Arg Arg Arg Gly Lys Gly His
    530                 535                 540

Asp Gly Leu Tyr Gln Gly Leu Ser Thr Ala Thr Lys Asp Thr Tyr Asp
545                 550                 555                 560

Ala Leu His Met Gln Ala Leu Pro Pro Arg
                565                 570

<210> SEQ ID NO 47
<211> LENGTH: 363
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 47
```

```
Met Leu Leu Leu Val Thr Ser Leu Leu Leu Cys Glu Leu Pro His Pro
1               5                   10                  15

Ala Phe Leu Leu Ile Pro Gly Pro Val Pro Pro Ser Thr Ala Leu Arg
            20                  25                  30

Tyr Leu Ile Glu Glu Leu Val Asn Ile Thr Gln Asn Gln Lys Ala Pro
            35                  40                  45

Leu Cys Asn Gly Ser Met Val Trp Ser Ile Asn Leu Thr Ala Gly Met
50                  55                      60

Tyr Cys Ala Ala Leu Glu Ser Leu Ile Asn Val Ser Gly Cys Ser Ala
65                  70                  75                  80

Ile Glu Lys Thr Gln Arg Met Leu Ser Gly Phe Cys Pro His Lys Val
                85                  90                  95

Ser Ala Gly Gln Phe Ser Ser Leu His Val Arg Asp Thr Lys Ile Glu
            100                 105                 110

Val Ala Gln Phe Val Lys Asp Leu Leu Leu His Leu Lys Lys Leu Phe
            115                 120                 125

Arg Glu Gly Arg Phe Asn Ala Lys Pro Thr Thr Pro Ala Pro Arg
            130                 135                 140

Pro Pro Thr Pro Ala Pro Thr Ile Ala Ser Gln Pro Leu Ser Leu Arg
145                 150                 155                 160

Pro Glu Ala Cys Arg Pro Ala Ala Gly Gly Ala Val His Thr Arg Gly
                165                 170                 175

Leu Asp Phe Ala Cys Asp Ile Tyr Ile Trp Ala Pro Leu Ala Gly Thr
            180                 185                 190

Cys Gly Val Leu Leu Ser Leu Val Ile Thr Gly Gly Lys Arg
                195                 200                 205

Gly Arg Lys Lys Leu Leu Tyr Ile Phe Lys Gln Pro Phe Met Arg Pro
210                 215                 220

Val Gln Thr Thr Gln Glu Glu Asp Gly Cys Ser Cys Arg Phe Pro Glu
225                 230                 235                 240

Glu Glu Glu Gly Gly Cys Glu Leu Gly Gly Arg Val Lys Phe Ser
                245                 250                 255

Arg Ser Ala Asp Ala Pro Ala Tyr Gln Gln Gly Gln Asn Gln Leu Tyr
            260                 265                 270

Asn Glu Leu Asn Leu Gly Arg Arg Glu Glu Tyr Asp Val Leu Asp Lys
            275                 280                 285

Arg Arg Gly Arg Asp Pro Glu Met Gly Gly Lys Pro Arg Arg Lys Asn
            290                 295                 300

Pro Gln Glu Gly Leu Tyr Asn Glu Leu Gln Lys Asp Lys Met Ala Glu
305                 310                 315                 320

Ala Tyr Ser Glu Ile Gly Met Lys Gly Glu Arg Arg Arg Gly Lys Gly
                325                 330                 335

His Asp Gly Leu Tyr Gln Gly Leu Ser Thr Ala Thr Lys Asp Thr Tyr
            340                 345                 350

Asp Ala Leu His Met Gln Ala Leu Pro Pro Arg
            355                 360

<210> SEQ ID NO 48
<211> LENGTH: 341
<212> TYPE: PRT
<213> ORGANISM: Artificial Sequence
<220> FEATURE:
<223> OTHER INFORMATION: Description of Artificial Sequence: Synthetic
      polypeptide
```

-continued

```
<400> SEQUENCE: 48

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
            100                 105                 110

Ala Lys Pro Thr Thr Thr Pro Ala Pro Arg Pro Pro Thr Pro Ala Pro
        115                 120                 125

Thr Ile Ala Ser Gln Pro Leu Ser Leu Arg Pro Glu Ala Cys Arg Pro
    130                 135                 140

Ala Ala Gly Gly Ala Val His Thr Arg Gly Leu Asp Phe Ala Cys Asp
145                 150                 155                 160

Ile Tyr Ile Trp Ala Pro Leu Ala Gly Thr Cys Gly Val Leu Leu Leu
                165                 170                 175

Ser Leu Val Ile Thr Gly Gly Lys Arg Gly Arg Lys Lys Leu Leu
            180                 185                 190

Tyr Ile Phe Lys Gln Pro Phe Met Arg Pro Val Gln Thr Thr Gln Glu
        195                 200                 205

Glu Asp Gly Cys Ser Cys Arg Phe Pro Glu Glu Glu Glu Gly Gly Cys
    210                 215                 220

Glu Leu Gly Gly Gly Arg Val Lys Phe Ser Arg Ser Ala Asp Ala Pro
225                 230                 235                 240

Ala Tyr Gln Gln Gly Gln Asn Gln Leu Tyr Asn Glu Leu Asn Leu Gly
                245                 250                 255

Arg Arg Glu Glu Tyr Asp Val Leu Asp Lys Arg Arg Gly Arg Asp Pro
            260                 265                 270

Glu Met Gly Gly Lys Pro Arg Arg Lys Asn Pro Gln Glu Gly Leu Tyr
        275                 280                 285

Asn Glu Leu Gln Lys Asp Lys Met Ala Glu Ala Tyr Ser Glu Ile Gly
    290                 295                 300

Met Lys Gly Glu Arg Arg Arg Gly Lys Gly His Asp Gly Leu Tyr Gln
305                 310                 315                 320

Gly Leu Ser Thr Ala Thr Lys Asp Thr Tyr Asp Ala Leu His Met Gln
                325                 330                 335

Ala Leu Pro Pro Arg
            340

<210> SEQ ID NO 49
<211> LENGTH: 245
<212> TYPE: PRT
<213> ORGANISM: Homo sapiens

<400> SEQUENCE: 49

Asp Ile Gln Met Thr Gln Ser Pro Ser Ser Leu Ser Ala Ser Val Gly
1               5                   10                  15
```

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys Gly Ser Thr Ser Gly
            100                 105                 110

Gly Gly Ser Gly Gly Gly Ser Gly Gly Gly Ser Ser Glu Val Gln
            115                 120                 125

Leu Val Glu Ser Gly Gly Gly Leu Val Gln Pro Gly Gly Ser Leu Arg
    130                 135                 140

Leu Ser Cys Ala Ala Ser Gly Phe Asn Ile Lys Asp Thr Tyr Ile His
145                 150                 155                 160

Trp Val Arg Gln Ala Pro Gly Lys Gly Leu Glu Trp Val Ala Arg Ile
                165                 170                 175

Tyr Pro Thr Asn Gly Tyr Thr Arg Tyr Ala Asp Ser Val Lys Gly Arg
            180                 185                 190

Phe Thr Ile Ser Ala Asp Thr Ser Lys Asn Thr Ala Tyr Leu Gln Met
        195                 200                 205

Asn Ser Leu Arg Ala Glu Asp Thr Ala Val Tyr Tyr Cys Ser Arg Trp
    210                 215                 220

Gly Gly Asp Gly Phe Tyr Ala Met Asp Tyr Trp Gly Gln Gly Thr Leu
225                 230                 235                 240

Val Thr Val Ser Ser
            245

<210> SEQ ID NO 50
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 50

Gly Gln Pro Arg Glu Pro Gln Val Tyr Thr Leu Pro Pro Ser Gln Glu
1               5                   10                  15

Glu Met Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Arg Leu Thr Val Asp Lys Ser Arg Trp Gln Glu Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Leu Gly Lys
            100                 105

<210> SEQ ID NO 51

```
<211> LENGTH: 229
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Gln Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 52
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 52

Glu Ser Lys Tyr Gly Pro Pro Cys Pro Ser Cys Pro
1               5                   10

<210> SEQ ID NO 53

<400> SEQUENCE: 53

000

<210> SEQ ID NO 54

<400> SEQUENCE: 54
```

000

<210> SEQ ID NO 55

<400> SEQUENCE: 55

000

<210> SEQ ID NO 56

<400> SEQUENCE: 56

000

<210> SEQ ID NO 57
<211> LENGTH: 28
<212> TYPE: PRT
<213> ORGANISM: Homo sapiens

<400> SEQUENCE: 57

```
Met Phe Trp Val Leu Val Val Val Gly Gly Val Leu Ala Cys Tyr Ser
1               5                   10                  15

Leu Leu Val Thr Val Ala Phe Ile Ile Phe Trp Val
            20                  25
```

<210> SEQ ID NO 58
<211> LENGTH: 1027
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 58

```
Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Ser Pro Ser Ser
            20                  25                  30

Leu Ser Ala Ser Val Gly Asp Arg Val Thr Ile Thr Cys Arg Ala Ser
        35                  40                  45

Gln Asp Val Asn Thr Ala Val Ala Trp Tyr Gln Gln Lys Pro Gly Lys
    50                  55                  60

Ala Pro Lys Leu Leu Ile Tyr Ser Ala Ser Phe Leu Tyr Ser Gly Val
65                  70                  75                  80

Pro Ser Arg Phe Ser Gly Ser Arg Ser Gly Thr Asp Phe Thr Leu Thr
                85                  90                  95

Ile Ser Ser Leu Gln Pro Glu Asp Phe Ala Thr Tyr Tyr Cys Gln Gln
            100                 105                 110

His Tyr Thr Thr Pro Pro Thr Phe Gly Gln Gly Thr Lys Val Glu Ile
        115                 120                 125

Lys Gly Ser Thr Ser Gly Gly Gly Ser Gly Gly Ser Gly Gly Gly
    130                 135                 140

Gly Ser Ser Glu Val Gln Leu Val Glu Ser Gly Gly Gly Leu Val Gln
145                 150                 155                 160

Pro Gly Gly Ser Leu Arg Leu Ser Cys Ala Ala Ser Gly Phe Asn Ile
                165                 170                 175

Lys Asp Thr Tyr Ile His Trp Val Arg Gln Ala Pro Gly Lys Gly Leu
            180                 185                 190

Glu Trp Val Ala Arg Ile Tyr Pro Thr Asn Gly Tyr Thr Arg Tyr Ala
```

-continued

```
            195                 200                 205
Asp Ser Val Lys Gly Arg Phe Thr Ile Ser Ala Asp Thr Ser Lys Asn
210                 215                 220
Thr Ala Tyr Leu Gln Met Asn Ser Leu Arg Ala Glu Asp Thr Ala Val
225                 230                 235                 240
Tyr Tyr Cys Ser Arg Trp Gly Gly Asp Gly Phe Tyr Ala Met Asp Tyr
                    245                 250                 255
Trp Gly Gln Gly Thr Leu Val Thr Val Ser Ser Glu Ser Lys Tyr Gly
                260                 265                 270
Pro Pro Cys Pro Pro Cys Pro Ala Pro Glu Phe Glu Gly Gly Pro Ser
            275                 280                 285
Val Phe Leu Phe Pro Pro Lys Pro Lys Asp Thr Leu Met Ile Ser Arg
        290                 295                 300
Thr Pro Glu Val Thr Cys Val Val Val Asp Val Ser Gln Glu Asp Pro
305                 310                 315                 320
Glu Val Gln Phe Asn Trp Tyr Val Asp Gly Val Glu Val His Asn Ala
                325                 330                 335
Lys Thr Lys Pro Arg Glu Glu Gln Phe Gln Ser Thr Tyr Arg Val Val
                340                 345                 350
Ser Val Leu Thr Val Leu His Gln Asp Trp Leu Asn Gly Lys Glu Tyr
            355                 360                 365
Lys Cys Lys Val Ser Asn Lys Gly Leu Pro Ser Ser Ile Glu Lys Thr
370                 375                 380
Ile Ser Lys Ala Lys Gly Gln Pro Arg Glu Pro Gln Val Tyr Thr Leu
385                 390                 395                 400
Pro Pro Ser Gln Glu Glu Met Thr Lys Asn Gln Val Ser Leu Thr Cys
                405                 410                 415
Leu Val Lys Gly Phe Tyr Pro Ser Asp Ile Ala Val Glu Trp Glu Ser
            420                 425                 430
Asn Gly Gln Pro Glu Asn Asn Tyr Lys Thr Thr Pro Pro Val Leu Asp
        435                 440                 445
Ser Asp Gly Ser Phe Phe Leu Tyr Ser Arg Leu Thr Val Asp Lys Ser
    450                 455                 460
Arg Trp Gln Glu Gly Asn Val Phe Ser Cys Ser Val Met His Glu Ala
465                 470                 475                 480
Leu His Asn His Tyr Thr Gln Lys Ser Leu Ser Leu Ser Leu Gly Lys
                485                 490                 495
Met Phe Trp Val Leu Val Val Val Gly Val Leu Ala Cys Tyr Ser
            500                 505                 510
Leu Leu Val Thr Val Ala Phe Ile Ile Phe Trp Val Arg Ser Lys Arg
        515                 520                 525
Ser Arg Gly Gly His Ser Asp Tyr Met Asn Met Thr Pro Arg Arg Pro
    530                 535                 540
Gly Pro Thr Arg Lys His Tyr Gln Pro Tyr Ala Pro Pro Arg Asp Phe
545                 550                 555                 560
Ala Ala Tyr Arg Ser Gly Gly Arg Val Lys Phe Ser Arg Ser Ala
                565                 570                 575
Asp Ala Pro Ala Tyr Gln Gln Gly Gln Asn Gln Leu Tyr Asn Glu Leu
            580                 585                 590
Asn Leu Gly Arg Arg Glu Glu Tyr Asp Val Leu Asp Lys Arg Arg Gly
        595                 600                 605
Arg Asp Pro Glu Met Gly Gly Lys Pro Arg Arg Lys Asn Pro Gln Glu
610                 615                 620
```

-continued

Gly Leu Tyr Asn Glu Leu Gln Lys Asp Lys Met Ala Glu Ala Tyr Ser
625                 630                 635                 640

Glu Ile Gly Met Lys Gly Glu Arg Arg Gly Lys Gly His Asp Gly
            645                 650                 655

Leu Tyr Gln Gly Leu Ser Thr Ala Thr Lys Asp Thr Tyr Asp Ala Leu
            660                 665                 670

His Met Gln Ala Leu Pro Pro Arg Leu Glu Gly Gly Gly Glu Gly Arg
            675                 680                 685

Gly Ser Leu Leu Thr Cys Gly Asp Val Glu Glu Asn Pro Gly Pro Arg
        690                 695                 700

Met Pro Pro Pro Arg Leu Leu Phe Phe Leu Phe Leu Thr Pro Met
705                 710                 715                 720

Glu Val Arg Pro Glu Glu Pro Leu Val Val Lys Val Glu Glu Gly Asp
            725                 730                 735

Asn Ala Val Leu Gln Cys Leu Lys Gly Thr Ser Asp Gly Pro Thr Gln
            740                 745                 750

Gln Leu Thr Trp Ser Arg Glu Ser Pro Leu Lys Pro Phe Leu Lys Leu
        755                 760                 765

Ser Leu Gly Leu Pro Gly Leu Gly Ile His Met Arg Pro Leu Ala Ile
770                 775                 780

Trp Leu Phe Ile Phe Asn Val Ser Gln Gln Met Gly Gly Phe Tyr Leu
785                 790                 795                 800

Cys Gln Pro Gly Pro Pro Ser Glu Lys Ala Trp Gln Pro Gly Trp Thr
            805                 810                 815

Val Asn Val Glu Gly Ser Gly Glu Leu Phe Arg Trp Asn Val Ser Asp
            820                 825                 830

Leu Gly Gly Leu Gly Cys Gly Leu Lys Asn Arg Ser Ser Glu Gly Pro
        835                 840                 845

Ser Ser Pro Ser Gly Lys Leu Met Ser Pro Lys Leu Tyr Val Trp Ala
850                 855                 860

Lys Asp Arg Pro Glu Ile Trp Glu Gly Glu Pro Pro Cys Val Pro Pro
865                 870                 875                 880

Arg Asp Ser Leu Asn Gln Ser Leu Ser Gln Asp Leu Thr Met Ala Pro
            885                 890                 895

Gly Ser Thr Leu Trp Leu Ser Cys Gly Val Pro Pro Asp Ser Val Ser
            900                 905                 910

Arg Gly Pro Leu Ser Trp Thr His Val His Pro Lys Gly Pro Lys Ser
        915                 920                 925

Leu Leu Ser Leu Glu Leu Lys Asp Asp Arg Pro Ala Arg Asp Met Trp
        930                 935                 940

Val Met Glu Thr Gly Leu Leu Leu Pro Arg Ala Thr Ala Gln Asp Ala
945                 950                 955                 960

Gly Lys Tyr Tyr Cys His Arg Gly Asn Leu Thr Met Ser Phe His Leu
            965                 970                 975

Glu Ile Thr Ala Arg Pro Val Leu Trp His Trp Leu Leu Arg Thr Gly
            980                 985                 990

Gly Trp Lys Val Ser Ala Val Thr Leu Ala Tyr Leu Ile Phe Cys Leu
        995                 1000                1005

Cys Ser Leu Val Gly Ile Leu His Leu Gln Arg Ala Leu Val Leu
    1010                1015                1020

Arg Arg Lys Arg
    1025

<210> SEQ ID NO 59
<211> LENGTH: 1021
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 59

```
Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Ser Pro Ser Ser
            20                  25                  30

Leu Ser Ala Ser Val Gly Asp Arg Val Thr Ile Thr Cys Arg Ala Ser
        35                  40                  45

Gln Asp Val Asn Thr Ala Val Ala Trp Tyr Gln Gln Lys Pro Gly Lys
    50                  55                  60

Ala Pro Lys Leu Leu Ile Tyr Ser Ala Ser Phe Leu Tyr Ser Gly Val
65                  70                  75                  80

Pro Ser Arg Phe Ser Gly Ser Arg Ser Gly Thr Asp Phe Thr Leu Thr
                85                  90                  95

Ile Ser Ser Leu Gln Pro Glu Asp Phe Ala Thr Tyr Tyr Cys Gln Gln
            100                 105                 110

His Tyr Thr Thr Pro Pro Thr Phe Gly Gln Gly Thr Lys Val Glu Ile
        115                 120                 125

Lys Gly Ser Thr Ser Gly Gly Gly Ser Gly Gly Gly Ser Gly Gly Gly
    130                 135                 140

Gly Ser Ser Glu Val Gln Leu Val Glu Ser Gly Gly Gly Leu Val Gln
145                 150                 155                 160

Pro Gly Gly Ser Leu Arg Leu Ser Cys Ala Ala Ser Gly Phe Asn Ile
                165                 170                 175

Lys Asp Thr Tyr Ile His Trp Val Arg Gln Ala Pro Gly Lys Gly Leu
            180                 185                 190

Glu Trp Val Ala Arg Ile Tyr Pro Thr Asn Gly Tyr Thr Arg Tyr Ala
        195                 200                 205

Asp Ser Val Lys Gly Arg Phe Thr Ile Ser Ala Asp Thr Ser Lys Asn
    210                 215                 220

Thr Ala Tyr Leu Gln Met Asn Ser Leu Arg Ala Glu Asp Thr Ala Val
225                 230                 235                 240

Tyr Tyr Cys Ser Arg Trp Gly Gly Asp Gly Phe Tyr Ala Met Asp Tyr
                245                 250                 255

Trp Gly Gln Gly Thr Leu Val Thr Val Ser Ser Glu Ser Lys Tyr Gly
            260                 265                 270

Pro Pro Cys Pro Pro Cys Pro Ala Pro Glu Phe Glu Gly Gly Pro Ser
        275                 280                 285

Val Phe Leu Phe Pro Pro Lys Pro Lys Asp Thr Leu Met Ile Ser Arg
    290                 295                 300

Thr Pro Glu Val Thr Cys Val Val Asp Val Ser Gln Glu Asp Pro
305                 310                 315                 320

Glu Val Gln Phe Asn Trp Tyr Val Asp Gly Val Phe Val His Asn Ala
                325                 330                 335

Lys Thr Lys Pro Arg Glu Glu Gln Phe Gln Ser Thr Tyr Arg Val Val
            340                 345                 350

Ser Val Leu Thr Val Leu His Gln Asp Trp Leu Asn Gly Lys Phe Tyr
        355                 360                 365
```

```
Lys Cys Lys Val Ser Asn Lys Gly Leu Pro Ser Ser Ile Glu Lys Thr
            370                 375                 380

Ile Ser Lys Ala Lys Gly Gln Pro Arg Glu Pro Gln Val Tyr Thr Leu
385                 390                 395                 400

Pro Pro Ser Gln Glu Glu Met Thr Lys Asn Gln Val Ser Leu Thr Cys
                405                 410                 415

Leu Val Lys Gly Phe Tyr Pro Ser Asp Ile Ala Val Glu Trp Glu Ser
                420                 425                 430

Asn Gly Gln Pro Glu Asn Asn Tyr Lys Thr Thr Pro Pro Val Leu Asp
            435                 440                 445

Ser Asp Gly Ser Phe Phe Leu Tyr Ser Arg Leu Thr Val Asp Lys Ser
450                 455                 460

Arg Trp Gln Glu Gly Asn Val Phe Ser Cys Ser Val Met His Glu Ala
465                 470                 475                 480

Leu His Asn His Tyr Thr Gln Lys Ser Leu Ser Leu Ser Leu Gly Lys
                485                 490                 495

Ile Tyr Ile Trp Ala Pro Leu Ala Gly Thr Cys Gly Val Leu Leu Leu
                500                 505                 510

Ser Leu Val Ile Thr Lys Arg Gly Arg Lys Lys Leu Leu Tyr Ile Phe
            515                 520                 525

Lys Gln Pro Phe Met Arg Pro Val Gln Thr Thr Gln Glu Glu Asp Gly
530                 535                 540

Cys Ser Cys Arg Phe Pro Glu Glu Glu Glu Gly Gly Cys Glu Leu Gly
545                 550                 555                 560

Gly Gly Arg Val Lys Phe Ser Arg Ser Ala Asp Ala Pro Ala Tyr Gln
                565                 570                 575

Gln Gly Gln Asn Gln Leu Tyr Asn Glu Leu Asn Leu Gly Arg Arg Glu
            580                 585                 590

Glu Tyr Asp Val Leu Asp Lys Arg Arg Gly Arg Asp Pro Glu Met Gly
            595                 600                 605

Gly Lys Pro Arg Arg Lys Asn Pro Gln Glu Gly Leu Tyr Asn Glu Leu
            610                 615                 620

Gln Lys Asp Lys Met Ala Glu Ala Tyr Ser Glu Ile Gly Met Lys Gly
625                 630                 635                 640

Glu Arg Arg Arg Gly Lys Gly His Asp Gly Leu Tyr Gln Gly Leu Ser
                645                 650                 655

Thr Ala Thr Lys Asp Thr Tyr Asp Ala Leu His Met Gln Ala Leu Pro
                660                 665                 670

Pro Arg Leu Glu Gly Gly Gly Glu Gly Arg Gly Ser Leu Leu Thr Cys
            675                 680                 685

Gly Asp Val Glu Glu Asn Pro Gly Pro Arg Met Pro Pro Arg Leu
            690                 695                 700

Leu Phe Phe Leu Leu Phe Leu Thr Pro Met Glu Val Arg Pro Glu Glu
705                 710                 715                 720

Pro Leu Val Val Lys Val Glu Glu Gly Asp Asn Ala Val Leu Gln Cys
                725                 730                 735

Leu Lys Gly Thr Ser Asp Gly Pro Thr Gln Gln Leu Thr Trp Ser Arg
                740                 745                 750

Glu Ser Pro Leu Lys Pro Phe Leu Lys Leu Ser Leu Gly Leu Pro Gly
            755                 760                 765

Leu Gly Ile His Met Arg Pro Leu Ala Ile Trp Leu Phe Ile Phe Asn
            770                 775                 780
```

-continued

```
Val Ser Gln Gln Met Gly Gly Phe Tyr Leu Cys Gln Pro Gly Pro Pro
785             790                 795                 800

Ser Glu Lys Ala Trp Gln Pro Gly Trp Thr Val Asn Val Glu Gly Ser
                805                 810                 815

Gly Glu Leu Phe Arg Trp Asn Val Ser Asp Leu Gly Gly Leu Gly Cys
                820                 825                 830

Gly Leu Lys Asn Arg Ser Ser Glu Gly Pro Ser Ser Pro Ser Gly Lys
            835                 840                 845

Leu Met Ser Pro Lys Leu Tyr Val Trp Ala Lys Asp Arg Pro Glu Ile
        850                 855                 860

Trp Glu Gly Glu Pro Pro Cys Val Pro Pro Arg Asp Ser Leu Asn Gln
865             870                 875                 880

Ser Leu Ser Gln Asp Leu Thr Met Ala Pro Gly Ser Thr Leu Trp Leu
                885                 890                 895

Ser Cys Gly Val Pro Pro Asp Ser Val Ser Arg Gly Pro Leu Ser Trp
            900                 905                 910

Thr His Val His Pro Lys Gly Pro Lys Ser Leu Leu Ser Leu Glu Leu
            915                 920                 925

Lys Asp Asp Arg Pro Ala Arg Asp Met Trp Val Met Glu Thr Gly Leu
930             935                 940

Leu Leu Pro Arg Ala Thr Ala Gln Asp Ala Gly Lys Tyr Tyr Cys His
945             950                 955                 960

Arg Gly Asn Leu Thr Met Ser Phe His Leu Glu Ile Thr Ala Arg Pro
                965                 970                 975

Val Leu Trp His Trp Leu Leu Arg Thr Gly Gly Trp Lys Val Ser Ala
            980                 985                 990

Val Thr Leu Ala Tyr Leu Ile Phe Cys Leu Cys Ser Leu Val Gly Ile
        995             1000                1005

Leu His Leu Gln Arg Ala Leu Val Leu Arg Arg Lys Arg
    1010            1015            1020
```

ADMINISTRATION OF ENGINEERED T CELLS FOR TREATMENT OF CANCERS IN THE CENTRAL NERVOUS SYSTEM

CROSS-REFERENCE TO RELATED APPLICATIONS

This application is a continuation of U.S. application Ser. No. 15/425,773, filed Feb. 6, 2017, which claims the benefit of prior U.S. Provisional Application Ser. No. 62/292,152, filed Feb. 5, 2016, and of prior U.S. Provisional Application Ser. No. 62/309,348, filed Mar. 16, 2016. The disclosures of the above applications are hereby incorporated by reference in their entirety.

SEQUENCE LISTING

This application contains a Sequence Listing that has been submitted electronically as an ASCII text file named "40056-0028002_UPDATEDSL_ST25.txt." The ASCII text file, created on Sep. 23, 2025, is 180,407 bytes in size. The material in the ASCII text file is hereby incorporated by reference in its entirety.

BACKGROUND

Tumor-specific T cell based immunotherapies, including therapies employing engineered T cells and ex vivo expanded or selected T cells, have been investigated for anti-tumor treatment. In some cases, the T cells used in such therapies do not remain active in vivo for a long enough period. In some cases, the tumor-specificity of the T cells is relatively low. In some cases, the engineered T cells have insufficient access to the tumor. Therefore, there is a need in the art for tumor-specific cancer therapies with more effective anti-tumor function.

Treatment of cancers of the central nervous system can be particularly challenging. For example, treatment of high-grade malignant glioma (MG), including anaplastic astrocytoma (AA-grade III) and glioblastoma multiforme (GBM-grade IV), remains a significant therapeutic challenge. Currently available therapeutic options have limited curative potential and only less than 5% of patients survive more than five years after initial diagnosis.

SUMMARY

Described herein are methods for treating malignancies in the central nervous system by administering compositions comprising T cells (e.g., CAR T cells, Tumor Infiltrating lymphocytes ("TIL"), TCR-engineered T cells, or T cell clones) to the cerebrospinal fluid ("CSF") of a patient. The T cells include T cells that have be manipulated, for example, by introduction of a nucleic acid molecule expressing a desired receptor, by ex vivo expansion of isolated or genetically-modified T cells or by ex vivo selection of a subset of T cells obtained from a patient or a donor or by a combination of two or more of these techniques.

Administration to the CNS can be accomplished, for example, by administration to the ventricular system or the central cavity of the spinal column. Administration to the CNS, as the term is used herein, is distinct from both intratumoral administration (injection or infusion into the tumor itself) and administration to a cavity created by resection of a tumor. However, the CNS administration methods described herein can be combined with intratumoral and/or post-resection, intracavity administration.

The CNS administration described herein permits infusion of relatively large volumes of the composition comprising T cells, for example 1 ml-2 ml or more in a single infusion. Thus, several million T cells can be administered in a single infusion.

A method of treating a patient diagnosed with a malignancy of the central nervous system is thus disclosed, which comprises infusing a composition comprising an effective amount of T cells into an anatomical compartment of a patient diagnosed with a malignancy of the central nervous system, the anatomical compartment containing cerebrospinal fluid ("CSF"). The method includes infusion of a composition into a ventricular system or a portion of a central canal of a spinal cord, for example. In one embodiment of the disclosed method, the malignancy of the central nervous system includes a primary tumor or a metastasized tumor found somewhere in the central nervous system, including a portion of the brain, spinal column, or the like. Preferably the anatomical compartment contains a contiguous volume of at least about 50, 100, or 150 mL of cerebrospinal fluid.

The manipulated T cells infused in the methods described herein target tumor antigens, for example surface protein and intracellular proteins. The malignancies treated can be primary tumors or secondary tumors arising from cancers originating elsewhere in the body. Because administration to the cerebrospinal fluid allows the T cells access to regions beyond the local site of injection, the methods described herein can be used to attack and reduce the size of tumors remote from the site of injection but within the CNS. TCR-engineered T cells are prepared by introduction of TCRαβ genes into T cells (e.g., autologous T cells) followed by ex vivo expansion of T cells; and infusion of T cells into the patient. The infusion of the TCR-engineered T cells confers tumor reactivity to patients whose tumor expresses the appropriate antigen and HLA restriction element. The TCR can be targeted to any of a variety of tumor antigens, including, for example melanoma-associated antigen recognized by T cells 1 (MART-1), glycoprotein (gp) 100, carcinoembryonic antigen (CEA), p53, melanoma-associated antigen (MAGE-A3, and New York esophageal squamous cell carcinoma antigen (NYESO).

Described herein is a method of treating a patient diagnosed with a malignancy of the central nervous system comprising introducing into the cerebrospinal fluid (CSF) of the patient a composition comprising an effective amount of T cells.

In various embodiments: the T cells are autologous or allogenic T cells; the T cells have been manipulated ex vivo by one or more of: expansion, fractionation or transfection with a recombinant nucleic acid molecule; the T cells comprise cells that have been transfected with a recombinant nucleic acid molecule encoding a polypeptide that binds to a tumor cell antigen; the polypeptide is a chimeric antigen receptor; the composition is administered intraventricularly; the composition is administered to the central canal of the spinal cord; the administration is to the left ventrical or the right ventrical; the composition comprises at least $1 \times 10^6$ cells; the composition comprising T cells is administered at least two times; the administrations differ in the total number of T cells administered; the administrations escalate in dose; the administrations de-escalate in dose; the T cells comprise CAR T cells; the T cells comprise autologous tumor infiltrating lymphocytes; the T cells comprise TCR-engineered T cells; the malignancy is a diffuse, infiltrating tumor; the malignancy is a primary brain tumor; one or more tumor foci decrease in size by at least 25%; the malignancy arose from a primary cancer selected from: breast cancer, lung cancer, head and neck cancer, and melanoma; the method is performed after tumor resection; the method further comprises intratumoral administration of a composition comprising T cells; the malignancy is secondary brain tumor; the method further comprises intratumoral administration of a composition comprising therapeutic T cells expressing a chimeric antigen receptor that binds a protein expressed on the surface of glioblastoma cells; the patient has previously undergone resection of a tumor lesion; the tumor antigen is selected from the group consisting of: IL13Rα2, HER2, PSCA, EGFR, EGFRvIII, EphA2, NY-ESO-1, and CD19; T cells comprise both CD4+ cells and CD8+ cells; the T cells have undergone ex vivo expansion; the T cells comprise at least 10% $T_{CM}$ cells; at least 40%, 50%, 60%, 70% or more of the cells infused are CD4+; at least at least 40%, 50%, 60%, 70% or more of the cells infused express a cell surface receptor that targets the tumor antigen (e.g., IL13Rα2); and the dose of cells is based on the number of infused cells that express a cell surface receptor that targets the tumor antigen (e.g., IL13Rα2).

In some embodiments the T cells comprise CAR T cells that target IL13Rα2 and the cells comprise a nucleic acid molecule encoding a chimeric antigen receptor comprising: human IL-13 or a variant thereof having 1-10 amino acid modifications; a transmembrane domain selected from: a CD4 transmembrane domain or variant thereof having 1-10 amino acid modifications, a CD8 transmembrane domain or variant thereof having 1-10 amino acid modifications, a CD28 transmembrane domain or a variant thereof having 1-10 amino acid modifications, and a CD3ζ transmembrane domain or a variant thereof having 1-10 amino acid modifications; at least one costimulatory domain; and CD3 ζ signaling domain of a variant thereof having 1-10 amino acid modifications. In some embodiments: the costimulatory domain is selected from the group consisting of: a CD28 costimulatory domain or a variant thereof having 1-10 amino acid modifications, a 4IBB costimulatory domain or a variant thereof having 1-10 amino acid modifications and an OX40 costimulatory domain or a variant thereof having 1-10 amino acid modifications; the variant of a human IL13 has 1-10 amino acid modification that increase binding specificity for IL13Rα2 versus IL13Rα1; the human IL-13 or variant thereof is an IL-13 variant comprising the amino acid sequence of SEQ ID NO:3 with 1 to 5 amino acid modifications, provided that the amino acid at position 11 of SEQ ID NO:3 is other than E; the chimeric antigen receptor comprises two different costimulatory domains selected from the group consisting of: a CD28 costimulatory domain or a variant thereof having 1-10 amino acid modifications, a 4IBB costimulatory domain or a variant thereof having 1-10 amino acid modifications and an OX40 costimulatory domain or a variant thereof having 1-10 amino acid modifications; the chimeric antigen receptor comprises two different costimulatory domains selected from the group consisting of: a CD28 costimulatory domain or a variant thereof having 1-2 amino acid modifications, a 4IBB costimulatory domain or a variant thereof having 1-2 amino acid modifications and an OX40 costimulatory domain or a variant thereof having 1-2 amino acid modifications; the chimeric antigen receptor comprises: human IL-13 or a variant thereof having 1-2 amino acid modifications; a transmembrane domain selected from: a CD4 transmembrane domain or variant thereof having 1-2 amino acid modifications, a CD8 transmembrane domain or variant thereof having 1-2 amino acid modifications, a CD28 transmembrane domain or a variant thereof having 1-2 amino acid modifications, and a CD3ζ transmembrane domain or a variant thereof having 1-2 amino acid modifications; a costimulatory domain; and CD3 ζ signaling domain of a variant thereof having 1-2 amino acid modifications; the CAR comprises a spacer region located between the IL-13 or variant thereof and the transmembrane domain; the spacer region comprises an amino acid sequence selected from the group consisting of SEQ ID NO: 4, 14-20, 50 and 52; the chimeric antigen receptor comprises an amino acid sequence selected from the group consisting of SEQ ID NOs: 10 and 31-48.

In some embodiments the T cells express a chimeric antigen receptor that binds HER2 comprise a nucleic acid molecule encoding a chimeric antigen receptor comprising: a HER2 targeting sequence; a transmembrane domain selected from: a CD4 transmembrane domain or variant thereof having 1-5 amino acid modifications, a CD8 transmembrane domain or variant thereof having 1-5 amino acid modifications, a CD28 transmembrane domain or a variant thereof having 1-5 amino acid modifications, and a CD3s transmembrane domain or a variant thereof having 1-5 amino acid modifications; a costimulatory domain selected from a CD28 costimulatory domain or a variant thereof having 1-5 amino acid modifications and a 4-IBB costimulatory domain or a variant thereof having 1-5 amino acid modifications; and CD3s signaling domain of a variant thereof having 1-5 amino acid modifications. In certain embodiments: the HER2 targeting domain is a HER2 scFv; the HER2 scFv comprising the amino acid sequence: DIQMTQSPSSLSASVGDRVTITCRASQDVNTAVAWY QQKPGKAPKLLIYSASFLYSGVPSRFS GSRSGTD FTLTISSLQPEDFATYYCQQHYTTPPTFGQGTK VEIKGSTSGGGSGGGSGGGGSSE VQLVESGG-GLVQPGGSLRLSCAASGFNIKDTYIHWVRQAPGK-GLEWVARIYPTNGYTRYADS VKGRFTISADTSKN-TAYLQMNSLRAEDTAVYYCSRWGGDGFYAMDYWG QGTLVTVSS (SEQ ID NO:49) or a variant thereof having 1 to 5 amino acid modifications; the chimeric antigen receptor comprises: a HER2 targeting sequence; a transmembrane domain selected from: a CD4 transmembrane domain or variant thereof having 1-2 amino acid modifications, a CD8 transmembrane domain or variant thereof having 1-2 amino acid modifications, a CD28 transmembrane domain or a variant thereof having 1-2 amino acid modifications, and a CD3s transmembrane domain or a variant thereof having 1-2 amino acid modifications; a costimulatory domain selected from a CD28 costimulatory domain or a variant thereof having 1-2 amino acid modifications and a 4-IBB costimulatory domain or a variant thereof having 1-2 amino acid modifications; and CD3 signaling domain of a variant thereof having 1-2 amino acid modifications; the nucleic acid molecule expresses a polypeptide comprising an amino acid sequence selected from SEQ ID NO: 26 and 27 or a variant thereof having 1-5 amino acid modifications.

Also described herein is a method of treating a patient diagnosed with a malignancy of the central nervous system comprising infusing a composition comprising an effective amount of T cells into an anatomical compartment of a patient diagnosed with a malignancy of the central nervous system, the anatomical compartment containing cerebrospinal fluid (CSF). In various embodiments: the anatomical compartment comprises a portion of a ventricular system; the anatomical compartment comprises a portion of a central canal of a spinal cord; the malignancy of the central nervous system includes a brain tumor; the malignancy of the central nervous system includes a metastasized tumor; the anatomical compartment contains a contiguous volume of at least about 50 mL of cerebrospinal fluid; the anatomical compartment contains a contiguous volume of at least about 100 mL of cerebrospinal fluid; and the anatomical compartment contains a contiguous volume of at least about 150 mL of cerebrospinal fluid.

Among the cancers that can be treated by the methods described herein are primary CNS malignancies and secondary malignancies arising from a cancer located elsewhere, for example. Acute Lymphoblastic Leukemia (ALL), Acute Myeloid Leukemia (AML), Adrenocortical, Carcinoma, AIDS-Related Cancers, Anal Cancer, Appendix Cancer, Astrocytomas, Atypical Teratoid/Rhabdoid Tumor, Central Nervous System, Basal Cell Carcinoma, Bile Duct Cancer, Bladder Cancer, Bone Cancer, Osteosarcoma and Malignant Fibrous Histiocytoma, Brain Stem Glioma, Brain Tumors, Breast Cancer, Bronchial Tumors, Burkitt Lymphoma, Carcinoid Tumors, Central Nervous System Cancers, Cervical Cancer, Chordoma, Chronic Lymphocytic Leukemia (CLL), Chronic Myelogenous Leukemia (CML), Chronic Myeloproliferative Disorders, Colon Cancer, Colorectal Cancer, Craniopharyngioma, Cutaneous T-Cell Lymphoma, Embryonal Tumors, Central Nervous System, Endometrial Cancer, Ependymoblastoma, Ependymoma, Esophageal Cancer, Esthesioneuroblastoma, Ewing Sarcoma Family of Tumors Extracranial Germ Cell Tumor, Extragonadal Germ Cell Tumor Extrahepatic Bile Duct Cancer, Eye Cancer Fibrous Histiocytoma of Bone, Malignant, and Osteosarcoma, Gallbladder Cancer, Gastric (Stomach) Cancer, Gastrointestinal Carcinoid Tumor, Gastrointestinal Stromal Tumors (GIST)—see Soft Tissue Sarcoma, Germ Cell Tumor, Gestational Trophoblastic Tumor, Glioma, Hairy Cell Leukemia, Head and Neck Cancer, Heart Cancer, Hepatocellular (Liver) Cancer, Histiocytosis, Hodgkin Lymphoma, Hypopharyngeal Cancer, Intraocular Melanoma, Islet Cell Tumors (Endocrine Pancreas), Kaposi Sarcoma, Kidney cancer, Langerhans Cell Histiocytosis, Laryngeal Cancer, Leukemia, Lip and Oral Cavity Cancer, Liver Cancer (Primary), Lobular Carcinoma In Situ (LCIS), Lung Cancer, Lymphoma, Macroglobulinemia, Male Breast Cancer, Malignant Fibrous Histiocytoma of Bone and Osteosarcoma, Medulloblastoma, Medulloepithelioma, Melanoma, Merkel Cell Carcinoma, Mesothelioma, Metastatic Squamous Neck Cancer with Occult Primary Midline Tract Carcinoma Involving NUT Gene, Mouth Cancer, Multiple Endocrine Neoplasia Syndromes, Multiple Myeloma/Plasma Cell Neoplasm, Mycosis Fungoides, Myelodysplastic Syndromes, Myelodysplastic/Myeloproliferative Neoplasms, Myelogenous Leukemia, Chronic (CML), Myeloid Leukemia, Acute (AML), Myeloma, Multiple, Myeloproliferative Disorders, Nasal Cavity and Paranasal Sinus Cancer, Nasopharyngeal Cancer, Neuroblastoma, Non-Hodgkin Lymphoma, Non-Small Cell Lung Cancer, Oral Cancer, Oral Cavity Cancer, Oropharyngeal Cancer, Osteosarcoma and Malignant Fibrous Histiocytoma of Bone, Ovarian Cancer, Pancreatic Cancer, Papillomatosis, Paraganglioma, Paranasal Sinus and Nasal Cavity Cancer, Parathyroid Cancer, Penile Cancer, Pharyngeal Cancer, Pheochromocytoma, Pineal Parenchymal Tumors of Intermediate Differentiation, Pineoblastoma and Supratentorial Primitive Neuroectodermal Tumors, Pituitary Tumor, Plasma Cell Neoplasm/Multiple Myeloma, Pleuropulmonary Blastoma, Pregnancy and Breast Cancer, Primary Central Nervous System (CNS) Lymphoma, Prostate Cancer, Rectal Cancer, Renal Cell (Kidney) Cancer, Renal Pelvis and Ureter, Transitional Cell Cancer, Retinoblastoma, Rhabdomyosarcoma, Salivary Gland Cancer, Sarcoma, Sézary Syndrome, Small Cell Lung Cancer, Small Intestine Cancer, Soft Tissue Sarcoma, Squamous Cell Carcinoma, Squamous Neck Cancer, Stomach (Gastric) Cancer, Supratentorial Primitive Neuroectodermal Tumors, T-Cell Lymphoma, Cutaneous, Testicular Cancer, Throat Cancer, Thymoma and Thymic Carcinoma, Thyroid Cancer, Transitional Cell Cancer of the Renal Pelvis and Ureter, Trophoblastic Tumor, Ureter and Renal Pelvis Cancer, Urethral Cancer, Uterine Cancer, Uterine Sarcoma, Vaginal Cancer, Vulvar Cancer, Waldenström Macroglobulinemia, and Wilms Tumor.

In some embodiments, the malignancy treated according to the disclosed methods comprises a tumor. In some embodiments, treatment results in at least a 50% reduction in tumor volume, at least a 60% reduction in tumor volume, at least a 70% reduction in tumor volume, at least an 80% reduction in tumor volume, or at least an 90% reduction in tumor volume. And in some embodiments, the treatment results in elimination of the malignancy.

In some embodiments, the patient does not experience any grade 3 or higher toxicity.

In some embodiments, the patient was administered a regimen of steroids prior to treatment with the composition comprising an effective amount of T cells, and in some embodiments the regimen of steroids is reduced to a lower dose following the treatment.

In some embodiments, the patient has an increased life expectancy compared to a patient receiving standard of care treatment, including radiation therapy, small molecule drug therapy, antibody therapeutics, or a combination thereof. And in some embodiments, in which the patient receiving standard of care ("SOC") treatment can expect to survive about 15 months from initial diagnosis (overall survival or OS), the patient receiving the disclosed treatment can expect an OS of 15, 20, 25, 26, 27, 28, 29, 30, 31, 32, 33, 34, 35, 36 months or more. In some embodiments, the patient receiving the claimed treatment can expect an OS of 42, 48, 54, 60, 66, 72, 78, 84, 90 months or more.

In some embodiments, the composition comprises at least $2\times10^6$ T cells or $2\times10^6$ T cells expressing a cell surface receptor targeting a tumor antigen, while in some embodiments, the composition comprises at least $1\times10^6$ T cells or $1\times10^6$ T cells expressing a cell surface receptor targeting a tumor antigen. In some embodiments, the composition comprises at least $5\times10^6$ T cells or $5\times10^6$ T cells expressing a cell surface receptor targeting a tumor antigen, while in some embodiments, the composition comprises at least $10\times10^6$ T cells or $10\times10^6$ T cells expressing a cell surface receptor targeting a tumor antigen. In some embodiments, the disclosed methods comprised repeated administrations of the compositions, for instance repeating administration of the composition at least five times, repeating administration of the composition at least ten times, or repeating administration until the patient receives a total dose of at least $90\times10^6$ T cells or T cells expressing a cell surface receptor targeting a tumor antigen. In some embodiments, the administration is repeated once a week or once every two weeks. In some embodiments, the repeated administrations are continued over the course of 15 weeks.

Also disclosed herein are methods of increasing a level of at least one cytokine or chemokine in the cerebrospinal fluid (CSF) of a patient comprising, administering a composition comprising an effective amount of T cells into the CSF of a patient with a malignancy of the central nervous system, wherein the level of at least one cytokine or chemokine in the CSF is increased following administration of the composition comprising an effective amount of T cells compared to a baseline level of the at least one cytokine or chemokine prior to the administration.

In some embodiments of the disclosed methods, the level of the at least one cytokine or chemokine in the CSF following the administration is increased 10-fold or 5-fold compared to the baseline level.

In some embodiments, the level of at least five or at least ten cytokines or chemokines is increased following administration of the composition comprising an effective amount of T cells compared to a baseline level of the at least five cytokines or chemokines prior to the administration. In some embodiments, the at least one cytokine or chemokine comprises EGF, Eotaxin, FGF, G-CSF, GM-CSF, HGF, IFN-α, IFN-γ, IL-10, IL-12, IL-13, IL-15, IL-17, IL-1Rα, IL-1β, IL-2, IL-2R, IL-4, IL-5, IL-6, IL-7, IL-8, IP-10, MCP-1, MIG, MIP-1α, MIP-1β, RANTES, TNF-α, or VEGF. In some embodiments, the increase in cytokine or chemokine expression is a local increase (i.e., specific to the CSF).

Also disclosed herein are methods of sustaining for at least about five days an increased number of T cells, compared to a baseline number, observed in a cerebrospinal fluid (CSF) of a patient diagnosed with a malignancy of a central nervous system, comprising infusing an effective amount of T cells into a CSF of a patient diagnosed with a malignancy of a central nervous system, in which an increased number of T cells observed, compared to a baseline number observed prior to the infusion step, is sustained for at least about five days.

In some embodiments, an effective amount of T cells (or T cells expressing a cell surface receptor that targets the tumor antigen) ranges from about $1 \times 10^6$ cells to about $100 \times 10^6$ cells, and in some embodiments, an effective amount of T cells ranges from about $2 \times 10^6$ cells to about $50 \times 10^6$ cells.

In some embodiments, the increased number of T cells observed is sustained for at least about six days, or the number of T cells observed does not return to the baseline number for about seven days.

In some embodiments, the T cells observed include infused T cells (e.g. CAR-expressing T cells), and in some embodiments, the T cells observed include endogenous T cells.

Also disclosed herein are methods of increasing a number of T cells in the cerebrospinal fluid (CSF) of a patient comprising, administering a composition comprising an effective amount of T cells into the CSF of a patient with a malignancy of the central nervous system, wherein the number of T cells detectable in the CSF is increased compared to pre-administration levels.

In some embodiments, the number of T cells detectable in the CSF is increased compared to pre-administration levels for up to seven days following administration. In some embodiments, the T cells detectable in the CSF comprise endogenous T cells and CAR-expressing T cells, and/or Type 1 T cells, and/or Type 2 T cells.

In some embodiments, the T cells detectable in the CSF comprise CD3+ T cells, and in some embodiments, the T cells detectable in the CSF comprise CD14+ CD11b+ HLA-DR+ mature myeloid populations. In some embodiments, CD19+ B cells and CD11b+ CD15+ granulocytes are detectable in the CSF following administration of the composition.

In some embodiments, reactive lymphocytes, monocytes, and macrophages are detectable in the CSF following administration of the composition.

Also disclosed herein are methods of determining the suitability of a patient with a malignancy for treatment with an IL-13Rα2-specific CAR T cell comprising, determining if a score attributed to a sample from the patient exhibits IL-13Rα2 expression above a predetermined threshold.

In some embodiments, the score attributed to the sample is calculated by determining the immunoreactivity of a resected tumor sample from a patient diagnosed with a malignancy by immunohistochemically staining the sample with a marker of IL-13Rα2, analyzing the strength of the staining, and calculating a score based on the strength of the staining, wherein a score that corresponds to moderate to strong staining intensity in the sample indicates that treatment with an IL-13Rα2-specific CAR T cell is suitable for the patient. In some embodiments, the score comprises counting the number of cells that have a weak, moderate, or strong staining intensity and assigning each intensity a weight (The H score, a method of quantitating immunohistochemical results, is based on the following formula: (3×the percentage of strongly staining cells)+(2×the percentage of moderately staining cells)+(1×the percentage of weakly staining cells), resulting in a range of 0 to 300). In some cases, the patient has a H score that is: greater that 50, 50-100, greater than 100, 100-200, greater than 200, 100-300, or greater than 250 for the relevant tumor-associated antigen. In some embodiments, an expression of Ki67 in the sample is also determined by immunohistochemical staining.

Also disclosed herein are methods of treating a patient with a malignancy comprising, administering to a patient diagnosed with a malignancy a composition comprising an effective dose of IL-13Rα2-specific CAR T cells, wherein the patient expresses IL-13Rα2 above a predetermined threshold.

In some embodiments, the predetermined threshold of IL-13Rα2 expression was previously identified as being suitable for a treatment comprising IL-13Rα2-specific CAR T cell therapy.

TIL are tumor infiltrating lymphocytes that can be isolated from a patient or a donor, expand ex vivo and re-infused into the patient in need thereof.

CAR T cells express chimeric T cell receptors that comprise an extracellular domain, a transmembrane region and an intracellular signaling domain. The extracellular domain includes a portion that binds the targeted cell and, optionally, a spacer, comprising, for example a portion human Fc domain. The transmembrane portion includes suitable transmembrane domain, for example, a CD4 transmembrane domain, a CD8 transmembrane domain, a CD28 transmembrane domain, a CD3 transmembrane domain or a 4IBB transmembrane domain. The intracellular signaling domain includes the signaling domain from the zeta chain of the human CD3 complex (CD3ζ) and one or more costimulatory domains, e.g., a 4-1BB costimulatory domain. The target cell binding portion of extracellular domain (for example a scFv or an ligand) enables the CAR, when expressed on the surface of a T cell, to direct T cell activity to those cells expressing the targeted cell surface molecule, for example HER2 or IL13Rα2, a receptor expressed on the surface of tumor cells, including malignant glioma cells.

A variety of different T cells, for example, patient-specific, autologous T cells, can be engineered to express a TCR or a CAR. Various T cell subsets can be used. In addition, CAR can be expressed in other immune cells such as NK cells. Where a patient is treated with an immune cell expressing a CAR or TCR the cell can be an autologous or allogenic T cell. In some cases, the cells used are CD4+ and CD8+ central memory T cells ($T_{CM}$), which are CD45RO+ CD62L+, and the use of such cells can improve long-term persistence of the cells after adoptive transfer compared to the use of other types of patient-specific T cells. The $T_{CM}$ cells can include CD4+ cells and CD8+ cells.

Among the CAR useful in the methods described herein are those that target IL13Rα2. Such CAR can include IL13 having an amino acid modification, such as an E13Y mutation, that increases binding specificity.

The T cells used in the methods described herein can contain a nucleic acid molecule encoding a chimeric antigen receptor (CAR), wherein the chimeric antigen receptor comprises: human IL-13 or a variant thereof having 1-10 (e.g., 1 or 2) amino acid modifications; a transmembrane domain selected from: a CD4 transmembrane domain or variant thereof having 1-10 (e.g., 1 or 2) amino acid modifications, a CD8 transmembrane domain or variant thereof having 1-10 (e.g., 1 or 2) amino acid modifications, a CD28 transmembrane domain or a variant thereof having 1-10 (e.g., 1 or 2) amino acid modifications, and a CD3 transmembrane domain or a variant thereof having 1-10 (e.g., 1 or 2) amino acid modifications; a costimulatory domain; and CD3 ζ signaling domain of a variant thereof having 1-10 (e.g., 1 or 2) amino acid modifications.

The inclusion of a costimulatory domain, such as the 4-1BB (CD137) or CD28 costimulatory domain in series with CD3ζ in the intracellular region enables the T cell to receive co-stimulatory signals. Thus, in various embodiments, the costimulatory domain is selected from the group consisting of: a CD28 costimulatory domain or a variant thereof having 1-10 (e.g., 1 or 2) amino acid modifications, a 4-1BB costimulatory domain or a variant thereof having 1-10 (e.g., 1 or 2) amino acid modifications and an OX40 costimulatory domain or a variant thereof having 1-10 (e.g., 1 or 2) amino acid modifications. In certain embodiments, a 4IBB costimulatory domain or a variant thereof having 1-10 (e.g., 1 or 2) amino acid modifications is present.

In additional embodiments of the methods, the CAR expressed by the T cells comprises: a variant of a human IL13 having 1-10 amino acid modification that increase binding specificity for IL13Rα2 versus IL13Rα1; the human IL-13 or variant thereof is an IL-13 variant comprising the amino acid sequence of SEQ ID NO:3 with 1 to 5 amino acid modifications, provided that the amino acid at position 11 of SEQ ID NO:3 other than E; two different costimulatory domains selected from the group consisting of: a CD28 costimulatory domain or a variant thereof having 1-10 (e.g., 1 or 2) amino acid modifications, a 4IBB costimulatory domain or a variant thereof having 1-10 (e.g., 1 or 2) amino acid modifications and an OX40 costimulatory domain or a variant thereof having 1-10 (e.g., 1 or 2) amino acid modifications; two different costimulatory domains selected from the group consisting of: a CD28 costimulatory domain or a variant thereof having 1-2 amino acid modifications, a 4IBB costimulatory domain or a variant thereof having 1-2 amino acid modifications and an OX40 costimulatory domain or a variant thereof having 1-2 amino acid modifications; human IL-13 or a variant thereof having 1-2 amino acid modifications; a transmembrane domain selected from: a CD4 transmembrane domain or variant thereof having 1-2 amino acid modifications, a CD8 transmembrane domain or variant thereof having 1-2 amino acid modifications, a CD28 transmembrane domain or a variant thereof having 1-2 amino acid modifications, and a CD3 transmembrane domain or a variant thereof having 1-2 amino acid modifications; a costimulatory domain; and CD32 signaling domain of a variant thereof having 1-2 amino acid modifications; a spacer region located between the IL-13 or variant thereof and the transmembrane domain (e.g., the spacer region comprises an amino acid sequence selected from the group consisting of SEQ ID NO: 4, 14-20, 50 and 52); the spacer comprises an IgG hinge region; the spacer region comprises 10-150 amino acids; the 4-1BB signaling domain comprises the amino acid sequence of SEQ ID NO:6; the CD3ζ signaling domain comprises the amino acid sequence of SEQ ID NO:7; and a linker of 3 to 15 amino acids that is located between the costimulatory domain and the CD3ζ signaling domain or variant thereof. In certain embodiments where there are two costimulatory domains, one is an 4-IBB costimulatory domain and the other a costimulatory domain selected from: CD28 and CD28gg In some embodiments of the methods described herein the T cells harbor a nucleic acid molecule that expresses a polypeptide comprising an amino acid sequence selected from SEQ ID NOs: 10 and 31-48; the chimeric antigen receptor comprises a IL-13/IgG4/CD4t/41-BB region comprising the amino acid of SEQ ID NO:11 and a CD3 ζ signaling domain comprising the amino acid sequence of SEQ ID NO:7; and the chimeric antigen receptor comprises the amino acid sequence of SEQ ID NOs: 10 and 31-48.

Also disclosed are methods comprising intraventricular administration of a population of human T cells transduced by a vector comprising an expression cassette encoding a chimeric antigen receptor, wherein chimeric antigen receptor comprises: human IL-13 or a variant thereof having 1-10 amino acid modifications; a transmembrane domain selected from: a CD4 transmembrane domain or variant thereof having 1-10 amino acid modifications, a CD8 transmembrane domain or variant thereof having 1-10 amino acid modifications, a CD28 transmembrane domain or a variant thereof having 1-10 amino acid modifications, and a CD3ζ transmembrane domain or a variant thereof having 1-10 amino acid modifications; a costimulatory domain; and CD3 ζ signaling domain of a variant thereof having 1-10 amino acid modifications. In various embodiments: the population of human T cells comprise a vector expressing a chimeric antigen receptor comprising an amino acid sequence selected from SEQ ID NOs: 10 and 31-48; the population of human T cells are comprises of central memory T cells ($T_{CM}$ cells) (e.g., at least 20%, 30%, 40%, 50% 60%, 70%, 80% of the cells are $T_{CM}$ cells; at least 10%, 15%, 20%, 25%, 30% or 35% of the T cells or the $T_{CM}$ cells are CD4+ and at least 10%, 15%, 20%, 25%, 30% or 35% of the T cells or the $T_{CM}$ cells are CD8+ cells).

Also described is a method of treating cancer in a patient comprising CNSadministration of a population of autologous or allogeneic human T cells (e.g., autologous or allogeneic T cells comprising $T_{CM}$ cells, e.g., at least 20%, 30%, 40%, 50% 60%, 70%, 80% of the cells are $T_{CM}$ cells; at least 15%, 20%, 25%, 30%, 35% of the $T_{CM}$ cells are CD4+ and at least 15%, 20%, 25%, 30%, 35% of the $T_{CM}$ cells are CD8+ cells) transduced by a vector comprising an expression cassette encoding a chimeric antigen receptor, wherein chimeric antigen receptor comprises an amino acid sequence selected from SEQ ID NOs: 10 and 31-48. In various embodiments: the population of human T cells comprise central memory T cells; the cancer is glioblastoma; and the transduced human T cells where prepared by a method comprising obtaining T cells from the patient, treating the T cells to isolate central memory T cells, and transducing at least a portion of the central memory cells to with a viral vector comprising an expression cassette encoding a chimeric antigen receptor, wherein chimeric antigen receptor comprises an amino acid sequence selected from SEQ ID NOs: 10 and 31-48.

Also described are method is which the T cells administered to the patient harbor a nucleic acid molecule encoding an polypeptide comprising an amino acid sequence that is at least 95% identical to an amino acid sequence selected from and SEQ ID NOs: 10 and 31-48; a nucleic acid molecule encoding an polypeptide comprising an amino acid sequence that is identical to an amino acid sequence selected from SEQ ID NO: 10 and 31-48 except for the presence of no more than 5 amino acid substitutions, deletions or insertions; a nucleic acid molecule encoding an polypeptide comprising an amino acid sequence that is identical to an amino acid sequence selected from SEQ ID NO:10 and SEQ ID NOs: 10 and 31-48 except for the presence of no more than 5 amino acid substitutions; and a nucleic acid molecule encoding an polypeptide comprising an amino acid sequence that is identical to an amino acid sequence selected from SEQ ID NO:10 and SEQ ID NOs: 10 and 31-48 except for the presence of no more than 2 amino acid substitutions.

Described herein are method for treating a patient by CSF administration of T cells harboring a nucleic acid molecule encoding a chimeric antigen receptor (CAR), wherein the chimeric antigen receptor comprises an scFv targeted to HER2 (e.g., comprises the amino acid sequence DIQMTQSPSSLSASVGDRVTITCRASQDVNTAVAWY QQKPGKAPKLLIYSASFLYSGVP SRFSGSRSGTD FTLTISSLQPEDFATYYCQQHYTTPPTFGQGTK VEIKGSTSGGGSGGGSG GGGSSEVQLVESGG-GLVQPGGSLRLSCAASGFNIKDTYIHWVRQAPGK-GLEWVARIYPT NGYTRYADSVKGRFTISADTSKN-TAYLQMNSLRAEDTAVYYCSRWGGDGFYAMDYW GQGTLVTVSS; SEQ ID NO: 49) or a variant thereof having 1-10 (e.g., 1 or 2) amino acid modifications; a spacer region; a transmembrane domain selected from: a CD4 transmembrane domain or variant thereof having 1-10 (e.g., 1 or 2) amino acid modifications, a CD8 transmembrane domain or variant thereof having 1-10 (e.g., 1 or 2) amino acid modifications, a CD28 transmembrane domain or a variant thereof having 1-10 (e.g., 1 or 2) amino acid modifications, and a CD3ζ transmembrane domain or a variant thereof having 1-10 (e.g., 1 or 2) amino acid modifications; a costimulatory domain; and CD3 ζ signaling domain of a variant thereof having 1-10 (e.g., 1 or 2) amino acid modifications.

In various embodiments the costimulatory domain is selected from the group consisting of: a CD28 costimulatory domain or a variant thereof having 1-10 (e.g., 1 or 2) amino acid modifications, a 4-IBB costimulatory domain or a variant thereof having 1-10 (e.g., 1 or 2) amino acid modifications and an OX40 costimulatory domain or a variant thereof having 1-10 (e.g., 1 or 2) amino acid modifications. In certain embodiments, a 4IBB costimulatory domain or a variant thereof having 1-10 (e.g., 1 or 2) amino acid modifications in present.

In additional embodiments T cells administered to the patient express a CAR that comprises: an scFv targeted to HER2 (e.g., a humanized scFv); two different costimulatory domains selected from the group consisting of: a CD28 costimulatory domain or a variant thereof having 1-10 (e.g., 1 or 2) amino acid modifications, a 4IBB costimulatory domain or a variant thereof having 1-10 (e.g., 1 or 2) amino acid modifications and an OX40 costimulatory domain or a variant thereof having 1-10 (e.g., 1 or 2) amino acid modifications; two different costimulatory domains selected from the group consisting of: a CD28 costimulatory domain or a variant thereof having 1-2 amino acid modifications, a 4IBB costimulatory domain or a variant thereof having 1-2 amino acid modifications and an OX40 costimulatory domain or a variant thereof having 1-2 amino acid modifications; human IL-13 or a variant thereof having 1-2 amino acid modifications; a transmembrane domain selected from: a CD4 transmembrane domain or variant thereof having 1-2 amino acid modifications, a CD8 transmembrane domain or variant thereof having 1-2 amino acid modifications, a CD28 transmembrane domain or a variant thereof having 1-2 amino acid modifications, and a CD3ζ transmembrane domain or a variant thereof having 1-2 amino acid modifications; a costimulatory domain; and CD32 signaling domain of a variant thereof having 1-2 amino acid modifications; a spacer region located between the IL-13 or variant thereof and the transmembrane domain (e.g., the spacer region comprises an amino acid sequence selected from the group consisting of SEQ ID NO: 4, 14-20, 50 and 52); the spacer comprises an IgG hinge region; the spacer region comprises 10-150 amino acids; the 4-1BB signaling domain comprises the amino acid sequence of SEQ ID NO:6; the CD3ζ signaling domain comprises the amino acid sequence of SEQ ID NO:7; and a linker of 3 to 15 amino acids that is located between the costimulatory domain and the CD3 ζ signaling domain or variant thereof. In certain embodiments where there are two costimulatory domains, one is an 4-IBB costimulatory domain and the other a costimulatory domain selected from: CD28 and CD28gg In some embodiments the T cells administered the patient harbor a nucleic acid molecule that expresses a polypeptide comprising an amino acid sequence selected from SEQ ID NOs: 53-56.

Also disclosed are methods comprising intraventricular administration of a population of human T cells transduced by a vector comprising an expression cassette encoding a chimeric antigen receptor comprising: an scFv targeted to HER2; a transmembrane domain selected from: a CD4 transmembrane domain or variant thereof having 1-10 amino acid modifications, a CD8 transmembrane domain or variant thereof having 1-10 amino acid modifications, a CD28 transmembrane domain or a variant thereof having 1-10 amino acid modifications, and a CD3ζ transmembrane domain or a variant thereof having 1-10 amino acid modifications; a costimulatory domain; and CD3 ζ signaling domain of a variant thereof having 1-10 amino acid modifications. In various embodiments: the population of human T cells comprise a vector expressing a chimeric antigen receptor comprising an amino acid sequence selected from: SEQ ID NOs: 53-56; the population of human T cells are comprises of central memory T cells ($T_{CM}$ cells) (e.g., at least 20%, 30%, 40%, 50% 60%, 70%, 80% of the cells are $T_{CM}$ cells; at least 10%, 15%, 20%, 25%, 30%, 35% of the T cells or $T_{CM}$ cells are CD4+ and/or at least 10%, 15%, 20%, 25%, 30%, 35% of the T cells or $T_{CM}$ cells are CD8+ cells).

Also described is a method of treating cancer in a patient comprising intraventricular administration of a population of autologous or allogeneic human T cells (e.g., autologous or allogenic T cells comprising $T_{CM}$ cells, e.g., at least 20%, 30%, 40%, 50% 60%, 70%, 80% of the cells are $T_{CM}$ cells; at least 15%, 20%, 25%, 30%, 35% of the $T_{CM}$ cells are CD4+ and/or at least 15%, 20%, 25%, 30%, 35% of the $T_{CM}$ cells are CD8+ cells) transduced by a vector comprising an expression cassette encoding a chimeric antigen receptor, wherein chimeric antigen receptor comprises an amino acid sequence selected from SEQ ID NOs: 53-56. In various embodiments: the population of human T cells comprise central memory T cells; the cancer is glioblastoma; and the transduced human T cells where prepared by a method comprising obtaining T cells from the patient, treating the T cells to isolate central memory T cells, and transducing at least a portion of the central memory cells to with a viral vector comprising an expression cassette encoding a chimeric antigen receptor, wherein chimeric antigen receptor comprises an amino acid sequence selected from SEQ ID NOs: 53-56.

Also described is a method of treating cancer in a patient comprising intraventricular administration of a population of autologous or allogeneic human T cells (e.g., autologous or allogenic T cells comprising $T_{CM}$ cells harboring: a nucleic acid molecule encoding an polypeptide comprising an amino acid sequence that is at least 95% identical to an amino acid sequence selected from SEQ ID NOs: 53-56; a nucleic acid molecule encoding an polypeptide comprising an amino acid sequence that is identical to an amino acid sequence selected from SEQ ID NOs: 53-56 except for the presence of no more than 5 amino acid substitutions, deletions or insertions; a nucleic acid molecule encoding an polypeptide comprising an amino acid sequence that is identical to an amino acid sequence selected from SEQ ID NOs: 53-56 except for the presence of no more than 5 amino acid substitutions; and a nucleic acid molecule encoding an polypeptide comprising an amino acid sequence that is identical to an amino acid sequence selected from SEQ ID NOs: 53-56, except for the presence of no more than 2 amino acid substitutions.

Certain CAR described herein, for example, the IL13(EQ) BBζ CAR and the IL13 (EQ) CD28-BBζ CAR, have certain beneficial characteristics compared to certain other IL13-targeted CAR. For example, they have improved selectivity for IL13Rα, elicit lower Th2 cytokine production, particularly lower IL13 production.

T cells expressing a CAR targeting IL13Rα2 can be useful in treatment of cancers such as glioblastoma, as well as other cancers that expresses IL13Rα2. Thus, this disclosure includes methods for treating cancer using T cells expressing a CAR described herein.

T cells expressing a CAR targeting HER2 can be useful in treatment of cancers such as glioblastoma, as well as other cancer that expresses HER2, for example breast cancer that has spread to the central nervous system. Thus, this disclosure includes methods for treating cancer using T cells expressing a CAR described herein.

The CAR described herein can include a spacer region located between the targeting domain and the transmembrane domain. A variety of different spacers can be used. Some of them include at least portion of a human Fc region, for example a hinge portion of a human Fc region or a CH3 domain or variants thereof. Table 1 below provides various spacers that can be used in the CARs described herein.

TABLE 1

Examples of Spacers

| Name | Length | Sequence |
|---|---|---|
| a3 | 3 aa | AAA |
| linker | 10 aa | GGGSSGGGSG (SEQ ID NO: 14) |
| IgG4 hinge (S→P) (S228P) | 12 aa | ESKYGPPCPPCP (SEQ ID NO: 15) |
| IgG4 hinge | 12 aa | ESKYGPPCPSCP (SEQ ID NO: 52) |
| IgG4 hinge + linker | 22 aa | ESKYGPPCPPCPGGGSSGGGSG (SEQ ID NO: 16) |
| CD28 hinge | 39 aa | IEVMYPPPYLDNEKSNGTIIHVKGKHLCPSPLFPGPSKP (SEQ ID NO: 17) |
| CD8 hinge-48 aa | 48 aa | AKPTTTPAPRPPTPAPTIASQPLSLRPEACRPAAGGAVHTRGLDFACD (SEQ ID NO: 18) |
| CD8 hinge-45 aa | 45 aa | TTTPAPRPPTPAPTIASQPLSLRPEACRPAAGGAVHTRGLDFACD (SEQ ID NO: 19) |
| IgG4(HL-CH3) | 129 aa | ESKYGPPCPPCPGGGSSGGGSGGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO: 20) |
| IgG4(L235E, N297Q) | 229 aa | ESKYGPPCPSCPAPEFEGGPSVFLFPPKPKDTLMISRTPEVTCVVVDVSQEDPEVQFNWYVDGVEVHQAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO: 4) |
| IgG4(S228P, L235E, N297Q) | 229 aa | ESKYGPPCPPCPAPEFEGGPSVFLFPPKPKDTLMISRTPEVTCVVVDVSQEDPEVQFNWYVDGVEVHQAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO: 51) |

TABLE 1-continued

Examples of Spacers

| Name | Length | Sequence |
|---|---|---|
| IgG4(CH3) | 107 aa | GQPREPQVYTLPPSQEEMTKNQVSLTCLVKGFYPS DIAVEWESNGQPENNYKTTPPVLDSDGSFFLYSRLT VDKSRWQEGNVFSCSVMHEALHNHYTQKSLSLSL GK (SEQ ID NO: 50) |

Some spacer regions include all or part of an immunoglobulin (e.g., IgG1, IgG2, IgG3, IgG4) hinge region, i.e., the sequence that falls between the CH1 and CH2 domains of an immunoglobulin, e.g., an IgG4 Fc hinge or a CD8 hinge. Some spacer regions include an immunoglobulin CH3 domain or both a CH3 domain and a CH2 domain. The immunoglobulin derived sequences can include one ore more amino acid modifications, for example, 1, 2, 3, 4 or 5 substitutions, e.g., substitutions that reduce off-target binding.

An "amino acid modification" refers to an amino acid substitution, insertion, and/or deletion in a protein or peptide sequence. An "amino acid substitution" or "substitution" refers to replacement of an amino acid at a particular position in a parent peptide or protein sequence with another amino acid. A substitution can be made to change an amino acid in the resulting protein in a non-conservative manner (i.e., by changing the codon from an amino acid belonging to a grouping of amino acids having a particular size or characteristic to an amino acid belonging to another grouping) or in a conservative manner (i.e., by changing the codon from an amino acid belonging to a grouping of amino acids having a particular size or characteristic to an amino acid belonging to the same grouping). Such a conservative change generally leads to less change in the structure and function of the resulting protein. The following are examples of various groupings of amino acids: 1) Amino acids with nonpolar R groups: Alanine, Valine, Leucine, Isoleucine, Proline, Phenylalanine, Tryptophan, Methionine; 2) Amino acids with uncharged polar R groups: Glycine, Serine, Threonine, Cysteine, Tyrosine, Asparagine, Glutamine; 3) Amino acids with charged polar R groups (negatively charged at pH 6.0): Aspartic acid, Glutamic acid; 4) Basic amino acids (positively charged at pH 6.0): Lysine, Arginine, Histidine (at pH 6.0). Another grouping may be those amino acids with phenyl groups: Phenylalanine, Tryptophan, and Tyrosine.

A variety of transmembrane domains can be used in CAR expressed by the cells used in the methods described herein. Table 2 includes examples of suitable transmembrane domains. Where a spacer region is present, the transmembrane domain is located carboxy terminal to the spacer region.

TABLE 2

Examples of Transmembrane Domains

| Name | Accession | Length | Sequence |
|---|---|---|---|
| CD3z | J04132.1 | 21 aa | LCYLLDGILFIYGVILTALFL (SEQ ID NO: 21) |
| CD28 | NM_006139 | 27 aa | FWVLVVVGGVLACYSLLVTVAFII FWV (SEQ ID NO: 22) |
| CD28(M) | NM_006139 | 28 aa | MFWVLVVVGGVLACYSLLVTVAFI IFWV (SEQ ID NO: 22) |
| CD4 | M35160 | 22 aa | MALIVLGGVAGLLLFIGLGIFF (SEQ ID NO: 5) |
| CD8tm | NM_001768 | 21 aa | IYIWAPLAGTCGVLLLSLVIT (SEQ ID NO: 23) |
| CD8tm2 | NM_001768 | 23 aa | IYIWAPLAGTCGVLLLSLVITLY (SEQ ID NO: 24) |
| CD8tm3 | NM_001768 | 24 aa | IYIWAPLAGTCGVLLLSLVITLYC (SEQ ID NO: 25) |
| 41BB | NM_001561 | 27 aa | IISFFLALTSTALLFLLFF LTLRFSVV (SEQ ID NO: 26) |

Many of the CAR expressed by the cells used in the methods described herein include one or more (e.g., two) costimulatory domains. The costimulatory domain(s) are located between the transmembrane domain and the CD3ζ signaling domain. Table 3 includes examples of suitable costimulatory domains together with the sequence of the CD3ζ signaling domain.

TABLE 3

Examples of Costimulatory Domains

| Name | Accession | Length | Sequence |
|---|---|---|---|
| CD3ζ | J04132.1 | 113 aa | RVKFSRSADAPAYQQGQNQLYNELNLGRREEYD VLDKRRGRDPEMGGKPRRKNPQEGLYNELQKDK MAEAYSEIGMKGERRRGKGHDGLYQGLSTATKD TYDALHMQALPPR |
| CD28 | NM_006139 | 42 aa | RSKRSRLLHSDYMNMTPRRPGPTRKHYQPYAPPR DFAAYRS (SEQ ID NO: 27) |
| CD28gg* | NM_006139 | 42 aa | RSKRSRGGHSDYMNMTPRRPGPTRKHYQPYAPP RDFAAYRS (SEQ ID NO: 28) |

TABLE 3-continued

Examples of Costimulatory Domains

| Name | Accession | Length | Sequence |
|------|-----------|--------|----------|
| 41BB | NM_001561 | 42 aa | KRGRKKLLYIFKQPFMRPVQTTQEEDGCSCRFPEE EEGGCEL (SEQ ID NO: 29) |
| OX40 | | 42 aa | ALYLLRRDQRLPPDAHKPPGGGSFRTPIQEEQADA HSTLAKI (SEQ ID NO: 30) |

DESCRIPTION OF DRAWINGS

FIGS. 6A-C depicts the results of flow cytometric analysis of surface transgene and T cell marker expression. IL13 (EQ)BBζ/CD19t+ T$_{CM}$ HD006.5 and HD187.1 were co-stained with anti-IL13-PE and anti-CD8-FITC to detect CD8+ CAR+ and CD4+ (i.e., CD8 negative) CAR+ cells (A), or anti-CD19-PE and anti-CD4-FITC to detect CD4+ CD19t+ and CD8+ (i.e., CD4 negative) CAR+ cells (B). IL13 (EQ)BBζ/CD19t+ T$_{CM}$ HD006.5 and HD187.1 stained with fluorochromeconjugatedanti-CD3, TCR, CD4, CD8, CD62L and CD28 (grey histograms) or isotype controls (black histograms) (C). In all cases the percentages based on viable lymphocytes (DAPI negative) stained above isotype.

FIG. 9A-9B depict the amino acid sequence of IL13 (EQ)BBζ/CD19t+ (SEQ ID NO:10).

FIG. 10A-10O depicts a sequence comparison of IL13 (EQ)41BBζ[IL13{EQ}41BBζT2A-CD19t_epHIV7; pF02630] (SEQ ID NO:12) and CD19Rop_epHIV7 (pJ01683) (SEQ ID NO: 13).

FIG. 11 depicts the amino acid sequence of IL13(EmY)-CD8h3-CD8tm2-41BB Zeta (SEQ ID NO:31 with GMCSFRa signal peptide; SEQ ID NO:39 without GMCSFRa signal peptide).

FIG. 12 depicts the amino acid sequence of IL13(EmY)-CD8h3-CD28tm-CD28gg-41BB-Zeta (SEQ ID NO:32 with GMCSFRa signal peptide; SEQ ID NO:40 without GMSCFRa signal peptide).

FIG. 13 depicts the amino acid sequence of IL13(EmY)-IgG4 (HL-CH3)-CD4tm-41BB-Zeta (SEQ ID NO:33 with GMCSFRa signal peptide; SEQ ID NO:41 without GMCSFRa signal peptide).

FIG. 14 depicts the amino acid sequence of IL13(EmY)-IgG4 (L235E,N297Q)-CD8tm-41BB-Zeta (SEQ ID NO:34 with GMCSFRa signal peptide; SEQ ID NO:42 without GMSCFRa signal peptide).

FIG. 15 depicts the amino acid sequence of IL13(EmY)-Linker-CD28tm-CD28gg-41BB-Zeta (SEQ ID NO:35 with GMCSFRa signal peptide; SEQ ID NO:43 without GMCSFRa signal peptide).

FIG. 16 depicts the amino acid sequence of IL13(EmY)-HL-CD28m-CD28gg-41BB-Zeta (SEQ ID NO:36 with GMCSFRa signal peptide; SEQ ID NO:44 without GMSCFRa signal peptide).

FIG. 17 depicts the amino acid sequence of IL13(EmY)-IgG4 (HL-CH3)-CD28tm-CD28gg-41BB-Zeta (SEQ ID NO:37 with GMSCFRa signal peptide; SEQ ID NO:45 without GMCSFRa signal peptide).

FIG. 18 depicts the amino acid sequence of IL13(EmY) IgG4 (L235E,N297Q)-CD28tm-CD28gg-41BB-Zeta (SEQ ID NO:38 with GMCSFRa signal peptide; SEQ ID NO:46 without GMCSFRa signal peptide).

FIG. 19 depicts the amino acid sequence of IL13(EmY)-CD8h3-CD8tm-41BB Zeta (SEQ ID NO:47 with GMCSFRa signal peptide; SEQ ID NO:48 without GMCSFRa signal peptide).

FIG. 20 depicts the amino acid sequence of Her2scFv-IgG4 (L235E, N297Q)-CD28tm-CD28gg-Zeta-T2A-CD19t (SEQ ID NO: 53). The various domains are listed in order below the sequence and are indicated by alternating underlining and non-underlining. The mature CAR sequence (SEQ ID NO: 54) does not include the GMCSFRa signal peptide, the T2A skip sequence or truncated CD19.

FIG. 21 depicts the amino acid sequence of Her2scFv-IgG4 (L235E,N297Q)-CD8tm-41BB-Zeta-T2A-CD19t (SEQ ID NO: 55). The various domains are listed in order below the sequence and are indicated by alternating underlining and non-underlining. The mature CAR sequence (SEQ ID NO: 56) does not include the GMCSFRa signal peptide, the T2A skip sequence or truncated CD19.

FIGS. 22A-D depict HER2-specific CAR constructs and CAR T cell expansion data.

FIGS. 23A-D depict in vitro characterization of HER2-CAR T cells against breast cancer cell lines.

FIGS. 25A-I depict the result of studies on the in vivo anti-tumor efficacy of local intratumorally-delivered HER2-CAR T cells.

FIGS. 27A-D depict the results of studies on intraventricular delivery of HER2-CAR T cells.

FIG. 28 schematically depicts the locations of tumor cell injection and CAR T cell injection for a study of intratumoral and intraventricular injection of CAR T cells targeting IL13α2R in a murine model of glioblastoma.

FIGS. 29A-C depict the results of studies demonstrating regression of established glioma tumor xenografts after administration of IL13 (EQ)BBζ/CD19t+ $T_{CM}$. ffLuc$^+$ PBT030-2 tumor cells (1×10$^5$) were stereotactically implanted into the right and left forebrains of NSG mice. On day 6, mice were injected either ict or icv with 1×10$^6$ IL13 (EQ)BBζ+ Tcm (1.6×10$^6$ total cells; 63% CAR+) as described in FIG. 4.1 above. A, Representative mice from each group showing relative tumor burden using Xenogen Living Image. B, Average Xenogen flux of left and right brain hemispheres (region of interest, ROI) from the mice (n=4-5) of each group, where each successive bar represents day 5, 9, 12, 15, and 19, respectively. *, p<0.05 when compared to the respective ROI and day/bar of the untreated PBT030-2 group using an unpaired Student's t-test. C, Average Xenogen flux of the whole brain 13 days after T cell injection. *, p=0.0407 when comparing icv group to untreated PBT030-2 group using the unpaired Student's t-test. These data are representative of three separate multifocal GBM experiments.

FIGS. 37A-C shows immunohistochemistry of primary and recurrent tumors. Tumor resected at initial diagnosis (A), and recurrent tumor (T1) resected at time of Rickham placement under NCT02208362 (B, C). Immunochemical staining using either IL13Rα2-specific or Ki67-specific DAB with hematoxylin counterstain are depicted, with red boxes outlining the successive magnified images going left to right.

FIGS. 38A-B shows tumor lesion identification. (A) Identifying characteristics of GBM lesions T1-T8. (B) Brain MRI scans depicting the sites of T1-T7.

DETAILED DESCRIPTION

Figure 1:
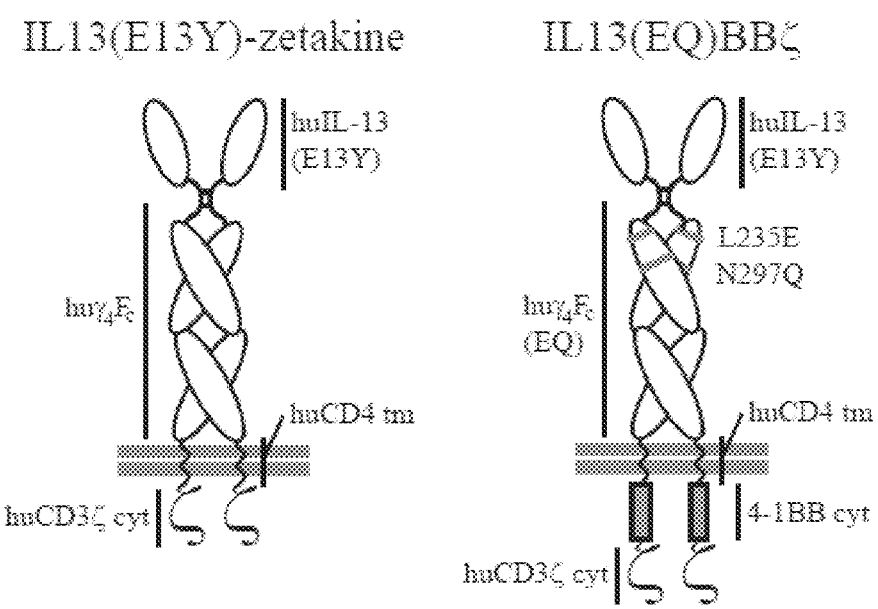
FIG. 1 is a schematic depiction of IL13 (E13Y)-zetakine CAR (Left) composed of the IL13Rα2-specific human IL-13 variant (huIL-13 (E13Y)), human IgG4 Fc spacer (hu$\gamma_4$F$_c$), human CD4 transmembrane (huCD4 tm), and human CD3ζ chain cytoplasmic (huCD3ζ cyt) portions as indicated. Also depicted is a IL13(EQ)BBζ CAR which is the same as the IL13 (E13Y)-zetakine with the exception of the two point mutations, L235E and N297Q indicated in red, that are located in the CH2 domain of the IgG4 spacer, and the addition of a costimulatory 4-1BB cytoplasmic domain (4-1BB cyt).

Described below is the structure, construction and characterization of various CAR T cells and their use in treating cancers of the central nervous system. A chimeric antigen (CAR) is a recombinant biomolecule that contains, at a minimum, an extracellular recognition domain, a transmembrane region, and an intracellular signaling domain. The term "antigen," therefore, is not limited to molecules that bind antibodies, but to any molecule that can bind specifically to a target. For example, a CAR can include a ligand that specifically binds a cell surface receptor. The extracellular recognition domain (also referred to as the extracellular domain or simply by the recognition element which it contains) comprises a recognition element that specifically binds to a molecule present on the cell surface of a target cell. The transmembrane region anchors the CAR in the membrane. The intracellular signaling domain comprises the signaling domain from the zeta chain of the human CD3 complex and optionally comprises one or more costimulatory signaling domains. CARs can both to bind antigen and transduce T cell activation, independent of MHC restriction. Thus, CARs are "universal" immunoreceptors which can treat a population of patients with antigen-positive tumors irrespective of their HLA genotype. Adoptive immunotherapy using T lymphocytes that express a tumor-specific CAR can be a powerful therapeutic strategy for the treatment of cancer.

In some cases the CAR described herein can be produced using a vector in which the CAR open reading frame is followed by a T2A ribosome skip sequence and a truncated CD19 (CD19t), which lacks the cytoplasmic signaling tail (truncated at amino acid 323). In this arrangement, co-expression of CD19t provides an inert, non-immunogenic surface marker that allows for accurate measurement of gene modified cells, and enables positive selection of gene-modified cells, as well as efficient cell tracking and/or imaging of the therapeutic T cells in vivo following adoptive transfer. Co-expression of CD19t provides a marker for immunological targeting of the transduced cells in vivo using clinically available antibodies and/or immunotoxin reagents to selectively delete the therapeutic cells, and thereby functioning as a suicide switch.

The disclosed methods of treatment using CAR T cells can be performed at various doses and across various timeframes. For example, a patient receiving an infusion, administration, or injection of CAR T cells (e.g. IL-13Rα2-specific CAR T cells) may receive a single dose comprising between $1\times10^6$ and $15\times10^6$ cells. In other words, a single dose for use in the disclosed methods can comprise $1\times10^6$, $2\times10^6$, $3\times10^6$, $4\times10^6$, $5\times10^6$, $6\times10^6$, $7\times10^6$, $8\times10^6$, $9\times10^6$, $10\times10^6$, $11\times10^6$, $12\times10^6$, $13\times10^6$, $14\times10^6$, or $15\times10^6$ cells. Over the entire course of treatment, a patient may receive a cumulative or total dose of cells between $20\times10^6$ and $150\times10^6$ T cells. For instance, the patient may receive about $20\times10^6$, about $25\times10^6$, about $30\times10^6$, about $35\times10^6$, about $40\times10^6$, about $45\times10^6$, about $50\times10^6$, about $55\times10^6$, about $60\times10^6$, about $65\times10^6$, about $70\times10^6$, about $75\times10^6$, about $80\times10^6$, about $85\times10^6$, about $90\times10^6$, about $95\times10^6$, about $100\times10^6$, about $105\times10^6$, about $110\times10^6$, about $115\times10^6$, about $120\times10^6$, about $125\times10^6$, about $130\times10^6$, about $135\times10^6$, about $140\times10^6$, about $145\times10^6$, or about $150\times10^6$ or more T cells over the course of treatment. In some embodiments, a patient can receive a total dose of at least $90\times10^6$ T cells. In one embodiment, a patient can receive a total dose of $94\times10^6$ T cells.

Furthermore, the doses may be administered according to different regimens and timetables. For example, the disclosed methods can comprise an infusion, administration, or injection once a day, once every two days, once every three days, once every four days, once every five days, once every six days, a week, once every two weeks, once every three weeks, once every four weeks, once a month, once every other month, once every three months, or once every six months. In some embodiments, the disclosed methods can comprise continuous infusion, for instance, from a wearable pump. Similarly, the total time course of treatment may be about 5 weeks, about 10 weeks, about 15 weeks, about 20 weeks, about 25 weeks, about 30 weeks, about 35 weeks, about 40 weeks, about 45 weeks, about 50 weeks, about 55 weeks, about 60 weeks, about 65 weeks, about 70 weeks, about 75 weeks, or more. The patient may receive 1, 2, 3, 4, 5, 6, 7, 8, 9, 10, 11, 12, 13, 14, 15, 16, 17, 18, 19, or 20 or more infusions, administrations, or injections of T cells over the course of treatment according to the disclosed methods. For example, in one embodiment, a patient can receive 11 infusions of T cells over the course of 15 weeks.

Treating cancer, and more specifically gliomas like glioblastoma, according to the disclosed methods can result in numerous therapeutic effects. For instance, treatment with the disclosed CAR T cells can result in an increase in the level of cytokines and chemokines in the CSF of a patient being treated according to the disclosed methods. Cytokine and/or chemokine expression may increase by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 99%, or at least 100%, or cytokine and/or chemokine expression may increase by at least 1-fold, at least 2-fold, at least 3-fold, at least 4-fold, at least 5-fold, at least 6-fold, at least 7-fold, at least 8-fold, at least 9-fold, or at least 10-fold compared to baseline levels, as measured prior to treatment with a composition comprising CAR T cells. This increase in expression may be observed for 1, 2, 3, 4, 5, 6, 7, 8, 9, 10, 11, 12, 13, 14, or 15 or more cytokines or chemokines.

In particular, the expression of at least one of EGF, Eotaxin, FGF, G-CSF, GM-CSF, HGF, IFN-α, IFN-γ, IL-10, IL-12, IL-13, IL-15, IL-17, IL-1Rα, IL-1β, IL-2, IL-2R, IL-4, IL-5, IL-6, IL-7, IL-8, IP-10, MCP-1, MIG, MIP-1α, MIP-1β, RANTES, TNF-α, and VEGF may increase as a result of treatment with CAR T cells as disclosed herein. Furthermore, the increase in cytokine and/or chemokine expression may be local (i.e. the increase is only observable in the CNS and CFS, while serum levels of cytokines and chemokines remain unchanged.

Treatment according to the disclosed methods may also result in an increase in T cells detectable in the CSF. While at least some of the T cells detectable in the CSF following treatment will likely be CAR-expressing T cells, there may also be an increase in endogenous T cells that are recruited to the CSF. Although not wanting to be bound by theory, the increase in endogenous T cells may be a result of the recruitment of Type 1 and Type 2 T helper cells due to the increase in local cytokine levels. Additionally, the detectable T cells can comprise CD3+ T cells, as well as CD14+ CD11b+ HLA-DR+ mature myeloid populations, CD19+ B cells and CD11b+ CD15+ granulocytes, and/or reactive lymphocytes, monocytes, and macrophages.

The increase in the number of T cells in the CSF may be detectable for a specific period of time following treatment according to the disclosed methods. A detectable increase in T cells in the CSF may persist or be sustained for 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 or more days following administration of a composition comprising T cells. For example, an increase in the number of T cells observed in the CSF may not return to baseline levels (i.e. the number of T cells detectable prior to treatment) for about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days. The number of T cells detectable in the CSF may increase by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 99%, or at least 100%, or by at least 1-fold, at least 2-fold, at least 3-fold, at least 4-fold, at least 5-fold, at least 6-fold, at least 7-fold, at least 8-fold, at least 9-fold, at least 10-fold, at least 11-fold, at least 12-fold, at least 13-fold, at least 14-fold, or at least 15-fold compared to baseline levels, as measured prior to treatment with a composition comprising CAR T cells.

Figure 31:
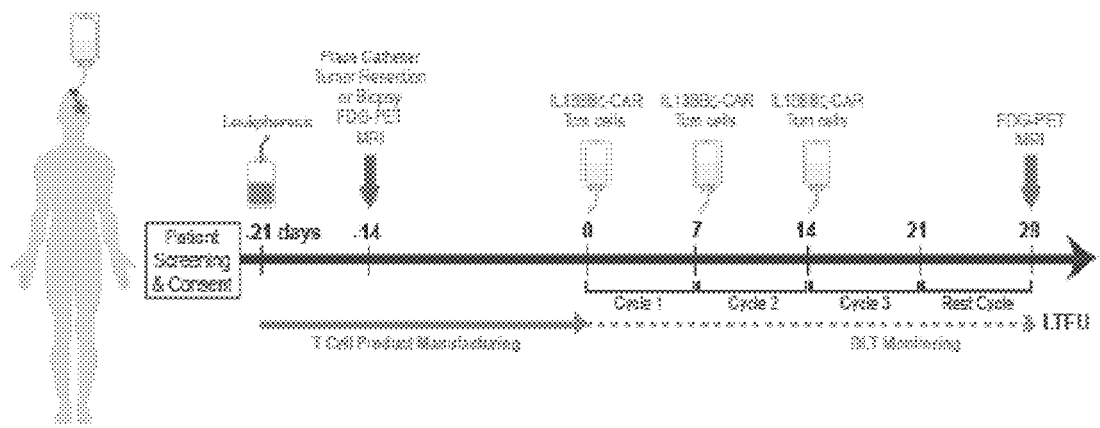
FIG. 31 schematically depicts the time course of CAR T cell preparation and treatment for a clinical trial of CAR T cells for treatment of glioblastoma (A) and provides several dosing schemes (B).

The time course of CAR T cell preparation and treatment is depicted in FIG. 31. Concurrent with the manufacturing process, research participants underwent resection of their tumor(s) followed by placement of a Rickham catheter and baseline imaging.

Patient UPN097 underwent tumor resection and was treated in Cycle 1 with $2\times10^6$ cells and in Cycle 2 with $10\times10^6$ cells. In both Cycle 1 and Cycle 2 the cells were administered to the cavity left by resection. After the second cycle Patient UPN097 was taken off the study due to rapid tumor progression.

Patient UPN109 was treated in Cycle 1 with $2\times10^6$ cells and in Cycles 2 and 3 with $10\times10^6$ cells. After a rest period, Patient UPN109 was treated in Cycles 4, 5 and 6 with $10\times10^6$ cells. In Cycles 1-6 the cells were administered intratumorally. In Cycle 7 the patient was treated with $2\times10^6$ cells. In Cycles 8 and 9 the patient was treated with $10\times10^6$ cells. In Cycles 7-10 the administration was intraventricular.

As used herein, the term "intraventricular" refers to the space inside the ventricular system, specifically the cerebral ventricles. Accordingly, the term "intraventricular" and "intracerebroventricular" may be used interchangeably throughout this disclosure. Accordingly, "intraventricular administration" or "intraventricular injection" refer to delivery of a composition into the ventricals of the brain (i.e. the cerebral ventricles). The cerebral ventricles are a series of interconnected, fluid-filled spaces that lie in the core of the forebrain and brainstem. This system comprises four ventricles: the right and left lateral ventricles (one of which is found in each hemisphere of the brain), the third ventricle, and the fourth ventricle.

The disclosed methods comprise various routes of administering the compositions comprising T cells. For instance, in some embodiments, the disclosed compositions may be delivered or administered intraventricularly. In some embodiments, the disclosed compositions may be delivered or administered into the spinal canal (i.e. intrathecal delivery). In some embodiments, the disclosed compositions may be delivered or administered into the epidural space of the spinal cord (i.e. epidural delivery). In some embodiments, the disclosed compositions may be delivered or administered directly into a tumor (i.e. intratumoral delivery). In some embodiments, the disclosed compositions may be delivered or administered into a cavity formed by the resection of tumor tissue (i.e. intracavity delivery). Furthermore, in some embodiments, the disclosed methods can comprise a combination of the aforementioned routes of administration. For instance, a patient may receive at least one dose of the composition comprising T cells via intracavity delivery, followed by at least one dose of the composition via intraventricular delivery.

Figure 32:
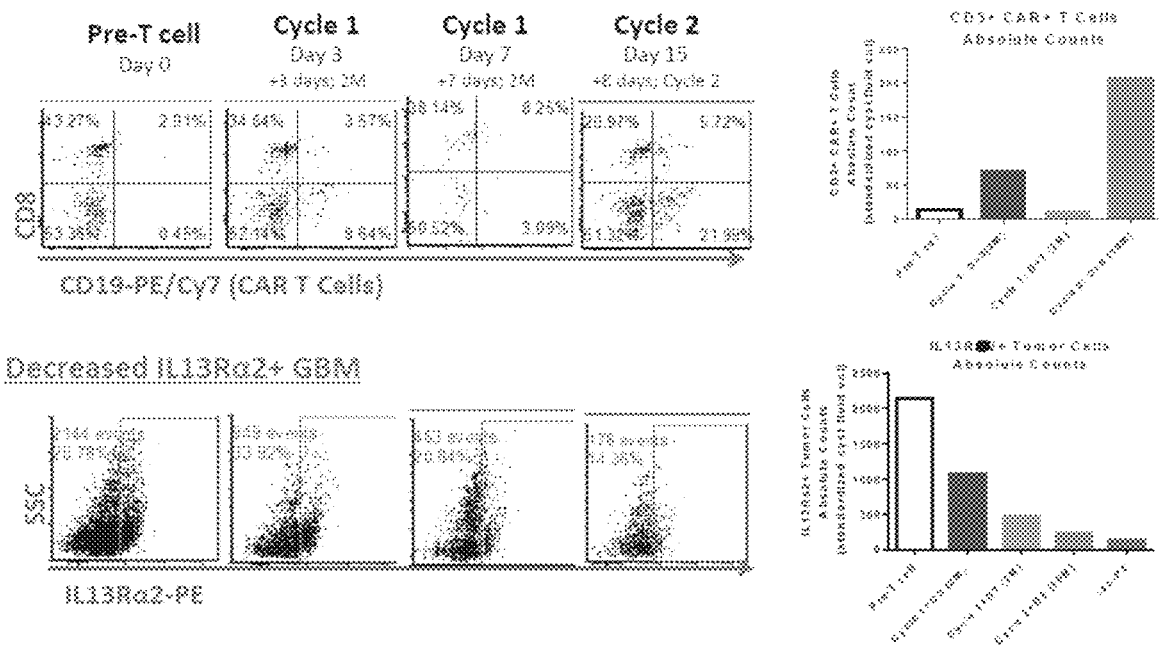
FIG. 32 presents analysis of CAR T cell persistence, as monitored by CD19 (A) and presence of GBM cells as monitored by IL13Rα2 expression (B).

FIG. 32A presents analysis of CAR T cell persistence, as monitored by CD19. This analysis shows good T cell persistence 8 days after the Cycle 2. FIG. 32B shows decreased presence of GBM cells as monitored by IL13Rα2 expression.

Figure 33:
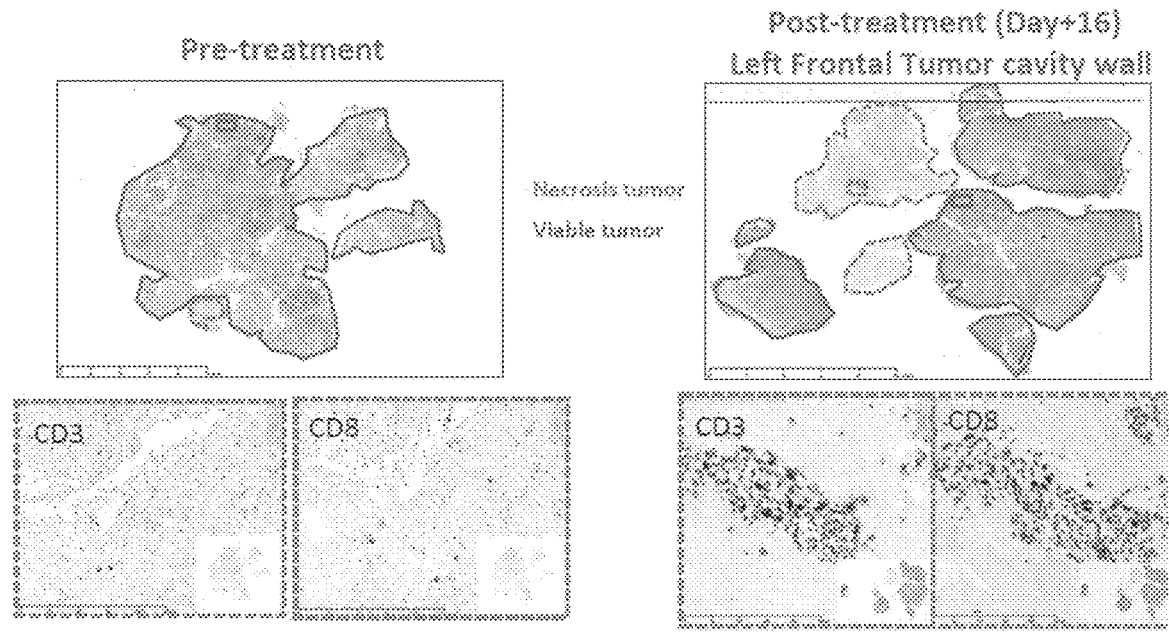
FIG. 33 presents imaging results from Patient UPN097 in the region of the catheter used for intratumoral administration.

FIG. 33A and FIG. 33B depict imaging results from Patient UPN097 in the region of the catheter used for intratumoral administration. In FIG. 33A one can see that few CD3+ or CD8+ T cells are present pretreatment. FIG. 33B, which is a sample at Day 16 post-treatment taken from the left frontal tumor cavity wall shows a large area of necrotic tumor and significant presence of CD3+ and CD8+ cells.

Gliomas, express IL13 receptors, and in particular, high-affinity IL13 receptors. However, unlike the IL13 receptor, glioma cells overexpress a unique IL13Rα2 chain capable of binding IL13 independently of the requirement for IL4Rβ or γc44. Like its homolog IL4, IL13 has pleotropic immunoregulatory activity outside the CNS. Both IL13 and IL4 stimulate IgE production by B lymphocytes and suppress pro-inflammatory cytokine production by macrophages. Detailed studies using autoradiography with radiolabeled IL13 have demonstrated abundant IL13 binding on nearly all malignant glioma tissues studied. This binding is highly homogeneous within tumor sections and in single cell analysis. However, molecular probe analysis specific for IL13Rα2 mRNA did not detect expression of the glioma-specific receptor by normal brain elements and autoradiography with radiolabeled IL13 also could not detect specific IL13 binding in the normal CNS. These studies suggest that the shared IL13Rα1/IL4β/γc receptor is not expressed detectably in the normal CNS. Therefore, IL13Rα2 is a very specific cell-surface target for glioma and is a suitable target for a CAR designed for treatment of a glioma.

Certain patients may be more suitable than others to receive the disclosed methods of treatment. For instance, those patients with malignancies that highly express IL-13Rα2 may particularly benefit from treatment with the disclosed CAR T-cells. Suitability of a patient can be determined by staining a resected tumor sample from a patient to determine the amount of expression of IL-13Rα2. The sample may be scored based on the number of cells exhibiting weak, moderate, or strong staining intensity. Determining the expression level of Ki67 may also be beneficial for determining the aggressiveness of the disease. Once it has been determined that a patient is well suited to receive the disclosed CAR T cells, the patient may be treated according to the disclosed methods.

Binding of IL13-based therapeutic molecules to the broadly expressed IL13Rα1/IL4β/γc receptor complex, however, has the potential of mediating undesired toxicities to normal tissues outside the CNS, and thus limits the systemic administration of these agents. An amino acid substitution in the IL13 alpha helix A at amino acid 13 of tyrosine for the native glutamic acid selectively reduces the affinity of IL13 to the IL13Rα1/IL4β/γc receptor. Binding of this mutant (termed IL13 (E13Y)) to IL13Rα2, however, was increased relative to wild-type IL13. Thus, this minimally altered IL13 analog simultaneously increases IL13's specificity and affinity for glioma cells. Therefore, CAR described herein include an IL13 containing a mutation (E to Y or E to some other amino acid such as K or R or L or V) at amino acid 13 (according to the numbering of Debinski et al. 1999 Clin Cancer Res 5: 3143s). IL13 having the natural sequence also may be used, however, and can be useful, particularly in situations where the modified T cells are to be locally administered, such as by injection directly into a tumor mass.

Additionally, gliomas are known to have a generally poor patient prognosis. For example, glioblastoma multiforme (GBM) is a common malignant cancer of the CNS. The 1-year and 2-year relative survival rates for GBM are 29.6% and 9.0%, respectively. Only 3.4% of patients with a GBM diagnosis survive more than 5 years. Furthermore, recurrence following surgical resection and/or treatment with other conventional therapeutics is common. Current conventional treatments include, but are not limited to, radiation therapy, small molecules (e.g. temozolomide, irinotecan, imatinib mesylate, erlotinib, and hydroxyurea), and biologics such as antibodies (e.g. bevacizumab).

The disclosed methods of treatment improve clinical prognosis in patients compared to current standards. For instance, the disclosed methods can increase 1-year, 2-year, and 5-year survival rates. In some embodiments, the 1-year survival rate of a patient being treated according to the disclosed methods can at least 30%, at least 35%, at least 40%, at least 45%, at least 50%, at least 55%, at least 60%, at least 65%, at least 70%, at least 75%, at least 80%, at least 85%, at least 90%, at least 95%, at least 99%, or at least 100%. In some embodiments, the 2-year survival rate of a patient being treated according to the disclosed methods can at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 99%, or at least 100%. In some embodiments, the 5-year survival rate of a patient being treated according to the disclosed methods can at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 99%, or at least 100%.

In some embodiments, the disclosed methods also increase the life expectancy of a patient compared to another patient receiving conventional treatments or SOC treatment, including radiation therapy, small molecule drug therapy, therapeutic biologics like therapeutic antibodies, or a combination thereof. In some embodiments, in which the patient receiving SOC treatment can expect to survive about 15 months from initial diagnosis (overall survival or OS), the patient receiving the disclosed treatment can expect an OS of 25, 26, 27, 28, 29, 30, 31, 32, 33, 34, 35, 36 months or more. In some embodiments, the patient receiving the claimed treatment can expect an OS of 42, 48, 54, 60, 66, 72, 78, 84, 90 months or more.

The disclosed methods may improve a patient's prognosis through a variety of clinical outcomes. For instance, the disclosed methods can result in a reduction in tumor volume in a patient being treated with a composition comprising T cells. In some embodiments, the disclosed methods of treatment can result in at least a 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 99%, or at least 100% reduction in tumor volume. In some embodiments, the tumors in a patient may be completely eliminated and the patient can be cured of the malignancy.

Additionally, the disclosed methods are safe and well-tolerated. Patients being treated according to the disclosed methods may not experience significant side effects, and furthermore, may be able to discontinue taking auxiliary medications. For instance, in some embodiments, the disclosed methods will not result in any grade 3 or higher toxicities according to NCI Common Toxicity Criteria (CTC). The CTC provides a quantifiable scale of 0-5, with 0 meaning no adverse event, 1 meaning mild, 2 meaning moderate, 3 meaning sever and undesirable, 4 meaning life threatening or disabling, and 5 meaning death. Thus, side effects and or toxicities may include events like mild or moderate headaches, fatigue, myalgia, and minor nervous system disorders such as olfactory aura, but high grade toxicities will be avoided.

Steroids like dexamethasone are commonly used in the clinical management of gliomas to prevent neurological side effects like brain edema. The disclosed methods of treatment can decrease the need for such auxiliary treatments. For instance, if a patient is receiving a regimen of steroids (e.g. dexamethasone) prior to treatment according to the disclosed methods, the patient may be able to reduce the dose of the steroid regimen or discontinue the steroid regimen altogether without experiencing clinically deleterious effects.

Brain metastases of breast cancer can express HER2. Certain of the CAR described herein that are useful in treatment of malignant glioma are targeted to HER2.

The CAR described herein can be produced by any means known in the art, though preferably they are produced using recombinant DNA techniques. Nucleic acids encoding the several regions of the chimeric receptor can be prepared and assembled into a complete coding sequence by standard techniques of molecular cloning known in the art (genomic library screening, PCR, primer-assisted ligation, site-directed mutagenesis, etc.) as is convenient. The resulting coding region is preferably inserted into an expression vector and used to transform a suitable expression host cell line, preferably a T lymphocyte cell line, and most preferably an autologous T lymphocyte cell line.

Various T cell subsets isolated from the patient, including unselected PBMC or enriched CD3 T cells or enriched CD3 or memory T cell subsets, can be transduced with a vector for CAR expression. Central memory T cells are one useful T cell subset. Central memory T cell can be isolated from peripheral blood mononuclear cells (PBMC) by selecting for CD45RO+/CD62L+ cells, using, for example, the CliniMACS® device to immunomagnetically select cells expressing the desired receptors. The cells enriched for central memory T cells can be activated with anti-CD3/CD28, transduced with, for example, a SIN lentiviral vector that directs the expression of the CAR as well as a truncated human CD19 (CD19t), a non-immunogenic surface marker for both in vivo detection and potential ex vivo selection. The activated/genetically modified central memory T cells can be expanded in vitro with IL-2/IL-15 and then cryopreserved.

Example 1: Construction and Structure of an IL13Rα2-Specific CAR

The structure of a useful IL13Rα2-specific CAR is described below. The codon optimized CAR sequence contains a membrane-tethered IL-13 ligand mutated at a single site (E13Y) to reduce potential binding to IL13Rα1, an IgG4 Fc spacer containing two mutations (L235E; N297Q) that greatly reduce Fc receptor-mediated recognition models, a CD4 transmembrane domain, a costimulatory 4-1BB cytoplasmic signaling domain, and a CD3ζ cytoplasmic signaling domain. A T2A ribosome skip sequence separates this IL13(EQ)BBζ CAR sequence from CD19t, an inert, non-immunogenic cell surface detection/selection marker. This T2A linkage results in the coordinate expression of both IL13 (EQ)BBζ and CD19t from a single transcript. FIG. 1A is a schematic drawing of the 2670 nucleotide open reading frame encoding the IL13(EQ)BBZ-T2ACD19t construct. In this drawing, the IL13Rα2-specific ligand IL13 (E13Y), IgG4 (EQ) Fc, CD4 transmembrane, 4-1BB cytoplasmic signaling, three-glycine linker, and CD3ζ cytoplasmic signaling domains of the IL13(EQ)BBZ CAR, as well as the T2A ribosome skip and truncated CD19 sequences are all indicated. The human GM-CSF receptor alpha and CD19 signal sequences that drive surface expression of the IL13 (EQ)BBZ CAR and CD19t are also indicated. Thus, the IL13(EQ)BBZ-T2ACD19t construct includes a IL13Rα2-specific, hinge-optimized, costimulatory chimeric immunoreceptor sequence (designated IL13(EQ)BBZ), a ribosome-skip T2A sequence, and a CD19t sequence.

The IL13(EQ)BBZ sequence was generated by fusion of the human GM-CSF receptor alpha leader peptide with IL13 (E13Y) ligand 5 L235E/N297Q-modified IgG4 Fc hinge (where the double mutation interferes with FcR recognition), CD4 transmembrane, 4-1BB cytoplasmic signaling domain, and CD3ζ cytoplasmic signaling domain sequences. This sequence was synthesized de novo after codon optimization. The T2A sequence was obtained from digestion of a T2A-containing plasmid. The CD19t sequence was obtained from that spanning the leader peptide sequence to the transmembrane components (i.e., basepairs 1-972) of a CD19-containing plasmid. All three fragments, 1) IL13 (EQ)BBZ, 2) T2A, and 3) CD19t, were cloned into the multiple cloning site of the epHIV7 lentiviral vector. When transfected into appropriate cells, the vector integrates the sequence depicted schematically in FIG. 1B into the host cells genome. FIG. 1C provides a schematic drawing of the 9515 basepair IL13(EQ)BBZ-T2A-CD19t_epHIV7 plasmid itself.

Figure 2A:
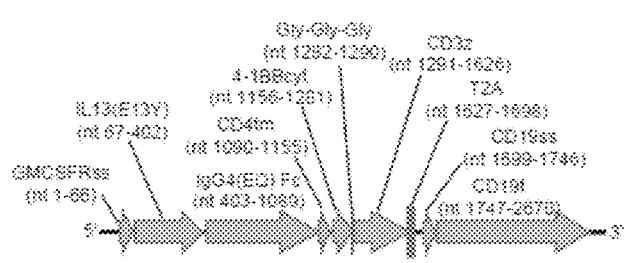
FIGS. 2A-C depict certain vectors and open reading frames. A is a diagram of the cDNA open reading frame of the 2670 nucleotide IL13 (EQ)BBZ-T2ACD19t construct, where the IL13Rα2-specific ligand IL13 (E13Y), IgG4 (EQ) Fc hinge, CD4 transmembrane, 4-1BB cytoplasmic signaling, three-glycine linker, and CD3ζ cytoplasmic signaling domains of the IL13(EQ)BBZ CAR, as well as the T2A ribosome skip and truncated CD19 sequences are indicated. The human GM-CSF receptor alpha and CD19 signal sequences that drive surface expression of the IL13(EQ)BBζ CAR and CD19t are also indicated. B is a diagram of the sequences flanked by long terminal repeats (indicated by 'R') that will integrate into the host genome. C is a map of the IL13(EQ)BBZ-T2A-CD19t_epHIV7 plasmid.
Figure 2B:
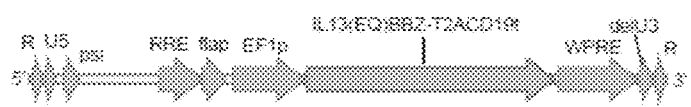
Figure 2C:
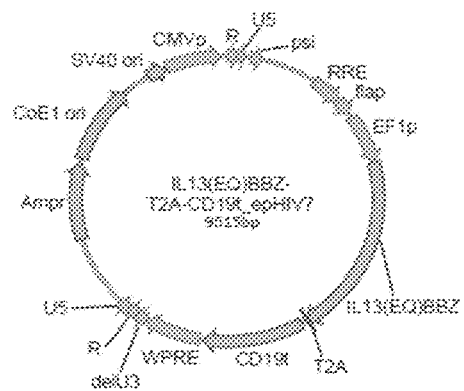

As shown schematically in FIG. 2, IL13(EQ)BBZ CAR differs in several important respects from a previously described IL13Rα2-specific CAR referred to as IL13 (E13Y)-zetakine (Brown et al. 2012 Clinical Cancer Research 18:2199). The IL13 (E13Y)-zetakine is composed of the IL13Rα2-specific human IL-13 mutein (huIL-13 (E13Y)), human IgG4 Fc spacer (huγ4F$_c$), human CD4 transmembrane (huCD4 tm), and human CD3ζ chain cytoplasmic (huCD3ζ cyt) portions as indicated. In contrast, the IL13 (EQ)BBζ) has two point mutations, L235E and N297Q that are located in the CH2 domain of the IgG4 spacer, and a costimulatory 4-1BB cytoplasmic domain (4-1BB cyt).

Example 2: Construction and Structure of epHIV7 used for Expression of an IL13Rα2-Specific CAR The pHIV7 plasmid is the parent plasmid from which the clinical vector IL13(EQ)BBZ-T2A-CD19t_epHIV7 was derived in the T cell Therapeutics Research Laboratory (TCTRL) at City of Hope (COH). The epHIV7 vector used for expression of the CAR was produced from pHIV7 vector. Importantly, this vector uses the human EF1 promoter to drive expression of the CAR. Both the 5' and 3' sequences of the vector were derived from pv653RSN as previously derived from the HXBc2 provirus. The polypurine tract DNA flap sequences (cPPT) were derived from HIV-1 strain pNL4-3 from the NIH AIDS Reagent Repository. The woodchuck post-transcriptional regulatory element (WPRE) sequence was previously described.

Figure 3:
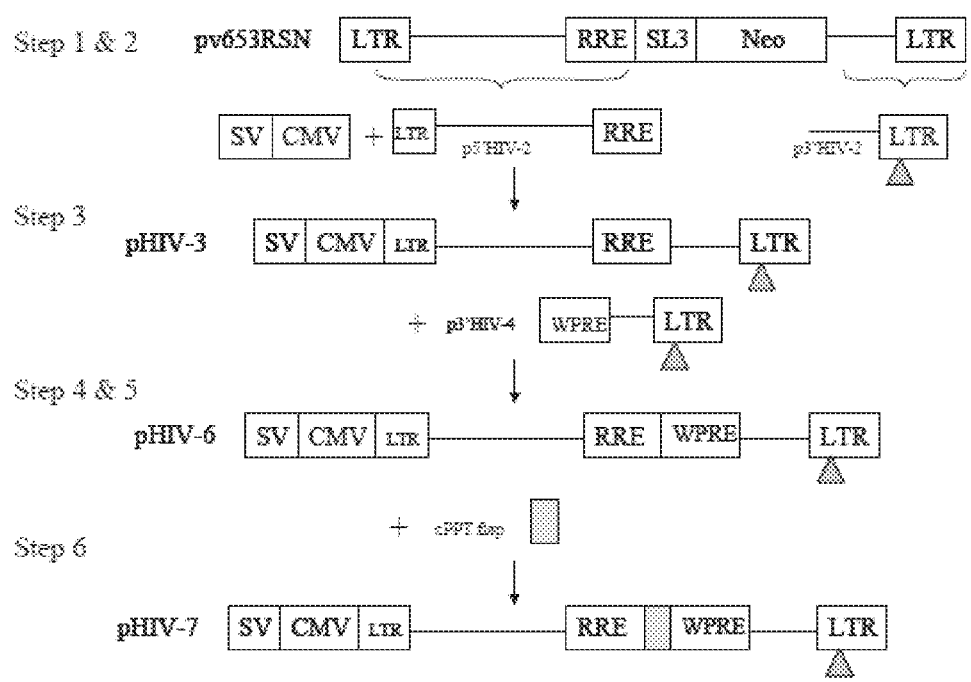
FIG. 3 depicts the construction of pHIV7.

Construction of pHIV7 is schematically depicted in FIG. 3. Briefly, pv653RSN, containing 653 bp from gag-pol plus 5' and 3' long-terminal repeats (LTRs) with an intervening SL3-neomycin phosphotransferase gene (Neo), was subcloned into pBluescript, as follows: In Step 1, the sequences from 5' LTR to rev-responsive element (RRE) made p5'HIV-1 51, and then the 5' LTR was modified by removing sequences upstream of the TATA box, and ligated first to a CMV enhancer and then to the SV40 origin of replication (p5'HIV-2). In Step 2, after cloning the 3' LTR into pBluescript to make p3'HIV-1, a 400-bp deletion in the 3' LTR enhancer/promoter was made to remove cis-regulatory elements in HIV U3 and form p3'HIV-2. In Step 3, fragments isolated from the p5'HIV-3 and p3'HIV-2 were ligated to make pHIV-3. In Step 4, the p3'HIV-2 was further modified by removing extra upstream HIV sequences to generate p3'HIV-3 and a 600-bp BamHI-SalI fragment containing WPRE was added to p3'HIV-3 to make the p3'HIV-4. In Step 5, the pHIV-3 RRE was reduced in size by PCR and ligated to a 5' fragment from pHIV-3 (not shown) and to the p3'HIV-4, to make pHIV-6. In Step 6, a 190-bp BglII-BamHI fragment containing the cPPT DNA flap sequence from HIV-1 pNL4-3 (55) was amplified from pNL4-3 and placed between the RRE and the WPRE sequences in pHIV6 to make pHIV-7. This parent plasmid pHIV7-GFP (GFP, green fluorescent protein) was used to package the parent vector using a four-plasmid system.

A packaging signal, psi w, is required for efficient packaging of viral genome into the vector. The RRE and WPRE enhance the RNA transcript transport and expression of the transgene. The flap sequence, in combination with WPRE, has been demonstrated to enhance the transduction efficiency of lentiviral vector in mammalian cells.

The helper functions, required for production of the viral vector), are divided into three separate plasmids to reduce the probability of generation of replication competent lentivirus via recombination: 1) pCgp encodes the gag/pol protein required for viral vector assembly; 2) pCMV-Rev2 encodes the Rev protein, which acts on the RRE sequence to assist in the transportation of the viral genome for efficient packaging; and 3) pCMV-G encodes the glycoprotein of the vesiculo-stomatitis virus (VSV), which is required for infectivity of the viral vector.

There is minimal DNA sequence homology between the pHIV7 encoded vector genome and the helper plasmids. The regions of homology include a packaging signal region of approximately 600 nucleotides, located in the gag/pol sequence of the pCgp helper plasmid; a CMV promoter sequence in all three helper plasmids; and a RRE sequence in the helper plasmid pCgp. It is highly improbable that replication competent recombinant virus could be generated due to the homology in these regions, as it would require multiple recombination events. Additionally, any resulting recombinants would be missing the functional LTR and tat sequences required for lentiviral replication.

Figure 4:
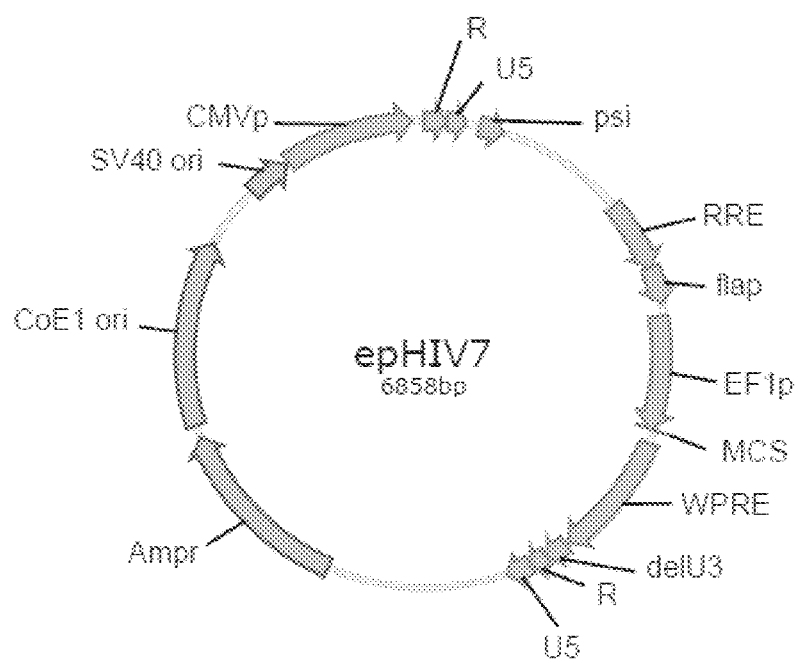
FIG. 4 depicts the elements of pHIV7.
Figure 5:
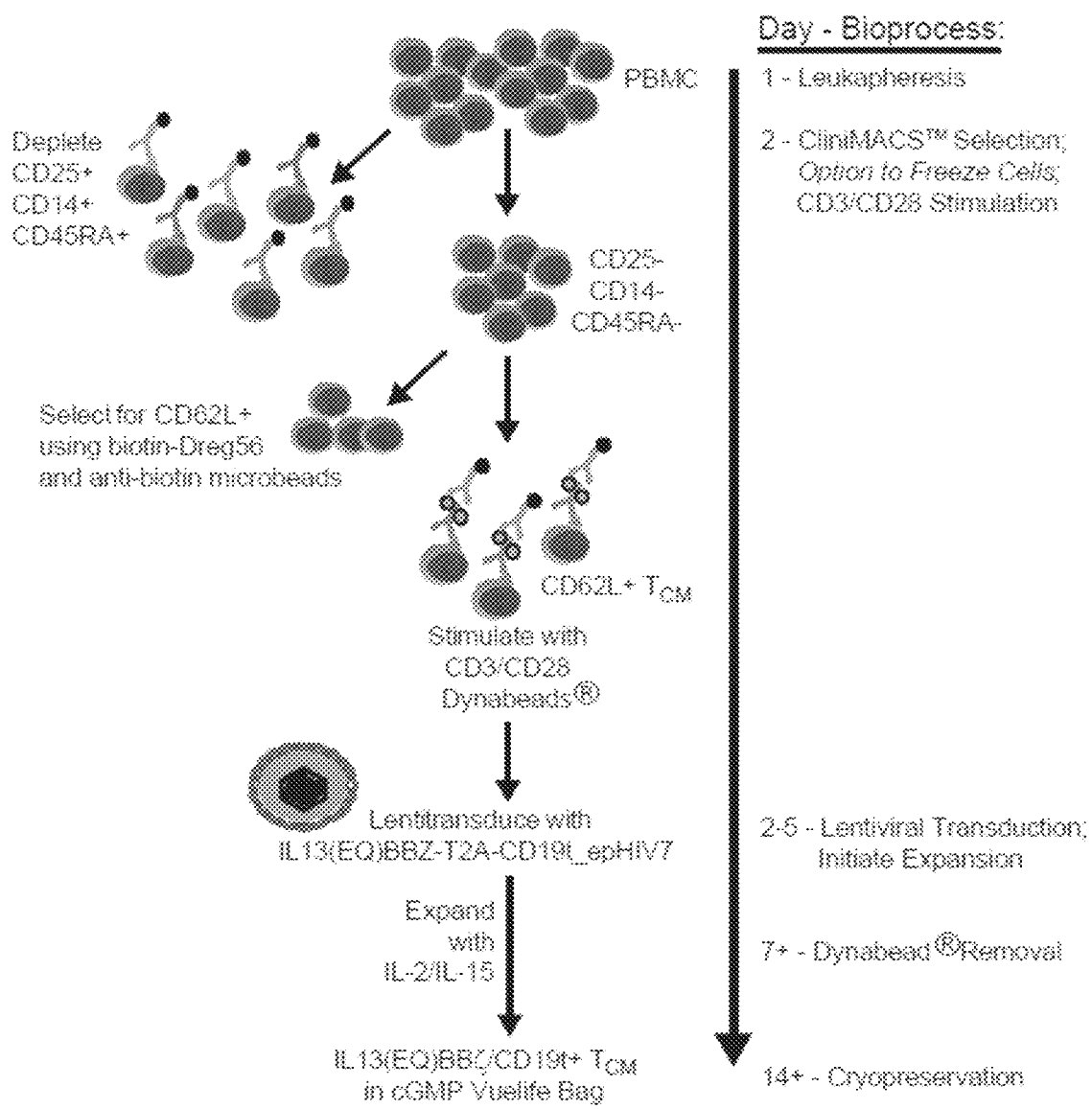
FIG. 5 depicts a production scheme for IL13 (EQ)BBζ/CD19t+ T$_{CM}$.

The CMV promoter was replaced by the EF1α-HTLV promoter (EF1p), and the new plasmid was named epHIV7 (FIG. 4). The EF1p has 563 bp and was introduced into epHIV7 using NruI and NheI, after the CMV promoter was excised.

The lentiviral genome, excluding gag/pol and rev that are necessary for the pathogenicity of the wild-type virus and are required for productive infection of target cells, has been removed from this system. In addition, the IL13(EQ)BBZ-T2ACD19t_epHIV7 vector construct does not contain an intact 3'LTR promoter, so the resulting expressed and reverse transcribed DNA proviral genome in targeted cells will have inactive LTRs. As a result of this design, no HIV-I derived sequences will be transcribed from the provirus and only the therapeutic sequences will be expressed from their respective promoters. The removal of the LTR promoter activity in the SIN vector is expected to significantly reduce the possibility of unintentional activation of host genes. Table 4 summarizes the various regulator elements present in IL13(EQ)BBZ-T2ACD19t_epHIV7.

TABLE 4

Functional elements of IL13(EQ)41BBZ-T2A-CD19t_epHIV7

| Regulatory Elements and Genes | Location (Nucleotide Numbers) | Comments |
| --- | --- | --- |
| U5 | 87-171 | 5' Unique sequence |
| psi | 233-345 | Packaging signal |
| RRE | 957-1289 | Rev-responsive element |
| flap | 1290-1466 | Contains polypurine track sequence and central termination sequence to facilitate nuclear import of pre-integration complex |
| EF1p Promoter | 1524-2067 | EF1-alpha Eukaryotic Promoter sequence driving expression of CD19Rop |
| IL13-IgG4 (EQ)-41BB-Zeta-T2A-CD19t | 2084-4753 | Therapeutic insert |
| WPRE | 4790-5390 | Woodchuck hepatitis virus derived regulatory element to enhance viral RNA transportation |
| delU3 | 5405-5509 | 3' U3 with deletion to generate SIN vector |
| R | 5510-5590 | Repeat sequence within LTR |
| U5 | 5591-5704 | 3' U5 sequence in LTR |
| $Amp^R$ | 6540-7398 | Ampicillin-resistance gene |
| CoE1 ori | 7461-8342 | Replication origin of plasmid |
| SV40 ori | 8639-8838 | Replication origin of SV40 |
| CMV promoter | 8852-9451 | CMV promoter to generate viral genome RNA |
| R | 9507-86 | Repeat sequence within LTR |

Example 3: Production of Vectors for Transduction of Patient T Cells

For each plasmid (IL13(EQ)BBZ-T2A-CD19t_epHIV7; pCgp; pCMV-G; and pCMV-Rev2), a seed bank is generated, which is used to inoculate the fermenter to produce sufficient quantities of plasmid DNA. The plasmid DNA is tested for identity, sterility and endotoxin prior to its use in producing lentiviral vector.

Briefly, cells were expanded from the 293T working cell (WCB), which has been tested to confirm sterility and the absence of viral contamination. A vial of 293T cells from the 293T WCB was thawed. Cells were grown and expanded until sufficient numbers of cells existed to plate an appropriate number of 10 layer cell factories (CFs) for vector production and cell train maintenance. A single train of cells can be used for production.

The lentiviral vector was produced in sub-batches of up to 10 CFs. Two sub-batches can be produced in the same week leading to the production of approximately 20 L of lentiviral supernatant/week. The material produced from all sub-batches were pooled during the downstream processing phase, in order to produce one lot of product. 293T cells were plated in CFs in 293T medium (DMEM with 10% FBS). Factories were placed in a 37° C. incubator and horizontally leveled in order to get an even distribution of the cells on all the layers of the CF. Two days later, cells were transfected with the four lentiviral plasmids described above using the CaPO4 method, which involves a mixture of Tris: EDTA, 2M CaCl2, 2× HBS, and the four DNA plasmids. Day 3 after transfection, the supernatant containing secreted lentiviral vectors was collected, purified and concentrated. After the supernatant was removed from the CFs, End-of-Production Cells were collected from each CF. Cells were trypsinized from each factory and collected by centrifugation. Cells were resuspended in freezing medium and cryopreserved. These cells were later used for replication-competent lentivirus (RCL) testing.

To purify and formulate vectors crude supernatant was clarified by membrane filtration to remove the cell debris. The host cell DNA and residual plasmid DNA were degraded by endonuclease digestion (Benzonase®). The viral supernatant was clarified of cellular debris using a 0.45 μm filter. The clarified supernatant was collected into a pre-weighed container into which the Benzonase® is added (final concentration 50 U/mL). The endonuclease digestion for residual plasmid DNA and host genomic DNA as performed at 37° C. for 6 h. The initial tangential flow ultrafiltration (TFF) concentration of the endonuclease-treated supernatant was used to remove residual low molecular weight components from the crude supernatant, while concentrating the virus ~20 fold. The clarified endonuclease-treated viral supernatant was circulated through a hollow fiber cartridge with a NMWCO of 500 kD at a flow rate designed to maintain the shear rate at ~4,000 sec-1 or less, while maximizing the flux rate. Diafiltration of the nuclease-treated supernatant was initiated during the concentration process to sustain the cartridge performance. An 80% permeate replacement rate was established, using 4% lactose in PBS as the diafiltration buffer. The viral supernatant was brought to the target volume, representing a 20-fold concentration of the crude supernatant, and the diafiltration was continued for 4 additional exchange volumes, with the permeate replacement rate at 100%.

Further concentration of the viral product was accomplished by using a high speed centrifugation technique. Each sub-batch of the lentivirus was pelleted using a Sorvall RC-26 plus centrifuge at 6000 RPM (6,088 RCF) at 6° C. for 16-20 h. The viral pellet from each sub-batch was then reconstituted in a 50 mL volume with 4% lactose in PBS. The reconstituted pellet in this buffer represents the final formulation for the virus preparation. The entire vector concentration process resulted in a 200-fold volume reduction, approximately. Following the completion of all of the sub-batches, the material was then placed at −80° C., while samples from each sub-batch were tested for sterility. Following confirmation of sample sterility, the sub-batches were rapidly thawed at 37° C. with frequent agitation. The material was then pooled and manually aliquoted in the Class II Type A/B3 biosafety cabinet in the viral vector suite. A fill configuration of 1 mL of the concentrated lentivirus in sterile USP class 6, externally threaded O-ring cryovials was used. Center for Applied Technology Development (CATD)'s Quality Systems (QS) at COH released all materials according to the Policies and Standard Operating Procedures for the CBG and in compliance with current Good Manufacturing Practices (cGMPs).

To ensure the purity of the lentiviral vector preparation, it was tested for residual host DNA contaminants, and the transfer of residual host and plasmid DNA. Among other tests, vector identity was evaluated by RT-PCR to ensure that the correct vector is present. All release criteria were met for the vector intended for use in this study.

Example 4: Preparation of T Cells Suitable for Use in ACT

T lymphocytes are obtained from a patient by leukopheresis, and the appropriate allogenic or autologous T cell subset, for example, Central Memory T cells ($T_{CM}$), are genetically altered to express the CAR, then administered back to the patient by any clinically acceptable means, to achieve anti-cancer therapy.

Suitable $T_{CM}$ can be prepared as follows. Apheresis products obtained from consented research participants are ficolled, washed and incubated overnight. Cells are then depleted of monocyte, regulatory T cell and naïve T cell populations using GMP grade anti-CD14, anti-CD25 and anti-CD45RA reagents (Miltenyi Biotec) and the CliniMACS™ separation device. Following depletion, negative fraction cells are enriched for CD62L+ $T_{CM}$ cells using DREG56-biotin (COH clinical grade) and anti-biotin microbeads (Miltenyi Biotec) on the CliniMACS™ separation device.

Following enrichment, $T_{CM}$ cells are formulated in complete X-Vivo15 plus 50 IU/mL IL-2 and 0.5 ng/ml IL-15 and transferred to a Teflon cell culture bag, where they are stimulated with Dynal ClinEx™ Vivo CD3/CD28 beads. Up to five days after stimulation, cells are transduced with IL13(EQ)BBZ-T2A-CD19t_epHIV7 lentiviral vector at a multiplicity of infection (MOI) of 1.0 to 0.3. Cultures are maintained for up to 42 days with addition of complete X-Vivo15 and IL-2 and IL-15 cytokine as required for cell expansion (keeping cell density between $3 \times 10^5$ and $2 \times 10^6$ viable cells/mL, and cytokine supplementation every Monday, Wednesday and Friday of culture). Cells typically expand to approximately $10^9$ cells under these conditions within 21 days. At the end of the culture period cells are harvested, washed twice and formulated in clinical grade cryopreservation medium (Cryostore CS5, BioLife Solutions).

On the day(s) of T cell infusion, the cryopreserved and released product is thawed, washed and formulated for re-infusion. The cryopreserved vials containing the released cell product are removed from liquid nitrogen storage, thawed, cooled and washed with a PBS/2% human serum albumin (HSA) Wash Buffer. After centrifugation, the supernatant is removed and the cells resuspended in a Preservative-Free Normal Saline (PFNS)/2% HSA infusion diluent. Samples are removed for quality control testing.

Two qualification runs on cells procured from healthy donors were performed using the manufacturing platform described above. Each preclinical qualification run product was assigned a human donor (HD) number—HD006.5 and HD187.1. Importantly, as shown in Table 5, these qualification runs expanded >80 fold within 28 days and the expanded cells expressed the IL13 (EQ)BBγ/CD19t transgenes.

TABLE 5

Summary of Expression Data from Pre-clinical Qualification Run Product

| Cell Product | CAR | CD19 | CD4+ | CD8+ | Fold Expansion |
|---|---|---|---|---|---|
| HD006.5 | 20% | 22% | 24% | 76% | 84-fold (28 days) |
| Hd187.1 | 18% | 25% | 37% | 63% | 259-fold (28 days) |

Example 5: Flow Cytometric Analysis of Surface Transgene and T Cell Marker Expression in IL13 (EQ)BBγ/CD19t+$T_{CM}$ The two preclinical qualification run products described in Example 4 were used in pre-clinical studies to as described below. FIGS. 6A-C depict the results of flow cytometric analysis of surface transgene and T cell marker expression. IL13 (EQ)BBγ/CD19t+ $T_{CM}$ HD006.5 and HD187.1 were co-stained with anti-IL13-PE and anti-CD8-FITC to detect CD8+ CAR+ and CD4+ (i.e., CD8 negative) CAR+ cells (FIG. 6A), or anti-CD19-PE and anti-CD4-FITC to detect CD4+ CD19t+ and CD8+ (i.e., CD4 negative) CAR+ cells (FIG. 6B). IL13(EQ)BBγ/CD19t+ $T_{CM}$ HD006.5 and HD187.1 were stained with fluorochrome-conjugated anti-CD3, TCR, CD4, CD8, CD62L and CD28 (grey histograms) or isotype controls (black histograms). (FIG. 6C). In each of FIGS. 6A-C, the percentages indicated are based on viable lymphocytes (DAPI negative) stained above isotype.

Figure 7A:
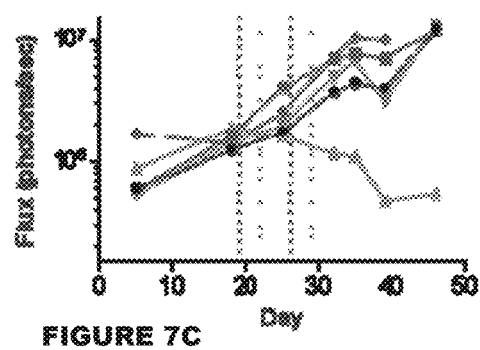
FIGS. 7A-D depict the results of experiments comparing route of CAR+ T cell delivery (i.e. versus i.v.) for large established tumors. EGFP-ffLuc+ PBT030-2 TSs (1×10$^5$) were implanted into the right forebrain of NSG mice. On days 19 and 26, mice were injected i.v. through the tail vein with either 5×10$^6$ CAR+ IL13 (EQ)BBζ+ TCM (11.8×10$^6$ total cells; n=4), or mock TCM (11.8×10$^6$ cells; n=4). Alternatively, on days 19, 22, 26 and 29 mice were injected i.e. with either 1×10$^6$ CAR+ IL13 (EQ)BBζ+ TCM (2.4×10$^6$ total cells; n=4), or mock TCM (2.4×10$^6$ cells; n=5). Average ffLuc flux (photons/sec) over time shows that i.e. delivered IL13 (EQ)BBζ TCM mediates tumor regression of day 19 tumors. By comparison, i.v. delivered T cells do not shown reduction in tumor burden as compared to untreated or mock TCM controls (A). Kaplan Meier survival curve demonstrates improved survival for mice treated i.e. IL13 (EQ)BBZ TCM as compared to mice treated with i.v. administered CAR+ TCM (p=0.0003 log rank test) (B). Representative H&E and CD3 IHC of mice treated i.v. (C) versus i.e. (D) with IL13(EQ)BBZ+ TCM. CD3+ T cells were only detected in the i.e. treated group, with no CD3+ cells detected in the tumor or surrounding brain parenchyma for i.v. treated mice.
Figure 7B:
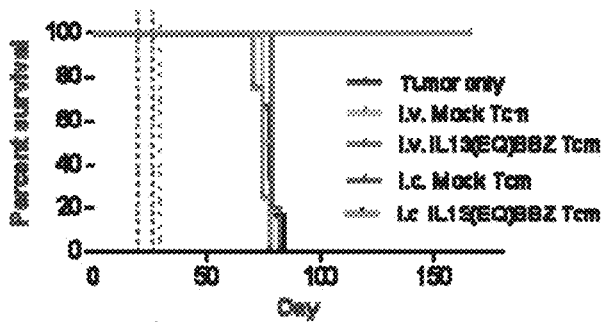
Figure 7C:
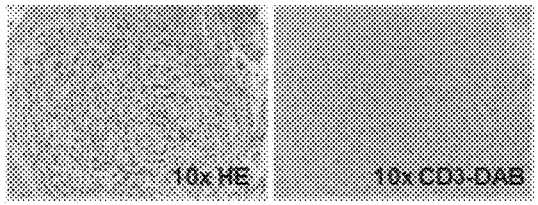
Figure 7D:
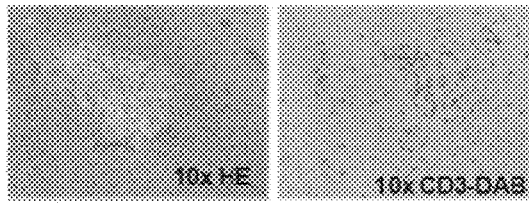

Example 6: Comparison of CAR T Cell Delivery Route for Treatment of Large TS-Initiated PBT Tumors Described below are studies that compare the route of delivery, intravenous (i.v.) or intracranial (i.e.), on antitumor activity against invasive primary PBT lines. In pilot studies (data not shown), it was unexpectedly observed that i.v. administered IL13 (EQ)BBζ+ TCM provided no therapeutic benefit as compared to PBS for the treatment of small (day 5) PBT030-2 EGFP: ffLuc tumors. This is in contrast to the robust therapeutic efficacy observed with i.e. administered CAR+ T cells. Reasoning that day 5 PBT030-2 tumors may have been too small to recruit therapeutic T cells from the periphery, a comparison was made of i.v. versus i.e. delivery against larger day 19 PBT030-2 EGFP: ffLuc tumors. For these studies, PBT030-2 engrafted mice were treated with either two i.v. infusions ($5 \times 10^6$ CAR+ TCM; days 19 and 26) or four i.e. infusions ($1 \times 10^6$ CAR+ TCM; days 19, 22, 26 and 29) of IL13(EQ)BBZ+ TCM, or mock TCM (no CAR). Here too no therapeutic benefit as monitored by Xenogen imaging or Kaplan-Meier survival analysis for i.v. administered CAR+ T cells (FIGS. 7A and 7B). In contrast, potent antitumor activity was observed for i.e. administered IL13 (EQ)BBζ+ TCM (FIGS. 7A-B). Next, brains from a cohort of mice 7 days post T cell injection were harvested and evaluated for CD3+ human T cells by IHC. Surprisingly, for mice treated i.v. with either mock TCM or IL13 (EQ) BBζ TCM there were no detectable CD3+ human T cells in the tumor or in others mouse brain regions where human T cells typically reside (i.e. the leptomeninges) (FIG. 7C), suggesting a deficit in tumor tropism. This is in contrast to the significant number of T cells detected in the i.e. treated mice (FIG. 7D).

Figure 8B:
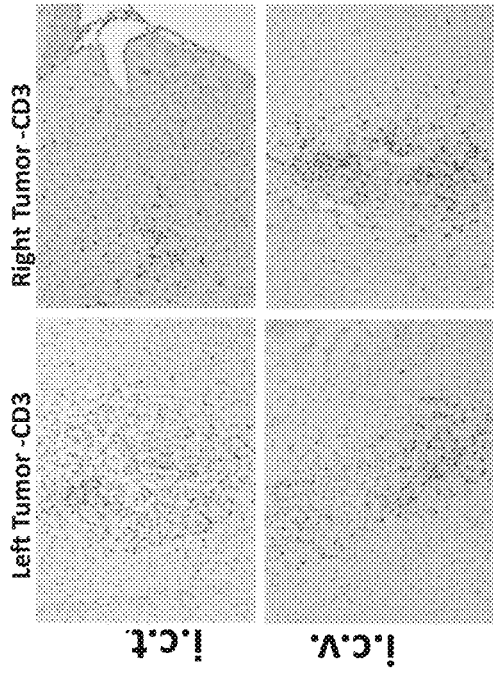
FIGS. 8A-B depict the results of studies showing that CAR+ T cell injected intracranially, either intratumoral (i.c.t.) or intraventricular (i.c.v.), can traffic to tumors on the opposite hemisphere. EGFP-ffLuc+ PBT030-2 TSs (1×10$^5$) were stereotactically implanted into the right and left forebrains of NSG mice. On day 6, mice were injected i.e. at the right tumor site with 1.0×10$^6$ IL13 (EQ)BBζ+ TCM (1.6× 10$^6$ total cells; 63% CAR; n=4). Schematic of multifocal glioma experimental model (A). CD3 IHC showing T cells infiltrating both the right and left tumor sites (B).
Figure 8A:
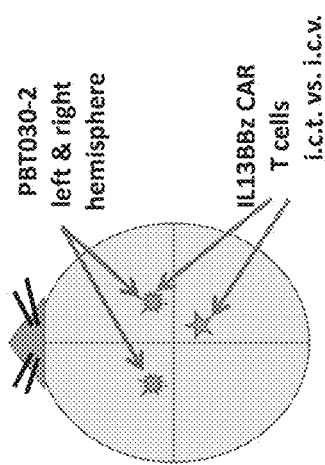

Tumor derived cytokines, particularly MCP-1/CCL2, are important in recruiting T cells to the tumor. Thus, PBT030-2 tumor cells were evaluated and it was found that this line produces high levels of MCP-1/CCL2 comparable to U251T cells (data not shown), a glioma line previously shown to attract i.v. administered effector CD8+ T cells to i.e. engrafted tumors. Malignant gliomas are highly invasive tumors and are often multi-focal in presentation. The studies described above establish that IL13BBζ $T_{CM}$ can eliminate infiltrated tumors such as PBT030-2, and mediate long-term durable antitumor activity. The capacity of intracranially delivered CAR T cells to traffic to multifocal disease was also examined. For this study PBT030-2 EGFP: ffLuc TSs were implanted in both the left and right hemispheres (FIG. 8A) and CAR+ T cells were injected only at the right tumor site. Encouragingly, for all mice evaluated (n=3) we detected T cells by CD3 IHC 7-days post T cell infusion both at the site of injection (i.e. right tumor), as well within the tumor on the left hemisphere (FIG. 8B). These findings provide evidence that CAR+ T cells are able to traffic to and infiltrate tumor foci at distant sites. Similar findings were also observed in a second tumor model using the U251T glioma cell line (data not shown).

Example 7: Amino Acid Sequence of IL13(EQ)BBζ/CD19t

The complete amino acid sequence of IL13 (EQ)BBζ/CD19t is depicted in FIG. 9A-9B. The entire sequence (SEQ ID NO:1) includes: a 22 amino acid GMCSF signal peptide (SEQ ID NO:2), a 112 amino acid IL-13 sequence (SEQ ID NO:3; amino acid substitution E13Y shown in bold); a 229 amino acid IgG4 sequence (SEQ ID NO:4; with amino acid substitutions L235E and N297Q shown in bold); a 22 amino acid CD4 transmembrane sequence (SEQ ID NO: 5); a 42 amino acid 4-1BB sequence (SEQ ID NO:6); a 3 amino acid Gly linker; a 112 amino acid CD3ζ sequence (SEQ ID NO:7); a 24 amino acid T2A sequence (SEQ ID NO:8); and a 323 amino acid CD19t sequence (SEQ ID NO:9).

The mature chimeric antigen receptor sequence (SEQ ID NO:10) includes: a 112 amino acid IL-13 sequence (SEQ ID NO:3; amino acid substitution E13Y shown in bold); a 229 amino acid IgG4 sequence (SEQ ID NO:4; with amino acid substitutions L235E and N297Q shown in bold); at 22 amino acid CD4 sequence (SEQ ID NO:5); a 42 amino acid 4-1BB sequence (SEQ ID NO:6); a 3 amino acid Gly linker; and a 112 amino acid CD3ζ sequence (SEQ ID NO: 7). Within this CAR sequence (SEQ ID NO:10) is the IL-13/IgG4/CD4t/41-BB sequence (SEQ ID NO:11), which includes: a 112 amino acid IL-13 sequence (SEQ ID NO:3; amino acid substitution E13Y shown in bold); a 229 amino acid IgG4 sequence (SEQ ID NO:4; with amino acid substitutions L235E and N297Q shown in bold); at 22 amino acid CD4 sequence (SEQ ID NO: 5); and a 42 amino acid 4-1BB sequence (SEQ ID NO:6). The IL13/IgG4/CD4t/4-1BB sequence (SEQ ID NO:11) can be joined to the 112 amino acid CD3ζ sequence (SEQ ID NO:7) by a linker such as a Gly Gly Gly linker. The CAR sequence (SEQ ID NO: 10) can be preceded by a 22 amino acid GMCSF signal peptide (SEQ ID NO:2).

FIG. 10A-10O depicts a comparison of the sequences of IL13(EQ)41BB ζ[IL13{EQ}41BBζ(T2A-CD19t_epHIV7; pF02630] (SEQ ID NO:12) and CD19Rop_epHIV7 (pJ01683) (SEQ ID NO:13).

Example 8: Amino Acid Sequence of Additional CAR Targeting IL13Rα2

FIGS. 11-18 depict the amino acid sequences of additional CAR directed against IL13Rα2. In each case the various domains are labelled except for the GlyGlyGly spacer located between certain intracellular domains. Each includes human IL13 with and Glu to Tyr (SEQ ID NO:3; amino acid substitution E13Y shown in highlighted). In the expression vector used to express these CAR, the amino acid sequence expressed can include a 24 amino acid T2A sequence (SEQ ID NO:8); and a 323 amino acid CD19t sequence (SEQ ID NO:9) to permit coordinated expression of a truncated CD19 sequence on the surface of CAR-expressing cells.

A panel of CAR comprising human IL13 (E13Y) domain, a CD28 tm domain, a CD28gg costimulatory domain, a 4-1BB costimulatory domain, and a CD3ζ domain CAR backbone and including either a HL (22 amino acids) spacer, a CD8 hinge (48 amino acids) spacer, IgG4-HL-CH3 (129 amino acids) spacer or a IgG4 (EQ) (229 amino acids) spacer were tested for their ability to mediate IL13Ra2-specific killing as evaluated in a 72-hour co-culture assay. With the exception of HL (22 amino acids) which appeared to have poor CAR expression in this system, all were active.

Example 9: Structure of Two HER2-CAR

One CAR comprising a HER2 scFv described herein is referred to as Her2scFv-IgG4 (L235E, N297Q)-CD28tm-CD28gg-Zeta-T2A-CD19t. This CAR includes a variety of important features including: a scFv targeted to HER2; an IgG4 Fc region that is mutated at two sites within the CH2 region (L235E; N297Q) in a manner that reduces binding by Fc receptors (FcRs); a CD28 transmembrane domain, a CD28 co-stimulatory domain, and CD32 activation domain. FIG. 20 presents the amino acid sequence of this CAR, including the sequence of the truncated CD19 sequence used for monitoring CAR expression and the T2A ribosomal skip sequence that allows the CAR to be produced without fusion of the truncated CD19 sequence. As shown in FIG. 21, the immature CAR includes: GMCSFR signal peptide, HER2 scFv, IgG4 that acts as a spacer, a CD8 transmembrane domain, a 4-IBB co-stimulatory domain that includes a LL to GG sequence alteration, a three Gly sequence, CD3 Zeta stimulatory domain. The transcript also encodes a T2A ribosomal sequence and a truncated CD19 sequence that are not part of the CAR protein sequence. The mature CAR is identical to the immature CAR, but lacks the GMCSF signal peptide.

Example 10: Expression of CAR Targeted to HER2

FIG. 22A is a schematic diagram of two the HER2-specific CAR constructs depicted in FIG. 20 and FIG. 21. In HER2(EQ)28ζ the scFv is tethered to the membrane by a modified IgG4 Fc linker (double mutant, L235E; N297Q), containing a CD28 transmembrane domain, an intracellular CD28 co-stimulatory domain and a cytolytic CD3ζ domain. The T2A skip sequence separates the CAR from a truncated CD19 (CD19t) protein employed for cell tracking. HER2 (EQ)BBζ is similar except that the costimulatory domain is 4-1BB rather than CD28 and the transmembrane domain is a CD8 transmembrane domain rather than a CD28 transmembrane domain. Human central memory (TCM) cells were transfected with a lentiviral vector expressing either HER2(EQ)28ζ or HER2(EQ)BBζ. FIG. 22B depicts representative FACS data of human TCM surface phenotype. FIG. 22C depicts the results of assays for CD19 and Protein L expression in TCM transfected with a lentiviral vector expressing either HER2(EQ)28ζ or HER2(EQ)BBζ. As can be seen from these results, transfection efficiency as assessed by CD19 expression was similar for both CAR. However, Protein L expression was lower for HER2(EQ)BBζ than for HER2(EQ)28ζ suggesting that the HER2(EQ) BBζ CAR is less stable that the HER2(EQ)BBζ. Analysis of cell expansion (FIG. 22D) shows that neither CAR interferes with T cell expansion.

Example 11: In Vitro Characterization of HER2 Targeted CAR

A variety of breast cancer cell lines, including, HER2-negative lines (LCL lymphoma, MDA-MB-468, U87 glioma), low-HER2 expressing lines (MDA-MB-361, 231BR) and high-HER2 expressing lines (SKBR3, BT474, BBM1) were used to characterize HER2(EQ)28ζ and HER2 (EQ)BBζ. FIG. 23A depicts the HER2 expression level of each of these lines. Flow cytometry (gated on CAR+ T cells) was used to characterize CD107a degranulation and IFNγ production in Mock (untransduced), HER2(EQ)28ζ or HER2(EQ)BBζ CAR T cells following a 5 hr co-culture with either MDA-MB-361 tumor cells (low HER2 expressing) or BBM1 tumor cells (high HER2 expressing). The results of this analysis are presented in FIG. 23B. Similar studies were conducted with the other breast cancer cells lines, and the results are summarized in FIG. 23C. Production of IFNγ production by HER2-CAR T cells following a 24 hr culture with recombinant HER2 protein or tumor targets was measured by ELISA and the results of this analysis are shown in FIG. 23D.

Example 12: In Vitro Anti-Tumor Activity of HER2 Targeted CAR

Figure 24A:
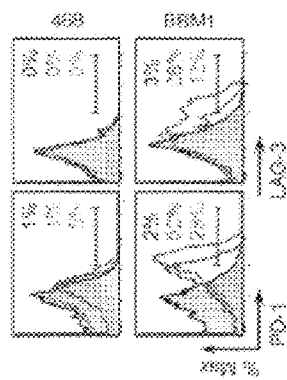
FIGS. 24A-F depict the result of studies on the in vitro tumor activity of HER2-CAR T cells.
Figure 24C:
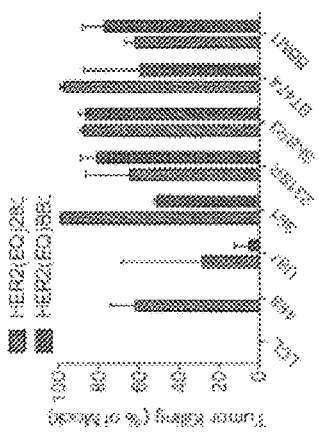
Figure 24B:
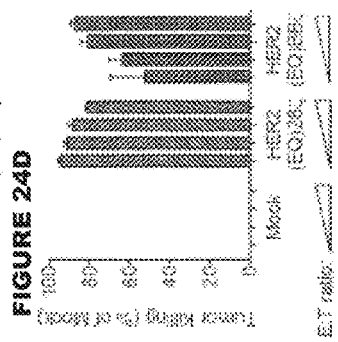
Figure 24D:
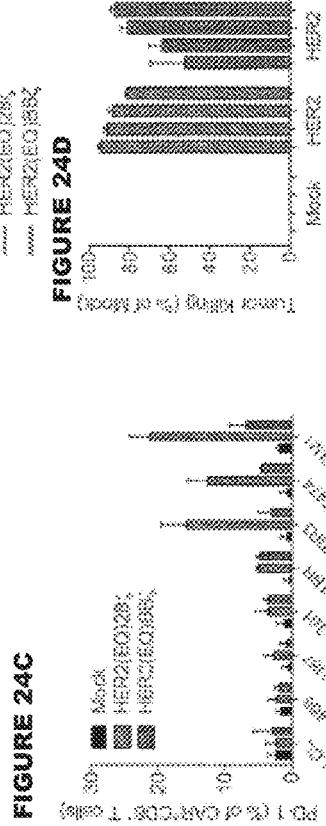
Figure 24E:
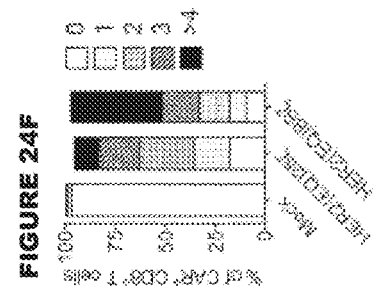
Figure 24F:
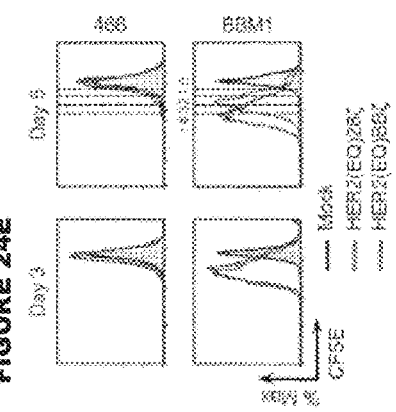

Flow cytometry was used to assess tumor cell killing following a 72h co-culture of Mock (untransduced), HER2 (EQ)28ζ or HER2(EQ)BBζ CAR T cells with tumor targets. The results of this analysis are presented in FIG. 24A. PD-1 and LAG-3 induction in total CAR T cells after a 72h co-culture with HER2-negative MDA-MB-468 or HER2-positive BBM1 cells was measured, and the results of this analysis are presented in FIG. 24B. PD-1 induction in CD8+ CAR T cells following a 72h co-culture with tumor targets that are HER2-negative (LCL lymphoma, MDA-MB-468, U87 glioma), low-HER2 expressing (MDA-MB-361, 231BR) or high-HER2 expressing (SKBR3, BT474, BBM1) was measured, and the results of this analysis are presented in FIG. 24C. These studies suggest that HER2(EQ)BBζ causes lower PD-1 induction that does HER2(EQ)28ζ. Tumor cell killing with Effector:Tumor (E:T) ratio ranging from 0.25:1 to 2:1 was measured for both HER2(EQ)28ζ or HER2(EQ)BBζ CAR T cells. The results of this analysis are presented in FIG. 24D, which shows that both HER2(EQ) 28ζ and HER2(EQ)BBζ are effective in tumor cell killing in vitro. CFSE proliferation of HER2-CAR T cells following a 72h co-culture with MDA-MB-468 or BBM1 cells was measured by flow cytometry. The results of this analysis are presented in FIG. 24E, which shows that HER2(EQ)BBζ CAR T cells proliferate more than HER2(EQ)28ζ CAR T cells.

Example 13: In Vivo Anti-Tumor Activity of HER2 Targeted CAR

The activity of intratumorally delivered HER2 CAR T cells was assessed in a patient-derived breast-to-brain metastasis model. FIGS. 25A-25C are H&E staining of tumors. Mice were treating by injection directly into the tumor with Mock (untransduced) or HER2(EQ)BBζ CAR T cells. FIGS. 25D-25F depict the results of optical imaging of the tumors and FIGS. 25G-25I are Kaplan-Meier survival curves for mice treated locally with either at day 3, 8 or 14 post tumor injection. These studies show that HER2(EQ) BBζ CAR T cells have potent anti-tumor efficacy in vivo when injected directly into the tumor.

Figure 26A:
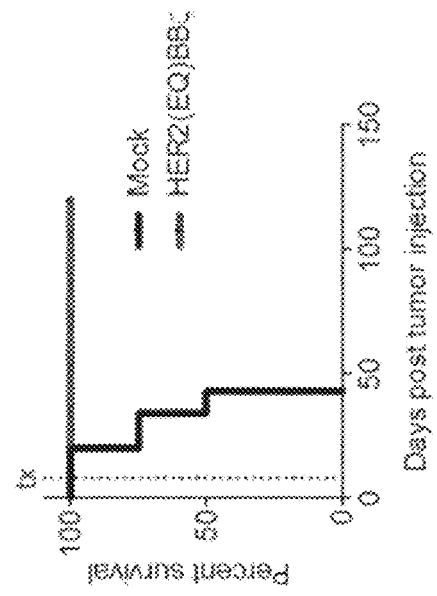
FIGS. 26A-D depict the results of studies on local delivery of HER2-CAR T cells in human orthotopic BBM xenograft models.
Figure 26B:
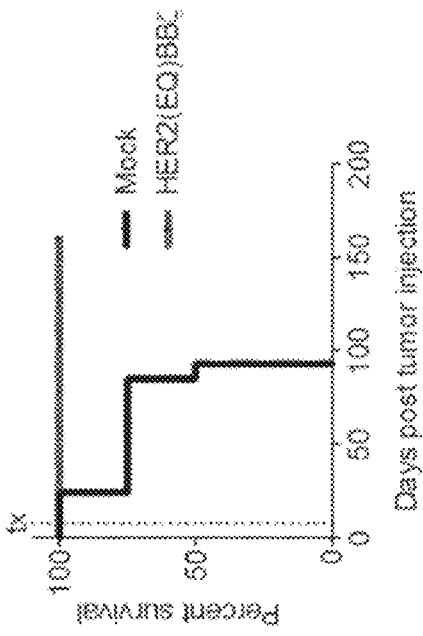
Figure 26C:
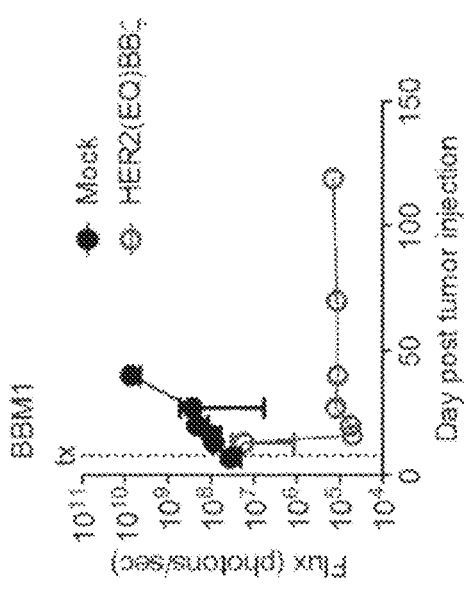
Figure 26D:
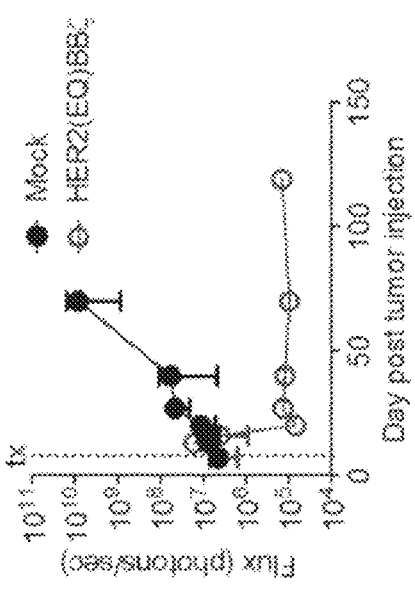

To assess anti-tumor efficacy in human xenograft models of breast-to-brain metastasis, BBM1 cells (0.2M) or BT474 (0.15M) were intracranially injected in NSG mice. At day 8 post tumor injection, HER2(EQ)28ζ or HER2(EQ)BBζ, or Mock (untransduced) T cells (1M) were injected intratumorally. BBM1 (FIG. 26A) and BT474 (FIG. 26B) tumors were monitored by luciferase-based optical imaging. Kaplan Meier curves are presented in FIG. 26C and FIG. 26D.

A human patient-derived orthotopic xenograft model of breast-to-brain metastasis was also used to assess HER2 (EQ)28ζ and HER2(EQ)BBζ CAR T cells. FIG. 27A illustrates the region of tumor implantation by stereotactic injection of BBM1 cells (0.2M), and intraventricular T cell delivery. Staining of tumors is depicted in FIG. 27B. At day 14 post tumor injection, HER2(EQ)28ζ, HER2(EQ)BBζ, or Mock (unstransduced) T cells (0.5M) were injected intratumorally. Tumor growth was monitored by luciferase-based optical imaging. FIG. 27C presents the flux averages for each treatment group, and FIG. 27D presents the Kaplan Meier survival curve for each treatment group.

Example 14: Comparison of Intracranial and Intratumoral Administration of $T_{CM}$ Expressing a CAR Targeted to IL13Rα2

Two different intracranial (ic) delivery routes, intratumoral (ict) and intraventricular (icv) were assessed in a murine model of glioblastoma for in vivo safety, trafficking and efficacy of CAR T cells generated from $T_{CM}$-enriched cell lines that were transduced with the IL13(EQ)BBZ-T2A-CD19t_epHIV7 lentiviral vector and expanded in vitro as proposed for the clinical treatment of glioblastoma (GBM). In vivo safety and functional potency of these cells administered either ict or icv was examined in immunodeficient NSG mice using the IL13Rα2+ primary low-passage GBM tumor sphere line PBT030-2, which has been engineered to express the firefly luciferase (ffLuc) reporter gene.

$T_{CM}$ cell lines that had been enriched from PBMC by CliniMACS™/AutoMACS selection were lenti-transduced with IL13(EQ)BBZ-T2A-CD19t_epHIV7 lentivirus, expanded and then cryopreserved using methods similar to that described above. Freshly thawed CAR T cells administered either ict or icv were then evaluated for potential toxicity, their ability to traffic to multifocal GBM tumors and their potency in controlling the in vivo growth of ic engrafted IL13Rα2+ GBM line PBT030-2 cells. To assess general toxicity, mice were observed daily for overall health, including body weight and alertness. Tumor burden, as measured by Xenogen imaging, was examined; and immunohistochemistry (IHC) to detect T cell recruitment/infiltration of the tumors was also performed on a subset of mice.

Male NSG mice (10-12 weeks old) were stereotactically injected ic with $1\times10^5$ ffLuc+ PBT030-2 cells in both the right and left contralateral hemispheres on day 0 and allowed to engraft for 6 days. Mice were then grouped based on tumor size as determined by Xenogen imaging for equal tumor size distributions per group. Groups of mice were then left untreated (n=4), or treated either ict (right hemisphere, n=8) or icv (n=8) with $1\times10^6$ CAR+IL13 (EQ)BBζ/CD19t+ $T_{CM}$ (FIG. 28). PBT030-2 tumor growth was monitored over time by Xenogen imaging and quantification of ffLuc flux (photons/sec). At different time points, mice from each group were euthanized, their brains harvested, embedded in paraffin and immunohistochemistry (IHC) was performed to evaluate the presence of human CD3-expressing cells (i.e., human T cells). Specifically, three mice were euthanized from each CAR T cell treated group one week after the T cell administration (Day 13 of the experiment), and thus these mice were not included in the Xenogen imaging analysis of FIG. 29; and then two mice in each of the groups of mice were euthanized two weeks after the T cell administration (Day 21 of the experiment).

While this was not a survival study, and thus mice were all euthanized at specific time points to evaluate T cell trafficking in the brains (described below), the mice were monitored daily for any obvious signs of distress or general toxicity. Mice treated with either the ict or icv regimen did not exhibit any weight loss, and were bright, alert and reactive throughout the experiment. Thus, regardless of the route of T cell administration, there were no signs of any therapy-associated adverse effects.

As shown in FIGS. 29A-C, ict delivery of IL13 (EQ)BBζ/ CD19t+ $T_{CM}$ exhibited robust anti-tumor activity against the PBT030-2 tumors as expected. However, icv delivery of IL13 (EQ)BBζ/CD19t+ $T_{CM}$ appeared to provide greater therapeutic benefit against ic engrafted PBT030-2 tumors than that observed with ict administration, especially against the tumor lesion in the contralateral (left) hemisphere.

Figure 30:
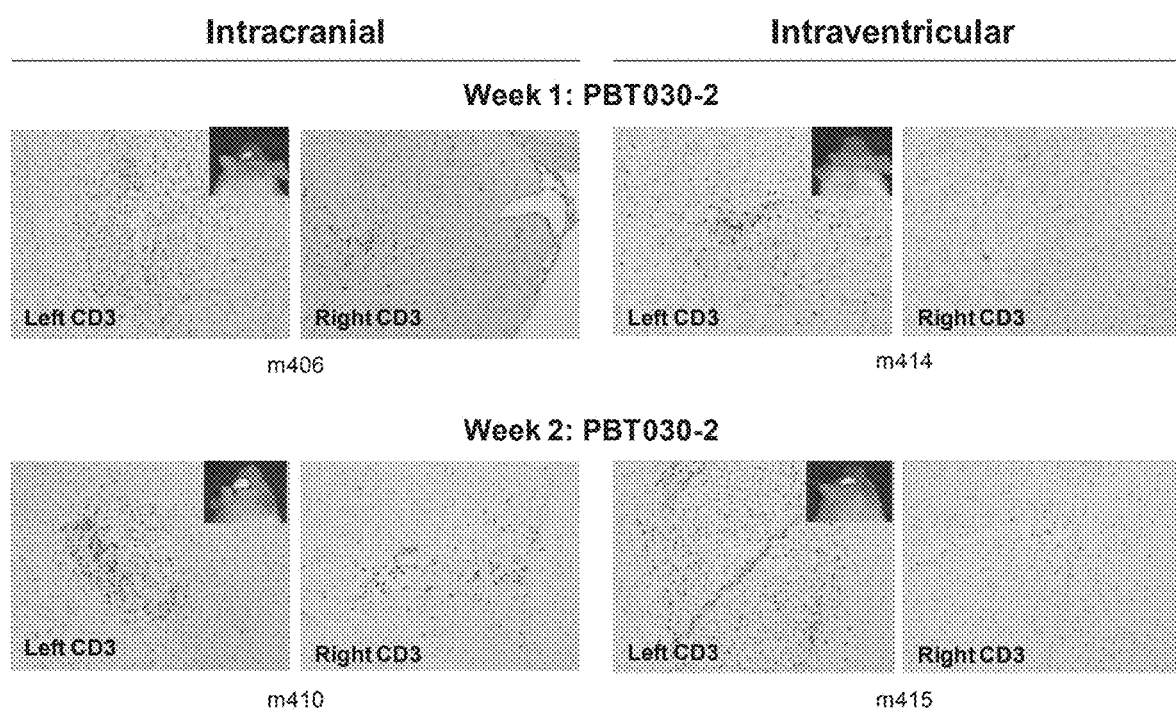
FIG. 30 depicts the results of studies demonstrating that huCD3+ cells are detected in the right and left brain tumors/hemispheres after ict and icv administration of IL13 (EQ) BBζ/CD19t+ $T_{CM}$. ffLuc$^+$ PBT030-2 tumor cells (1×10$^5$) were stereotactically implanted into the right and left forebrains of NSG mice. On day 6, mice were injected either ict (left images) or icv (right images) with 1×10$^6$ IL13 (EQ) BBζ+ Tcm (1.6×10$^6$ total cells; 63% CAR+). One week (top images) and two weeks (bottom images) after T cell administration, 2-3 mice were euthanized from each group, brains were harvested, embedded in paraffin, and IHC was performed with anti-human CD3 antibody to detect T cells. Representative IHC images of the left and right tumor sites from mice of each group (ict: m406 and m410; icv: m414 and m415) are depicted. Inlays depict the xenogen flux images of the mice at the day of euthanasia and brain harvest.

To determine if route of administration affected the ability of T cells to migrate to the tumor site, IHC analysis for CD3+ T cells was performed on the brains of mice from each group at one and two weeks after the T cell administration. As shown in FIG. 30, human CD3+ T cells were found at both the left and right tumor sites in mice that had received either ict or icv administered T cells. These data are representative of 3 mice in each group at one week, and 2 mice in each group at two weeks post T cell administration.

This study demonstrates that both intratumoral and intraventricular administration of T cells were well-tolerated in this NSG mouse model. Furthermore, in vivo multi-focal anti-tumor efficacy and IHC detection of T cells at the tumor sites can be observed with both ict and icv delivery of $T_{CM}$ qualification run cells that had been transduced with the IL13(EQ)BBZ-T2A-CD19t_epHIV7 vector. This study further suggests that icv delivered T cells may have greater efficacy than ict delivered T cells.

Example 15: Phase 1 Clinical Trial Evaluating IL-13Rα2 CAR T Cells for Treatment of Glioblastoma This example describes the initial findings of a clinical trial evaluating the safety, feasibility and bioactivity of weekly intracranial infusions of autologous IL13BBζ Tcm in patients with recurrent IL13Rα2+ GBM. As described in greater detail below, Enrolled patients undergo leukapheresis to collect autologous PBMC and, concurrent with IL13BBζ+ Tcm manufacturing, tumor biopsy or resection is performed, with placement of a reservoir/catheter device. Following baseline MR and PET imaging and recovery from surgery, patients are treated on a 4-week therapeutic regimen, consisting of 3-weekly intracranial infusions of IL13BBζ+ Tcm followed by one rest week for toxicity and disease assessment. The results to date for this first low dose cohort of three resection patients, suggest that local delivery of IL13BBζ Tcm post surgical resection is safe and well-tolerated with no grade 3 or higher toxicities attributed to the therapy observed, and importantly, demonstrate early evidence for antitumor activity following CAR T cell administration. For all patients in which a sample was available, CAR T cells were detected in the tumor cyst fluid or cerebral spinal fluid (CSF) by flow cytometry for a minimum of 7 days post treatment. One patient of particular interest presented with a recurrent multifocal GBM, including one metastatic site in the spine and extensive leptomeningeal disease. This patient was initially treated per protocol with six local infusions of IL13BBζ Tcm into the resection cavity of the largest recurrent tumor focus in the posterior temporal-occipital region. Encouragingly, this CAR T cell injection site remained stable without evidence of disease recurrence for over 7-weeks, while other disease foci distant from the CAR T cell injection site continued to progress. This patient was then treated on a compassionate use protocol with five weekly intraventricular infusions of IL13BBζ Tcm without any other therapeutic interventions. One week following the final intraventricular CAR T cell infusion, all intracranial and spinal tumors had regressed with most decreasing more than 75% by volume, and this patient remained clinically stable four months following the start of CAR T cell treatment.

The CAR, IL13 (EQ)BBζ, used in this study is described above. The sequence of the immature CAR, including the CD19t marker is depicted in FIG. 9A-9B. The entire immature sequence (SEQ ID NO:1) includes: a 22 amino acid GMCSF signal peptide (SEQ ID NO:2), a 112 amino acid IL-13 sequence (SEQ ID NO:3; amino acid substitution E13Y shown in bold); a 229 amino acid IgG4 sequence (SEQ ID NO:4; with amino acid substitutions L235E and N297Q shown in bold); a 22 amino acid CD4 transmembrane sequence (SEQ ID NO:5); a 42 amino acid 4-1BB sequence (SEQ ID NO:6); a 3 amino acid Gly linker; a 112 amino acid CD3ζ sequence (SEQ ID NO:7); a 24 amino acid T2A sequence (SEQ ID NO:8); and a 323 amino acid CD19t sequence (SEQ ID NO:9).

Autologous cells from each patient was used to prepare CD8+ CD4+ $T_{CM}$ cells which were then transfected with a lentiviral vector, described above, expressing IL13 (EQ) BBζ. Briefly, $T_{CM}$ were enriched from peripheral blood mononuclear cells (PBMC) using the CliniMACS® device to immunomagnetically select for CD45RO+/CD62L+ $T_{CM}$. These cells were activated with anti-CD3/CD28 Dynal beads, transduced with a SIN lentiviral vector that directs the expression of the IL13(EQ)BBζ CAR. The activated/genetically modified IL13 (EQ)BBζ/CD19t+ $T_{CM}$ cells were expanded in vitro with IL-2/IL-15 and then cryopreserved.

The treatment of two patients, both suffering from relapsed/refractory GBM is described below. Intracavity administration of CAR T cells was performed manually over about 5-10 minutes through a Rickham catheter followed by up to 1.0 mL preservative-free normal-saline (PFNS) flush delivered by convection enhanced delivery (CED) at 0.5 ml/hour. Intraventricular administration of CAR T cells was performed manually over approximately 5-10 minutes through a Rickham catheter placed into the lateral ventricle. This was followed by up to 0.5 mL preservative-free normal-saline (PFNS) flush delivered via a manual push technique over 5-10 minutes. The PFNS flush is meant to clear the administration line and push remaining CAR T cells through the catheter.

The time course of CAR T cell preparation and treatment is depicted in FIG. 31. Concurrent with the manufacturing process, research participants underwent resection of their tumor(s) followed by placement of a Rickham catheter and baseline imaging.

Patient UPN097 underwent tumor resection and was treated in Cycle 1 with 2×10⁶ cells and in Cycle 2 with 10×10⁶ cells. In both Cycle 1 and Cycle 2 the cells were administered to the cavity left by resection. After the second cycle Patient UPN097 was taken off the study due to rapid tumor progression.

Patient UPN109 was treated in Cycle 1 with 2×10⁶ cells and in Cycles 2 and 3 with 10×10⁶ cells. After a rest period, Patient UPN109 was treated in Cycles 4, 5 and 6 with 10×10⁶ cells. In Cycles 1-6 the cells were administered into. In Cycle 7 the patient was treated with 2×10⁶ cells. In Cycles 8 and 9 the patient was treated with 10×10⁶ cells. In Cycles 7-10 the administration was intraventricular.

FIG. 32A presents analysis of CAR T cell persistence, as monitored by CD19. This analysis shows good T cell persistence 8 days after the Cycle 2. FIG. 32B shows decreased presence of GBM cells as monitored by IL13Rα2 expression on cells.

FIG. 33A and FIG. 33B depict imaging results from Patient UPN097 in the region of the catheter used for intratumoral administration. In FIG. 33A one can see that few CD3+ or CD8+ T cells are present pretreatment. FIG. 33B, which is a sample at Day 16 post-treatment taken from the left frontal tumor cavity wall shows a large area of necrotic tumor and significant presence of CD3+ and CD8+ cells.

Figure 34:
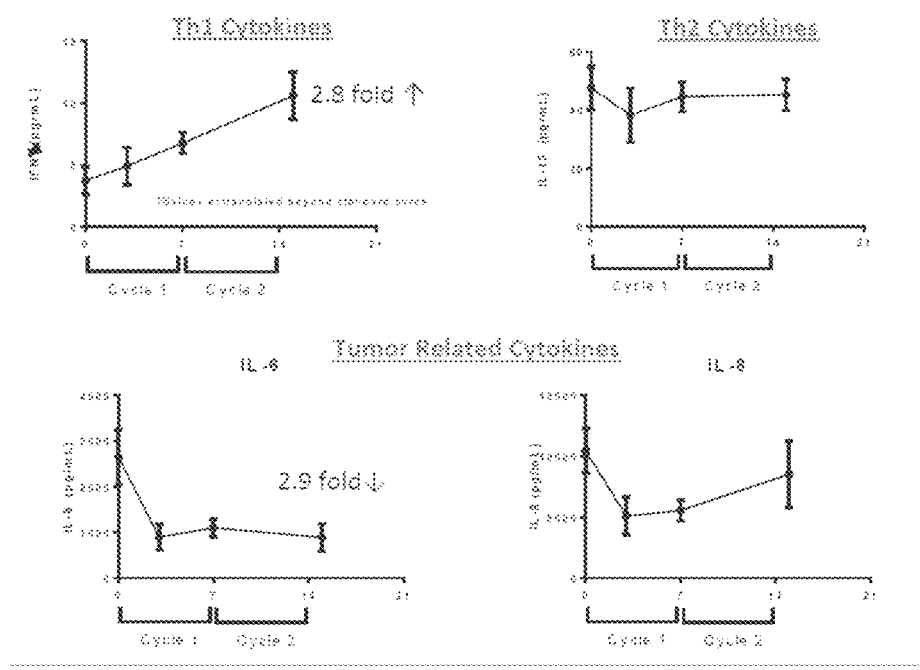
FIG. 34 is a series of graphs showing the levels of various cytokines during the course of treatment for one patient.

As shown in FIGS. 34A-D, there was an increase in IFN-gamma (a Th1 cytokine) over the two Cycles of treatment while levels of IL-13 (a Th2 cytokine did not change significantly (FIGS. 34A and 34B). IL-6, a tumor related cytokine, decreased during Cycle 1 and remained at the lower level during Cycle 2 (FIG. 34C). IL-8, another tumor related cytokine, decreased during Cycle 1, but increased towards its pre-Cycle 1 level during Cycle 2 (FIG. 34D).

Figure 35A:
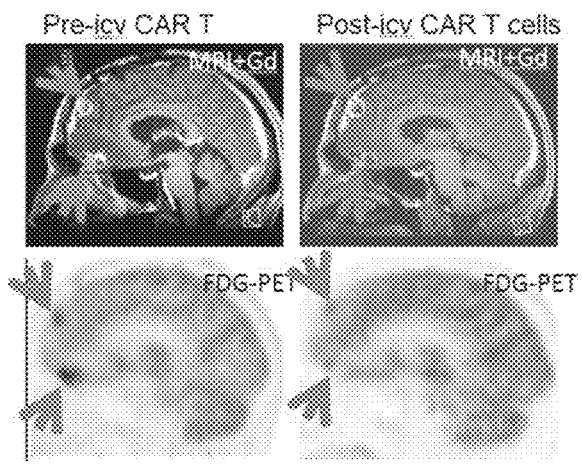
FIGS. 35A-C are images depicting egression of recurrent multifocal glioblastoma, including spinal metastasis, following intraventricular delivery of IL13Rα2-targeted CAR T cells. A patient presenting with a recurrent multifocal GBM, including one metastatic site in the spine and extensive leptomeningeal disease was treated with six local infusions of IL13BBζ Tcm into the resection cavity of the largest recurrent tumor focus (1 cycle of 2 M, and 5 cycles of 10M CAR+ T cells). While the CAR T cell injection site remained stable without evidence of disease recurrence for over 7-weeks, other disease foci distant from the CAR T cell injection site continued to progress (data not shown). This patient then received five weekly intraventricular (icv) infusions of IL13BBζ Tcm (1 cycles of 2 M, and 4 cycles of 10M CAR+ T cells). Shown are MRI and/or PET images of (A) transverse brain section, (B) saggital brain section, and (C) transverse (top) and frontal (bottom) sections of the spine before (left) and one week after (right) completion of i.c.v. therapy, with tumor lesion sites indicated by red arrows in each image.
Figure 35B:
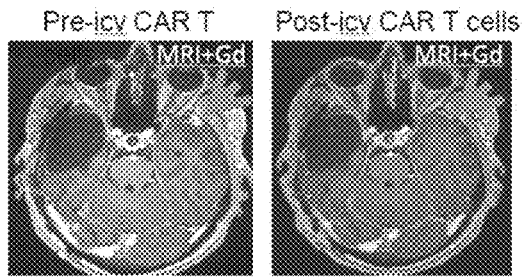
Figure 35C:
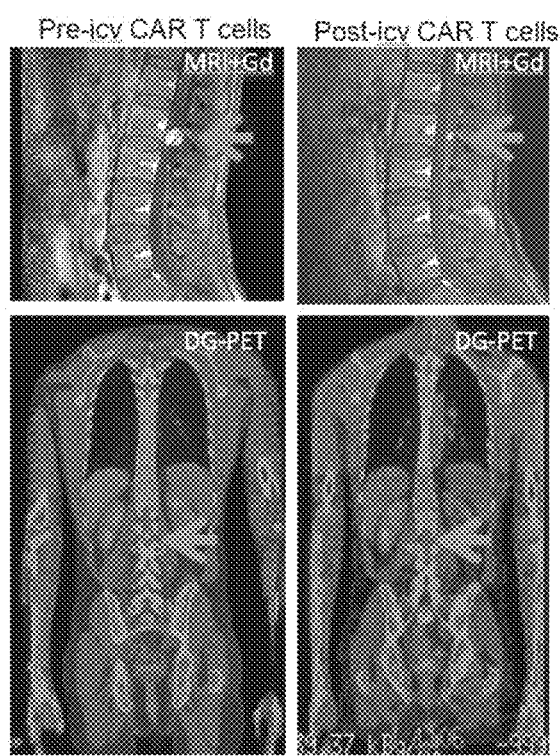

Patient UPN109 presented with a recurrent multifocal GBM, including one metastatic site in the spine and extensive leptomeningeal disease. As described above, this patient was treated with six local infusions of IL13BBζ Tcm into the resection cavity of the largest recurrent tumor focus. While the CAR T cell injection site remained stable without evidence of disease recurrence for over 7-weeks, other disease foci distant from the CAR T cell injection site continued to progress (data not shown). This patient then received five weekly intraventricular infusions of IL13BBζ Tcm, as described above. FIGS. 35A-B presents MRI and/or PET images of transverse brain section (FIG. 35A) and saggital brain section (FIG. 35B). FIG. 35C presents transverse (top) and frontal (bottom) sections of the spine before (left) and one week after (right) completion of intraventricular therapy, with tumor lesion sites indicated by red arrows in each image.

Example 16: Case Report on Intraventricular Administration

A 50 year old male was initially diagnosed with a low-grade brain tumor in the right temporal lobe after presenting with grand mal seizures. After four months of monitoring, this right temporal tumor displayed increased enhancement by MRI, and the patient underwent tumor resection which confirmed a diagnosis of WHO grade IV glioma (GBM). The patient then received standard-of-care adjuvant proton radiation to a total dose of 59.4 cobalt Gy equivalent with concurrent temozolomide (140 mg daily), followed by 4-cycles of temozolomide with concomitant use of the Novocure device (NovoTTF-100A) for three months. Six months after the primary tumor resection, PET and MRI images showed evidence of disease progression.

Figure 36A:
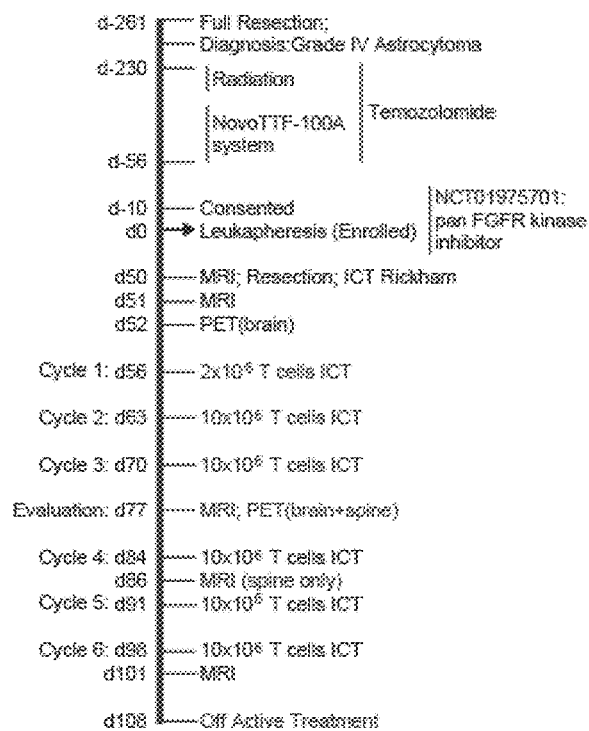
FIGS. 36A-B shows treatment regimens with enrollment on NCT02208362 and a compassionate use protocol. Enrollment on NCT02208362 was set at day 0 (A), with initiation of compassionate use protocol on day 107 (B). NovoTTF-100A, a portable medical device that delivers low intensity, intermediate frequency, alternating electric fields by means of noninvasive, disposable scalp electrodes; FGFR, fibroblast growth factor receptor; MRI, magnetic resonance imaging, all of which was performed on the brain unless otherwise indicated; ICT, intracavitary; PET, positron emission tomography, performed at the indicated sites; ICV, intracerebroventricular.
Figure 36B:
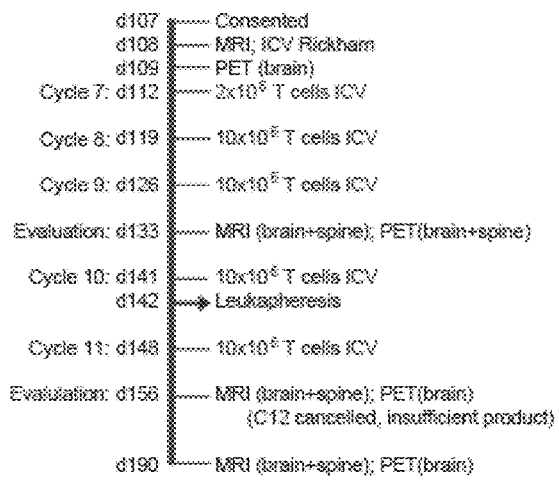

The patient was then treated autologous IL13Rα2-targeted CAR T cells (FIG. 36) following confirmation of IL13Rα2-expression in the primary right temporal lobe tumor by IHC, with an H score of 100 (FIG. 37). Peripheral blood mononuclear cells (PBMC) were then collected by leukapheresis followed by enrichment of CD4+ CD8+ TCM via a two-step depletion selection procedure as previously described. During IL13BBζ TCM manufacturing, the patient was treated on a separate clinical protocol evaluating a fibroblastic growth factor inhibitor (NCT01975701), and progressed through therapy with symptoms of headaches, confusion and disorientation increasing. Additionally, the patient was tapered off steroids prior to T cell injections.

Ten months post primary tumor resection, the patient underwent another surgical resection for three of five identified progressing GBM lesions (FIG. 38), including the largest lesion in the right posterior temporal-occipital region (T1) where the reservoir/catheter device was placed, and two lesions in the right frontal lobe (T2, T3). Two additional tumors in the left temporal area were not surgically removed (T4,T5). Six days post-surgical resection, the patient received two 4-week treatment regimens, each consisting of three weekly intracavitary (ICT) infusions of IL13BBζ TCM followed by a week for toxicity evaluation and disease assessment. This patient was treated starting with a low dose of $2 \times 10^6$ CAR+ T cells followed by five infusions of $10 \times 10^6$ CAR+ T cells (FIG. 39). Following these six ICT infusions, under a compassionate use protocol, a second catheter was placed in the right lateral ventricle, allowing the patient to receive an additional five intracerebroventricular (ICV) treatment cycles of IL13BBζ TCM, again starting at a low dose of $2 \times 10^6$ CAR T cells followed by four infusions of $10 \times 10^6$ CAR T cells (FIG. 40).

Due to limited therapeutic product only five ICV infusion cycles were feasible. Overall, the patient received 11 cell infusions for a total dose of $94 \times 10^6$ CAR+ T cells. The treatment course encompassed 15-weeks, with evaluation weeks for toxicity and disease assessment (i.e., MRI and PET imaging) taking place after every third cycle, and after the final two ICV infusions. The patient received no other therapeutic interventions during this CAR T cell treatment course, and findings up to the 190 day evaluation period, encompassing the 11 infusions cycles, is reported here. Subsequently, a second IL13BBζ TCM product was manufactured and beginning on day 192 this patient has continued to receive ICV infusions of this second manufactured product approximately every 3 weeks.

Example 17: Study Design

These studies, including the compassionate use protocol, were approved by an institutional review board, and the patient provided written informed consent. Eligibility included prior histologically-confirmed diagnosis of an IL13Rα2+ grade IV glioma that is now recurrent, age >18 years with a Karnofsky performance status (KPS)>60, adequate cardiopulmonary function, and a survival expectation >4 weeks. The patient must have completed initial radiation therapy at least 12 weeks prior to enrollment, and must not have any other active malignancies, infections or intercurrent illness or be receiving other investigational agents or require more than 2 mg TID (3×/day) of Dexamethasone during T cell therapy.

This patient was initially treated under our ongoing phase I study (NCT02208362) to evaluate the safety and feasibility of weekly intracranial infusions of autologous IL13Rα2-targeted CAR T cells (IL13BBζ TCM) in patients diagnosed with recurrent/refractory IL13Rα2+ high-grade glioma (WHO Grades III and IV). This is a two arm study with T cells administered either directly into the tumor (stratum 1=intratumoral) or into the tumor resection cavity (stratum 2=intracavitary). After completing the six intracavitary (ICT) infusion cycles, this patient was then treated under a separate compassionate use protocol allowing for intracerebroventricular (ICV) delivery of IL13BBζ TCM.

Example 18: Cell Product Manufacture and Infusion

The lentiviral vector encoding the 4-1BB costimulatory, IL13Rα2-targeted CAR, IL13BBζ, is detailed herein. Briefly, the codon optimized CAR sequence contains a membrane-tethered human IL-13 ligand mutated at a single site (E13Y) to reduce potential binding to IL13Rα1, a human IgG4 Fc spacer containing two mutations (L235E; N297Q) that prevent Fc receptor-mediated recognition, a human CD4 transmembrane domain, a human costimulatory 4-1BB cytoplasmic signaling domain, and a human CD3ζ cytoplasmic signaling domain. A T2A ribosome skip sequence then separates this IL13BBζ CAR sequence from a truncated human CD19 sequence (CD19t), an inert, non-immunogenic cell surface marker.

For IL13BBζ TCM manufacturing, on the day of leukapheresis, PBMC were isolated by density gradient centrifugation over Ficoll-Paque (GE Healthcare) followed by two washes in PBS/EDTA. PBMC were then washed once in PBS, resuspended in X Vivo15 media (Bio Whittaker) containing 10% fetal calf serum (FCS) (Hyclone), transferred to a 300 cc transfer bag, and stored on a 3-D rotator overnight at room temperature (RT). The following day, $5 \times 10^9$ PBMC were incubated in a 300 cc transfer bag with clinical grade anti-CD14 (1.25 mL), anti-CD25 (2.5 mL) and anti-CD45RA (2.5 mL) microbeads (Miltenyi Biotec) for 30 minutes at RT in X Vivo15 containing 10% FCS. CD14+, CD25+, and CD45RA+ cells were then immediately depleted using the CliniMACS™ depletion mode according to the manufacturer's instructions (Miltenyi Biotec). After centrifugation, the unlabeled negative fraction of cells was resuspended in CliniMACS™ PBS/EDTA buffer (Miltenyi Biotec) containing 0.5% human serum albumin (HSA) (CSL Behring) and then labeled with clinical grade biotinylated-DREG56 mAb (COHNMC CBG) at 0.6 mL for 30 minutes at RT. The cells were then washed and resuspended in a final volume of 100 mL CliniMACS™ PBS/EDTA containing 0.5% HSA and transferred into a new 300 cc transfer bag. After 30 minutes incubation with 1.25 mL anti-biotin microbeads (Miltenyi Biotec), the CD62L+ fraction (TCM) was purified with positive selection on Clini- MACS™ according to the manufacturer's instructions, and resuspended in X Vivo15 containing 10% FCS.

Within 2 hours of enrichment, $26.9 \times 10^6$ TCM were stimulated with GMP Dynabeads® Human T expander CD3/CD28 (Invitrogen) at a 1:3 ratio (T cell:bead), and transduced with clinical grade IL13BBζ-T2A-CD19t_epHIV7 at an MOI of 0.3 in 5.5 mL×Vivo15 containing 10% FCS with 5 μg/mL protamine sulfate (APP Pharmaceutical), 50 U/mL rhIL-2 and 0.5 ng/mL rhIL-15 in a 32 Vuelife tissue culture bag (AFC) that was placed at a horizontal position on a culture rack at 37° C., 5% CO2. Cultures were then maintained with addition of X-Vivo15 10% FCS as required to keep cell density between $4 \times 10^5$ and $2 \times 10^6$ viable cells/mL, with cytokine supplementation (final concentration of 50 U/mL rhIL-2 and 0.5 ng/mL rhIL-15) every Monday, Wednesday and Friday of culture. Based on culture volume, T cells were transferred to 730 Vuelife bags (AFC). Seven days after the lentiviral transduction, the CD3/CD28 Dynabeads were removed using the Dynal ClinEx Vivo Magnetic Particle Concentrator bag magnet, and bead-free T cells were drained into a new 730 Vuelife bag. Cultures were propagated until approximately $4.53 \times 10^8$ cells were generated as determined by Guava PCA, at which time cultures were harvested, washed in Isolyte (Braun) with 2% HSA, then resuspended in Cryostor CS5 (BioLife Solutions) at approximately $1.3 \times 10^7$ cells/mL for cryopreservation using a Mr. Frosty (Nalgene) and a portable controlled rate freezer system (Custom Biogenics). Quality control tests included viability, potency (CD19t expression), Identity (CD3 expression), transgene copy number (WPRE qPCR), replication competent virus testing (VSV-G qPCR and formal RCL testing at the University of Indiana), residual bead count, and sterility.

Figure 39A:
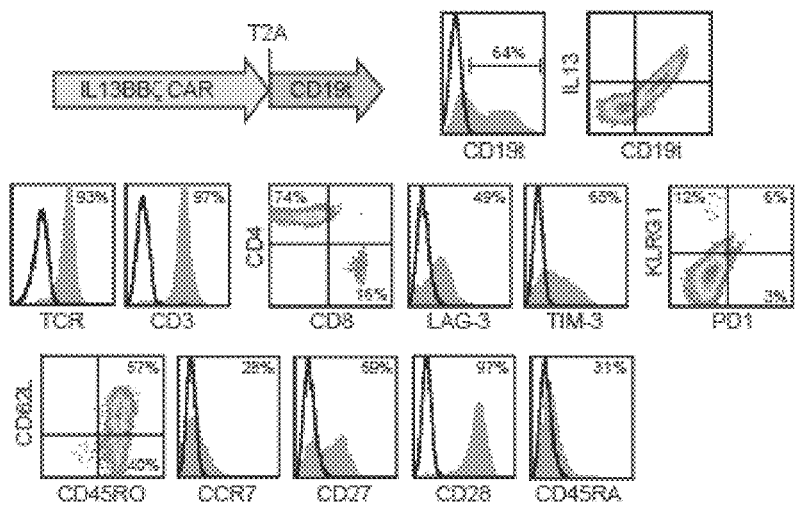
FIGS. 39A-C shows resected tumor region remains stable, without evidence of disease progression/recurrence following intracavitary delivery of IL13BBζ TCM. (A) Flow cytometry analysis of the IL13BBζ TCM cell product. Top row, transduction with the indicated construct drove coordinate surface expression of the IL13BBζ CAR (detected with anti-IL13) and the CD19t marker (detected with anti-CD19) via the T2A ribosomal skip sequence. Staining profiles for the T cell markers TCR-α/β, CD3, CD4 and CD8, as well as the exhaustion markers LAG-3, TIM-3, KLRG1 and PD-1 are depicted in the middle row; staining profiles for the memory markers CD62L, CD45RO, CCR7, CD27, and CD28, as well as the naïve T cell marker CD45RA are depicted in the bottom row. (B) Treatment schema under NCT02208362. After the patient experienced recurrence and underwent tumor excision with placement of an intracavitary (ICT) Rickham catheter, 6 cycles of ICT cell doses (1 cycle of $2\times10^6$, and 5 cycles of $10\times10^6$ CAR+ cells) were administered with one week rest between cycles 3 and 4. Red arrow, site of IL13BBζ TCM delivery. (C) Yellow circles on brain MRI scans show the site of resected tumor where catheter was placed (T1), as well as the resected-only tumor sites in the frontal lobe (T2, T3), and the newly arising tumor sites (T6, T7) over the 51-day ICT treatment time period.
Figure 39B:
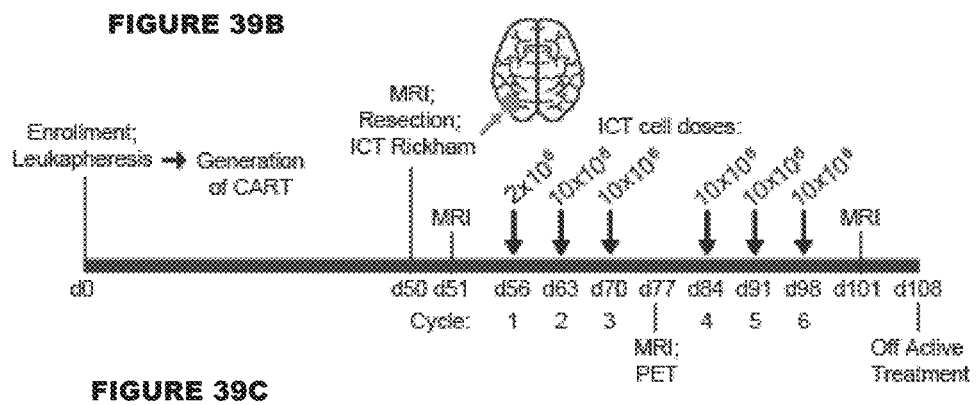

As noted above, the T2A ribosome skip sequence12 then separates this IL13BBζ sequence from CD19t, an inert, nonimmunogenic cell surface marker marking cell transduction (FIG. 39A). This T2A linkage results in the coordinate expression of both IL13BBζ and CD19t from a single transcript.

Manufacturing methods for the immunomagenetic enrichment of CD62L+ CD45RA– CD4+ CD8+ central memory T cells (TCM), lentiviral transduction and ex vivo expansion are also detailed herein. The end-of-process (EOP) cyropreserved IL13BBζ TCM product underwent quality control release testing as per the clinical protocol. For each infusion, T cells were thawed, washed and reformulated into a final volume of 0.5 mL in pharmaceutical preservative-free normal saline (PFNS) with 2% human serum albumin (HSA). Cells were manually injected into the Rickham reservoir using a 21 gauge butterfly needle to deliver a 0.5 mL volume over 5-10 minutes, followed by up to 1 mL PFNS flush delivered by convection enhanced delivery (CED) at 0.5 mL per hour.

Example 19: Clinical Imaging

The post-gadolinium T1 weighted MRI sequences of the brain and spine were acquired on a Siemens Viro 3 Tesla scanner. Lesions were measured on axial T1 MPR weighted images obtained after the administration of Multihance. Imaging with 18-F-fluorodeoxyglucose (18-F-FDG) was performed using a GE Discovery DST HP60 PET-CT scanner (70 cm axial field of view, slice thickness 3.75 mm). Maximal standardized uptake values (SUVs) were obtained utilizing Vital Images Vitrea version 6.7.2 software. Regions of contrast-enhancing tumor foci were outlined by a radiologist for measurements of largest tumor area (mm2) and tumor volumes (cm3) were computed.

Cryopreserved cell banks of quality control released autologous IL13BBζ TCM were thawed and reformulated for infusion by washing twice with phosphate buffered saline (PBS) with 2% HSA and resuspending in pharmaceutical preservative-free normal saline with 2% HSA. Delivery of the therapeutic CAR T cells into either the glioma resection cavity (ICT) or the lateral ventricle (ICV) was achieved using a Holter™ Rickham Ventriculostomy Reservoir (Codman), with a ventricular catheter (Integra Pudenz), and a stylet. For ICT delivery, the reservoir/catheter system was inserted at the time of tumor resection, and the tip of the catheter was partially embedded into the resection wall in order to allow for cell delivery both into the cavity and into the peritumoral brain tissue. Post-operative imaging (CT and MRI) were obtained to confirm catheter position and extent of tumor resection.

Example 20: IL13BBζ TCM Display a Central Memory-Like T Cell Phenotype

Enriched TCM ($36 \times 10^6$) were ex vivo stimulated, lentivirally transduced and expanded to yield $638 \times 10^6$ total cells in 17 days. The final T cell product (CD3+ and TCR+) consisted of CD4 (74%) and CD8 (16%) T cell subsets and expressed IL13BBζ and CD19t with gene modified co-staining for both cell surface proteins (FIG. 39A). The CAR T cell product exhibited a central memory T cell phenotype, expressing CD45RO (97%), CD62L (57%), CCR7 (28%), CD28 (97%) and CD27 (59%) (FIG. 39A). The product also expressed of some markers of exhaustion, including TIM-3 (65%) and LAG-3 (49%), but not significant levels of PD-1 and KLRG1 (FIG. 39A).

Example 21: Safety and Tolerability of Repetitive Intracranial Infustions of IL13BBζ TCM The patient was treated with weekly infusions of IL13BBζ TCM administered via a reservoir/catheter device through two different intracranial delivery routes, that being intracavitary (ICT) delivery following tumor resection (cycles 1-6) and intracerebroventricular (ICV) delivery into the cerebral spinal fluid (CSF) (cycles 7-11). The 11 intracranial infusions, at a maximum cell dose of $10 \times 10^6$ CAR+ T cells, were well-tolerated with no grade 3 or higher toxicity (NCI Common Toxicity Criteria) with possible or higher attribution to the therapy observed. Mild events noted following CAR T cell infusions include.

TABLE 6

SAFETY AND TOLERABILITY

| Delivery Route | T-cell Doses | Maximum T-cell Dose | Cumulative T-cell Dose | Adverse Event (Grade 1-2)* |
|---|---|---|---|---|
| ICT | 6 | $10^7$ | $5.2 \times 10^7$ | Chills<br>Fatigue<br>Fever<br>Lymphopenia<br>Myalgia<br>Dizziness<br>Headache<br>Seizure |
| ICV | 5 | $10^7$ | $4.2 \times 10^7$ | Chills<br>Fatigue<br>Fever<br>Myalgia |

TABLE 6-continued

SAFETY AND TOLERABILITY

| Delivery Route | T-cell Doses | Maximum T-cell Dose | Cumulative T-cell Dose | Adverse Event (Grade 1-2)* |
|---|---|---|---|---|
| | | | | Headache |
| | | | | Short Olfactory Aura |
| | | | | Seizure |
| | | | | Anxiety |
| | | | | Hypertension |
| | | | | Sinus Tachycardia |

*Only events with possible or higher attribution to the T cell administration are reported; all occurred once and were Grade 1-2 according to the NCI Common Toxicity Criteria, with no events of Grade 3 or higher observed.

Example 22: Clinical Response

At the time of treatment, the patient's tumor displayed characteristics of a highly aggressive recurrent GBM with poor prognostic features. This included evidence of recurrence from primary diagnosis within six months following standard-of-care therapy, the presentation of multifocal tumor lesions, including spinal lesions and extensive leptomeningeal disease (FIG. 38), histological features of a dedifferentiated GBM, and a high tumor proliferation rate with over 60% of the cells staining positive for Ki67 (FIG. 37B). Tumor expression of IL13Rα2, as evaluated by IHC on FFPE of resected tumor tissue, was similar between the primary and recurrent tumors with an H score of 100 and 80, respectively (FIG. 37). Intratumoral IL13Rα2 expression for the recurrent tumor was heterogeneous, with 10% of the cells showing high staining intensity (2-3+), 60% showing low expression (1+), and 30% of the cells not staining above background (0+). Of potential interest, the highest levels of IL13Rα2 expression were often observed in tumor regions of pseudopalisading necrosis (FIG. 37A), an expression pattern noted for other GBM tumors.

Figure 39C:
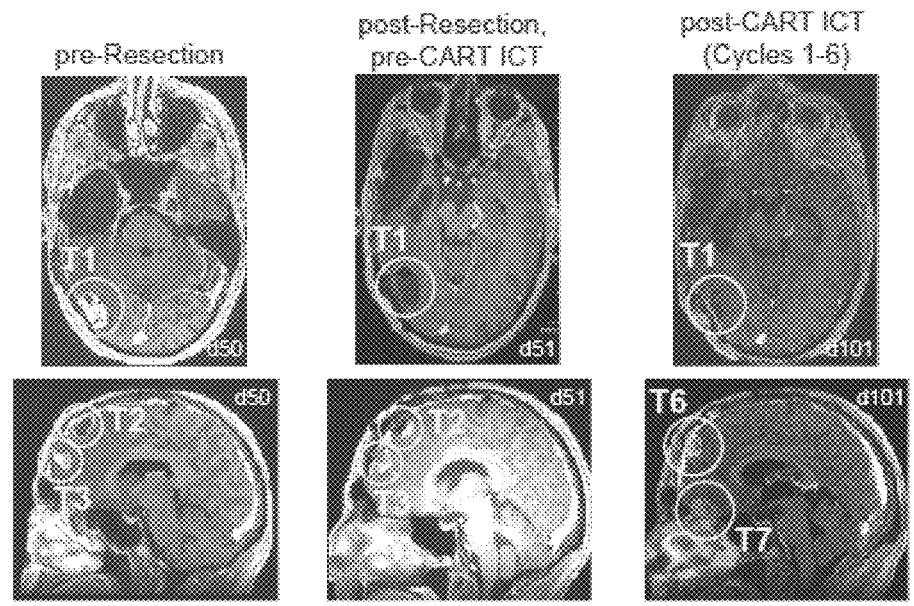

Following enrollment on the clinical protocol, this patient underwent surgical resection for three of the five recurrent lesions (FIG. 38), and the reservoir/catheter device was place in the resected cavity of the largest recurrent foci (T1) in the right posterior temporal-occipital area. This patient was initially treated per protocol with six weekly intracavitary (ICT) infusions of CAR+ T cells ($2\times10^6$ cycle 1; $10\times10^6$ cycles 2-6) (FIG. 1B), and during this time period the temporal-occipital tumor lesion (T1) remained stable for over 45-days post-surgery without evidence of progressive disease (FIG. 39C). MRI revealed, however, that other non-resected tumor foci in the left temporal lobes (T4 and T5), as well as a new recurrent lesion adjacent to tumor 3 (T6) and a lesion in the olfactory groove (T7) continued to progress over this same time period (FIG. 39C). Additionally, metastatic lesions in the spine, including one large tumor (270 mm$^2$) and more than one small tumor foci (<1 cm$^2$) were also detected. These results, while mixed, were encouraging, in that they suggested the IL13BBζ T$_{CM}$ may have prevented disease recurrence at the resected posterior temporal-occipital area, however, they also suggested that local ICT delivery was not sufficient to effectively control tumor progression at distant locations away from the infusion site.

Figure 40A:
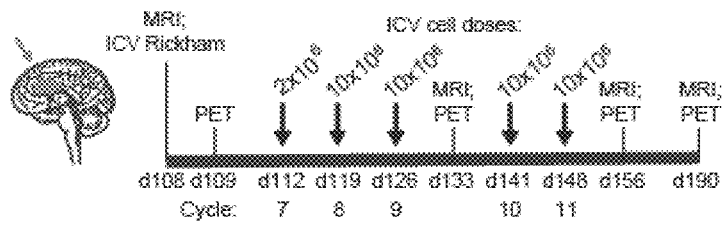
FIGS. 40A-E shows regression of recurrent multifocal glioblastoma, including spinal metastases, following intracerebroventricular delivery of IL13Rα2-targeted CAR T cells. (A) Treatment schema under compassionate use protocol. After the patient underwent placement of an intracerebroventricular (ICV) Rickham catheter, 5 cycles of ICV cell doses (1 cycle of $2\times10^6$ and 4 cycles of $10\times10^6$ CAR+ cells, indicated as cycles 7 through 11) were administered with one week rest between cycles 9 and 10. Red arrow, site of IL13BBζ TCM delivery. MRI and/or PET images of (B) transverse brain sections, (C) saggital brain sections, and (D) transverse (top) and frontal (bottom) sections of the spine before (left) and one week after (right) completion of ICV therapy, with tumor lesion sites indicated by yellow circles in each image. (E) Maximum lesion areas for non-resected tumors T4-T8 depict their respective decreases over time with ICV therapy.

Based on these findings and supported by preclinical studies showing that ICV delivery of CAR T cells can traffic to multifocal GBM in NSG mouse models (data not shown), this patient was enrolled on a compassionate use protocol and treated with five weekly ICV infusions of IL13BBζ T$_{CM}$ without any other therapeutic interventions ($2\times10^6$ cycle 7; $10\times10^6$ cycles 8-11) (FIG. 40A). One week after three ICV infusions (cycle 9; day 133) all tumor lesions showed dramatic regression, and following the final ICV infusion (cycle 11; day 156), most intracranial and spinal tumors had regressed more than 70% by both maximum area and volume measurements (FIG. 40B-E, Table 7 below, and FIG. 41). Follow-up MR and PET imaging six weeks after the last ICV infusion (day 190), during which the patient received no other therapeutic intervention, showed continued disease regression, with all tumors decreasing 78% by both maximum area and volume measurements (FIG. 40B-E, Table 7 below, and FIG. 41). At this 190 day time point, it was not possible to differentiate between residual radiographic evidence of disease versus inflammation, scaring and/or dural enhancement. ICV delivery of IL13BBζ T$_{CM}$ elicited almost complete elimination of all metastatic tumors in the spine, with 97% reduction in the maximum area for the largest lesion and only one small tumor foci visible out of the more than ten present prior to ICV treatment. Over the time course of ICV treatment, and coinciding with tumor regression, the patient was able to reduce system dexamethosome from 2 mg bid to 0.5 mg qd. This patient remains clinically stable and has returned to normal life and work activities, thus supporting the durability of this CAR T cell-mediated anti-tumor response. These results demonstrate that treatment with IL13BBζ T$_{CM}$ mediated a near complete response based on the stringent RANO criteria.

TABLE 7

MRI Evaluation of Non-Resected Lesions (Volume in cm$^3$, Area in mm$^2$)

| Tumor | Anatomical Location | Pre Op D50 | Post Op i.c.t. D51 | Post Cycles 1-3 D77 | Post Cycles 4-6 D86 | Post Cycles 4-6 D101 | Post Op i.c.v. D108 | Post Cycles 7-9 D133 | Post Cycles 10-11 D156 | Post Cycles 10-11 D190 | Max % Decrease |
|---|---|---|---|---|---|---|---|---|---|---|---|
| 4 | Left temporal, pterion | 0.2 cm$^3$ 65 mm$^2$ | 0.3 cm$^3$ 98 mm$^2$ | 0.5 cm$^3$ 112 mm$^2$ | ND | 0.8 cm$^3$ 168 mm$^2$ | 1.4 cm$^3$ 224 mm$^2$ | 0.3 cm$^3$ 80 mm$^2$ | 0.1 cm$^3$ 49 mm$^2$ | 0.1 cm$^3$ 28 mm$^2$ | Vol: 93% Area: 88% |
| 5 | Left temporal, apex | 0 cm$^3$ 20 mm$^2$ | 0 cm$^3$ 20 mm$^2$ | 0.1 cm$^3$ 36 mm$^2$ | ND | 0.3 cm$^3$ 54 mm$^2$ | 0.7 cm$^3$ 126 mm$^2$ | 0.1 cm$^3$ 33 mm$^2$ | 0 cm$^3$ 11 mm$^2$ | 0 cm$^3$ 7 mm$^2$ | Vol: 100% Area: 94% |
| 6* | Right frontal lobe | NA 0 mm$^2$ | NA 0 mm$^2$ | 0.5 cm$^3$ 42 mm$^2$ | ND | 1 cm$^3$ 176 mm$^2$ | 1.7 cm$^3$ 187 mm$^2$ | 1.8 cm$^3$ 300 mm$^2$ | 1.4 cm$^3$ 143 mm$^2$ | 0.4 cm$^3$ 64 mm$^2$ | Vol: 78% Area: 79% |

TABLE 7-continued

MRI Evaluation of Non-Resected Lesions (Volume in cm³, Area in mm²)

| Tumor | Anatomical Location | Pre Op D50 | Post Op i.c.t. D51 | Post Cycles 1-3 D77 | Post Cycles 4-6 D86 | | Post Op i.c.v. D108 | Post Cycles 7-9 D133 | Post Cycles 10-11 D156 | | Max % Decrease |
|---|---|---|---|---|---|---|---|---|---|---|---|
| | | | | | | D101 | | | | D190 | |
| 7* | Olfactory groove | NA 27 mm² | 0.1 cm³ 18 mm² | 0.4 cm³ 60 mm² | ND | 1.4 cm³ 171 mm² | 2.5 cm³ 360 mm² | 1.9 cm³ 312 mm² | 1.3 cm³ 98 mm² | 0.3 cm³ 40 mm² | Vol: 88% Area: 89% |
| 8 | Spinal | ND | ND | ND | 270 mm² | ND | ND | 35 mm² | 18 mm² | 8 mm² | Area: 97% |

*new lesion arising during Cycles 1-6
Bold, values compared for Maximum % Decrease
NA, no lesion could be identified
0, lesion might be visually identified, but value was below that of analysis software parameters
ND, imaging was not done

Example 23: CAR T Cell Persistence and CNS Inflammatory Response

Figure 42A:
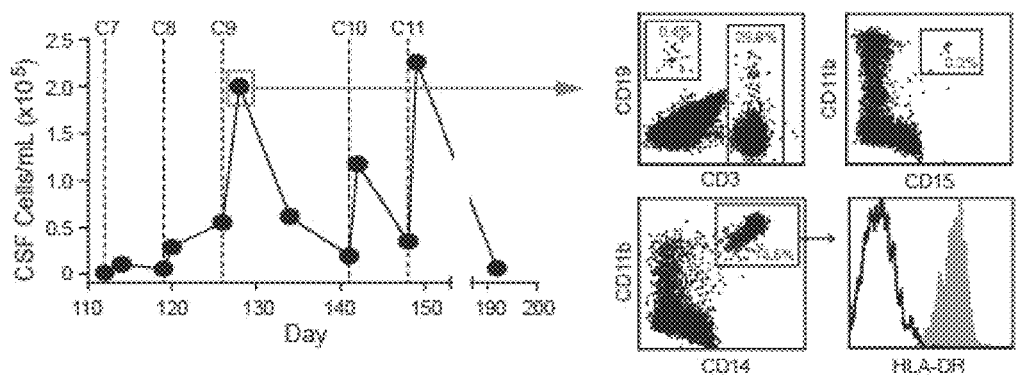
FIG. 42A-C shows analysis of cell infiltrates and cytokines from cerebrospinal fluid (CSF) samples. (A) CSF cellular infiltrate numbers spiked after ICV cycles 9, 10 and 11, with flow cytometric evidence of CD19+ B cells, both CAR+ (i.e., CD19t+) and non-engineered CD3+ T cells, CD11b+ CD15+ granulocytes, and CD11b+ CD14+ HLA-DR+ monocytes. (B) Evaluation of the CD3+ T cell population in the CSF for the presence of gene-modified (i.e., CD19t+) T cells. CD3-gated cells from the CSF collected at the indicated day of cycles 9, 10 and 11 were co-stained for CD19 and CD8 (top histograms). Percentages of immunoreactive cells were then used to calculate numbers of total CD3+ T cells and CD19+ CD3+ (IL13BBζ TCM) cells per mL of CSF fluid at each time point. (C) Fold change in cytokine levels with ICV treatment cycles 7-11. Only those cytokines from the 30-plex analysis that exhibited a 10-fold or more change compared to pre-treatment levels are depicted.
Figure 42B:
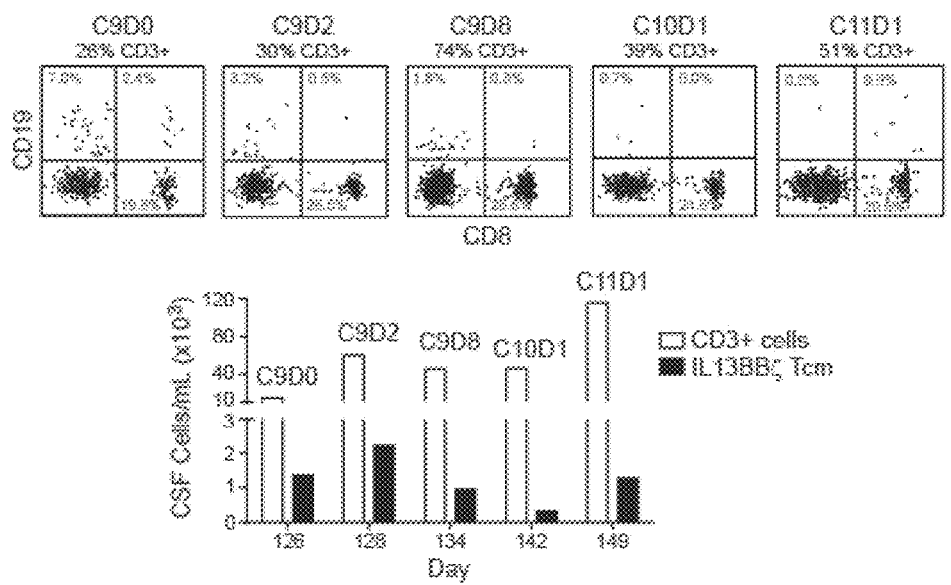
Figure 42C:
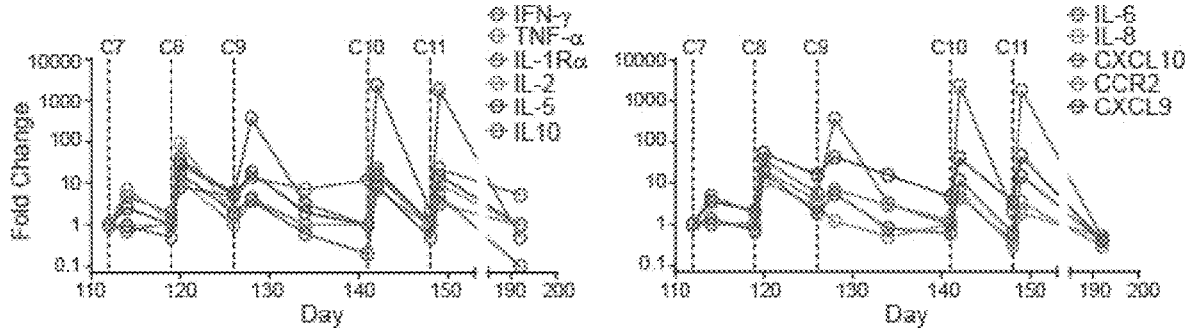

To elucidate immunological changes associated with anti-tumor responses observed following the ICV infusion of IL3BBζ $T_{CM}$ (Cycles 6-11), CSF was evaluated for cell infiltrates, CAR+ T cell persistence, and cytokine levels. Immediately following each ICV infusion (i.e., day 1-2 of cycles 6-11), cell numbers per mL of CSF increased 7.0±3.6 fold as compared to pre-infusion levels (day 0 of each cycle), and increased 153±128 fold as compared to pre-ICV (C7D0) levels (FIG. 42). Total cell numbers in the CSF typically decreased over the 7-day treatment cycle. As evaluated for C9D2, the cell infiltrates included a large proportion of CD3+ T cells, both endogenous and CAR-expressing, as well as CD14+ CD11b+ HLA-DR+ mature myeloid populations (FIG. 42A). Only rare CD19+ B cells and CD11b+ CD15+ granulocytes were detected (FIG. 42A). Consistent with flow cytometry data, CSF cytopathology on C11D1 reported the presence of reactive lymphocytes, monocytes, and macrophages.

Figure 40B:
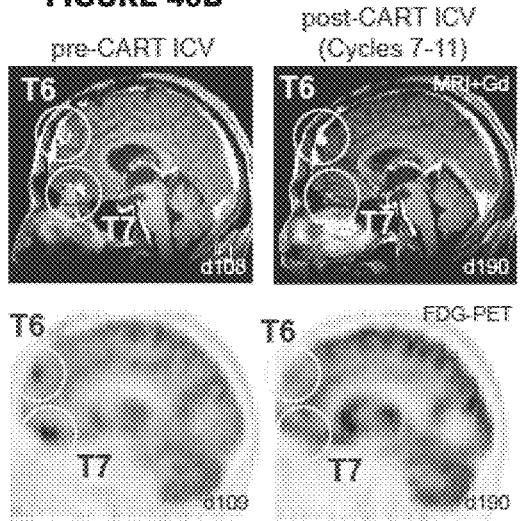
Figure 40D:
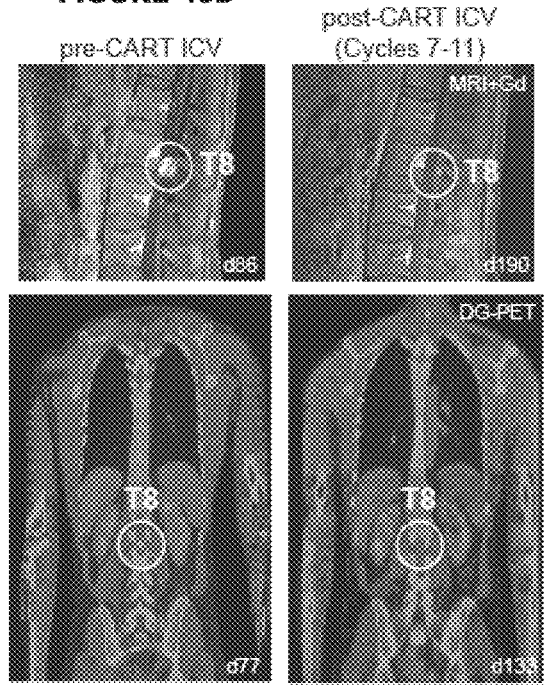
Figure 40C:
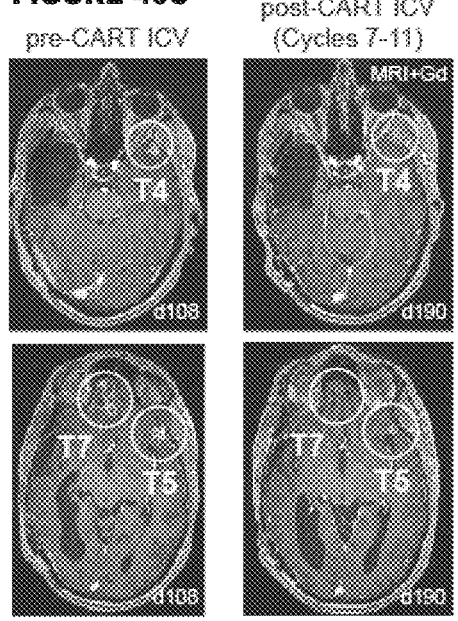
Figure 40E:
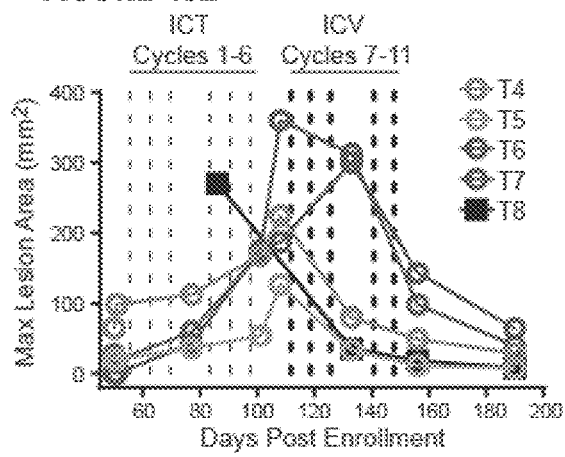
Figure 41:
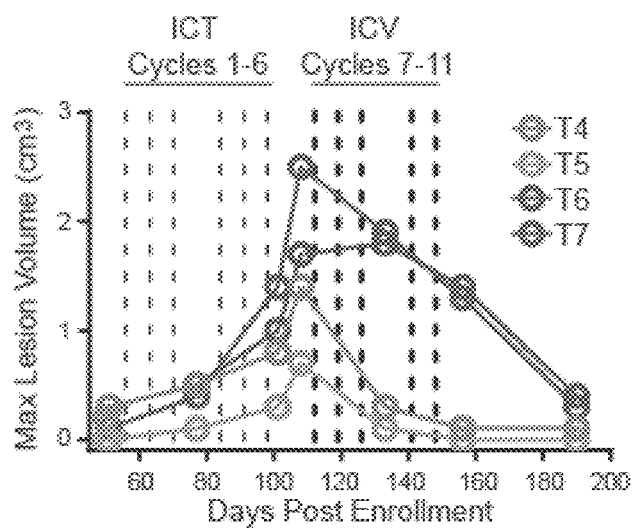
FIG. 41 shows regression of recurrent multifocal GBM following ICV delivery of IL13Rα2-targeted CAR T cells. Maximum lesion areas for non-resected tumors T4-T7 are depicted.

CAR-T persistence was also monitored over the ICV treatment course. Due to low cell recovery in the CSF for cycles 7 and 8, analysis focused on evaluating cycle 9 and time points immediately following cycles 10 and 11. Importantly, CAR+ T cells were detected at all-time points evaluated (FIG. 42B), including C9D0 which corresponded to 7-days post cycle 8, thus demonstrating persistence of the therapeutic cells for at least 7 to 8 days post-infusion. However, CAR T numbers in the CSF post infusion decreased at the later cycles (C10D1 and C11D1) when tumor burden had also significantly decreased (FIG. 40B). To note, significant expansion of the CAR T cells in the CSF over cycle 9 was not detected, with CAR+ cell numbers increasing 1.6-fold 2 days later (C9D2) from pre-infusion (C9D0) and then decreasing 2.3-fold by day 8 (C9D8).

The presence of immune cells, including CAR+ T cells, following each infusion corresponded to significant elevations of cytokine levels in the CSF. The measured levels and calculated fold-change over baseline for the 30-cytokines measured is presented in Tables 9 and 10 below. Notably, 11 cytokines increased more than 10-fold from pre-ICV baseline (C7D0) immediately following IL3BBζ $T_{CM}$ infusions, including cytokines IFNγ, TNF, IL-2, IL-10, IL-5, IL-6, and IL-8 and chemokines CXCL9/MIG, CXCL10/IP-10, and CCR2/MCP-1 and soluble cytokine receptor IL-1Rα (FIG. 3C). Seven other cytokines showed greater than a 5-fold increase from baseline (C7D0), including G-CSF, IL-12, IL2-R, IL-4, IL-7, and MIP-1b. The inflammatory cytokines that exhibited the highest fold increase immediately following IL3BBζ $T_{CM}$ infusion as compared to pre-ICV (C7D0) was IL-2 (>90-fold for C9D2) and the IFN-γ inducible chemokines CXCL9 and CXCL10 (>40-fold for C8D1, C9D2, C10D1 and C11D2). These cytokines returned to near baseline levels within 7-days between treatment cycles. Cytokines that did not show significant increase following CAR T cell infusions include IL-13, RANTES and VEGF (Tables 9 and 10).

TABLE 9

UPN 109 CSF Cytokine Analysis (pg/mL), ICV Cycles 7 through 11.

| Cytokine | C7D0 | C7D2 | C8D0 | C8D1 | C9D0 | C9D2 | C9D8 | C10D0 | C10D1 | C11D0 | C11D1 | C11D44 |
|---|---|---|---|---|---|---|---|---|---|---|---|---|
| EGF | OOR< | OOR< | OOR< | OOR< | OOR< | OOR< | OOR< | OOR< | OOR< | OOR< | OOR< | 10.0 |
| Eotaxin | *2.1 | *2.4 | *2.4 | 6.2 | 3.0 | 3.8 | *2.4 | *2.4 | 6.3 | *2.4 | 6.1 | *2.6 |
| FGF | 7.1 | 8.0 | 8.8 | 14.1 | *4.0 | *3.1 | *4.7 | *6.3 | 12.2 | 7.3 | 13.6 | 11.5 |
| G-CSF | *25.1 | 68.6 | *43.7 | 232.6 | 103.9 | 137.5 | 64.9 | *23.3 | 245.6 | *13.8 | 248.9 | 39.9 |
| GM-CSF | *2.0 | *2.4 | *2.5 | *8.7 | *2.5 | *4.2 | *1.4 | *1.3 | *3.2 | *1.3 | *2.7 | OOR< |
| HGF | 74.4 | 113.1 | 127.7 | 253.9 | 162.3 | 250.8 | 145.8 | 110.9 | 213.6 | 125.2 | 241.8 | 81.0 |
| IFN-α | 45.5 | 56.8 | 42.0 | 109.7 | 59.5 | 66.1 | 35.6 | 17.9 | 90.0 | 24.8 | 74.5 | OOR< |
| IFN-γ | *8.2 | *7.0 | *3.8 | 140.8 | 16.8 | 32.1 | *5.0 | *1.8 | 69.5 | *4.0 | 42.8 | *1.0 |
| IL-10 | *4.4 | *4.6 | *2.1 | 74.6 | 70.4 | 70.4 | *16.0 | *3.5 | 147.1 | *6.9 | 167.5 | OOR< |
| IL-12 | 16.7 | 23.5 | 24.7 | 92.4 | 41.5 | 82.7 | 62.4 | 35.5 | 57.0 | 42.6 | 85.7 | 12.7 |
| IL-13 | *15.8 | *15.3 | *13.1 | 29.9 | *15.9 | 18.1 | *4.8 | OOR< | 22.7 | OOR< | 18.8 | OOR< |
| IL-15 | OOR< | OOR< | OOR< | OOR< | OOR< | OOR< | OOR< | OOR< | OOR< | OOR< | OOR< | *7.1 |
| IL-17 | *2.4 | *2.8 | *0.9 | *9.2 | *5.4 | *5.1 | *2.3 | *1.2 | *8.5 | *1.0 | *8.1 | OOR< |
| IL-1Rα | *50.1 | *35.7 | *56.9 | 405.9 | 238.6 | 699.3 | 358.0 | 605.2 | 1113.0 | *53.4 | 1141.9 | 259.9 |
| IL-1β | *5.0 | 10.1 | *6.2 | 22.1 | *3.0 | 12.9 | *6.7 | *6.7 | 15.6 | *8.0 | 17.0 | *4.69 |
| IL-2 | OOR< | *4.2 | *0.8 | 55.4 | *1.0 | *2.7 | OOR< | *0.6 | 10.8 | *0.6 | *5.5 | OOR< |
| IL-2R | 43.8 | 81.0 | 51.2 | 223.7 | 89.6 | 243.1 | 67.7 | *13.1 | 219.3 | *18.3 | 241.5 | 54.2 |
| IL-4 | *2.5 | *3.8 | *2.9 | *17.0 | *5.5 | *8.3 | *3.9 | *2.3 | *13.8 | *1.3 | *10.5 | OOR< |

TABLE 9-continued

UPN 109 CSF Cytokine Analysis (pg/mL), ICV Cycles 7 through 11.

| Cytokine | C7D0 | C7D2 | C8D0 | C8D1 | C9D0 | C9D2 | C9D8 | C10D0 | C10D1 | C11D0 | C11D1 | C11D44 |
|---|---|---|---|---|---|---|---|---|---|---|---|---|
| IL-5 | OOR< | *1.3 | *0.5 | 14.7 | *2.6 | 9.1 | *1.0 | OOR< | 7.9 | OOR< | 7.7 | OOR< |
| IL-6 | 56.5 | 78.4 | 40.9 | 1062.5 | 106.5 | 318.4 | 47.0 | 33.2 | 688.5 | 31.4 | 857.3 | 23.2 |
| IL-7 | OOR< | 6.3 | OOR< | 42.7 | 20.0 | 19.9 | OOR< | 6.3 | 23.4 | OOR< | 22.0 | 28.0 |
| IL-8 | 226.2 | 231.0 | 253.4 | 4904.6 | 827.4 | 1591.0 | 677.8 | 283.2 | 1023.9 | 84.4 | 794.9 | 66.0 |
| IP-10 | 161.4 | 766.7 | 307.3 | 6213.7 | 916.7 | 59779.1 | 510.1 | 156.9 | 393430.8 | 345.3 | 305579.5 | 79.2 |
| MCP-1 | 1660.6 | 1752.3 | 1280.8 | 18439.9 | 4437.4 | 1939.1 | 791.9 | 1598.9 | 10868.4 | 420.0 | 3157.4 | 888.7 |
| MIG | 82.9 | 302.1 | 179.1 | 4500.5 | 1360.6 | 3621.2 | 1342.1 | 380.7 | 3423.0 | 288.2 | 3823.6 | 29.3 |
| MIP-1α | 22.0 | 28.0 | 20.7 | 68.1 | 31.9 | 50.8 | 19.7 | *14.8 | 68.6 | *14.6 | 64.4 | *8.8 |
| MIP-1β | 26.3 | 33.8 | 26.1 | 213.8 | 49.7 | 106.1 | 24.2 | 16.8 | 126.8 | 22.3 | 52.6 | 13.6 |
| RANTES | *15.5 | OOR< | OOR< | 41.7 | 25.7 | OOR< | OOR< | OOR< | 68.5 | *1.0 | *12.5 | OOR< |
| TNF-α | OOR< | OOR< | OOR< | 19.9 | *1.6 | *6.3 | OOR< | OOR< | 11.0 | OOR< | *5.1 | OOR< |
| VEGF | 17.0 | 21.8 | 16.7 | 90.2 | 25.5 | 38.6 | 10.9 | 7.8 | 65.5 | OOR< | 70.0 | 14.1 |

OOR<, Out of Range (below)
*Value extrapolated beyond standard range

TABLE 10

UPN 109 CSF Cytokine Fold Change Analysis, ICV Cycles 7 through 11.

| Cytokine | C7D0 | C7D2 | C8D0 | C8D1 | C9D0 | C9D2 | C9D8 | C10D0 | C10D1 | C11D0 | C11D1 | C11D44 |
|---|---|---|---|---|---|---|---|---|---|---|---|---|
| EGF | 1.0 | 1.0 | 1.0 | 1.0 | 1.0 | 1.0 | 1.0 | 1.0 | 1.0 | 1.0 | 1.0 | 1.0 |
| Eotaxin | 1.0 | 1.1 | 1.1 | 3.0 | 1.4 | 1.8 | 1.1 | 1.1 | 3.0 | 1.1 | 2.9 | 1.2 |
| FGF | 1.0 | 1.1 | 1.2 | 2.0 | 0.6 | 0.4 | 0.7 | 0.9 | 1.7 | 1.0 | 1.9 | 1.6 |
| G-CSF | 1.0 | 2.7 | 1.7 | 9.3 | 4.1 | 5.5 | 2.6 | 0.9 | 9.8 | 0.5 | 9.9 | 1.6 |
| GM-CSF | 1.0 | 1.2 | 1.3 | 4.4 | 1.3 | 2.1 | 0.7 | 0.7 | 1.6 | 0.7 | 1.4 | 0.7 |
| HGF | 1.0 | 1.5 | 1.7 | 3.4 | 2.2 | 3.4 | 2.0 | 1.5 | 2.9 | 1.7 | 3.3 | 1.1 |
| IFN-α | 1.0 | 1.2 | 0.9 | 2.4 | 1.3 | 1.5 | 0.8 | 0.4 | 2.0 | 0.5 | 1.6 | 0.5 |
| IFN-γ* | 1.0 | 0.9 | 0.5 | 17.2 | 2.0 | 3.9 | 0.6 | 0.2 | 8.5 | 0.5 | 5.2 | 0.1 |
| IL-10* | 1.0 | 1.4 | 0.5 | 17.0 | 4.7 | 16.0 | 3.6 | 0.8 | 33.4 | 1.6 | 38.1 | 0.5 |
| IL-12 | 1.0 | 1.4 | 1.5 | 5.5 | 2.5 | 5.0 | 3.7 | 2.1 | 3.4 | 2.6 | 5.1 | 0.8 |
| IL-13 | 1.0 | 1.0 | 0.8 | 1.9 | 1.0 | 1.1 | 0.3 | 0.3 | 1.4 | 0.3 | 1.2 | 0.3 |
| IL-15 | 1.0 | 1.0 | 1.0 | 1.0 | 1.0 | 1.0 | 1.0 | 1.0 | 1.0 | 1.0 | 1.0 | 1.0 |
| IL-17 | 1.0 | 1.2 | 0.4 | 3.8 | 2.3 | 2.1 | 1.0 | 0.5 | 3.5 | 0.4 | 3.4 | 0.4 |
| IL-1Rα* | 1.0 | 0.7 | 1.1 | 8.1 | 4.8 | 14.0 | 7.1 | 12.1 | 22.2 | 1.1 | 22.8 | 5.2 |
| IL-1β | 1.0 | 2.0 | 1.2 | 4.4 | 0.6 | 2.6 | 1.3 | 1.3 | 3.1 | 1.6 | 3.4 | 0.9 |
| IL-2* | 1.0 | 7.0 | 1.3 | 92.3 | 1.7 | 4.5 | 1.0 | 1.0 | 18.0 | 1.0 | 9.2 | 1.0 |
| IL-2R | 1.0 | 1.8 | 1.2 | 5.1 | 2.0 | 5.6 | 1.5 | 0.3 | 5.0 | 0.4 | 5.5 | 1.2 |
| IL-4 | 1.0 | 1.5 | 1.2 | 6.8 | 2.2 | 3.3 | 1.6 | 0.9 | 5.5 | 0.5 | 4.2 | 0.5 |
| IL-5* | 1.0 | 2.6 | 1.0 | 29.4 | 5.2 | 18.2 | 2.0 | 1.0 | 15.8 | 1.0 | 15.4 | 1.0 |
| IL-6* | 1.0 | 1.4 | 0.7 | 18.8 | 1.9 | 5.6 | 0.8 | 0.6 | 12.2 | 0.6 | 15.2 | 0.4 |
| IL-7 | 1.0 | 1.0 | 1.0 | 6.8 | 3.2 | 3.2 | 1.0 | 1.0 | 3.7 | 1.0 | 3.5 | 4.4 |
| IL-8* | 1.0 | 1.0 | 1.1 | 21.7 | 3.7 | 7.0 | 3.0 | 1.3 | 4.5 | 0.4 | 3.5 | 0.3 |
| IP-10* | 1.0 | 4.8 | 1.9 | 38.5 | 5.7 | 370.4 | 3.2 | 1.0 | 2437.6 | 2.1 | 1893.3 | 0.5 |
| MCP-1* | 1.0 | 1.1 | 0.8 | 11.1 | 2.7 | 1.2 | 0.5 | 1.0 | 6.5 | 0.3 | 1.9 | 0.5 |
| MIG* | 1.0 | 3.6 | 2.2 | 54.3 | 16.4 | 43.7 | 16.2 | 4.6 | 41.3 | 3.5 | 46.1 | 0.4 |
| MIP-1α | 1.0 | 1.3 | 0.9 | 3.1 | 1.5 | 2.3 | 0.9 | 0.7 | 3.1 | 0.7 | 2.9 | 0.4 |
| MIP-1β | 1.0 | 1.3 | 1.0 | 8.1 | 1.9 | 4.0 | 0.9 | 0.6 | 4.8 | 0.8 | 2.0 | 0.5 |
| RANTES | 1.0 | 0.1 | 0.1 | 2.7 | 1.7 | 0.1 | 0.1 | 0.1 | 4.4 | 0.1 | 0.8 | 0.1 |
| TNF-α* | 1.0 | 1.0 | 1.0 | 12.4 | 1.0 | 3.9 | 1.0 | 1.0 | 6.9 | 1.0 | 3.2 | 1.0 |
| VEGF | 1.0 | 1.3 | 1.0 | 5.3 | 1.5 | 2.3 | 0.6 | 0.5 | 3.9 | 0.5 | 4.1 | 0.8 |

Bold values, 'OOR<' value from Table 10 was replaced with the lowest measurable value for that cytokine to allow for fold change calculation.
*Cytokines in which a >10 fold increase was observed at least once These immunological changes in the CSF were local, as no significant changes in cytokine levels (Table 11), and no detectable CAR+ T cells by qPCR and flow cytometry (data not shown) in the peripheral blood were observed. The changes in the CSF could not be compared to changes in the resected cavity of tumor lesion 1 (T1) due to the inability to obtain cyst fluid from the cavity during the ICT treatment course.

TABLE 11

UPN 109 Serum Cytokine Analysis (pg/mL), ICV Cycles 7 through 11.

| Cytokine | C7D0 | C7D2 | C7D4 | C8D0 | C8D1 | C8D4 | C9D0 | C9D2 | C10D0 | C10D1 | C10D3 | C11D0 | C11D1 | C11D2 |
|---|---|---|---|---|---|---|---|---|---|---|---|---|---|---|
| EGF | 148.1 | 166.7 | 171.9 | 168.8 | 132.2 | 118.3 | 105.9 | 73.8 | 154.8 | 158.9 | 121.9 | 114.8 | 152.2 | 151.8 |
| Eotaxin | 110.1 | 116.8 | 112.6 | 101.2 | 83.7 | 133.8 | 152.1 | 156.4 | 172.1 | 167.9 | 143.2 | 147.3 | 197.7 | 168.3 |
| FGF | *5.3 | 8.3 | 6.8 | OOR< | OOR< | OOR< | OOR< | 14.7 | 17.4 | 22.7 | 20.2 | 14.8 | 15.3 | 15.9 |

TABLE 11-continued

UPN 109 Serum Cytokine Analysis (pg/mL), ICV Cycles 7 through 11.

| Cytokine | C7D0 | C7D2 | C7D4 | C8D0 | C8D1 | C8D4 | C9D0 | C9D2 | C10D0 | C10D1 | C10D3 | C11D0 | C11D1 | C11D2 |
|---|---|---|---|---|---|---|---|---|---|---|---|---|---|---|
| G-CSF | 211.6 | 236.7 | 284.5 | 229.3 | 208.2 | 208.2 | 210.8 | 230.1 | 216.7 | 334.3 | 221.8 | 282.9 | 207.4 | 241.6 |
| GM-CSF | *2.0 | *2.1 | *2.4 | *1.9 | *1.6 | *2.0 | *1.9 | *1.7 | *2.0 | *3.1 | *2.3 | *1.9 | *1.8 | *1.7 |
| HGF | 471.5 | 596.1 | 611.6 | 420.1 | 403.0 | 508.1 | 362.4 | 400.0 | 385.9 | 502.5 | 456.6 | 395.3 | 476.1 | 451.6 |
| IFN-α | 43.9 | 47.4 | 49.9 | 43.8 | 42.2 | 47.1 | 43.9 | 40.0 | 41.1 | 64.5 | 43.1 | 50.4 | 43.3 | 43.4 |
| IFN-γ | 53.0 | 52.5 | 56.4 | 52.2 | 52.1 | 55.5 | 52.2 | 44.8 | 45.6 | 58.5 | 47.0 | 54.8 | 49.7 | 50.7 |
| IL-10 | *2.9 | *3.9 | *3.4 | *0.8 | OOR< | *2.4 | *1.0 | *3.3 | *2.6 | *9.4 | *3.5 | *1.8 | *1.9 | *0.6 |
| IL-12 | 211.7 | 192.3 | 195.0 | 187.2 | 182.3 | 190.9 | 192.8 | 223.3 | 227.9 | 241.6 | 254.4 | 220.2 | 240.5 | 219.1 |
| IL-13 | 21.1 | 27.4 | 30.7 | 23.1 | 36.8 | 31.0 | 28.0 | 24.2 | 22.3 | 38.3 | 31.4 | 32.2 | 25.8 | 34.8 |
| IL-15 | OOR< | OOR< | OOR< | OOR< | OOR< | OOR< | OOR< | OOR< | OOR< | OOR< | OOR< | OOR< | OOR< | OOR< |
| IL-17 | *3.5 | *4.1 | *5.2 | OOR< | *1.8 | *0.7 | *0.8 | *3.3 | *4.6 | *11.5 | *5.2 | *7.3 | *4.4 | *4.4 |
| IL-1Rα | 112.7 | 145.3 | *68.2 | *94.3 | *73.8 | *64.5 | *58.2 | *64.9 | 101.1 | 133.8 | 96.3 | *68.7 | 107.9 | 105.8 |
| IL-1β | *2.1 | *4.6 | *4.9 | *1.0 | OOR< | OOR< | OOR< | 11.3 | 15.9 | 30.6 | 18.2 | 12.7 | 14.3 | 14.7 |
| IL-2 | *0.1 | *0.9 | *1.3 | *0.3 | OOR< | *0.2 | *0.3 | *0.4 | *0.9 | *5.2 | *1.2 | *1.8 | *0.9 | *1.0 |
| IL-2R | 372.0 | 391.2 | 438.5 | 352.6 | 273.9 | 272.7 | 241.9 | 304.9 | 312.2 | 363.8 | 314.8 | 338.0 | 296.4 | 314.5 |
| IL-4 | *8.9 | *11.5 | *13.5 | *9.0 | *10.4 | *10.5 | *10.1 | *10.2 | *8.7 | *20.9 | *11.1 | *13.8 | *9.7 | *10.8 |
| IL-5 | *1.6 | *2.0 | *3.2 | *0.2 | *1.5 | *1.1 | *0.8 | OOR< | OOR< | 5.1 | *0.2 | *2.2 | OOR< | OOR< |
| IL-6 | OOR< | *1.6 | *0.4 | OOR< | *0.7 | OOR< | OOR< | *2.5 | *2.6 | 7.1 | *4.2 | *2.9 | *3.9 | *3.0 |
| IL-7 | OOR< | OOR< | OOR< | OOR< | OOR< | OOR< | OOR< | OOR< | OOR< | OOR< | OOR< | OOR< | OOR< | OOR< |
| IL-8 | 49.4 | 130.2 | 88.4 | 96.4 | 56.3 | 17.1 | 43.6 | *9.4 | 32.8 | 93.1 | 112.1 | 18.3 | 30.1 | 59.0 |
| IP-10 | 33.9 | 23.5 | 17.2 | 11.7 | 9.0 | 11.5 | 15.0 | 12.7 | 17.4 | 33.6 | 16.3 | 15.3 | 23.2 | 18.9 |
| MCP-1 | 459.6 | 610.9 | 475.9 | 426.2 | 414.8 | 561.0 | 944.8 | 538.5 | 848.2 | 1074.3 | 703.0 | 954.9 | 950.0 | 826.3 |
| MIG | 141.3 | 108.1 | 50.6 | 8.0 | OOR< | 10.0 | 28.5 | 34.0 | 41.2 | 79.1 | 42.6 | 47.3 | 42.2 | 44.2 |
| MIP-1α | 58.4 | 58.4 | 62.2 | 51.1 | 49.2 | 53.4 | 53.1 | 47.1 | 55.8 | 81.2 | 57.7 | 64.6 | 52.7 | 54.1 |
| MIP-1β | 103.3 | 93.4 | 92.0 | 78.1 | 64.4 | 76.8 | 83.1 | 57.3 | 84.5 | 157.1 | 86.3 | 90.0 | 87.6 | 90.0 |
| RANTES | 11127.1 | 11965.0 | 14328.5 | 10584.5 | 12610.1 | 12415.5 | 12937.9 | 9221.7 | 8567.4 | 10428.1 | 8886.3 | 11117.8 | 9782.5 | 9771.1 |
| TNF-α | *1.2 | *2.1 | *4.5 | *2.3 | *2.6 | *2.1 | *2.3 | OOR< | OOR< | 7.2 | OOR< | *2.1 | OOR< | OOR< |
| VEGF | OOR< | OOR< | OOR< | OOR< | OOR< | OOR< | OOR< | OOR< | OOR< | OOR< | OOR< | OOR< | OOR< | OOR< |

OOR<, Out of Range (below)

*Value extrapolated beyond standard range

Example 24: Patient Sample Processing and Analysis

Tumor resection material was collected through the COH department of Pathology according to the clinical protocol.

IL13Rα2 immunohistochemistry (IHC) was performed on 5 μm-sections of formalin-fixed paraffin-embedded specimens as previously described, and Ki67 IHC was similarly performed with the exception of antigen retrieval by heating @ pH 8.0, and incubation with a 1:75 dilution of anti-K167 (Dako Corp). IL-13Rα2 immunoreactivity was scored by a clinical neuropathologist and quantified based on the percentage of tumor cells exhibiting weak (1+), moderate (2+), or strong (3+) intensity of cytoplasmic and golgi-like staining. The H score is obtained by the formula: (3× percentage of strongly staining cells)+(2×percentage of moderately staining cells)+percentage of weakly staining cells, giving a range of 0 to 300. The H score can be translated into the intensity scoring system described in the enrollment criteria as follows: 0 representing negative (H score 0), 1+ low (H score 1-100), 2+ moderate (H score 101-200) and 3+ high (H score 201-300). The criteria for inclusion was at least 20% of the cells scoring 1+ staining intensity (>20%, 1+), representing an H score of 20. Appropriate positive (testicular) and negative (prostate) controls were employed for IL-13Rα2 IHC staining. A "+" sign reflects the presence of membranous staining. This test has been performed at the Department of Pathology, City of Hope National Medical Center and is regarded as investigational for research. This Laboratory is certified under the Clinical Laboratory Improvement Amendments of 1988 (CLIA) as qualified to perform high complexity clinical laboratory testing.

Peripheral blood samples were collected in vacutainer tubes ±EDTA. Samples with EDTA were ficolled immediately upon receipt and peripheral blood mononuclear cells (PBMC) were frozen in Crystor CS5 at −80° C. and then transferred to liquid nitrogen for long term storage. Samples without EDTA were allowed to coagulate for 2-3 hours at room temperature; serum was collected by centrifugation, aliquoted in single use 100-200 μl aliquots and stored at −80° C. Cerebral spinal fluid (CSF) was collected from the ICV reservoir in a 3 cc syringe, spun down, and supernatants were aliquoted and stored at −80° C. The CSF cells were resuspended in HBSS-/-(Corning CellGro) with 2% FCS and sodium azide for immediate flow cytometric analysis, with the remaining cells resuspended and frozen in Cryostor CS4 at −80° C. and then transferred to liquid nitrogen for long term storage Cell surface phenotyping of immune cells was performed by flow cytometry using fluorochrome conjugated antibodies specific for CD3, CD4, CD11b, CD14, CD19, CD27, CD28, CD62L, CD45RA, CD45RO, IL-13, TCR-a/B (BD Biosciences), KLRG1, CD15 (BioLegend), HLA-DR, PD1 (eBiosciences), CD8 (Fisher Scientific), LAG-3 (Lifespan Biosciences), CCR7, or TIM-3 (R&D Systems), and their respective isotype controls.

Research participant serum and CSF samples were analyzed by cytokine bead array. Assays were performed using the Human Cytokine 30-Plex Panel kit (Invitrogen) and a FLEXMAP 3D® (Luminex).

What is claimed is:

1. A method of treating a glioma in a human patient comprising administering intraventricularly to the patient a composition comprising an effective amount of T cells expressing a chimeric antigen receptor that binds to IL13 receptor α2.

2. The method of claim 1 wherein the T cells are autologous or allogenic T cells.

3. The method of claim 1, wherein the administration is to the left ventricle or the right ventricle.

4. The method of claim 1, wherein the composition comprises at least 1×10⁶ T cells.

5. The method of claim 1, wherein the composition comprising T cells is administered at least two times.

6. The method of claim 5, wherein administrations differ in the total number of T cells administered.

7. The method of claim 5, wherein the administrations escalate in dose.

8. The method of claim 5, wherein the administrations de-escalate in dose.

9. The method of claim 1, wherein the glioma is a diffuse, infiltrating tumor.

10. The method of claim 1, wherein one or more tumor foci decrease in size by at least 25%.

11. The method of claim 1, wherein the method is performed after tumor resection.

12. The method of claim 1, further comprising intratumoral administration of a composition comprising T cells.

13. The method of claim 1, wherein the glioma is glioblastoma.

14. The method of claim 1, wherein the chimeric antigen receptor comprises the amino acid sequence of SEQ ID NO: 3.

15. The method of claim 1, wherein the chimeric antigen receptor comprises an amino acid sequence selected from the group consisting of SEQ ID NOs: 31-48.

16. The method of claim 1, wherein the chimeric antigen receptor comprises amino acids 23-540 of SEQ ID NO: 10.

* * * * *